United States Patent
Nakashima et al.

(10) Patent No.: US 8,189,470 B2
(45) Date of Patent: May 29, 2012

(54) COMMUNICATION APPARATUS AND DEVICE, COMMUNICATION APPARATUS CONTROL METHOD

(75) Inventors: Ken Nakashima, Yamatokoriyama (JP); Kentaroh Hama, Nara (JP); Wataru Gohda, Chiba (JP); Yuhsuke Yamada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 429 days.

(21) Appl. No.: 12/305,644

(22) PCT Filed: Jul. 4, 2007

(86) PCT No.: PCT/JP2007/063389
§ 371 (c)(1),
(2), (4) Date: Jul. 29, 2009

(87) PCT Pub. No.: WO2008/004592
PCT Pub. Date: Jan. 10, 2008

(65) Prior Publication Data
US 2010/0020681 A1      Jan. 28, 2010

(30) Foreign Application Priority Data

Jul. 4, 2006  (JP) ................................ 2006-184888
Jul. 4, 2007  (JP) ................................ 2007-176445
Jul. 4, 2007  (JP) ................................ 2007-176446

(51) Int. Cl.
*H04L 1/00*    (2006.01)

(52) U.S. Cl. .......................... 370/231; 370/252; 370/468
(58) Field of Classification Search .......... 370/229–235, 370/252, 253, 400, 401, 468
See application file for complete search history.

(56) References Cited

U.S. PATENT DOCUMENTS
2002/0181484 A1 * 12/2002 Aimoto ........................ 370/413

FOREIGN PATENT DOCUMENTS
| JP | 2001-156838 A | 6/2001 |
| JP | 2003-37621 A | 2/2003 |
| JP | 2003-153221 A | 5/2003 |
| JP | 2008-263535 A | 10/2008 |
| WO | WO-2005/096583 A2 | 10/2005 |

* cited by examiner

Primary Examiner — Pao Sinkantarakorn
(74) Attorney, Agent, or Firm — Birch, Stewart, Kolasch & Birch, LLP

(57) ABSTRACT

Provided is a communication apparatus by which a user can simply set a transmission quality in a network and QoS control effectively functions. QoS type receiving sections (11, 21, 31, 41) are arranged in communication apparatuses (10, 20, 30, 40) on a network, and a user is permitted to specify a QoS type to be requested to the communication apparatuses (10, 20, 30, 40), by operating the QoS type receiving sections (11, 21, 31, 41). When the communication apparatuses (10, 20, 30, 40) perform communication, the network is controlled to ensure the QoS corresponding to the QoS type received by the QoS type receiving sections (11, 21, 31, 41).

39 Claims, 43 Drawing Sheets

PLC NETWORK

FIG. 19

| INPUT OUTPUT PORT | QoS TYPE |
|---|---|
| FIRST PORT | HD |

FIG. 20

| QoS TYPE | QoS PARAMETER (NECESSARY BANDWIDTH) |
|---|---|
| SD | 6Mbps |
| HD | 16Mbps |

FIG. 21

| INPUT OUTPUT PORT | Ethernet ADDRESS |
|---|---|
| FIRST PORT | E1 |
| SECOND PORT | NO ADDRESS |
| THIRD PORT | E2 |

FIG. 22

| ADDRESS | QoS PARAMETER (NECESSARY BANDWIDTH) | HISTORY INFORMATION (TOTAL PACKET SIZE) |
|---|---|---|
| E1 | 16Mbps | 1Mbyte |

FIG. 26

| INPUT OUTPUT PORT | QoS TYPE |
|---|---|
| FIRST PORT | HIGH PRIORITY |

FIG. 27

| QoS TYPE | QoS CONTROL INFORMATION (PRIORITY) |
|---|---|
| NORMAL | 1 |
| PRIORITIZED | 2 |
| HIGHLY PRIORITIZED | 3 |

FIG. 28

| ADDRESS | QoS CONTROL INFORMATION (PRIORITY) | HISTORY INFORMATION (TOTAL PACKET SIZE) |
|---|---|---|
| E1 | 3 | 1Mbyte |

FIG. 33

| INPUT OUTPUT PORT | QoS IS REQUIRED OR NOT |
|---|---|
| FIRST PORT | REQUIRED |
| SECOND PORT | NOT REQUIRED |
| THIRD PORT | NOT REQUIRED |

FIG. 39

| INPUT OUTPUT PORT | QoS TYPE |
|---|---|
| FIRST PORT | HD |
| SECOND PORT | OFF |
| THIRD PORT | OFF |

FIG. 40

| ADDRESS | QoS PARAMETER (NECESSARY BANDWIDTH) | HISTORY INFORMATION (TOTAL PACKET SIZE) |
|---|---|---|
| E1 | 16Mbps | 1Mbyte |

FIG. 44

| Ethernet ADDRESS | QoS IS REQUIRED OR NOT |
|---|---|
| E1 | REQUIRED |
| NO ADDRESS | — |
| E2 | NOT REQUIRED |

FIG. 49

| INPUT OUTPUT PORT | QoS CONTROL INFORMATION | | |
|---|---|---|---|
| | QoS MODE | PRIORITY | NECESSARY BANDWIDTH |
| FIRST PORT | BANDWIDTH GUARANTEED | NOT USED | 16Mbps |
| SECOND PORT | PRIORITY CONTROL | 3 | NOT USED |

FIG. 50

| Ethernet ADDRESS | QoS CONTROL INFORMATION | | | HISTORY INFORMATION |
|---|---|---|---|---|
| | QoS MODE | PRIORITY | NECESSARY BANDWIDTH | TOTAL PACKET SIZE |
| E1 | BANDWIDTH GUARANTEED | NOT USED | 16Mbps | 1Mbyte |
| E2 | PRIORITY CONTROL | 3 | NOT USED | 10Kbyte |

COMMUNICATION APPARATUS AND DEVICE, COMMUNICATION APPARATUS CONTROL METHOD

TECHNICAL FIELD

The present invention relates to a communication apparatus and control method thereof each of which allows QoS to be set in a communication network.

BACKGROUND ART

Conventionally, transmission/reception of packets has been carried out based on a communication method referred to as "packet communication method" in a computer network. Recently, there has been a great demand for construction of LAN (Local Area Network) using PLC (Power Line Communication) in a home LAN.

Unlike the wired LAN, the LAN based on PLC does not require any special LAN cable to be wired and allows for construction of a network merely by connecting a power source cable of a device to a plug, so that this results in such advantage that a terminal can be more freely moved.

As to the LAN or the like based on PLC, in case of connecting a plurality of slave stations to a network in which a master station manages a bandwidth, a single network medium is shared by the plurality of slave stations in a time-division manner regarding transmission/reception of packets. In such a system, an efficiency at which the bandwidth is utilized greatly varies depending on how to manage transmission rights of the respective slave stations.

<QoS Technique>

Incidentally, in transferring non real-time data such as Web content item, mail, FTP, and the like, occurrence of certain transfer delay or jitter does not raise so significant problem. However, in transferring real-time data such as video, sound, and the like, transfer delay or jitter causes the video or the sound to be disarranged, so that it is necessary to suppress the transfer delay or the jitter to a certain level.

A technique for simultaneously and efficiently realizing transfer of plural data pieces in accordance with types of data pieces while keeping appropriate quality is referred to as "QoS (Quality of Service) technique." The QoS technique is roughly categorized into "Prioritized QoS" and "Parameterized QoS".

<Prioritized QoS>

In the Prioritized QoS, a communication apparatus for transmitting data gives a packet of data a priority according to a type of the data and a characteristic of a communication apparatus for transmitting/receiving the data so as to preferentially control transmission in accordance with the priority given to the packet, thereby realizing QoS.

Generally, a field for storing therein the priority is provided in a header of the packet, and a numerical value indicative of the priority is stored therein.

For example, higher transfer quality is required in transferring real-time data than in transferring non real-time data, so that a numerical value indicative of a higher priority is stored in the priority field of the header of the real-time data than in the priority field of the header of the non real-time data, and transmission is carried out in accordance with the priority corresponding to the numerical value, thereby realizing QoS.

<Parameterized QoS>

In the Parameterized QoS, a master station for managing a bandwidth of the entire network is provided, and the master station manages a schedule for using the bandwidth of the entire network in accordance with QoS parameters requested by slave stations, and all the slave stations are collectively managed in terms of the number of times of transmission and a transmission time, thereby realizing QoS.

In case of carrying out transfer whose QoS is guaranteed, a slave station preliminarily transmits a signal which requests for QoS transfer. This request signal includes a QoS parameter, and the master station interprets the QoS parameter, so as to determine whether QoS can be realized or not in accordance with a current status in which the network is used. If it is determined that QoS can be realized, the master station permits the QoS transfer. If it is determined that QoS cannot be realized, the master station refuses.

For example, in case where other slave station is carrying out QoS transfer and a sufficient bandwidth does not remain, the master station refuses the QoS transfer.

The master station always manages the schedule for allocating bandwidth so that QoS is guaranteed for each slave station and transmits a transmission permission signal to each slave station in accordance with the schedule. The slave station transfers data only in a period notified by the transmission permission signal.

In this way, there is no competition for access in the entire network, so that QoS is realized.

In the Parameterized QoS, QoS is managed for each flow. The flow refers to a series of data pieces required to be continuously transferred, e.g., video content, sound content, and the like. A plurality of packets belong to the series of data pieces.

In case of simultaneously transferring a plurality of content pieces, it is necessary to carry out QoS control in different manners corresponding to the content pieces respectively. For example, in case where a single communication apparatus simultaneously transmits video content and sound content, these content items are different from each other in terms of what is required in QoS.

The master station has to determine a schedule for using a bandwidth for each flow, so that it is necessary to find (i) a flow to which the packet belongs and (ii) a QoS parameter required, in transmitting the packet.

In order to realize QoS for each flow, the slave station notifies the master station of the QoS parameter together with flow identification information. The master station manages the schedule for using a bandwidth for each flow. In transmitting a transmission permission signal, the master station notifies also the flow identification information so as to show which flow corresponds to the transmission permission. The communication apparatus for carrying out the transmission transmits only a packet corresponding to the flow identification information, so that it is possible to control QoS for each flow.

The flow identification information is a part or a combination of: a receiving-end MAC address and a transmitting-end MAC address in a MAC header; a receiving-end IP address and a transmitting-end IP address in an IP header; a receiving-end port number and a transmitting-end port number in a TCP header (or a UDP header); a Flow Label field in an IPv6; a VID (VLAN Identifier) field of a VLAN tag in a frame header of Ethernet (registered trademark); and the like.

It is general to use the VID field of the VLAN tag not to virtually dividing LAN but to identify a flow.

In case of separating IP phone data and ordinary data (Web or FTP) from each other for example, physical separation thereof might be possible, but this is substantially impossible. Thus, it is general to carry out virtual separation with VLAN (a physically connected cable is shared but these data pieces are regarded as belonging to respective networks). For example, a first VID is allocated to transfer of the IP phone data, and a second VID is allocated to transfer of the ordinary data.

<How to Set QoS>

Generally, QoS is realized in a layer 2 or a layer 3 of an OSI reference model. Hereinafter, a layer for realizing and controlling QoS is referred to as "QoS control layer".

In both the Prioritized QoS and the Parameterized QoS, the QoS control layer has to find transfer quality, required in transferring data, in order to realize QoS. However, it is general that such information is managed by a superordinate layer of the QoS control layer.

For example, the bandwidth control in PLC is realized by a MAC layer (a sub layer of the layer 2 in the OSI reference model), but what data is actually transferred can be found only at an application layer (a layer 7 in the OSI reference model).

For example, a program causes a content item to be selected and causes a preparation for transfer to be made at the layer 7 and then the data is passed to a subordinate layer, but the data passed from the superordinate layer is nothing but data for the subordinate layer and it is impossible to find its detail content and cannot find a program from which the data derives.

Thus, it is preferable that, before starting transfer of the data, the superordinate layer should request the QoS control layer to set QoS with information indicative of a program which the data is derived from and of a purpose of use thereof. However, mechanism of QoS has not been so widely known, so that the subordinate layer is not designed on the assumption that the subordinate layer is applied to QoS. Thus, mechanism of the notification has not been incorporated into most of systems.

<Regarding QoS Setting from a Terminal Connected to a Bridge Apparatus>

Further, in order to connect an apparatus equipped with an Ethernet interface (the apparatus is referred to as "Ethernet terminal") to the PLC network, it is necessary to connect a bridge apparatus to the Ethernet terminal so that the Ethernet terminal is connected to the PLC network via the bridge apparatus. In case where the Ethernet terminal is to transfer data whose QoS has been secured in a PLC network interval in response to a received flow, the Ethernet terminal transmits any instruction to the bridge apparatus, and the bridge apparatus sets QoS of the PLC network in accordance with the instruction. For example, it is general to transmit an Ethernet packet indicative of such instruction from the Ethernet terminal to the bridge apparatus so as to control QoS.

<Regarding Patent Document 1>

Patent Document 1 describes mechanism for the user to specify a priority of Prioritized QoS in order to solve the problem.

In a home network connected to the CATV network, a MAC address of an information communication device connected to the home network and a transfer priority for the information communication device are preliminarily inputted by the user to a cable modem apparatus. As to the MAC address, the user refers to an instruction manual or checks out in a similar manner so as to find the MAC address.

In the cable modem apparatus, the inputted information is reserved as a control table, and the MAC address of a receiving end or a transmitting end in the home network is compared with the MAC address reserved in the control table so as to derive a priority of the packet, and an order of processes is changed in accordance with the priority, thereby realizing the Prioritized QoS for each information communication device.

Patent Document 1: Japanese Unexamined Patent Publication Tokukai 2003-153221 (Publication date: May 23, 2003)

DISCLOSURE OF THE INVENTION

However, according to the technique disclosed by Patent Document 1, the user has to preliminarily input the MAC address of the information communication device and the transfer priority to the cable modem apparatus. This raises such problem that the user cannot easily set transfer quality.

Specifically, the MAC address is a 48-bit address particular to the information communication device, and it is troublesome for the user to manually input the MAC address. Further, there is a possibility that the user may fail to intentionally set the priority in line due to an incorrect input or a similar cause. Further, the user has to refer to an instruction manual in inputting a MAC address of each device, but it is difficult for an ordinary user to understand concept of the MAC address, so that it is extremely difficult to check up this.

Further, in case of carrying out the setting of Parameterized QoS, it is necessary to set not only the MAC address but also a large number of QoS parameters, so that the user is more likely to fail intentionally set the priority due to the user's incorrect input than in Prioritized QoS.

In case of setting Parameterized QoS using a conventional technique, the user has to entirely understand meanings of the respective QoS parameters and input them one by one.

Thus, transfer quality is not appropriately set in the network. As a result, the QoS control is less likely to function effectively.

Further, in case where the Ethernet terminal is to carry out data transfer whose QoS has been secured in the PLC section in response to the received flow, it is necessary to transmit any instruction from the Ethernet terminal to the bridge apparatus. In case where the Ethernet terminal receiving the flow does not have a function for transmitting the instruction, the bridge apparatus cannot receive the instruction, so that the bridge apparatus cannot carry out the QoS setting process. Thus, with respect to the flow received by the Ethernet terminal, data transfer whose QoS has been secured cannot be carried out in the PLC section.

Further, in case of connecting a device such as a television, an HDD recorder, an STB, a game machine, and the like to a network with use of Ethernet or the like, it is often that devices which are compatible with each other are placed on the same spot. For example, the HDD recorder, the STB, and the game machine are basically connected to the television in being used, so that it is often that the television and these devices are placed on the same spot.

In this case, if there is only one device which can be connected to a single PLC adaptor, it is necessary to prepare as many PLC adaptors as the devices connected to the network. In order to save the space in which the PLC adaptors are placed and reduce the cost for the PLC adaptors, it is preferable that a plurality of devices are connected to a single PLC adaptor.

Further, it is preferable that QoS control of data transmitted to the respective devices is efficiently carried out also under such condition that a plurality of devices are connected to a single PLC adaptor.

Such problems cannot be solved by conventional arrangements.

The present invention was made in view of the foregoing problems, and an object of the present invention is to provide a communication apparatus whereby the user can easily set transmission quality in a network and its QoS control can effectively function (it is possible to efficiently carry out QoS control).

In order to solve the foregoing problems, a communication apparatus according to the present invention receives data and comprises: a QoS type receiving means for receiving a QoS type indicative of a type of QoS control of the data; a QoS control information conversion means for converting the QoS type received by the QoS type receiving means into QoS control information of the data; and a QoS setting control means for carrying out a QoS setting process with respect to the data in accordance with the QoS control information obtained by the conversion.

In the foregoing arrangement, the communication apparatus sets and controls QoS in data transfer between the communication apparatus and other communication apparatus which communicates with that communication apparatus. In setting QoS, the communication apparatus uses QoS control information, obtained by conversion of the QoS type received by the QoS type receiving means which conversion is carried out by the QoS control information conversion means, in order to determine a size of a transfer bandwidth which should be secured in the network.

Note that, the QoS control information is a transmission priority in case of Prioritized QoS in PLC and is a QoS parameter in case of Parameterized QoS.

Further, the thus generated QoS setting request is transmitted to a transmitting end of the data transfer in case of Prioritized QoS and is transmitted to a master station in case of Parameterized QoS.

According to the foregoing arrangement, appropriate QoS is set by merely specifying a QoS type, so that QoS control is carried out. That is, it is not necessary to input complicate information such as a MAC address and the like. This makes it possible to set QoS in a simpler manner.

In order to solve the foregoing problems, a communication apparatus according to the present invention transmits data and comprises: a QoS type request means for obtaining a QoS type, indicative of a type of QoS control of the data, from a communication apparatus for receiving the data; a QoS control information conversion means for converting the QoS type, obtained by the QoS type request means, into QoS control information of the data; and a QoS setting control means for carrying out a QoS setting process with respect to the data in accordance with the QoS control information obtained by the conversion.

In the foregoing arrangement, the communication apparatus sets and controls QoS in data transfer between the communication apparatus and other communication apparatus which communicates with that communication apparatus. In setting QoS, the communication apparatus uses QoS control information, obtained by conversion of the QoS type obtained from the communication apparatus for receiving data which conversion is carried out by the QoS control information conversion means, in order to determine a size of a transfer bandwidth which should be secured in the network.

Note that, the meaning of the QoS control information and the receiving end of the QoS setting request are as described above.

According to the foregoing arrangement, appropriate QoS is set by merely obtaining a QoS type from the communication apparatus for receiving data, so that QoS control is carried out. That is, it is not necessary to input complicate information such as a MAC address and the like. This makes it possible to set QoS in a simpler manner.

In order to solve the foregoing problems, a communication apparatus according to the present invention receives data and comprises: a QoS type receiving means for receiving a QoS type indicative of a type of QoS control of the data; and a QoS type notification means for notifying the QoS type, received by the QoS type receiving means, to a communication apparatus for transmitting the data.

In the foregoing arrangement, other communication apparatus which communicates with that communication apparatus sets and controls QoS in data transfer between the communication apparatus and other communication apparatus. In setting QoS, the QoS type notification means transmits the QoS type, received by the QoS type receiving means, to the communication apparatus for transmitting data, in order to determine a size of a transfer bandwidth which should be secured in the network.

According to the foregoing arrangement, appropriate QoS is set by merely specifying a QoS type, so that QoS control is carried out. That is, it is not necessary to input complicate information such as a MAC address and the like. This makes it possible to set QoS in a simpler manner.

In order to solve the foregoing problems, a communication apparatus according to the present invention transmits data and comprises: a QoS control information request means for obtaining QoS control information of the data from a communication apparatus for receiving the data; and a QoS setting control means for carrying out a QoS setting process with respect to the data in accordance with the QoS control information obtained by the QoS control information request means.

In the foregoing arrangement, the communication apparatus sets and controls QoS in data transfer between the communication apparatus and other communication apparatus which communicates with that communication apparatus. In setting QoS, the communication apparatus uses QoS control information, obtained from the communication apparatus for receiving data, in order to determine a size of a transfer bandwidth which should be secured in the network.

Note that, the meaning of the QoS control information and the receiving end of the QoS setting request are as described above.

According to the foregoing arrangement, appropriate QoS is set by merely obtaining QoS control information from the communication apparatus for receiving data, so that QoS control is carried out. That is, it is not necessary to input complicate information such as a MAC address and the like. This makes it possible to set QoS in a simpler manner.

In order to solve the foregoing problems, a communication apparatus according to the present invention receives data and comprises: a QoS type receiving means for receiving a QoS type indicative of a type of QoS control of the data; a QoS control information conversion means for converting the QoS type received by the QoS type receiving means into QoS control information of the data; and a QoS control information notification means for notifying the QoS control information, obtained by the conversion carried out by the QoS control information conversion means, to a communication apparatus for transmitting the data.

In the foregoing arrangement, other communication apparatus which communicates with that communication apparatus sets and controls QoS in data transfer between the communication apparatus and other communication apparatus. In setting QoS, the QoS control information notification means transmits, to the communication apparatus for transmitting data, the QoS control information, obtained by conversion of the QoS type received by the QoS type receiving means which conversion is carried out by the QoS control information conversion means, in order to determine a size of a transfer bandwidth which should be secured in the network.

According to the foregoing arrangement, appropriate QoS is set by merely specifying a QoS type, so that QoS control is carried out. That is, it is not necessary to input complicate information such as a MAC address and the like. This makes it possible to set QoS in a simpler manner.

In order to solve the foregoing problems, a communication apparatus according to the present invention receives data and comprises: a QoS type receiving means for receiving a QoS type indicative of a type of QoS control of the data; and a QoS setting control means for carrying out a QoS cancellation process with respect to the data received by the communication apparatus in case where the QoS type received by the QoS type receiving means indicates that the QoS control is not required.

According to the foregoing arrangement, the QoS type receiving means receives a QoS type indicative of a type of QoS control of the data. The QoS setting control means carries out a QoS cancellation process with respect to the data received by the communication apparatus in case where the QoS type received by the QoS type receiving means indicates that the QoS control is not required. The QoS cancellation process is, for example, a process in which a request for cancellation of the QoS control is transmitted to the communication apparatus for transmitting data.

Therefore, in case where the QoS control is not required, it is possible to cancel the QoS control with respect to data received by the communication apparatus, so that the QoS control can be efficiently carried out. Further, the user's instruction to cancel the QoS control is received by the receiving communication apparatus, so that the user does not have to input complicate information such as a MAC address and the like. This makes it possible to cancel the QoS control in a simpler manner.

In order to solve the foregoing problems, a communication apparatus according to the present invention transmits data and comprises: a QoS type request means for obtaining a QoS type indicative of a type of QoS control of the data from a communication apparatus for receiving the data; and a QoS setting control means for carrying out a QoS cancellation process with respect to the data in case where the QoS type obtained by the QoS type request means indicates that the QoS control is not required.

According to the foregoing arrangement, the QoS type request means obtains a QoS type indicative of a type of QoS control of the data from a communication apparatus for receiving the data. The QoS setting control means carries out a QoS cancellation process with respect to the data in case where the QoS type obtained by the QoS type request means indicates that the QoS control is not required. The QoS cancellation process is, for example, a process in which: in case where the communication apparatus for transmitting data carries out priority control transfer with respect to data addressed to the communication apparatus for receiving data, the receiving communication apparatus is excluded from the target of the priority control transfer.

Therefore, in case where the QoS control is not required, it is possible to cancel the QoS control with respect to data received by the communication apparatus for receiving data, so that the QoS control can be efficiently carried out. Further, the instruction to cancel the QoS control can be obtained from the receiving communication apparatus, so that the user does not have to input complicate information such as a MAC address and the like. This makes it possible to set QoS in a simpler manner.

In order to solve the foregoing problems, a communication apparatus according to the present invention transmits data and comprises: a QoS control information request means for obtaining QoS control information of the data from a communication apparatus for receiving the data; and a QoS setting control means for carrying out a QoS cancellation process with respect to the data in case where the QoS control information obtained by the QoS control information request means indicates that the QoS control with respect to the data is not required.

According to the foregoing arrangement, the QoS control information request means obtains QoS control information of the data from a communication apparatus for receiving the data. The QoS setting control means carries out a QoS cancellation process with respect to the data in case where the QoS control information obtained by the QoS control information request means indicates that the QoS control with respect to the data is not required. The QoS cancellation process is, for example, a process in which: in case where the communication apparatus for transmitting data carries out priority control transfer with respect to data addressed to the communication apparatus for receiving data, the receiving communication apparatus is excluded from the target of the priority control transfer.

Therefore, in case where the QoS control is not required, it is possible to cancel the QoS control with respect to data received by the communication apparatus for receiving data, so that the QoS control can be efficiently carried out. Further, the instruction to cancel the QoS control can be obtained from the receiving communication apparatus, so that the user does not have to input complicate information such as a MAC address and the like. This makes it possible to set QoS in a simpler manner.

In order to solve the foregoing problems, a communication apparatus according to the present invention receives data and comprises: a QoS type receiving means for receiving a QoS type indicative of a type of QoS control of the data; and a QoS control information notification means for notifying, to a communication apparatus for transmitting the data, QoS information indicating that the QoS control with respect to the data is not required, in case where the QoS type received by the QoS type receiving means indicates that the QoS control with respect to the data is not required.

According to the foregoing arrangement, the QoS type receiving means receives a QoS type indicative of a type of QoS control of the data. The QoS control information notification means notifies, to a communication apparatus for transmitting the data, QoS information indicating that the QoS control with respect to the data is not required, in case where the QoS type received by the QoS type receiving means indicates that the QoS control with respect to the data is not required.

Therefore, in case where the QoS control is not required, it is possible to cancel the QoS control with respect to data received by the communication apparatus for receiving data, so that the QoS control can be efficiently carried out. Further, the instruction to cancel the QoS control can be obtained from the receiving communication apparatus, so that the user does not have to input complicate information such as a MAC address and the like. This makes it possible to set QoS in a simpler manner.

In order to solve the foregoing problems, a communication apparatus according to the present invention transmits data to a receiving communication apparatus, comprising: a QoS setting control means for carrying out a QoS setting process with respect to the data; a bridge information obtaining means for obtaining, from the receiving communication apparatus, bridge information including an address of an apparatus to which the data is relayed by the receiving communication apparatus; and a flow identification information obtaining means for obtaining, from the data, flow identification information for identifying a flow including the data having been received, wherein the QoS setting control means determines whether or not to carry out the QoS setting process in accordance with a result obtained by making a cross-check between the bridge information obtained by the bridge information obtaining means and the flow identification information obtained by the flow identification information obtaining means.

In the foregoing arrangement, the communication apparatus makes a cross-check between an address of the apparatus connected to the communication apparatus to which the received data is to be transferred and the flow identification information indicative of a flow to which the QoS control is to be carried out, and in case where the address and the flow correspond to each other, the QoS control is carried out with respect to a packet which is to be transferred to the apparatus.

According to the foregoing arrangement, it is possible to find a relationship between the address of the apparatus connected to the communication apparatus to which data is to be transferred and the packet which should be subjected to the QoS control. This makes it possible to carry out the QoS control with respect to the flow so that the QoS control corresponds to each apparatus connected to the communication apparatus to which a packet is to be transferred.

In order to solve the foregoing problems, a communication apparatus according to the present invention relays data transfer between a first network and a second network, wherein said communication apparatus comprises a QoS setting control means for setting QoS of the second network regarding a flow received, by an apparatus connected to the communication apparatus via the first network, from an apparatus connected to the communication apparatus via the second network.

According to the foregoing arrangement, in the communication apparatus which relays data transfer between a first network and a second network, even if the apparatus connected to the first network does not have a function for instructing the communication apparatus to carry out the QoS setting with respect to the communication apparatus, the QoS setting control section instead carries out the QoS setting with respect to the flow.

In the foregoing arrangement, instead of the apparatus connected to the first network, the QoS setting control section carries out the QoS setting in the second network. Thus, when the apparatus connected to the first network receives a flow which requires QoS, even if the apparatus connected to the first network does not have a function for instructing the communication apparatus to carry out the QoS setting with respect to the communication apparatus, the QoS setting for the flow is carried out in the second network, thereby carrying out data transfer whose QoS for the flow is secured.

An apparatus of the present invention is connected to the communication apparatus so as to receive data, said apparatus outputting the QoS type to the communication apparatus.

Therefore, the specification of the QoS type which is carried out by the user can be transmitted from the apparatus to the communication apparatus.

While, in order to solve the foregoing problems, a method according to the present invention for controlling a communication apparatus which receives data, said method comprising: a QoS type receiving step in which a QoS type receiving means of the communication apparatus receives a QoS type indicative of a type of QoS control of the data; a QoS control information conversion step in which the QoS type received in the QoS type receiving step is converted into QoS control information of the data; and a QoS setting control step in which a QoS setting control means of the communication apparatus carries out a QoS setting process with respect to the data in accordance with the QoS control information obtained by the conversion.

In the foregoing arrangement, as in the foregoing communication apparatus, the method for controlling a communication apparatus is as follows. The communication apparatus sets and controls QoS in data transfer between the communication apparatus and other communication apparatus which communicates with that communication apparatus. In setting QoS, the communication apparatus uses QoS control information, obtained by conversion of the QoS type received in the QoS type receiving step which conversion is carried out in the QoS control information conversion step, in order to determine a size of a transfer bandwidth which should be secured in the network.

According to the foregoing arrangement, appropriate QoS is set by merely specifying a QoS type, so that QoS control is carried out. That is, it is not necessary to input complicate information such as a MAC address and the like. This makes it possible to set QoS in a simpler manner.

Further, in order to solve the foregoing problems, a method according to the present invention for controlling a communication apparatus which transmits data, said method comprising: a QoS type request step in which a QoS type request means of the communication apparatus obtains a QoS type indicative of a type of QoS control of the data from a communication apparatus for receiving the data; a QoS control information conversion step in which the QoS type obtained in the QoS type request step is converted into QoS control information of the data; and a QoS setting control step in which a QoS setting control means of the communication apparatus carries out a QoS setting process with respect to the data in accordance with the QoS control information obtained by the conversion.

According to the foregoing arrangement, as in the foregoing communication apparatus, appropriate QoS is set by merely obtaining a QoS type from the communication apparatus for receiving data, so that QoS control is carried out. That is, it is not necessary to input complicate information such as a MAC address and the like. This makes it possible to set QoS in a simpler manner.

Further, a method according to the present invention for controlling a communication apparatus which receives data, said method comprising: a QoS type receiving step in which a QoS type receiving means of the communication apparatus receives a QoS type indicative of a type of QoS control of the data; and a QoS type notification step in which the QoS type received in the QoS type receiving step is notified to a communication apparatus for transmitting the data.

In the foregoing arrangement, as in the foregoing communication apparatus, the method for controlling a communication apparatus is arranged as follows. Other communication apparatus which communicates with that communication apparatus sets and controls QoS in data transfer between the communication apparatus and other communication apparatus. In setting QoS, the QoS type notification means transmits the QoS type, received by the QoS type receiving means to the communication apparatus for transmitting data, in order to determine a size of a transfer bandwidth which should be secured in the network.

According to the foregoing arrangement, appropriate QoS is set by merely specifying a QoS type, so that QoS control is carried out. That is, it is not necessary to input complicate information such as a MAC address and the like. This makes it possible to set QoS in a simpler manner.

Further, in order to solve the foregoing problems, a method according to the present invention for controlling a communication apparatus which transmits data, said method comprising: a QoS type request step in which a QoS control information request means of the communication apparatus obtains a QoS control information of the data from a communication apparatus for receiving the data; and a QoS setting control step in which a QoS setting control means of the communication apparatus carries out a QoS setting process with respect to the data in accordance with the QoS control information obtained by the QoS control information request means.

According to the foregoing arrangement, as in the foregoing communication apparatus, appropriate QoS is set by merely obtaining QoS control information from the communication apparatus for receiving data, so that QoS control is carried out. That is, it is not necessary to input complicate information such as a MAC address and the like. This makes it possible to set QoS in a simpler manner.

Further, in order to solve the foregoing problems, a method according to the present invention for controlling a communication apparatus which receives data, said method comprising: a QoS type receiving step in which a QoS type receiving means of the communication apparatus receives a QoS type indicative of a type of QoS control of the data; a QoS control information conversion step in which the QoS type received in the QoS type receiving step is converted into QoS control information of the data; and a QoS type notification step in which the QoS control information obtained by the conversion carried out by the QoS control information conversion means is notified to a communication apparatus for transmitting the data.

According to the foregoing arrangement, as in the foregoing communication apparatus, appropriate QoS is set by merely specifying a QoS type, so that QoS control is carried out. That is, it is not necessary to input complicate information such as a MAC address and the like. This makes it possible to set QoS in a simpler manner.

In order to solve the foregoing problems, a communication apparatus according to the present invention receives data from a network and outputs the data having been received to a device communicably connected to the communication apparatus, said communication apparatus comprising: a plurality of output ports for outputting data to the device; and a QoS setting request generation means for generating a QoS setting request for QoS control in the network regarding data outputted from a QoS target output port which is any one of the plurality of output ports.

In order to solve the foregoing problems, a communication apparatus according to the present invention is a method for controlling a communication apparatus which receives data from a network and outputs the data having been received to a device communicably connected to the communication apparatus, said communication apparatus including a plurality of output ports for outputting the data to the device, said method comprising a QoS setting request generation step in which any one of the plurality of output ports is a QoS target output port and a QoS setting request for QoS control in the network is generated so as to carry out the QoS control with respect to data outputted from the QoS target output port.

According to the foregoing arrangement, the QoS setting request generation means generates a QoS setting request for the QoS control in the network regarding data outputted from the QoS target output port which is any one of the plurality of output ports.

Therefore, even in case where the communication apparatus which receives data from a network and transmits the data having been received to a device communicably connected to the communication apparatus has the plurality of output ports, the QoS control in the network can be set regarding data transmitted to a device connected to at least one output port out of the plurality of output ports. In other words, in case where the device connected to the communication apparatus does not require the QoS control, it is possible to keep the QoS control from being carried out with respect to the data transmitted to the device. This makes it possible to efficiently carry out the QoS control.

Further, the QoS target output port is provided on the communication apparatus to which the device used by the user is connected, so that the user can easily set transfer quality in the network.

Note that, the QoS setting request generated by the QoS setting request generation means is transmitted finally (directly or indirectly) to the control device for carrying out the QoS control (data-transmitting communication apparatus or master station). Alternatively, in case where the control device is included in the communication apparatus, the QoS setting request is outputted to the included control device.

In order to solve the foregoing problems, a communication apparatus according to the present invention receives data from a network and transmits the data having been received to a device communicably connected to the communication apparatus, said communication apparatus comprising: an identification information obtaining means for obtaining identification information for identifying the device; and a QoS setting request generation means for generating a QoS setting request for QoS control in the network regarding data transmitted to the device indicated by the identification information obtained by the identification information obtaining means.

In order to solve the foregoing problems, a method according to the present invention for controlling a communication apparatus which receives data from a network and outputs the data having been received to a device communicably connected to the communication apparatus, said method comprising: an identification information obtaining step in which identification information is obtained to identify the device; and a QoS setting request generation step in which a QoS setting request for QoS control in the network is generated so as to carry out the QoS control with respect to data transmitted to the device indicated by the identification information obtained in the identification information obtaining step.

According to the foregoing arrangement, the identification information obtaining means obtains identification information for identifying a device connected to the communication apparatus. The QoS setting request generation means generates a QoS setting request for the QoS control in the network regarding data transmitted to the device indicated by the identification information obtained by the identification information obtaining means.

Therefore, even in case where a plurality of devices are connected to the communication apparatus which receives data from a network and transmits the data having been received to a device communicably connected to the communication apparatus, it is possible to request the QoS control for each device. Thus, the QoS control is not carried out in data transfer which does not require the QoS control, so that it is possible to efficiently carry out the QoS control in data transfer which requires the QoS control (in other words, it is possible to efficiently carry out the QoS control in the entire network).

Further, the identification information obtaining means obtains identification information of the device, so that the user does not have to input the identification information. Thus, the user can easily set transfer quality in the network.

In order to solve the foregoing problems, a communication apparatus according to the present invention serves as a receiving communication apparatus for receiving data transmitted from a transmitting communication apparatus, comprising: a QoS type receiving means for receiving a QoS type information indicative of a priority of data reception in the communication apparatus with respect to other receiving communication apparatus in receiving data from the transmitting communication apparatus; and a communication means for transmitting, to the transmitting communication apparatus, a QoS setting request including the QoS type information received by the QoS type receiving means and an address of the communication apparatus.

According to the foregoing arrangement, the QoS type receiving means receives a QoS type information indicative of how data reception in the communication apparatus is prioritized with respect to other receiving communication apparatus in receiving data from the transmitting communication apparatus, and the communication means transmits, to the transmitting communication apparatus, a QoS setting request including the QoS type information received by the QoS type receiving means and an address of the communication apparatus.

Therefore, the user does not have to input complicate information such as a MAC address and the like, so that the user can more easily set the QoS in accordance with a priority.

In order to solve the foregoing problems, a communication apparatus according to the present invention serves as a transmitting communication apparatus for transmitting data to a receiving communication apparatus, comprising: a receiving means for receiving a QoS setting request which is transmitted from the receiving communication apparatus and which includes (i) QoS type information indicative of a priority of data reception in the communication apparatus with respect to other receiving communication apparatus when the receiving communication apparatus receives data from the transmitting communication apparatus and (ii) an address of the receiving communication apparatus for transmitting the QoS setting request; a QoS control means for giving a transmission priority, corresponding to the priority indicated by the QoS type information included in the QoS setting request received by the receiving means, to data transmitted to the receiving communication apparatus indicated by the address included in the QoS setting request; and a data transmitting means for transmitting the data, to which the QoS control means has given the transmission priority, to the receiving communication apparatus indicated by the address included in the QoS setting request, in accordance with the transmission priority.

According to the foregoing arrangement, the receiving means receives a QoS setting request which includes (i) QoS type information indicative of a priority in data reception and (ii) an address of the receiving communication apparatus for transmitting the QoS setting request, and receives a data transfer request packet including identification information for identifying data required by the receiving communication apparatus for transmitting the data transfer request. The QoS control means gives a transmission priority, corresponding to the priority indicated by the QoS type information, to data indicated by the identification information. The data transmitting means transmits the data, to which the QoS control means has given the transmission priority, to the receiving communication apparatus indicated by the address included in the QoS setting request, in accordance with the transmission priority.

Therefore, the user does not have to input complicate information such as a MAC address and the like, so that the user can more easily set the QoS in accordance with a priority.

In order to solve the foregoing problems, a communication apparatus according to the present invention comprises: a QoS type receiving means for receiving QoS type information indicative of a size of a transfer bandwidth of data transmitted from a transmitting communication apparatus to the communication apparatus; a QoS type management section for generating a QoS notification including information indicative of the size of the transfer bandwidth which size is indicated by the QoS type information having been received by the QoS type receiving means; and a communication means for transmitting the QoS notification, having been generated by the QoS type management means, to the transmitting communication apparatus.

According to the foregoing arrangement, the QoS type receiving means receives QoS type information indicative of a size of a transfer bandwidth of data transmitted from a transmitting communication apparatus to the communication apparatus. The QoS type management section generates a QoS notification including information indicative of the size of the transfer bandwidth which size is indicated by the QoS type information having been received by the QoS type receiving means. The communication means transmits the QoS notification, having been generated by the QoS type management means, to the transmitting communication apparatus.

Therefore, the user does not have to input complicate information such as a MAC address and the like, so that the user can more easily set QoS which guarantees a size of the transfer bandwidth.

In order to solve the foregoing problems, a communication apparatus according to the present invention, included in a communication network which has (a) at least one transmitting communication apparatus for transmitting data, (b) at least one receiving communication apparatus for receiving the data from the transmitting communication apparatus, and (c) a control device equipped with a control means for carrying out QoS control with respect to the data transmitted from the transmitting communication apparatus to the receiving communication apparatus in response to a QoS setting request, said communication apparatus serving as the transmitting communication apparatus, said communication apparatus comprising: a receiving means for receiving a trigger detection notification which notifies start of the QoS control carried out with respect to data received by the receiving communication apparatus; and a QoS type management means for transmitting, to the control device, a QoS setting request for start of the QoS control with respect to the data received by the receiving communication apparatus when the receiving means receives the trigger detection notification.

According to the foregoing arrangement, the receiving means receives a trigger detection notification which notifies start of the QoS control carried out with respect to data received by the receiving communication apparatus. A QoS type management means transmits, to the control device, a QoS setting request for start of the QoS control with respect to the data received by the receiving communication apparatus when the receiving means receives the trigger detection notification.

Therefore, in case where the trigger detection notification is received, it is possible to require the control device to start the QoS control with respect to data received by a certain receiving communication apparatus.

In order to solve the foregoing problems, a communication apparatus according to the present invention, included in a communication network which has (a) at least one transmitting communication apparatus for transmitting data and (b) at least one receiving communication apparatus for receiving the data from the transmitting communication apparatus, said communication apparatus serving as the transmitting communication apparatus, said communication apparatus comprising: a control means for carrying out QoS control; and a receiving means for receiving a trigger detection notification which notifies start of the QoS control carried out with respect to data received by the receiving communication apparatus, wherein the control means starts the QoS control when the receiving means receives the trigger detection notification.

According to the foregoing arrangement, when the receiving means receives the trigger detection notification for notifying the start of the QoS control with respect to data received by the receiving communication apparatus, the control means starts the QoS control.

Therefore, it is possible to start the QoS control when the QoS control is required. In other words, the QoS control is not carried out in data transfer which does not require the QoS control, so that it is possible to efficiently carry out the QoS control in other data transfer which requires the QoS control.

In order to solve the foregoing problems, a communication apparatus according to the present invention, included in a communication network which has (a) at least one transmitting communication apparatus for transmitting data and (b) at least one receiving communication apparatus for receiving the data from the transmitting communication apparatus, said communication apparatus serving as the receiving communication apparatus, said communication apparatus comprising a control means for carrying out QoS control, wherein the control means starts the QoS control in response to reception of the data from the transmitting communication apparatus.

According to the foregoing arrangement, the control means for carrying out the QoS control starts the QoS setting process in response to reception of data from the transmitting communication apparatus. With this arrangement, the master station for carrying out the QoS control receives data in case where Parameterized QoS is used.

Therefore, in case where the master station for carrying out the QoS control receives data, it is possible to start the QoS control when the QoS control is required, so that the QoS control can be efficiently carried out.

As described above, the communication apparatus according to the present invention comprises: a QoS type receiving means for receiving a QoS type indicative of a type of QoS control of the data; a QoS control information conversion means for converting the QoS type received by the QoS type receiving means into QoS control information of the data; and a QoS setting control means for carrying out a QoS setting process with respect to the data in accordance with the QoS control information obtained by the conversion.

Therefore, appropriate QoS is set by merely specifying a QoS type, so that QoS control is carried out. That is, it is not necessary to input complicate information such as a MAC address and the like. This makes it possible to set QoS in a simpler manner.

Further, as described above, the communication apparatus according to the present invention comprises: a QoS type receiving means for receiving a QoS type indicative of a type of QoS control of the data; and a QoS type notification means for notifying the QoS type, received by the QoS type receiving means, to a communication apparatus for transmitting the data.

Therefore, appropriate QoS is set by merely obtaining a QoS type from the communication apparatus for receiving a packet, so that QoS control is carried out. That is, it is not necessary to input complicate information such as a MAC address and the like. This makes it possible to set QoS in a simpler manner.

Further, as described above, the communication apparatus according to the present invention comprises: a QoS type receiving means for receiving a QoS type indicative of a type of QoS control of the data; and a QoS type notification means for notifying the QoS type, received by the QoS type receiving means, to a communication apparatus for transmitting the data.

Therefore, appropriate QoS is set by merely specifying a QoS type, so that QoS control is carried out. That is, it is not necessary to input complicate information such as a MAC address and the like. This makes it possible to set QoS in a simpler manner.

Further, as described above, the communication apparatus according to the present invention comprises: a QoS control information request means for obtaining QoS control information of the data from a communication apparatus for receiving the data; and a QoS setting control means for carrying out a QoS setting process with respect to the data in accordance with the QoS control information obtained by the QoS control information request means.

Therefore, appropriate QoS is set by merely obtaining QoS control information from the communication apparatus for receiving a packet, so that QoS control is carried out. That is, it is not necessary to input complicate information such as a MAC address and the like. This makes it possible to set QoS in a simpler manner.

Further, as described above, the communication apparatus according to the present invention comprises: a QoS type receiving means for receiving a QoS type indicative of a type of QoS control of the data; a QoS control information conversion means for converting the QoS type received by the QoS type receiving means into QoS control information of the data; and a QoS control information notification means for notifying the QoS type, obtained by the conversion carried out by the QoS control information conversion means, to a communication apparatus for transmitting the data.

Therefore, appropriate QoS is set by merely specifying a QoS type, so that QoS control is carried out. That is, it is not necessary to input complicate information such as a MAC address and the like. This makes it possible to set QoS in a simpler manner.

Further, as described above, the communication apparatus according to the present invention relays data transfer between a first network and a second network, wherein an apparatus connected to the communication apparatus via the first network comprises a QoS setting control means for setting QoS of the second network regarding a flow received from an apparatus connected to the communication apparatus via the second network.

Therefore, instead of the apparatus connected to the first network, the QoS setting control section carries out the QoS setting in the second network. Thus, when the apparatus connected to the first network receives a flow which requires QoS, even if the apparatus connected to the first network does not have a function for instructing the communication apparatus to carry out the QoS setting with respect to the communication apparatus, the QoS setting for the flow is carried out in the second network, thereby carrying out data transfer whose QoS for the flow is secured.

Further, as described above, the communication apparatus according to the present invention receives data and comprises: a QoS type receiving means for receiving a QoS type indicative of a type of QoS control of the data; and a QoS setting control means for carrying out a QoS cancellation process with respect to the data in case where the QoS type received by the QoS type receiving means indicates that the QoS control is not required.

Therefore, in case where the QoS control is not required, it is possible to cancel the QoS control with respect to data received by the communication apparatus, so that the QoS control can be efficiently carried out. Further, the user's instruction to cancel the QoS control is received by the receiving communication apparatus, so that the user does not have to input complicate information such as a MAC address and the like. This makes it possible to set QoS in a simpler manner.

Further, as described above, the communication apparatus according to the present invention comprises: a QoS type request means for obtaining a QoS type indicative of a type of QoS control of the data from a communication apparatus for receiving the data; and a QoS setting control means for carrying out a QoS cancellation process with respect to the data in case where the QoS type obtained by the QoS type request means indicates that the QoS control is not required.

Therefore, in case where the QoS control is not required, it is possible to cancel the QoS control with respect to data received by the communication apparatus for receiving data, so that the QoS control can be efficiently carried out. Further, the instruction to cancel the QoS control can be obtained from the receiving communication apparatus, so that the user does not have to input complicate information such as a MAC address and the like. This makes it possible to set QoS in a simpler manner.

Further, as described above, the communication apparatus according to the present invention comprises: a QoS control information request means for obtaining QoS control information of the data from a communication apparatus for receiving the data; and a QoS setting control means for carrying out a QoS cancellation process with respect to the data in case where the QoS control information obtained by the QoS control information request means indicates that the QoS control with respect to the data is not required.

Therefore, in case where the QoS control is not required, it is possible to cancel the QoS control with respect to data received by the communication apparatus for receiving data, so that the QoS control can be efficiently carried out. Further, the instruction to cancel the QoS control can be obtained from the receiving communication apparatus, so that the user does not have to input complicate information such as a MAC address and the like. This makes it possible to set QoS in a simpler manner.

Further, as described above, the communication apparatus according to the present invention comprises: a QoS type receiving means for receiving a QoS type indicative of a type of QoS control of the data; and a QoS control information notification means for notifying, to a communication apparatus for transmitting the data, QoS information also indicating that the QoS control with respect to the data is not required, in case where the QoS type received by the QoS type receiving means indicates that the QoS control with respect to the data is not required.

Therefore, in case where the QoS control is not required, it is possible to cancel the QoS control with respect to data received by the communication apparatus for receiving data, so that the QoS control can be efficiently carried out.

Further, as described above, the communication apparatus comprises: a QoS type receiving means for receiving a QoS type information indicative of a priority of data reception with respect to other receiving communication apparatus in receiving data from the transmitting communication apparatus; and a communication means for transmitting, to the transmitting communication apparatus, a QoS setting request including the QoS type information received by the QoS type receiving means and an address of the communication apparatus.

Further, as described above, the communication apparatus according to the present invention comprises: a receiving means for receiving a QoS setting request which is transmitted from the receiving communication apparatus and which includes (i) QoS type information indicative of a priority of data reception with respect to other receiving communication apparatus when the receiving communication apparatus receives data from one of plural transmitting communication apparatuses and (ii) an address of the receiving communication apparatus for transmitting the QoS setting request; a QoS control means for giving a transmission priority, corresponding to the priority indicated by the QoS type information included in the QoS setting request received by the receiving means, to data transmitted to the receiving communication apparatus indicated by the address included in the QoS setting request; and a data transmitting means for transmitting the data, to which the QoS control means has given the transmission priority, to the receiving communication apparatus indicated by the address included in the QoS setting request, in accordance with the transmission priority.

Therefore, the user does not have to input complicate information such as a MAC address and the like, so that the user can more easily set the QoS in accordance with a priority.

Further, as described above, the communication apparatus according to the present invention comprises: a QoS type receiving means for receiving QoS type information indicative of a size of a transfer bandwidth of data transmitted from a transmitting communication apparatus to the communication apparatus; a QoS type management section for generating a QoS notification including information indicative of the size of the transfer bandwidth which size is indicated by the QoS type information having been received by the QoS type receiving means; and a communication means for transmitting the QoS notification, having been generated by the QoS type management means, to the transmitting communication apparatus.

Therefore, the user does not have to input complicate information such as a MAC address and the like, so that the user can more easily set QoS which guarantee a size of the transfer bandwidth.

Further, as described above, the communication apparatus according to the present invention comprises: a receiving means for receiving a trigger detection notification which notifies start of the QoS control carried out with respect to data received by the receiving communication apparatus; and a QoS type management means for transmitting a QoS setting request for start of the QoS control with respect to the data received by the receiving communication apparatus when the receiving means receives the trigger detection notification.

Therefore, in case where the trigger detection notification is received, it is possible to require the control device to start the QoS control with respect to data received by a certain receiving communication apparatus.

Further, as described above, the communication apparatus according to the present invention comprises: a control means for carrying out QoS control; and a receiving means for receiving a trigger detection notification which notifies start of the QoS control carried out with respect to data received by the receiving communication apparatus, wherein the control means starts the QoS control when the receiving means receives the trigger detection notification.

Therefore, it is possible to start the QoS control when the QoS control is required. In other words, the QoS control is not carried out in data transfer which does not require the QoS control, so that it is possible to efficiently carry out the QoS control in other data transfer which requires the QoS control.

Further, as described above, the communication apparatus according to the present invention comprises a control means for carrying out QoS control, wherein the control means starts the QoS control in response to the data received from the transmitting communication apparatus.

Therefore, in case where the master station for carrying out the QoS control receives data, it is possible to start the QoS control when the QoS control is required, so that the QoS control can be efficiently carried out.

As described above, the communication apparatus according to the present invention comprises: a plurality of output ports for outputting data to the apparatus; and a QoS setting request generation means for generating a QoS setting request for QoS control in the network regarding data outputted from a QoS target output port which is any one of the plurality of output ports.

As described above, the method for controlling a communication apparatus which includes a plurality of output ports for outputting the data to the device, said method comprising a QoS setting request generation step in which any one of the plurality of output ports is determined as a QoS target output port and a QoS setting request for QoS control in the network is generated regarding data outputted from the QoS target output port.

Therefore, in case where the device connected to the communication apparatus does not require the QoS control, it is possible to keep the QoS control from being carried out with respect to the data transmitted to the device. This makes it possible to efficiently carry out the QoS control.

Further, the QoS target output port is provided on the communication apparatus to which the device used by the user is connected, so that the user can easily set transfer quality in the network.

As described above, the communication apparatus according to the present invention comprises: an identification information obtaining means for obtaining identification information for identifying the apparatus; and a QoS setting request generation means for generating a QoS setting request for QoS control in the network regarding data transmitted to the apparatus indicated by the identification information obtained by the identification information obtaining means.

As described above, the method according to the present invention for controlling a communication apparatus comprises: an identification information obtaining step in which identification information is obtained to identify the apparatus; and a QoS setting request generation step in which a QoS setting request for QoS control in the network is generated regarding data transmitted to the apparatus indicated by the identification information obtained in the identification information obtaining step.

Therefore, even in case where a plurality of devices are connected to the communication apparatus which receives data from a network and transmits the data having been received to a device communicably connected to the communication apparatus, it is possible to request the QoS control for each device. Thus, the QoS control is not carried out in data transfer which does not require the QoS control, so that it is possible to efficiently carry out the QoS control in the entire network.

Further, the identification information obtaining means obtains identification information of the device, so that the user does not have to input the identification information. Thus, the user can easily set transfer quality in the network.

BRIEF DESCRIPTION OF THE DRAWINGS

FIG. 19 is a diagram illustrating an example of a QoS type table used in the receiving-side PLC adaptor.

FIG. 20 is a diagram illustrating an example of a QoS control information conversion table used in the receiving-side PLC adaptor.

FIG. 21 is a diagram illustrating an example of a port table used in the receiving-side PLC adaptor.

FIG. 22 is a diagram illustrating an example of a trigger detection table used in the receiving-side PLC adaptor.

FIG. 26 is a diagram illustrating another example of the QoS control information conversion table.

FIG. 27 is a diagram illustrating another example of the QoS control information conversion table.

FIG. 28 is a diagram illustrating another example of the trigger detection table.

FIG. 33 is a diagram illustrating an example of a QoS target table used in the receiving-side PLC adaptor.

FIG. 39 is a diagram illustrating an example of a QoS type table used in the receiving-side PLC adaptor.

FIG. 40 is a diagram illustrating an example of a trigger detection table used in the receiving-side PLC adaptor.

FIG. 44 is a diagram illustrating an example of an address table used in the receiving-side PLC adaptor.

FIG. 49 is a diagram illustrating an example of a QoS control information table used in the receiving-side PLC adaptor.

FIG. 50 is a diagram illustrating an example of a trigger detection table used in the receiving-side PLC adaptor.

Figure 1:
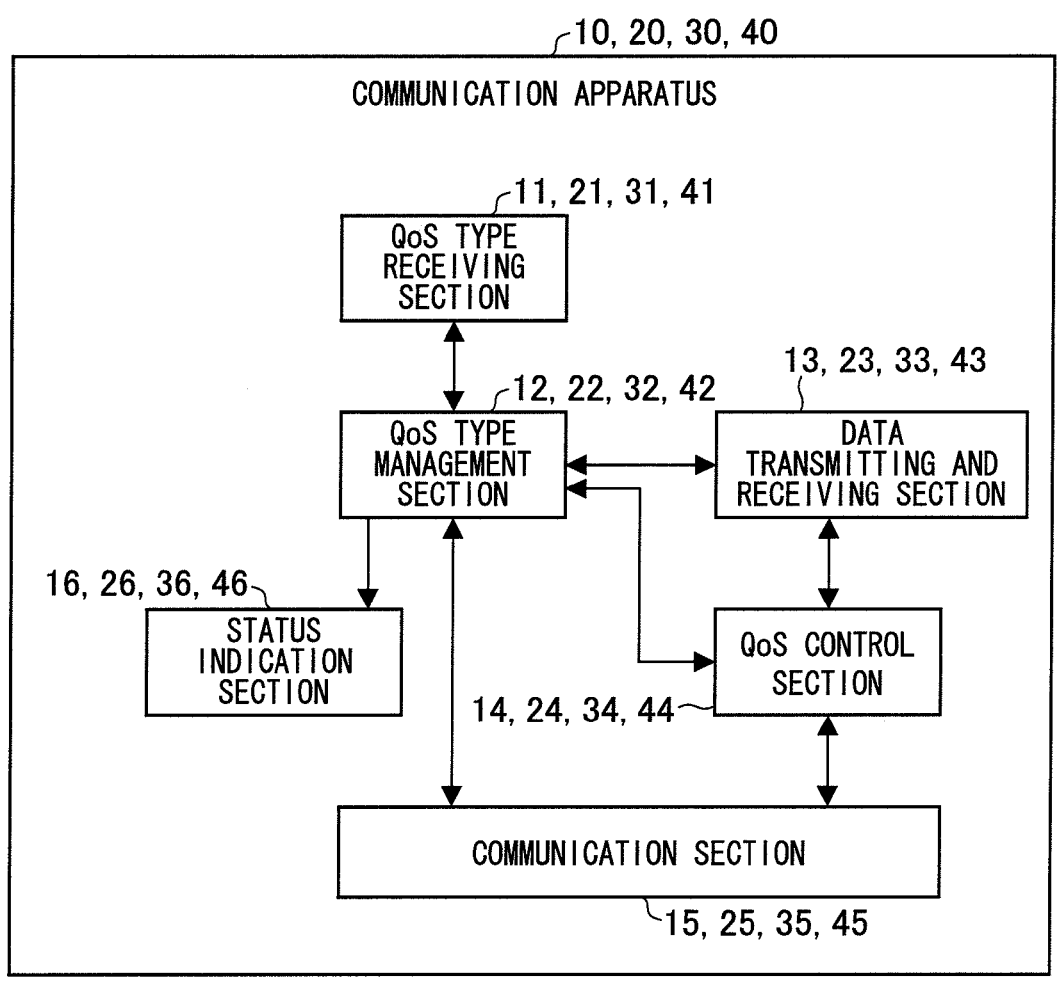
FIG. 1 is a functional block diagram of a communication apparatus of Embodiment 1.

REFERENCE NUMERALS 10, 20, 30, 40 Communication apparatus
11, 21, 31, 41 QoS type receiving section (QoS type receiving means)
12, 22, 32, 42 QoS type management section (QoS control information conversion means, QoS setting control means, QoS type request means, QoS type notification means, QoS control information request means, QoS control information notification means, QoS type management means)
14, 24, 34, 44 QoS control section (QoS setting control means, QoS control means)
15, 25, 35, 45 Communication section (receiving means, data transmitting means, communication means)
50, 60, 70, 80 PLC adaptor
51, 61, 71, 81 QoS type receiving section (QoS type receiving means)
52, 62, 72, 82 QoS type management section (QoS control information conversion means, QoS setting control means, QoS type request means, QoS type notification means, QoS control information request means, QoS control information notification means, QoS type management means)
54, 64, 74, 84 QoS control section (QoS setting control means, QoS control means)
55a, 65a, 75a, 85a PLC communication section (receiving means, data transmitting means, communication means)
56, 66, 76, 86 Status indication section (status indication means)
58, 68, 78, 88 Bridge section (QoS setting control means, bridge information obtaining means, flow identification information obtaining means)
59, 69, 79, 89 Trigger detection section (trigger detection means, trigger detection notification means, QoS setting control means, flow identification information obtaining means)
100 STB (Ethernet device)
110 PC (Ethernet device)
190 VoIP adaptor (Ethernet device)
200 PLC adaptor (communication apparatus)
208 PLC communication section (transmitting means)
214 QoS setting section (control device)
232 Second port (output port)
300 PLC adaptor (communication apparatus)
301 QoS type specifying section (QoS type specifying means)
301a, 301b, 301c QoS type specifying section (QoS type specifying means)
305a, 305b, 305c QoS status indication section (QoS status indication means)
308 PLC communication section (transmitting means)
312 QoS setting request generation section (QoS setting request generation means)
320 Storage section (QoS type storage means, period information storage means)
331 First port (output port)
332 Second port (output port)
333 Third port (output port)
342 PLC status indication section (period information indication means)
500 PLC adaptor (communication apparatus)
500a PLC adaptor (communication apparatus)
503 QoS target specifying section (QoS target selection means)
503a, 503b, 503c Push button (QoS target selection means)
600 PLC adaptor (communication apparatus)
700 PLC adaptor (communication apparatus)
703 Mode switching section (period information specifying means)
800 PLC adaptor (communication apparatus)

BEST MODE FOR CARRYING OUT THE INVENTION

Embodiment 1

Figure 4:
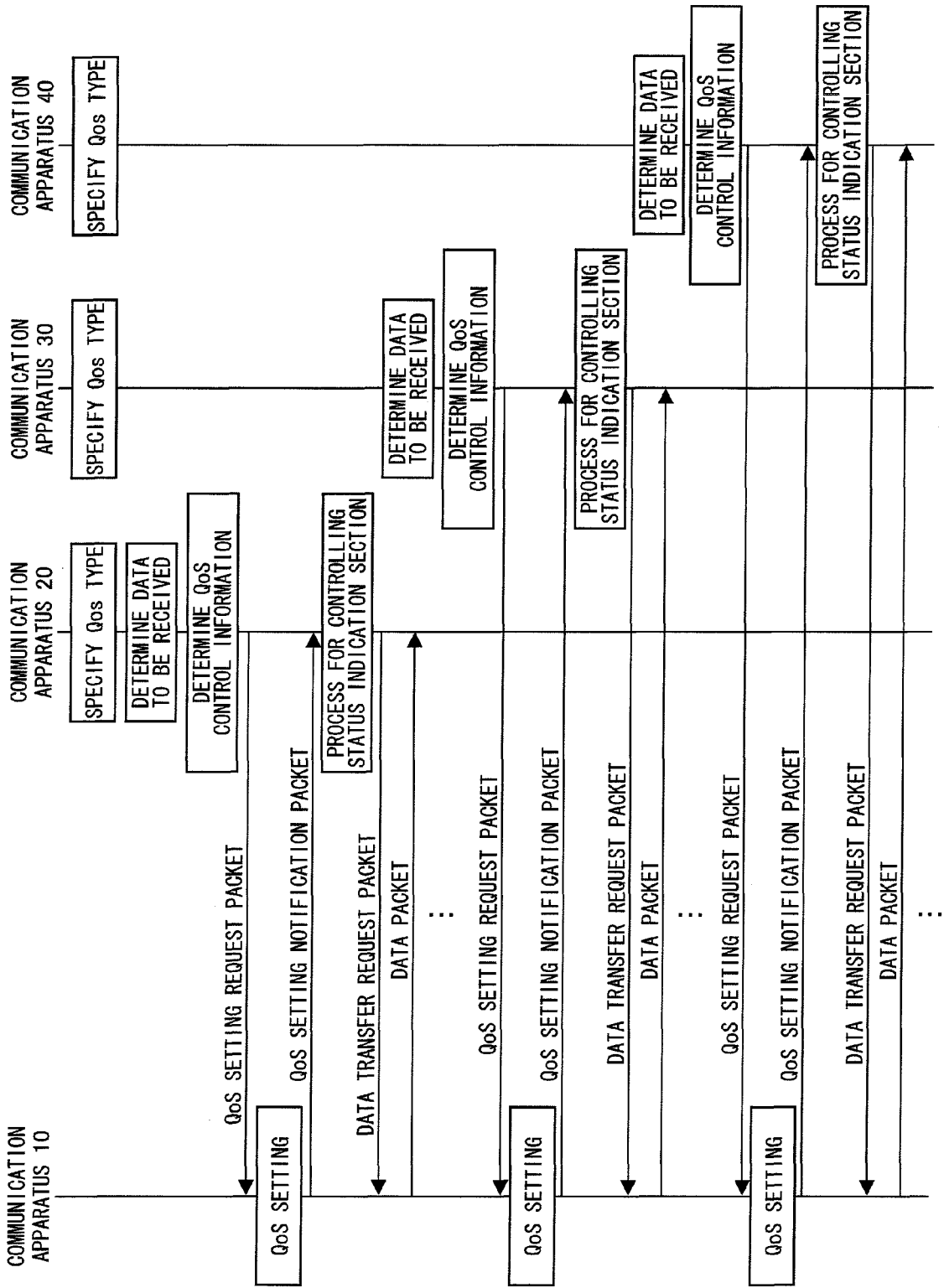
FIG. 4 is a flowchart illustrating communications among communication apparatuses in Embodiment 1.

Embodiment 1 describes a mode in which a user sets content-receiving PLC adapters to specify, as QoS types, reception priorities in accordance with which content items are received by content-receiving PLC adapters respectively, and the QoS of the entire network is controlled by Parameterized QoS in accordance with the specification. FIG. 4 shows an overall process flow.

(Regarding Arrangement of Network>

Figure 2:
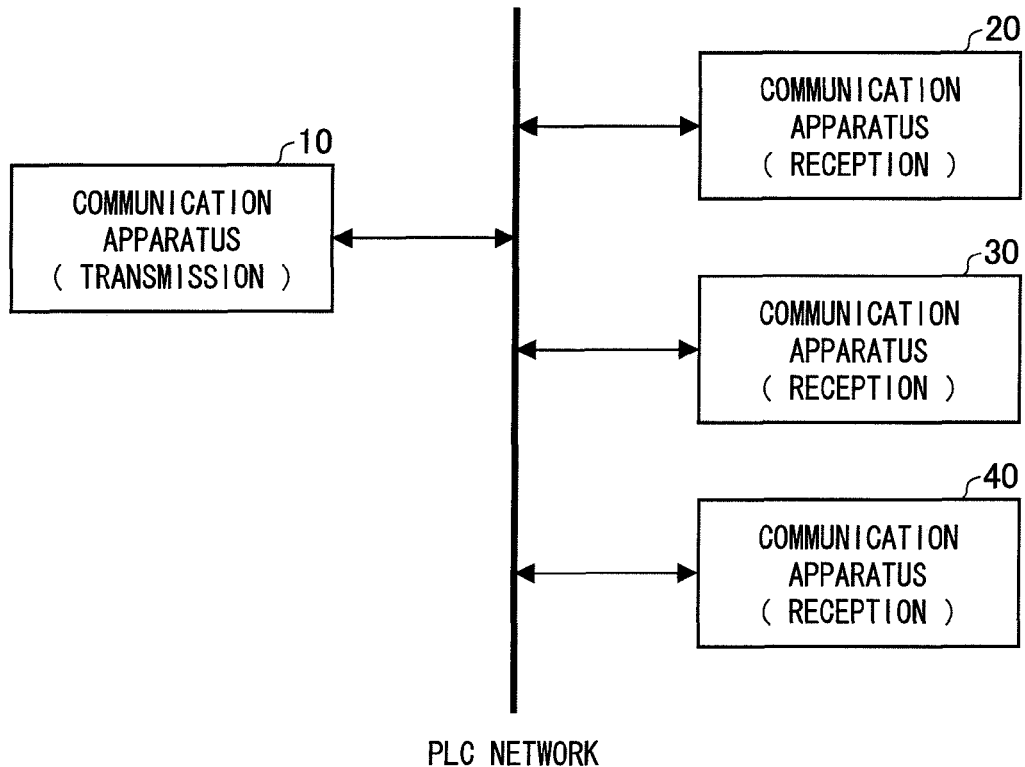
FIG. 2 is a network diagram of Embodiment 1.

FIG. 2 illustrates an arrangement of a network of the present embodiment. In the present embodiment, data is transferred from a communication apparatus 10 to a communication apparatus 20, data is transferred from the communication apparatus 10 to a communication apparatus 30, and data is transferred from the communication apparatus 10 to a communication apparatus 40. Each communication apparatus includes a function for carrying out data transfer with other communication apparatus via a network. Examples of the network include not only wired LAN such as Ethernet and the like but also PLC, wireless LAN, and the like. In the present invention, the respective communication apparatuses are connected via a PLC network.

In the present embodiment, any apparatus may be used as the communication apparatus as long as the apparatus can transmit/receive data. In case of transmitting data, the communication apparatus stores therein content items such as text, music, still image, moving image, and the like.

Examples thereof include a home server, a personal computer (PC), a server computer, an HDD recorder, a DVD player, a portable music payer.

Further, it may be so arranged that a content item transmitted from other communication apparatus is relayed instead of directly transmitting data.

Examples of such communication apparatus include a router, a modem, a home gateway, and the like, each of which relays a content item transmitted from a server in the Internet.

Further, the apparatus which receives data is an apparatus which displays, reproduces, and records content items such as document, video, music, image, and the like.

Examples of such apparatus for receiving data include a television receiver, STB (Set Top Box) for receiving VoD (Video on Demand), a tuner, PC, PDA, VoIP telephone, a mobile phone, a portable music player, an HDD recorder, and the like.

Further, it may be so arranged that a content item received by other communication apparatus is relayed instead of directly receiving data.

Examples of such apparatus include a router, a modem, a home gateway, and the like, each of which relays a content item transmitted from a server in the Internet.

It may be so arranged that a single communication apparatus carries out both the data transmission and the data reception.

In the present embodiment, the communication apparatus 10 is a home server and stores therein (i) video data such as MPEG format data, H.264 format data, and the like, (ii) sound data such as MP3 format data, ATRAC3 format data, and the like, and (iii) text data such as HTML format data, XML format data, and the like. Further, the communication apparatus 10 includes a PLC network interface so as to be able to transmit a content item to other communication apparatus via a PLC network.

Further, the communication apparatus 20 is a music player including a PLC network interface and can reproduce sound data received via the PLC.

Further, the communication apparatus 30 is a television receiver which includes a PLC network interface and can reproduce video data received via the PLC.

Further, the communication apparatus 40 is a PC which includes a PLC network interface and can display text data received via the PLC.

In the present embodiment, the communication apparatus 20 receives sound data, and the communication apparatus 30 receives video data, and the communication apparatus 40 receives text data. The user recognizes types of data pieces received by the respective communication apparatuses. At the time of data reception, the communication apparatus 20, the communication apparatus 30, and the communication apparatus 40 are prioritized in this order, and data reception is carried out in accordance with this priority. Respective users may use the receiving communication apparatuses or single user may use a plurality of communication apparatuses.

<Regarding Arrangement of Communication Apparatus>

FIG. 1 is a functional block diagram of the communication apparatuses 10, 20, 30, and 40. The communication apparatuses 10, 20, 30, and 40 are identical to one another in an arrangement, but there is a functional block which is not used depending on its role for transmitting/receiving data. In case where the role is limited, the functional block which is not used may be omitted.

The communication apparatuses 10, 20, 30, and 40 respectively include QoS type receiving sections 11, 21, 31, and 41 (QoS type receiving means), QoS type management sections 12, 22, 32, and 42 (QoS control information conversion means, QoS setting control means, QoS type request means, QoS type notification means, QoS control information request means, QoS control information notification means), data transmitting and receiving sections 13, 23, 33, and 43, QoS control sections 14, 24, 34, and 44 (QoS setting control means), and communication sections 15, 25, 35, and 45.

Each of the QoS type receiving sections 11, 21, 31, and 41 receives from the user an instruction indicative of a QoS type with which QoS data transfer is carried out in a QoS type receiving process. Each of the data transmitting and receiving sections 13, 23, 33, and 34 carries out transmission and reception of content data in a received data determination process and carries out creation and transmission of a data transfer request packet. Each of the QoS type management sections 12, 22, 32, and 42 converts the QoS type information into a transmission priority in the PC network in a QoS control information conversion process and carries out creation and transmission of a QoS setting request packet in a QoS setting process, and carries out setting of each of the QoS control sections 14, 24, 34, and 44. Each of the QoS control sections 14, 24, 34, and 44 controls priorities of packets to be transferred. Each of the communication sections 15 and 25 carries out transmission and reception of a packet with the PLC network.

In other words, each of the QoS type management sections (QoS setting control means) 12 and 22 carries out a QoS setting process with respect to data, received by the communication apparatus 20, in accordance with a transmission priority (QoS control information) obtained by conversion carried out in the QoS control information conversion process.

<Regarding QoS Type Receiving Process>

A procedure in which the communication apparatus 20 carries out the QoS setting and carries out data transfer of a content item with the communication apparatus 10, that is, the QoS type receiving process, the received data determining process, the QoS control information conversion process, the QoS setting process, and the data transfer request process are described as follows.

Figure 3:
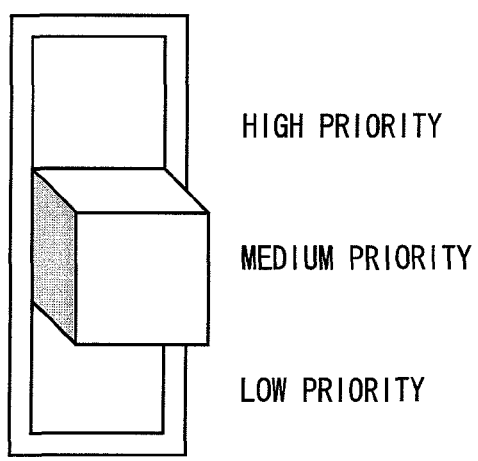
FIG. 3 is a diagram illustrating appearance of a QoS type receiving section of Embodiment 1.

As to the communication apparatus 20, the user intends to most preferentially receive data in the communication apparatuses 20, 30, and 40 for receiving the content item. Thus, the user specifies "high priority" by the QoS type receiving section 21. Specifically, it may be so arranged that a slide-type switch illustrated in FIG. 3 is set as "highly priority".

<Regarding Received Data Determination Process>

At any timing after setting the QoS type, the data transmitting and receiving section 23 of the communication apparatus 20 determines content data to be received. In case where a plurality of content items are reserved in the communication apparatus 10 and there are a plurality of candidates for the content data to be received, it is necessary to determine which content item the data transmitting and receiving section 23 should receive. How to determine the content item has nothing to do with the essential feature of the present invention, so that the determination may be made in any manner.

For example, it may be so arranged that the communication apparatus 10 creates a list of content items reserved therein and the communication apparatus 20 for receiving a content item receives the list via the PLC. The user selects a desired content item from the displayed list. A communication protocol or a user interface for carrying out such a process is included in each of the data transmitting and receiving sections 13 and 23. Note that, it may be so arranged that the user does not determine which content data should be received but the data transmitting and receiving section 23 automatically determines which content data should be received. Herein, it is assumed that any music content item is determined as the content item which should be received.

<Regarding QoS Control Information Conversion Process>

Upon determining content data which should be received, the data transmitting and receiving section 23 of the communication apparatus 20 instructs the QoS control information conversion section 22 to carry out a QoS control information conversion process. The QoS type management section 22 obtains the inputted QoS type information from the QoS type receiving section 21. Herein, information indicative of "high priority" is obtained, so that the QoS type information is converted into a transmission priority in the PLC network.

For example, in Home Plug AV Specification 1.0.00 which is a standard of the PLC, a value referred to as PLID (Priority Link ID) which can specify an integer from 0 to 3 is defined as a packet transmission priority.

When the communication apparatus 10 transmits a packet to the communication apparatus 20, the transmission priority is determined with reference to the PLID, so that the QoS type management section 22 derives PLID from the QoS type information and notifies the PLID, which the communication apparatus 20 requests, to the communication apparatus 10 for transmitting a content item.

In the present embodiment, each of the communication apparatuses 10, 20, 30, and 40 practically adopts the following methods: The PLID is set to 3 when the QoS type information is specified as "high priority", and the PLID is set to 2 when the QoS type information is specified as "medium priority", and the PLID is set to 1 when the QoS type information is specified as "low priority".

In the communication apparatus 20, the QoS type information is specified as "high priority", so that 3 is derived as the PLID.

Note that, in the present embodiment, the PLC is mentioned as a network, but the network of the present invention is not limited to the PLC as long as the network has a similar Prioritized QoS mechanism. For example, the present invention can be carried out by using wireless LAN based on IEEE802.11e standard or Ethernet.

<Regarding QoS Setting Process>

The QoS type management section 22 of the communication apparatus 20 creates a QoS setting request packet including PLID and transmits the created QoS setting request packet to the communication apparatus 10 via the communication section 25.

That is, the QoS type management section (QoS setting control means) 22 transmits a QoS setting request including the QoS control information to a communication apparatus for transmitting data.

In the Prioritized QoS, it is general that the communication apparatus 10 for transmitting a content item determines a priority, and there is not such method that the communication apparatus 20 for receiving a content item notifies the priority to the communication apparatus 10 for transmitting a content item. Thus, in the QoS setting process, another new protocol is additionally prepared, and the protocol causes the QoS type information to be notified from the communication apparatus 20 to the communication apparatus 10.

The communication section 25 adds header information defined in the communication protocol of the PLC network to the QoS setting request packet and transmits the resultant packet via the network. The header information includes an address of the communication apparatus 20 and an address of the communication apparatus 10 which is a destination.

The PLC header of the QoS setting request packet includes the address of the communication apparatus 10 which is a destination, so that the communication section 15 of the communication apparatus 10 receives the QoS setting request packet. The communication section 15 notifies the QoS type management section 12 of the QoS setting request packet.

The QoS type management section 12 picks up (i) the address of the communication apparatus 20 and (ii) the numerical value "3" indicative of the PLID from the QoS setting request packet and sets the QoS control section 14 so that the specified PLID is given when data addressed to the communication apparatus 20 is actually transmitted.

That is, the QoS type management section (QoS setting control means) 12 outputs the QoS control information to the QoS control section 14, and the QoS control section 14 carries out the QoS control with respect to content data, received by the communication apparatus 20, in accordance with the QoS control information.

Note that, the present embodiment describes the case where the communication apparatus 20 for receiving a content item converts the QoS type information into PLID and transmits the PLID to the communication apparatus 10. However, it may be so arranged that the communication apparatus 20 does not carry out the conversion and transmits the QoS type information to the communication apparatus 20 without any modification and the conversion into the PLID is carried out by the communication apparatus 10.

<Regarding QoS Setting Notification Packet>

When the communication apparatus 20 transmits the QoS setting request packet to the communication apparatus 10, the communication apparatus 10 may reject the QoS setting request. This is caused by a limit of a capacity of a priority control buffer of the communication apparatus 10 or by a similar factor. A flow of steps carried out in this case will be described as follows.

Upon receiving the QoS setting request packet, the communication apparatus 10 causes the QoS control section 14 to determine whether the QoS setting request indicated by the QoS setting request packet can be received or not.

In case where the QoS control section 14 determines that the QoS setting request can be received, the QoS setting notification packet including information (result code) indicative of the determination is transmitted to the communication apparatus 20 via the communication section 15.

Upon receiving the QoS setting notification packet indicating that the QoS setting request can be received, the communication apparatus 20 transmits a data transfer request packet to the communication apparatus 10.

It is preferable that the communication apparatus 10 transmits the QoS setting notification packet so as to cause the status indication section 26 of the communication apparatus 20 on the receiving side to change its display state, indicating that the QoS request is satisfied, also in case where the QoS setting request can be received.

On the other hand, in case where the QoS control section 14 determines that the QoS setting request cannot be received, the QoS setting notification packet including information (Result Code) indicative of the determination is transmitted to the communication apparatus 20 via the communication section 15.

Upon receiving the Result Code, the communication apparatus 20 notifies the user that the request was not received. An example of the notification is as follows. An LED (light emitting diode) serving as the status indication section 26 is provided in the vicinity of a switch of the QoS type receiving section 21, and the LED is caused to flash on and off in case where the specified QoS request was not satisfied, thereby showing the user the result of the QoS request.

<Regarding Data Transfer Request Process>

In the communication apparatus 20, after transmission of the QoS setting request, the data transmitting and receiving section 23 carries out a data transfer request process with respect to the data transmitting and receiving section 13 of the communication apparatus 10.

In the data transfer request process, the data transfer request packet is transmitted from the data transmitting and receiving section 23 of the communication apparatus 20 to the communication apparatus 10 via the communication section 25. Further, the communication section 15 of the communication apparatus 10 receives the data transfer request packet and passes the received data transfer request packet to the data transmitting and receiving section 13.

The data transfer request packet includes preset information for identifying a content item to be received, so that the data transmitting and receiving section 13 of the communication apparatus 10 can find a content item which should be transmitted to the communication apparatus 20.

For example, when the communication apparatus 10 transmits a list of music content items to the communication apparatus 20 in carrying out the received data determination process, not only text information for explaining what titles are included and what content items are included but also IDs each of which allows each music content item to be unambiguously identified are notified as a set of content items. Further, the communication apparatus 20 notifies the communication apparatus 10 of an ID of a music content item, the user selects from the list, by means of a data transfer request packet.

Note that, how to notify a content item which should be transmitted to the communication apparatus 10 has nothing to do with the essential features of the present invention, so that the data transfer request may be notified to the communication apparatus 10 in any other manner.

Upon receiving the data transfer request packet, the data transmitting and receiving section 13 of the communication apparatus 10 starts transmission of a content item notified by means of the data transfer request packet.

Data of the content item to be transmitted is made into a form of packet, and the packet and address information are sequentially passed to the QoS control section 14. The QoS control section 14 renders the preset PLID value to the packet according to an address of the data. The packet is preferentially controlled and transmitted in accordance with the PLID value.

In case where a transmission cue for each PLID value is provided and a packet corresponding to a highly prioritized cue remains, the priority control can be carried out by the following process: until the transmission is completed and the cue becomes emptied, a packet corresponding to a cue less prioritized than that cue is not transmitted.

How to practically carry out the transmission control based on a priority has nothing to do with the essential features of the present invention, so that the transmission control may be carried out in any manner as long as priority control according to a PLID value is carried out.

A data packet addressed to the communication apparatus 20 (in case where any data other than the selected content item is transferred, also a data packet thereof is included) is kept transmitted with its PLID set to 3 after setting the priority.

Note that, a QoS type is specified with respect to each of data pieces received by the communication apparatus 20 on the content receiving side, so that data packets are transmitted from the communication apparatus 10 on the content transmitting side by using the same PLID unless specification of the QoS type is changed by the user with the QoS type receiving section 21 of the communication apparatus 20. That is, the same PLID is used also when transfer of the selected content item is finished and another content item is subsequently transferred.

Note that, the present embodiment described the method in which the QoS setting request packet and the data transfer request packet are separately transmitted, but it may be so arranged that notification functions of the two packets are incorporated into a single packet and the communication apparatus 20 transmits only the single packet.

<Regarding Processes in Communication Apparatus>

As in the communication apparatus 20, also in other communication apparatuses 30 and 40, the QoS type receiving process, the received data determination process, the QoS control information conversion process, the QoS setting process, and the data transfer request process are carried out.

The following describes a procedure carried out until QoS transfer of video content item is carried out between the communication apparatus 30 serving as a television receiver and the communication apparatus 10 serving as a home server.

In the communication apparatus 30, the user intends to cause the communication apparatuses 20, 30, or 40 on the content receiving side to receive data in accordance with a second priority, so that the user specifies "medium priority" in the QoS type receiving section 31. Specifically, a slide-type switch of FIG. 3 is set to a position indicative of "medium priority".

At any timing after setting the QoS type, the data transmitting and receiving section 33 of the communication apparatus 30 determines content data to be received. Herein, it is assumed that any video content item is selected.

Upon determining the content data to be received, the data transmitting and receiving section 33 of the communication apparatus 30 instructs the QoS type management section 32 to carry out the QoS control information conversion process. The "medium priority" is specified as the QoS type information, the QoS type management section 32 derives 2 as a PLID value, and creates a QoS setting request packet including the PLID value, and transmits the QoS setting request packet to the communication apparatus 10 via the communication section 35.

The QoS type management section 12 of the communication apparatus 10 picks up (i) the address of the communication apparatus 30 and (ii) the numerical value "2" indicative of the PLID from the QoS setting request packet and sets the QoS control section 14 so that the specified PLID is given when data addressed to the communication apparatus 30 is actually transmitted.

In the communication apparatus 30, the data transmitting and receiving section 33 carries out a data transfer request process with respect to the data transmitting and receiving section 13 of the communication apparatus 10 after the QoS setting request packet is transmitted. As a result, the data transmitting and receiving section 13 of the communication apparatus 10 can find a content item which should be transmitted to the communication apparatus 30.

Upon receiving the data transfer request packet, the data transmitting and receiving section 13 of the communication apparatus 10 starts transmission of the content item notified by means of the data transfer request packet.

A data packet addressed to the communication apparatus 30 (also a data packet other than the selected data is included) is kept transmitted with its PLID set to 2 after setting the priority.

Note that, a QoS type is specified with respect to each of data pieces received by the communication apparatus 30 on the content receiving side, so that data packets are transmitted from the communication apparatus 10 on the content transmitting side by using the same PLID unless specification of the QoS type is changed by the user with the QoS type receiving section 31 of the communication apparatus 30.

<Regarding Processes in Communication Apparatus 40>

In the communication apparatus 40, the user intends to cause the communication apparatuses 20, 30, or 40 on the content receiving side to receive data in accordance with a lowest priority, so that the user specifies "low priority" in the QoS type receiving section 41. Specifically, a slide-type switch of FIG. 3 is set to a position indicative of "low priority".

At any timing after setting the QoS type, the data transmitting and receiving section 43 of the communication apparatus 40 determines content data to be received.

Upon determining content data which should be received, the data transmitting and receiving section 43 of the communication apparatus 40 instructs the QoS control information conversion section 42 to carry out a QoS control information conversion process. The "low priority" is specified as the QoS type information, so that the QoS type management section 42 derives 1 as a PLID value, and creates a QoS setting request packet including the PLID value, and transmits the QoS setting request packet to the communication apparatus 10 via the communication section 45.

The QoS type management section 12 of the communication apparatus 10 picks up (i) the address of the communication apparatus 40 and (ii) the numerical value "1" indicative of the PLID from the QoS setting request packet and sets the QoS control section 14 so that the specified PLID is given when data addressed to the communication apparatus 40 is actually transmitted.

In the communication apparatus 40, the data transmitting and receiving section 43 carries out a data transfer request process with respect to the data transmitting and receiving section 13 of the communication apparatus 10 after the QoS setting request packet is transmitted. As a result, the data transmitting and receiving section 13 of the communication apparatus 10 can find a content item which should be transmitted to the communication apparatus 40.

Upon receiving the data transfer request packet, the data transmitting and receiving section 13 of the communication apparatus 10 starts transmission of the content item notified by means of the data transfer request packet.

A data packet addressed to the communication apparatus 40 is kept transmitted with its PLID set to 1 after setting the priority.

Note that, a QoS type is specified with respect to each of data pieces received by the communication apparatus 40 on the content receiving side, so that data packets are transmitted from the communication apparatus 10 on the content transmitting side by using the same PLID unless specification of the QoS type is changed by the user with the QoS type receiving section 41 of the communication apparatus 40.

Note that, if the communication apparatus 10 determines to transmit data to a communication apparatus which does not request QoS setting, that is, which does not transmit a QoS setting request packet with the PLID always being set to 1 while determining that it is sufficient to transfer data with use of the lowest priority, the communication apparatus 40 does not have to transmit the QoS setting request packet. Thus, the process for transmitting the QoS setting request packet may be omitted from the processes in the communication apparatus 40.

Note that, the QoS type setting in each of the communication apparatuses 20, 30, and 40 may be carried out by the same user or may be carried out by respective users. However, in case where respective users carry out the setting, the users have to beforehand reach an agreement on a communication apparatus to which a high priority is to be given.

<Regarding Subsequent Data Transfer in Each Communication Apparatus>

Although not shown in FIG. 4, the communication apparatus 10 finally transmits data to the communication apparatuses 20, 30, and 40 in parallel.

At this time, a PLID is 3 in a packet addressed to the communication apparatus 20, and a PLID is 2 in a packet addressed to the communication apparatus 30, and a PLID is 1 in a packet addressed to the communication apparatus 40.

Thus, the packet addressed to the communication apparatus 20 having been specified as "high priority" in the QoS type receiving section 21 is transmitted with use of a highest priority, and the packet addressed to the communication apparatus 30 having been specified as "mediate priority" in the QoS type receiving section 31 is transmitted with use of a second priority, and the packet addressed to the communication apparatus 40 having been specified as "low priority" in the QoS type receiving section 41 is transmitted with use of a lowest priority. As a result, the QoS control of the network is carried out on the basis of the setting intended by the user.

<Regarding QoS Cancellation Process>

Figure 5:
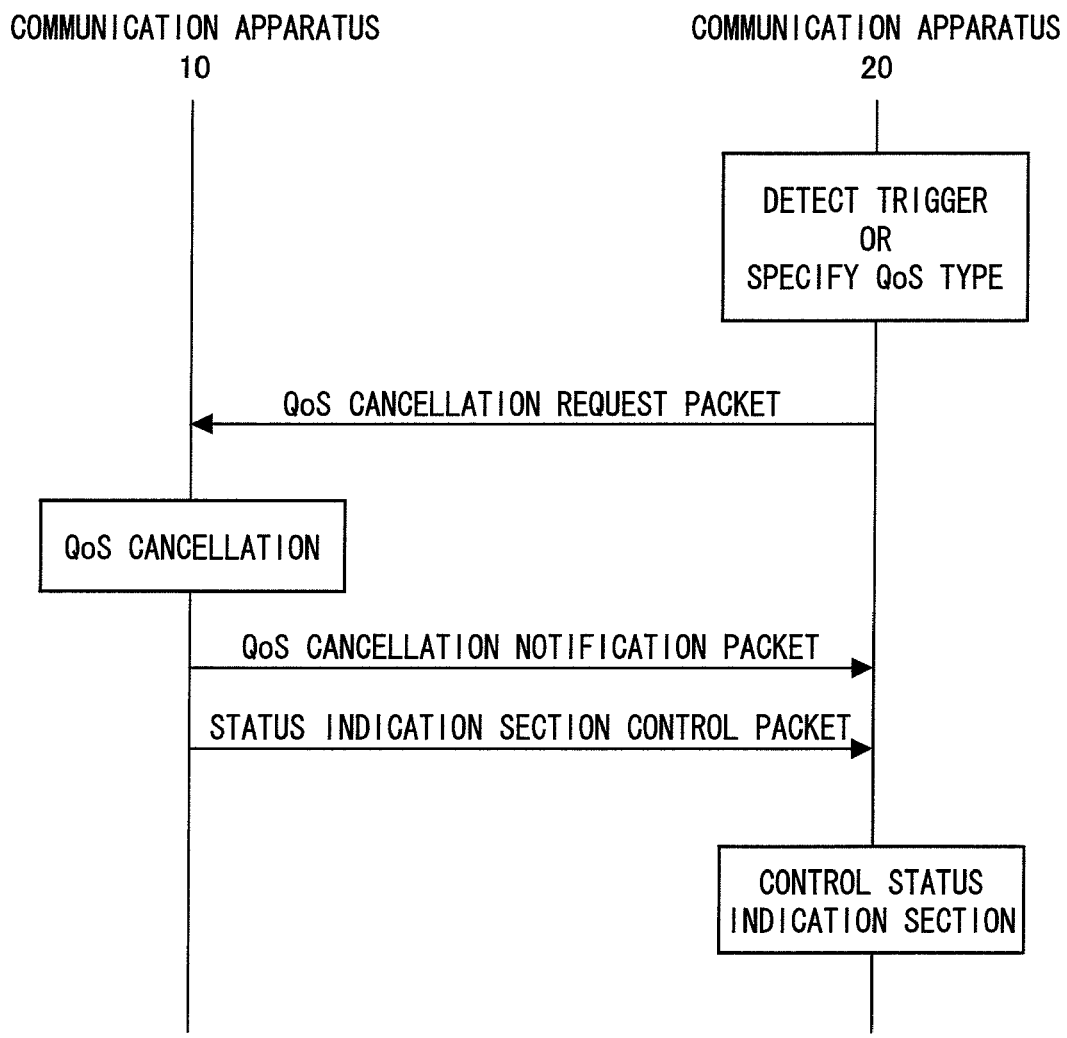
FIG. 5 is a flowchart illustrating a flow of a QoS cancellation process in Embodiment 1.

With reference to FIG. 5, the following describes a QoS cancellation process in the present embodiment. FIG. 5 is a flowchart illustrating a flow of the QoS cancellation process in the present embodiment. The QoS cancellation process in the PLC network where the Prioritized QoS control is carried out is a process for canceling the QoS setting regarding a receiving communication apparatus which has been subjected to the QoS control.

The QoS cancellation process is carried out in case where the user changes the QoS type to indicate that the QoS setting is not required. For example, the switch of FIG. 3 allows three-step switching, e.g., "high priority", "mediate priority", and "low priority", but an option which allows the priority to be set OFF can be added thereto. For example, an option referred to as "ordinary transfer" may be added.

When the QoS type management section 22 receives from the QoS type receiving section 21 information indicating that the "ordinary transfer" is selected, the QoS type management section 22 transmits a QoS cancellation request packet for requesting cancellation of the QoS setting to the communication apparatus 10 on the transmission side via the communication section 25. The QoS cancellation request packet includes an address of the communication apparatus 20 serving as the transmitting end and an address of the communication apparatus 10 serving as the receiving end.

That is, the QoS type management section (QoS setting control means) 22 carries out the QoS cancellation process with respect to data, which the communication apparatus 20 receives, in case where the QoS type received by the QoS type receiving section 21 indicates that it is not necessary to carry out the QoS control.

Upon receiving the QoS cancellation request packet via the communication section 15, the QoS type management section 12 of the communication apparatus 10 outputs, to the QoS control section 14, a command for canceling the QoS setting for data received by the communication apparatus 20 indicated by the address included in the QoS setting request packet. Further, the QoS type management section 12 transmits, via the communication section 15 to the communication apparatus 20, a QoS cancellation notification packet for notifying that the QoS setting for data received by the communication apparatus 20 has been cancelled.

That is, in case where the QoS type or the QoS control information obtained from the communication apparatus 20 indicates that it is not necessary to carry out the QoS control, the QoS type management section (QoS setting control means, QoS type request means, QoS control information request means) 12 notifies to the QoS control section 14 that the QoS control subjected to data received by the communication apparatus 20 is to be stopped, and the QoS control section 14 stops the QoS control with respect to the data upon receiving the notification.

Upon receiving the QoS cancellation notification packet, the QoS type management section 22 of the communication apparatus 20 notifies via the status indication section (not shown) such as an LED or the like to the user that the QoS setting has been canceled.

In case where the priority setting is made OFF, data has only to be transmitted to a communication apparatus whose priority setting is OFF with such transfer quality that there is no influence on QoS control with respect to other target communication apparatus to be subjected to QoS control. To a communication apparatus which has not been subjected to the QoS setting, a packet is transferred with a default priority ("0" is set as its PLID), so that transfer can be carried out with the default priority reset also in case where the priority setting is made OFF.

<Regarding Case where there are Plural Communication Apparatuses on Content Transmission Side>

The present embodiment described the case where there is only the communication apparatus 10 on the content transmission side, but the present invention is applicable also to a case where there are plural communication apparatuses on the content transmission side. In this case, if each communication apparatus on the content receiving side transmits a QoS setting request packet or a data transfer request packet to each of the communication apparatuses on the content transmission side, each of the communication apparatuses on the content transmission side can find a PLID value for each communication apparatus on the content receiving side, so that it is possible to carry out the QoS control.

In this case, when transmitting the QoS setting request packet or the data transfer request packet, there may be adopted not unicast transmission (addressed to a single communication apparatus) in which plural packets are respectively transmitted to plural communication apparatuses but multicast (addressed to plural communication apparatuses) or broadcast (addressed to all communication apparatuses) in which a single packet is transmitted to the communication apparatuses collectively. This makes it possible to reduce the number of times a packet is transmitted.

<Regarding Case where there is Communication Apparatus which does not Adopt the Present Invention>

In case where a communication apparatus which does not adopt the present invention exists in the network and the communication apparatus receives content data, it may be so arranged that data is transferred to the communication apparatus with the lowest priority.

The communication apparatus which does not adopt the present invention does not transmit a QoS setting request packet, that is, does not notify to the communication apparatus 10 on the content transmission side of a PLID value used in transferring data. Thus, it may be so arranged that: when the communication apparatus 10 on the content transmission side is to transfer content data, the QoS control section 14 determines that there is no clear QoS request from the communication apparatus and then transmits content data with the lowest priority.

<Regarding Case of Parameterized QoS>

The present embodiment described how to realize QoS by the Prioritized QoS, but QoS may be realized by using Parameterized QoS.

Specifically, it may be so arranged that: in case where a higher priority than a specific value is set in each of the QoS type receiving sections 11, 21, 31, and 41, a transfer bandwidth is secured in accordance with Parameterized QoS, and in case where a lower priority than the specific value is set, a transfer bandwidth is not secured and data is transferred with best effort.

<Regarding Application of the Present Invention in Other Protocol>

In the present embodiment, PLC (defined by Home Plug AV Specification 1.0.00), i.e., a MAC layer protocol, is adopted as the network protocol, but the present invention is not limited to this. The present invention is applicable also to a network protocol based on Parameterized QoS.

For example, the present invention is applicable also to a wireless LAN based on IEEE802.11e standard or to Ethernet. The present invention can be easily applied as long as a PLID in PLC is changed into a value defined in each protocol. In IEEE802.11e, a TID field corresponds to the PLID. In Ethernet, a user priority field in a VLAN tag corresponds to the PLID. Further, it may be so arranged that a ToS (Type of Service) field in an IPv4 header is used instead of the MAC layer protocol. Also in case where the network protocol is changed, it is possible to carry out the invention merely by changing a layer for controlling a priority at the time of data transfer in a protocol stack. Also substantially the same effect can be obtained.

<Regarding Other Example of Arrangement of QoS Type Receiving Section>

The present embodiment described the three-step slide type switch as each of the QoS type receiving sections 11, 21, 31, and 41. However, each of the QoS type receiving sections 11, 21, 31, and 41 may be arranged otherwise.

The number of switchable stages may be arbitrarily set, but there is no meaning in increasing the number of stages switchable by each of the QoS type receiving sections 11, 21, 31, and 41 so as to be larger than the number of stages of transfer priorities supported in the network.

For example, only four stages ranging from 0 to 3 can be prepared in setting the PLID value, so that there is no meaning in preparing a switch which covers more than four stages. Further, an excessively large number of switchable stages makes it difficult for the user to figure out the status.

Further, it may be so arranged that not only the switch but also a display device is provided so as to cause the display device to display a status of the switch. For example, it may be so arranged that a liquid crystal screen displays a status of the switch. The display device may be used also to display other status of the communication apparatus.

Note that, it is preferable that the user can confirm the selection in the switch with eyes, but this is not essential. For example, it may be so arranged that a single push switch is provided and the QoS type information is cyclically switched every time the switch is pushed. For example, it may be so arranged that the QoS type information is switched in an order of "high priority", "mediate priority", "low priority", and "high priority", every time the switch is pushed.

In case where QoS of the transfer bandwidth secured for a bit rate of a content item to be transferred is insufficient, video or sound is accordingly disarranged in a communication apparatus on the content receiving side. In the present embodiment, there is data transferred with a higher priority than the priority having been set by the switch, so that transfer of the data is more prioritized, which may result in an insufficient bandwidth. Thus, it is so arranged that: when the video or sound is disarranged, the user operates the switch so as to repeatedly change the priority setting, and the user stops the switching operation at the time when a content reproduction state is most improved.

Further, it may be so arranged that an LED or the like is provided in the vicinity of the switch and the LED is turned ON and OFF so that the QoS type can be discriminated. For example, it may be so arranged that the ON state of the LED indicates "high priority" and the OFF state of the LED indicates "low priority".

<Regarding Other Example of QoS Type Information>

The QoS type information may be categorized in a manner different from the categorization such as "high priority", "mediate priority", and "low priority", unlike the foregoing description of the present embodiment.

For example, the categorization may be indicative of a type of the received data, e.g., "video", "sound", and "other".

In the sound, deterioration caused by transfer delay or error is more likely to be perceived than the video, so that it is necessary to secure QoS by using a higher priority than that of the video in transferring the sound. Further, in transferring data such as FTP or Web content, some transfer delay or error does not influence on the user's operation, so that the data may be transferred with a lower priority than that for other data. That is, a priority can be determined depending on a type of received data.

in this case, it may be so arranged that: if "sound" is specified as the QoS type information at the time of the QoS control information conversion process, the PLID is set to 3, and if "video" is specified as the QoS type information at this time, the PLID is set to 2, and if "other" is specified as the QoS type information at this time, the PLID is set to 1.

Further, the QoS type information may be categorized so as to indicate a type of a communication apparatus, e.g., "TV", "Telephone", "Other", and the like. In this case, such categorization is the same as in the case of the categorization such as "Video", "Sound", and "Other" in terms of an internal process, but the specification indicative of a device to be connected allows the user to more easily understand information. This categorization may be applied to a case where a communication apparatus for receiving a content item has a plurality of functions (a television or the like which has a PC function).

Further, the QoS type information may be categorized so as to be indicative of a display screen size such as "20 inch", "37 inch", "45 inch", and the like in case where the communication apparatus is a television receiver or the like. As the communication apparatus has a larger display screen size, a high bit-rate video is more likely to be required, so that it may be so arranged that a transfer priority is made higher in order to secure a wider transfer bandwidth.

Further, the QoS type information may be categorized so as to be indicative of a display resolution such as "1920×1080 (Full-spec HiVision)", "1366×768 (HiVision)", "640×480 (Non-HiVision)", and the like in case where the communication apparatus is a television receiver or the like. As the communication apparatus has a higher resolution, a high bit-rate video is more likely to be required, so that it may be so arranged that a transfer priority is made higher in order to secure a wider transfer bandwidth.

Further, the QoS type information may be categorized so as to be indicative of a bit rate of received content item, e.g., "6 Mbps", "12 Mbps", "24 Mbps", and the like. It may be so arranged that a transfer priority is made higher as the bit rate is higher.

Further, the QoS type information may be categorized so as to be indicative of whether a content item to be received is charged or not, e.g., "PAY CONTENT", "FREE CONTENT", and the like.

In the VoD service, content items to be viewed or listened to include a pay content item and a free content item. For example, a latest movie is a pay content item, but programs including news programs or CMs are free content items.

In such case, it may be so arranged that: the user uses a switch provided on the communication apparatus so as to specify whether a content item to be received is a pay content item or a free content item, and in case where "PAY CONTENT" is specified, a transfer priority is made high, and in case where "free content item" is specified, the transfer priority is made low.

In case where a price for the content item varies depending on a bit rate of the content item, it may be so arranged that not only whether the content item is a pay content item or a free content item but also a priority according to the price for the content item can be specified with categories such as "EXPENSIVE CONTENT", "INEXPENSIVE", and "FREE CONTENT".

Further, it may be so arranged that a two-step switch is prepared and the QoS type information is categorized so as to be indicative of "QoS is required" or "QoS is not required" and the user specifies, in his or her communication apparatus, information on whether QoS is required or not.

It may be so arranged that: in case where "QoS is required" is specified, a high priority is set, and in case where "QoS is not required" is specified, a low priority is set.

It may be so arranged that: in setting "QoS is required" and "QoS is not required", the user comprehensively determines, in accordance with the foregoing condition (a type of data to be received, a type of an apparatus to be connected, and a similar condition), whether QoS is required in the communication apparatus or not.

Note that, the aforementioned QoS type information pieces may be used in combination. For example, it may be so arranged that the categorization such as "video", "sound", and "other" and the categorization such as "high priority", "mediate priority", and "low priority" are specified in combination. In this case, in using a network which allows a transfer priority corresponding to PLID to be specified by 9 or more stages, the priority is set to 9 (highest priority) when "sound"+"high priority" are specified, and the priority is set to 8 when "sound"+"mediate priority" are specified, and the priority is set to 7 when "sound"+"low priority" are specified, and the priority is set to 6 when "video"+"high priority" are specified, and the priority is set to 5 when "video"+"mediate priority" are specified. In this manner, it is possible to set the priority in more detail.

In this case, it may be so arranged that a plurality of switches are provided so as to specify a plurality of QoS types (there are provided two switches each of which can be switched by three stages), or it may be so arranged that a single switch allows all QoS types to be specified (there is provided a single switch which can be switched by 9 stages).

Further, it may be so arranged that both a switch for specifying whether QoS is required or not and a switch for specifying a QoS type are used in combination. In this case, the user basically uses only the switch for switching between "QoS is required" and "QoS is not required". Only in case of carrying out more detail setting, the setting of the priority may be changed.

According to this arrangement, it is possible to provide a simple operation method, in which merely whether QoS is required or not is specified, to a user who prefers simple use rather than changing the setting of the priority, and it is possible to provide a detail operation method to a user who prefers more detail setting.

Further, it may be so arranged that a switch for switching between "QoS is required" and "QoS is not required" is provided and a priority in case where "QoS is required" is set not by the switch but by another means. For example, a PC is connected to the communication apparatus, and a priority is inputted via a setting window of the PC.

Further, the switch for switching between "QoS is required" and "QoS is not required" is provided on a front surface of the communication apparatus, and the switch for switching the priority is provided on a rear surface of the communication apparatus or a similar arrangement is adopted, so that it is possible to prevent such disadvantage that: the user who prefers the simple use unintentionally changes the setting of the priority, which results in collapse of an operating environment free from any problems.

Note that, the foregoing description explained as an example the arrangement in which the switch causes the categorization of the QoS type information to correspond to the priority, and another combination may be adopted. For example, in the foregoing description, a transfer priority of sound content is set so as to be higher than a transfer priority of video content, but these transfer priorities may be set in an opposite manner.

Embodiment 2

Figure 9:
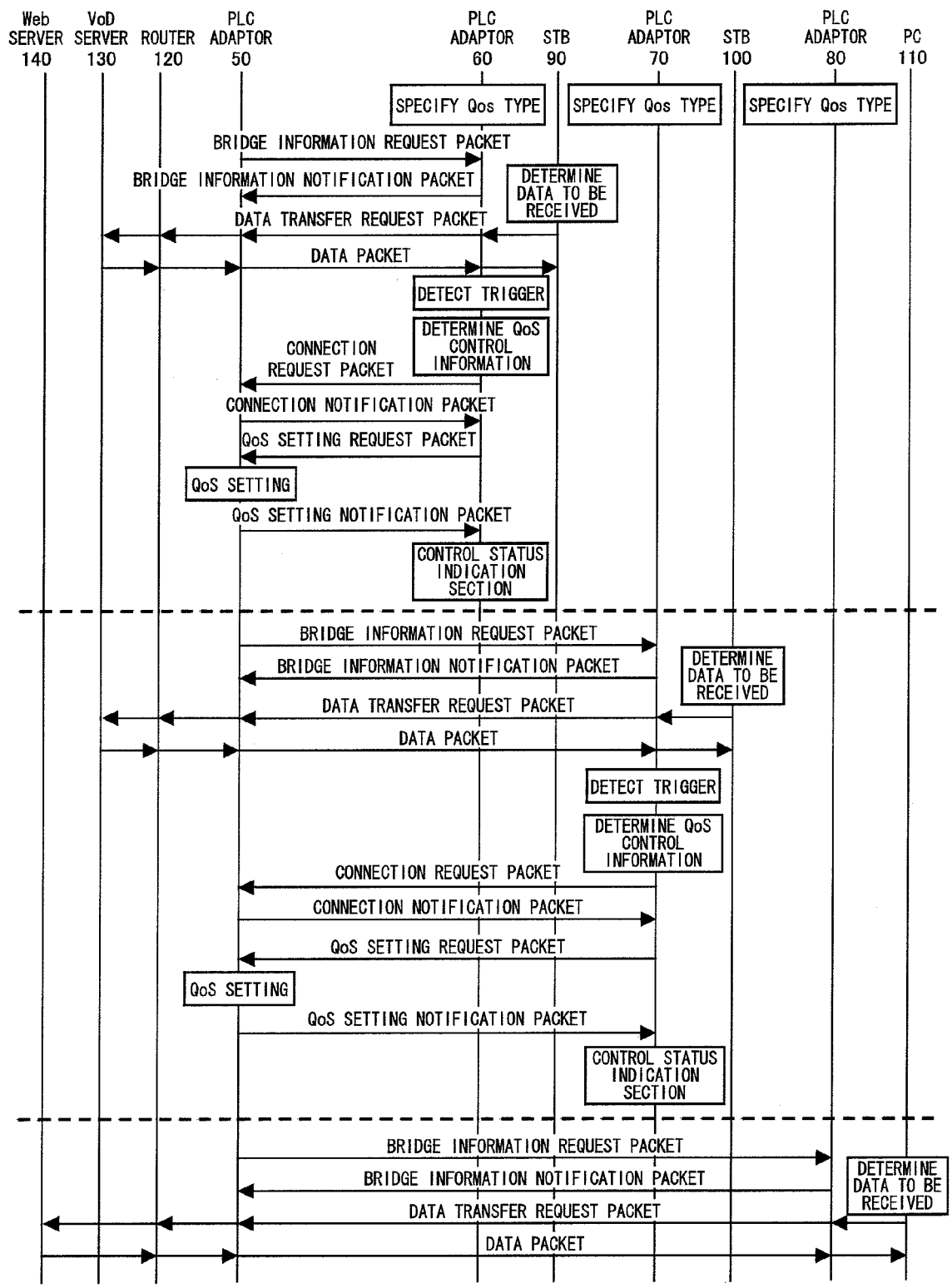
FIG. 9 is a flowchart illustrating communications among communication apparatuses in Embodiment 2.

Embodiment 2 describes a mode in which a user specifies, as QoS types, types of content that are received by content-receiving PLC adapters respectively and the QoS of the entire network is controlled by Parameterized QoS in accordance with the specification. FIG. 9 shows an overall process flow.

<Arrangement of a Network>

Figure 6:
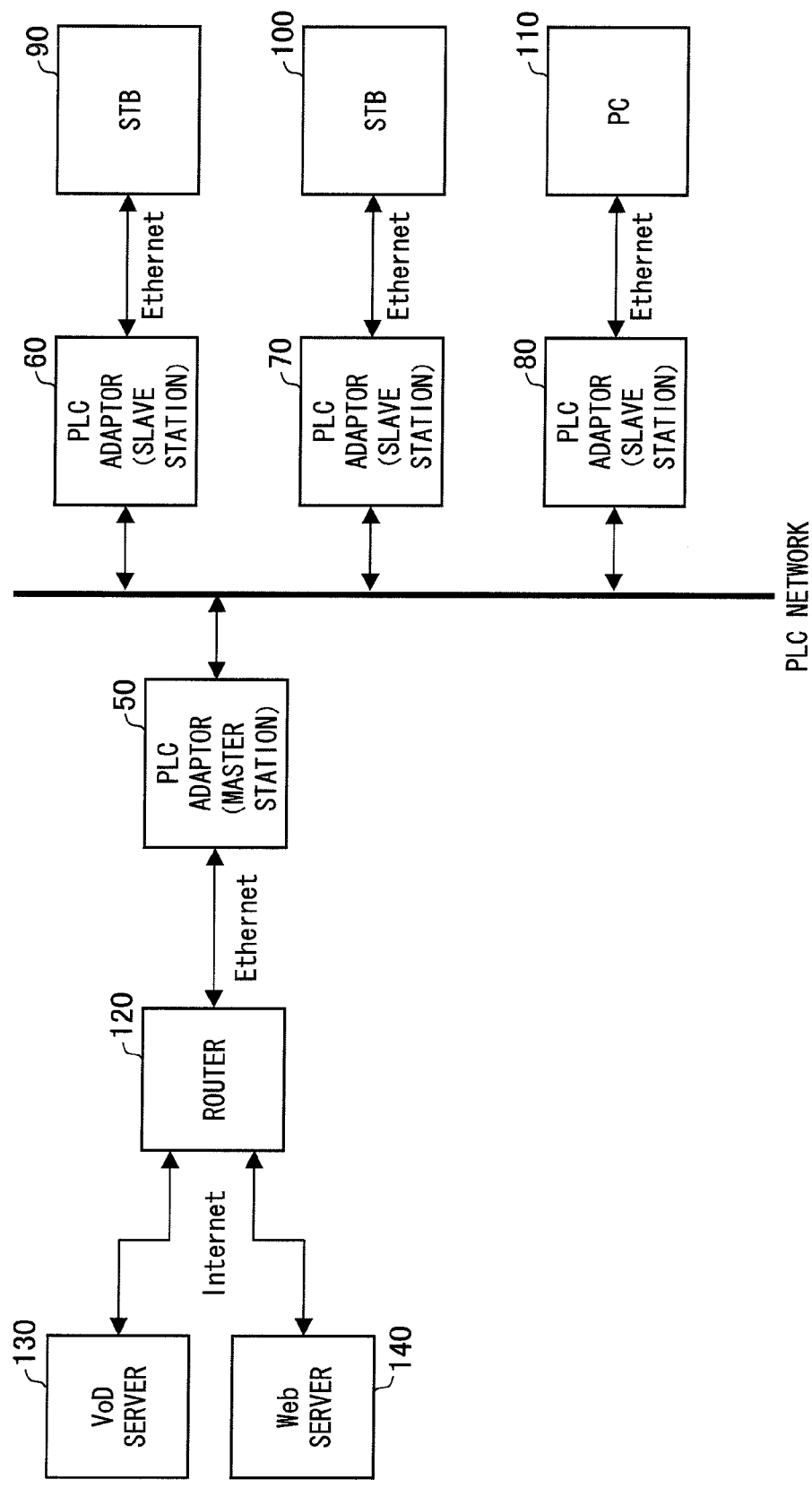
FIG. 6 is a network diagram of Embodiment 2.

FIG. 6 shows an arrangement of a network according to the present embodiment. The present embodiment differs from Embodiment 1 in that a PLC adapter that is connected to the PLC network so as to communicate and a device that actually transmits and receives content data are separate from each other in the present embodiment.

The present embodiment uses Parameterized QoS. Parameterized QoS requires the installation of one master station in a network and the management of QoS of the entire network by the master station. In the present embodiment, a PLC adapter 50 functions as a master station. However, the present embodiment is not limited to this. It is possible that any one of the other PLC adapters 60, 70, and 80 functions as a master station.

The PLC adapters 50, 60, 70, and 80 are apparatuses, corresponding to the communication apparatuses 10, 20, 30, and 40 of Embodiment 1 respectively, which transmit data to one another over the PLC network. Each of the PLC adapters 50, 60, 70, and 80 receives a packet from the Ethernet, converts the packet into a PLC packet, and then outputs the PLC packet to the PLC network. Conversely, each of the PLC adapters 50, 60, 70, and 80 receives a packet from the PLC network, converts the packet into an Ethernet packet, and then outputs the Ethernet packet to the Ethernet. That is, the PLC adapters 50, 60, 70, and 80 are apparatuses that serve as relays between the PLC network and the Ethernet.

STBs 90 and 100 are VoD STBs, and correspond to the data transmitting and receiving sections 23 and 33 of the content-receiving communication apparatuses 20 and 30 of Embodiment 1 respectively. The STBs 90 and 100 are devices that decode and display video content data. The STBs 90 and 100 are not intended for use in QoS data transmission, and as such, they cannot instruct the PLC adapters 60 and 70 to set QoS on the PLC network, respectively.

Although not shown, each of the STBs 90 and 100 has a display device, such as a TV monitor, connected thereto. Each of the STBs 90 and 100 outputs a decoded image to the TV monitor as a video signal. Each of the STBs 90 and 100 may be built in a TV receiver. A method for displaying an image is omitted because such a method is irrelevant to the essence of the present invention. Image data inputted to the STB 90 or 100 is presented to the user in one way or another.

A PC 110 corresponds to the data transmitting and receiving section 43 of the content-receiving communication apparatus 40 of Embodiment 1. In the present embodiment, the PC 110 receives Web content from the Internet and displays it. The PC 110 is not intended for use in QoS data transmission, and as such, it cannot instruct the PLC adapter 80 to set QoS on the PLC network.

A combination of a router 120, a VoD server 130, and a Web server 140 corresponds to the data transmitting and receiving section 13 of the content-transmitting communication apparatus 10 of Embodiment 1.

The VoD server 130 transmits data such as HD (High Definition) video content (i.e., a 16 Mbps image) or SD (Standard Definition) video content (i.e., a 6 Mbps image) to the router 120 via the Internet in response to a data transmission request from the STB 90 or 100.

The Web server 140 transmits Web content data to the router 120 via the Internet in response to a data transmission request from the PC 110.

The router 120 receives data from the Internet and outputs it to the Ethernet. The data outputted to the Ethernet is transmitted to the STB 90, the STB 100, or the PC 110 over the PLC network.

That is, in the present embodiment, the PLC adapters 60, 70, and 80, which are communication apparatuses that serve as relays between the PLC network and the Ethernet, are designed to set the QoS of flows being received by the STBs 90 and 100 and the PC 110, instead of the STBs 90 and 100 and the PC 110, which are Ethernet terminals that cannot instruct the PLC adapters to set QoS, respectively.

Normally, the STBs 90 and 100 are connected directly to the router 120 via the Ethernet. However, in the present embodiment, the PLC network is provided between the router 120 and the STBs 90 and 100. This is a network arrangement that is made, for example, in such a case that due to limitations of space to connect fiber-optic cables or telephone lines inside a house, the STBs 90 and 100 are used in a living room on the second floor of the house whereas the router 120 are installed on the first floor of the house.

In the present embodiment, the STB 90 receives HD video content from the VoD server 130, and the STB 100 receives an SD image from the VoD server 130. Also, the PC 110 receives Web content from the Web server 140.

The STBs 90 and 100 and the PC 110 may be used by separate users, or may be all used by a single user.

<Arrangements of the PLC Adapters>

Figure 7:
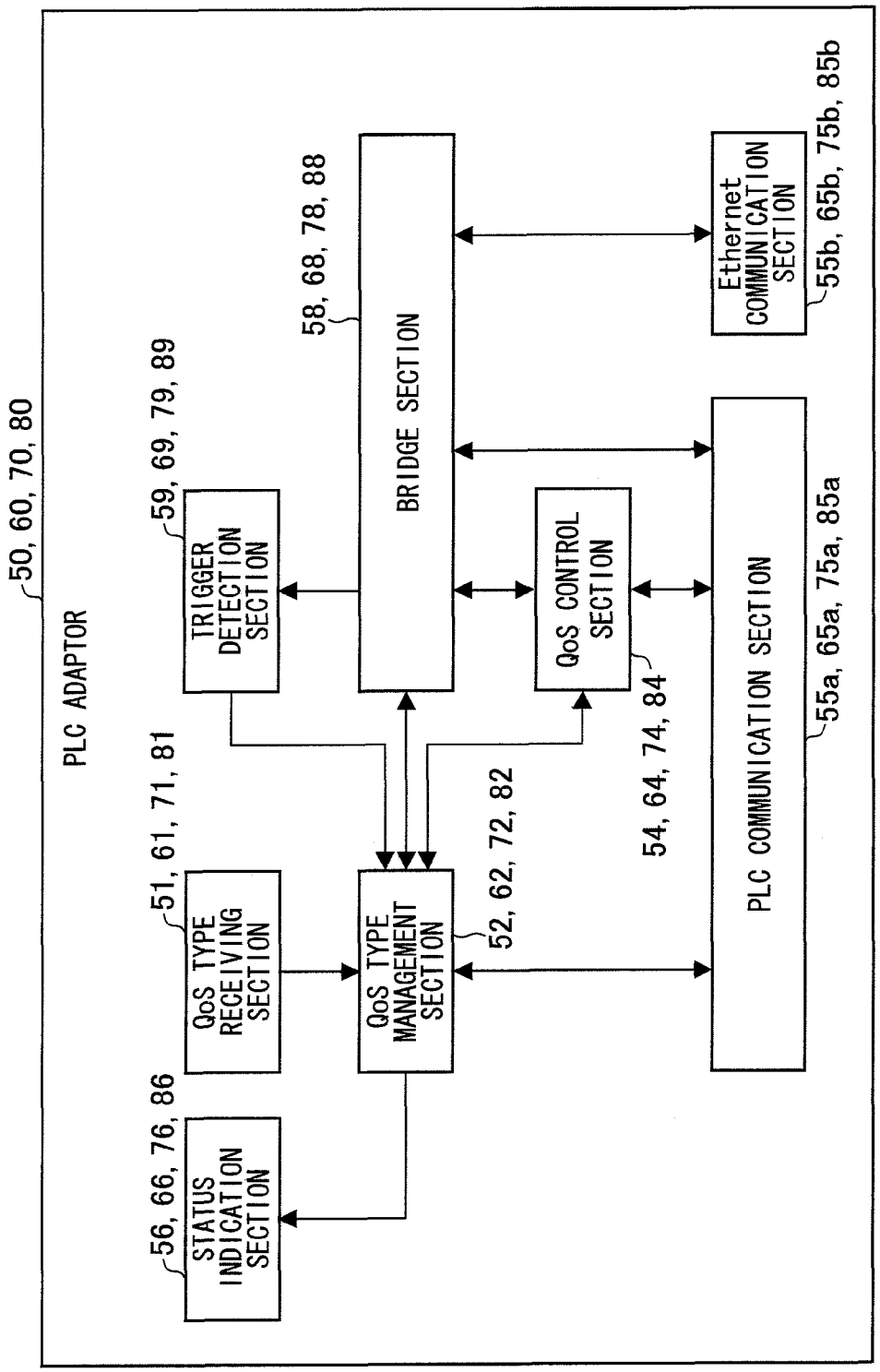
FIG. 7 is a functional block diagram of a PLC adaptor of Embodiment 2.

FIG. 7 is a functional block diagram showing the PLC adapters 50, 60, 70, and 80. The PLC adapters 50, 60, 70, and 80 are all identical in structure to one another. However, some of the PLC adapters may have unused functional blocks, depending on the respective transmitting and receiving roles of the PLC adapters. When such a PLC adapter is mounted with its role limited, it may be mounted with its unused functional block omitted therefrom.

The PLC adapters 50, 60, 70, and 80 include QoS type receiving sections 51, 61, 71, and 81 (QoS type receiving means), QoS type management sections 52, 62, 72, and 82 (QoS control information conversion means, QoS setting control means, QoS type request means, QoS type notification means, QoS control information request means, QoS control information notification means), QoS control sections 54, 64, 74, and 84 (QoS setting control means), PLC communication sections 55a, 65a, 75a, and 85a, Ethernet communication sections 55b, 65b, 75b, and 85b, bridge sections 58, 68, 78, and 88 (QoS setting control means, bridge information obtaining means, flow identification information obtaining means), trigger detection sections 59, 69, 79, and 89 (trigger detection means, trigger detection notification means, QoS setting control means, flow identification information obtaining means), and status indication sections 56, 66, 76, and 86 (status indication means), respectively.

Each of the QoS type receiving sections 51, 61, 71, and 81 carries out a QoS type receiving process of receiving, from a user or an Ethernet-linked device, a QoS type according to which QoS data transmission is carried out. Each of the QoS type management sections 52, 62, 72, and 82 carries out a QoS control information conversion process of creating a QoS parameter in accordance with QoS type information, and carries out a QoS setting process of creating and transmitting a QoS setting request packet, thereby setting the corresponding QoS control section 54, 64, 74, or 84. Each of the QoS control sections 54, 64, 74, and 84 makes out a schedule for bandwidth allocation in accordance with the QoS parameter contained in the QoS setting request packet. The PLC communication sections 55a, 65a, 75a, and 85a transmit and receive packets to and from the PLC network, and the Ethernet communication sections 55b, 65b, 75b, and 85b transmit and receive packets to and from the Ethernet. The bridge sections 58, 68, 78, and 88 perform bridging of packets between the PLC communication sections 55a, 65a, 75a, and 85a and the Ethernet communication sections 55b, 65b, 75b, and 85b, respectively. The bridge sections 58, 68, 78, and 88 also notify the trigger detection sections 59, 69, 79, and 89 of packets received from the PLC communication sections 55a, 65a, 75a, and 85a, respectively. Each of the trigger detection sections 59, 69, 79, and 89 analyzes a packet, and instructs the corresponding QoS type management section 52, 62, 72, or 82 to start the QoS setting process. Each of the status indication sections 56, 66, 76, and 86 indicates the status of QoS setting and a result of the process to the user.

<Regarding QoS Type Receiving Process>

The following describes a procedure up to QoS transmission of HD video content to the STB 90 from the VoD server 130 via the PLC adapters 50 and 60.

Figure 8:
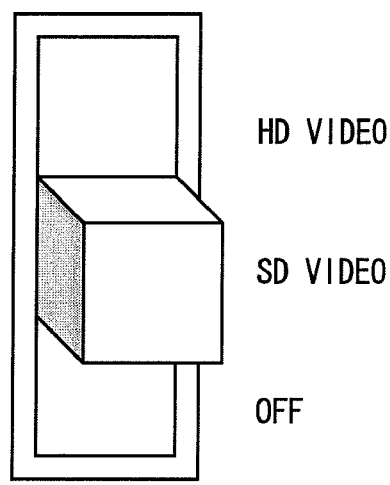
FIG. 8 is a diagram illustrating appearance of a QoS type receiving section of Embodiment 2.

In case where a user wishes to receive HD video content via the STB 90, the user specifies "HD IMAGE" as QoS type information by the QoS type receiving section 61 of the PLC adapter 60 to which the STB 90 has been connected. Specifically, it is conceivable that such a slide-type switch as shown in FIG. 8 is set in a position indicative of "HD IMAGE".

The setting status of the switch is notified to the QoS type management section 62. As a method for notification, it is conceivable that a numerical value capable of uniquely identifying the setting status of the switch is determined in advance (e.g., "0" for "OFF", "1" for "SD IMAGE", or "2" for "HD IMAGE") and the QoS type receiving section 61 notifies the QoS type management section 62 only of the numerical value. However, such a method for notification is not essential to the present invention. Therefore, it is possible to use any method for notification.

Further, it is possible that the device connected to the PLC adapter 60 via the Ethernet specifies a QoS type. This will be detailed later.

It is possible here that the status indication section 66 shows the user that a series of processes for QoS setting has been started. Specifically, it is conceivable to install an LED near the QoS type receiving section 61 and blink the LED. Then, on completion of the series of processes for QoS setting, the LED is made to shine steadily.

The series of processes for QoS setting may take time. In that case, QoS data transmission is not started immediately after a change in status of the switch, and normal data transmission is carried out instead. As a result of the normal data transmission, there occurs a disarrangement in sound or image during transmission of sound content or video content.

This misleads the user into judging that there is still a disarrangement in sound or image in spite of the change of the switch for QoS setting.

Such a misjudgment can be avoided by showing the user that QoS setting has yet to be completed. That is, if the user is shown that QoS setting has yet to be completed, the user will better grasp the status of QoS setting, without making a misjudgment. This allows the user to use the PLC adapter more comfortably.

Further, it is possible to show the user, by making stepwise changes in color of light emitted by the LED, how long it still takes to complete QoS setting. For example, it is conceivable to make stepwise changes from red to yellow and from yellow to green in this order.

Further, it is conceivable that in the case of use of a liquid crystal screen as the status indication section 56, 66, 76, or 86, the screen numerically displays an amount of time left until completion of setting. At the same time, it is possible to display a progress bar whose length changes according to the remaining time.

Further, it is possible that the STB 90, via which the user is actually viewing or listening to content, displays a character or icon indicative of a change in status of the switch of the QoS type receiving section 61 and displays an amount of time left until completion of QoS setting or a progress bar.

<Regarding Bridge Information Obtaining Process>

The content-transmitting PLC adapter 50 obtains bridge information from the PLC adapter 60 in advance in preparation for transferring, to the PLC adapter 60, a data packet received from the router 120.

In transmitting data, the PLC adapter 50 transfers, to another PLC adapter 60, 70, or 80, a data packet received from the router 120 connected via the Ethernet. On this occasion, the packet does not contain the address of the PLC adapters 60, 70, or 80 on the PLC network (such an address being hereinafter referred to as "PLC address"), but contains the address of the STB 90, the STB 100, or the PC 110 on the Ethernet (such an address being hereinafter referred to as "Ethernet address"). Note that, the STBs 90 and 100 and the PC 110 are connected downstream to their respective PLC adapters via the Ethernet.

This makes it necessary for the content-transmitting PLC adapter 50 to find information indicative of the Ethernet addresses of the STB 90, the STB 100, and the PC 110 in advance about the respective PLC adapters 60, 70, and 80 in the PLC network, judge which of the PLC adapter is in connection with a device that is the destination of a packet received from the router 120, and transfer the packet to that PLC adapter via the PLC network.

Accordingly, in order to obtain information indicative of the Ethernet address of the STB 90, the content-transmitting PLC adapter 50 transmits a bridge information request packet to the PLC adapter 60. Specifically, the bridge section 58 of the PLC adapter 50 creates a bridge information request packet and transmits it to the PLC communication section 55a. The PLC communication section 55a adds, to the bridge information request packet, a PLC header containing the address of the PLC adapter 60 as a destination, and then transmits the packet to the PLC network.

Although not detailed, it is possible for the PLC adapters 50, 60, 70, and 80 to find one another's addresses in advance by the exchange of specific packets.

Further, as a PLC address, an identifier that is given to each PLC adapter at the time of participation in the PLC network is used. However, such an identifier is irrelevant to the essence of the present invention, and therefore will not be detailed. Instead, such an identifier will be referred to simply as "PLC address".

Upon receiving the bridge information request packet, the PLC communication section 65a of the PLC adapter 60 notifies the bridge section 68 of the reception. The bridge section 68 creates a bridge information notification packet containing the Ethernet address of the device connected via the Ethernet communication section 65b of the PLC adapter 60.

It is assumed here that the bridge section 68 obtains, in advance, the Ethernet address of the STB 90 connected thereto. However, a method for obtaining the Ethernet address in advance is irrelevant to the essence of the present invention and may be any method of that kind, and as such, it will not be detailed.

In the present embodiment, since the PLC adapter 60 is in connection with the STB 90, the bridge information notification packet contains the Ethernet address of the STB 90. It should be noted that in case where a single PLC adapter is in connection with a plurality of devices, the Ethernet addresses of all the devices are contained in a bridge information notification packet.

The bridge section 68 transmits, to the PLC communication section 65a, the bridge information notification packet thus created. The PLC communication section 65a adds a PLC header to the bridge information notification packet, and then transmits the packet to the PLC network.

Upon receiving the packet, the PLC communication section 55a of the PLC adapter 50 notifies the bridge section 58. The bridge section 58 saves a combination of the PLC address of the PLC adapter 60 and the Ethernet address, which is contained in the bridge information notification packet, of the STB 90 connected downstream to the PLC adapter 60. These pieces of information are referred to as "bridge table".

It should be noted that the bridge information obtaining process may be carried out at any point of time before the PLC adapter 50 starts to transmit data packets.

For example, the bridge information obtaining process may be carried out before the specification of a QoS type, or may be carried out regularly after the PLC adapter 50 is powered up.

Further, in the present embodiment, since the PLC adapter 50 also transmits data to the PLC adapters 70 and 80, it is possible to carry out the bridge information obtaining process with respect to each of the PLC adapters 60, 70, and 80 at the beginning. On this occasion, it is possible that the PLC adapter 50 transmits a bridge information request packet by multicasting or broadcasting and the PLC adapters 60, 70, and 80 transmit bridge information notification packets in reply. In this case, efficiency in the use of bandwidths becomes better than in case where the PLC adapter transmits a plurality of bridge information request packets to the PLC adapters 60, 70, and 80 by unicasting respectively.

Alternatively, the content-receiving PLC adapters 60, 70, and 80 may spontaneously transmit bridge information notification packets to the PLC adapter 50 by multicasting or broadcasting, regardless of whether the PLC adapters 60, 70, and 80 have received bridge information request packets.

<Regarding Process of Determining What Data to Receive>

At a given point of time after a QoS type has been set, the STB 90 determines what content data to receive. In case where the VoD server 130 has plural content items stored therein and there are plural content items being considered for reception, it is necessary to determine which of the content items to receive. A method for determining what content item to receive is irrelevant to the essence of the present invention, and therefore may be any method of that kind.

As for the present embodiment, the following describes a procedure for processing in an ordinary STB and VoD server.

For each content item stored in the VoD server 130, the VoD server 130 sets (i) a title of the content item, (ii) a text descriptive of the content item, and (iii) content identification information capable of uniquely identifying the content. The VoD server 130 notifies the STB 90 of a list of such titles, texts, and content identification information, and the STB 90 indicates the list to the user. The user selects desired content item from the presented list, for example, by operating a remote controller accompanying the STB 90.

It should be noted that instead of the user's determining what content data to receive, the STB 90 may automatically determine what content item to receive. It is assumed here that some sort of HD video content has been selected.

<Regarding Data Transmission Request Process>

In Embodiment 1, the data transmitting and receiving sections 13, 23, 33, and 43 are built in the communication apparatuses 10, 20, 30, and 40 respectively; therefore, after it is determined what content data to receive, the data transmitting and receiving sections 13, 23, 33, and 43 can directly instruct the QoS type management sections 12, 22, 32, and 42 to start QoS control information conversion processes respectively.

Meanwhile, in the present embodiment, the PLC adapter 60 and the STB 90 are separate from each other; therefore, even if the STB 90 determines what content data to receive, the STB 90 cannot directly instruct the QoS type management section 62 to start a QoS control information conversion process.

As such, immediately after determining what content data to receive, the STB 90 carries out a data transmission request process with respect to the VoD server 130.

A method for carrying out a data transmission request process is irrelevant to the essence of the present invention, and therefore may be any method of that kind. As for the present embodiment, the following describes a procedure for processing in an ordinary STB and VoD server.

First, the STB 90 creates a data transmission request packet. This packet contains content identification information for identifying a content item already selected. The content identification information is a uniquely determinable value agreed upon in advance between the VoD server 130 and the STB 90, and has already been received by the STB 90 as a content list. Further, the data transmission request packet needs to be finally transmitted to the VoD server 130 on the Internet, and as such, the packet also contains the IP address of the VoD server 130.

Next, the STB 90 transmits the created packet to the PLC adapter 60 via the Ethernet. Then, the PLC adapter 60 transmits the received packet to the PLC adapter 50 via the PLC network. Then, the PLC adapter 50 transmits the received packet to the router 120 via the Ethernet. Then, the router 120 transmits the received packet to the VoD server 130 via the Internet.

It is assumed here that the PLC adapter 60 has been finished with a bridge information obtaining process as with the PLC adapter 50, has derived the PLC address of the PLC adapter 50 from the Ethernet address, which is contained as a destination in the packet received from the Ethernet, of the router 120, and has transmitted a PLC header containing the address. It should be noted that it is possible to use another method to notify the PLC adapter 50 of the data transmission request packet.

<Regarding Trigger Detection Process>

After receiving the data transmission request packet, the VoD server 130 starts to transmit the content item specified by the packet. The VoD server 130 converts the stored content data into packets, and then sequentially transmits the packets to the router 120 via the Internet together with destination information. The router 120 sequentially transmits the received data packets to the PLC adapter 50 via the Ethernet.

Each of these data packets is a packet of video content item that is transmitted from the VoD server 130 to the STB 90, and as such, the data packet contains the IP address of the STB 90 as a destination.

The router 120 carries out a routing process to search the IP address for an Ethernet address. This routing process is an ordinary process that deserves no special mention, and therefore will not be detailed.

As a result of the routing process, the Ethernet address of the STB 90 is contained as a destination address in the data packet at the point of time where the data packet has been transferred from the router 120 to the PLC adapter 50.

The Ethernet communication section 55b of the PLC adapter 50 receives the data packet and passes it to the bridge section 58. Since the bridge table obtained in advance contains the PLC address of the PLC adapter 60 and the Ethernet address of the STB 90, a cross-check between the bridge table and the destination Ethernet address of the data packet shows that the destination of the data packet on the network is the PLC adapter 60.

Accordingly, the bridge section 58 adds, to the data packet, a PLC header containing the PLC address of the PLC adapter 60 as a destination address of the data packet, and then passes the data packet to the QoS control section 54.

At this point of time, no QoS setting has been carried out on a flow to which the data packet belongs. Therefore, the QoS control section 54 passes the data packet to the PLC communication section 55a as a normal packet, without doing anything about QoS control. The PLC communication section 55a transmits the data packet to the PLC adapter 60.

The PLC communication section 65a of the PLC adapter 60 receives the data packet and passes it to the bridge section 68. The bridge section 68 passes the data packet to the Ethernet communication section 65b so that the data packet is transferred to the Ethernet, and also notifies the trigger detection section 69 of the reception of the data packet.

This notification allows the trigger detection section 69 to know that data transmission has been started, and the trigger detection section 69 recognizes the need for a QoS setting process. Accordingly, the trigger detection section 69 instructs the QoS type management section 62 to start a QoS setting process.

That is, the trigger detection section 69 detects the timing of a QoS setting process by analyzing a reception history of data received by the PLC adapter 60. In other words, the trigger detection section 69 analyzes the reception history of data received by the PLC adapter 60 and thereby determines whether or not a QoS setting process is carried out. The QoS type management section 62 carries out a QoS setting process at the timing detected by the trigger detection section 69. In other words, the QoS type management section 62 carries out a QoS setting process when the trigger detection section 69 determines that a QoS setting process is carried out.

In case where the transmitting PLC adapter carries out a trigger detection process, the trigger detection section detects the timing of a QoS setting process by analyzing a transmission history of data transmitted by the transmitting PLC adapter. The reception history or the transmission history only needs to be stored in a storage section (not shown) of the corresponding PLC adapter.

The QoS type management section of the transmitting or receiving PLC adapter may carry out a QoS setting process in accordance with timing notified from the other PLC adapter with which the transmitting or receiving PLC adapter carries out data communication. Conversely, the QoS type management section may notify the other PLC adapter via the PLC communication section of timing detected by the trigger detection section.

<Regarding Case where a Single PLC Adapter Receives Data Packets from a Plurality of PLC Adapters>

The following describes a process by which a single receiving PLC adapter receives data packets from a plurality of transmitting PLC adapters.

The receiving PLC adapter may receive packets at the time of trigger detection, sort the packets according to each transmitting PLC adapter, and request each transmitting PLC adapter for QoS setting. This arrangement makes it possible to carry out QoS setting with respect to each transmitting PLC adapter.

Each of the packets received by the receiving PLC adapter contains the Ethernet address of the source (e.g., the address of the router). Therefore, a cross-check between bridge information received from a transmitting PLC adapter and the Ethernet address makes it possible to find the PLC address of the transmitting PLC adapter from which the data packet was transmitted. This makes it possible to sort received packets according to each transmitting PLC adapter as described above.

<Regarding Timing of the Start of a QoS Setting Process>

As mentioned above, at the point of time where only a single data packet has been received, the trigger detection section 69 gives an instruction to start a QoS setting process. However, such an instruction to start a QoS setting process may be given only upon the satisfaction of specific conditions. Possible examples of the specific conditions include reception of a predetermined number of packets and reception of packets at specific frequencies.

Further, in notifying the trigger detection section 69 of the reception of a data packet, the bridge section 68 may pass the content of the data packet to the trigger detection section 69 in addition to the notification of reception. The trigger detection section 69 analyzes the data packet passed thereto. Only upon the satisfaction of specific conditions may the trigger detection section 69 instruct the QoS type management section 62 to start a QoS setting process. Possible examples of the specific conditions here include reception of a packet from a specific IP, PLC, or Ethernet address and reception of a packet containing a specific TPC port number or UDP port number.

If the reception of a data packet does not trigger the start of a QoS setting process as described above, the PLC adapter 60 starts a QoS setting process at the point of time where the PLC adapter 60 has been powered up or at the point of time where the switch of the QoS type receiving section 61 has been operated.

In that case, although no transmission of content data is provided during a period of time between a point of time where the QoS setting process is started and a point of time where the STB 90 carries out a process of determining what data to receive, a bandwidth is unnecessarily reserved for the transmission, and the other PLC adapters 70 and 80 cannot use the reserved bandwidth. This causes the entire network to decrease in efficiency in the use of bandwidths.

On the other hand, since the present embodiment carries out a QoS setting process first at the point of time where data transmission is started, the present embodiment brings about an advantage of high efficiency in the use of bandwidths.

Further, in case where the PLC adapter simultaneously receives data, such as Web content, which does not require QoS, separately from data, such as moving video content, which requires QoS, an arrangement in which a QoS setting process is carried out simply at the point of time where a packet is received causes a QoS setting process to be carried out even at the time of reception of data that does not require QoS.

However, at the time of reception of data that does not require QoS, it is desirable not to carry out QoS setting or use a bandwidth.

For that purpose, it is conceivable to analyze a received packet, determine whether or not the packet is data that requires QoS, and perform QoS setting only in case where the packet is judged to be data that requires QoS.

A possible example of a method for judgment of necessity of QoS is to analyze the header of a packet and determine what protocol the packet uses.

For example, as a transport-layer protocol in an OSI reference model, TCP and UDP are commonly used. Among these, UDP is characterized by low reliability and high transmission rates, and therefore is often used for transmission of real-time data such as moving images. If QoS setting is carried out when a packet using UDP is received, it becomes possible to carry out control for bandwidth reservation only in the case of a high possibility of the need for QoS.

It should be noted that it is conceivable to determine, with reference to a Protocol field in an IP header, whether or not a packet is using UDP. The value of this field is a value indicating what is being used as an upper protocol, and therefore makes it possible to distinguish between UDP and TCP.

Further, it is possible to make a similar determination in accordance with whether or not another protocol is being used. For example, RTP (Real-time Transport Protocol) is conceived as a similar protocol. RTP is often used for streaming data transmission.

Further, it is conceivable to analyze the content of a packet and carry out QoS setting in case where the packet is a sound or a moving image. For example, the header of an RTP packet contains a field called a PT field, and the PT field indicates what codec data is contained in the RTP packet. That is, an analysis of the PT field makes it possible to find whether the packet is an image or a sound. It is conceivable to start QoS setting if the PT field contains a value indicative of an image or a sound.

Further, in case where "IMAGE" or "SOUND" is specified as a QoS type as will be described later, it is conceivable to carry out QoS setting only in case where "IMAGE" is specified as a QoS type and the PT field contains a value indicative of an image. In case where a sound packet is received although "IMAGE" is specified as a QoS type, it is possible to judge that the packet is not a QoS target intended by the user. Therefore, in such a case, it is desirable that no QoS setting be carried out.

Further, because the transmitting side and the receiving side may conduct some sort of negotiation with each other prior to data transmission, it is conceivable to carry out QoS setting at the point of time where a packet of the negotiation is detected. For example, in the case of image transmission by streaming, RTSP (Real-time Streaming Protocol) may be used.

According to RTSP, the transmitting station and the receiving station exchange some packets with each other prior to the start of data packet transmission in order to conduct a negotiation for communication with each other. It is conceivable to carry out QoS setting in case where such a packet is detected. Similarly, the transmitting station and the receiving station also exchange packets with each other at the end of data packet transmission. Therefore, it is conceivable to carry out a QoS cancellation process in case where such a packet is detected.

In a process of analyzing what protocols packets belong to, analyses of all the packets impose burdens on a CPU and bring pressure on CPU resources to be used for other processes. Therefore, it is conceivable to analyze the packets intermittently. For example, it is conceivable to analyze one out of every 100 packets. Alternatively, instead of using the number of packets, it is conceivable to analyze the packets at time intervals. For example, it is conceivable to analyze only a packet received at the end of every 100 ms.

Further, in the case of transmission of real-time data such as moving video content, it is usual that the packets are not transmitted one by one but are transmitted continuously and suddenly. Therefore, it is conceivable to carry out QoS setting only in case where the PLC adapter 60, 70, or 80 receives a predetermined number of packets within a predetermined period of time, not in case where the PLC adapter 60, 70, or 80 receives only a single packet. For example, it is conceivable to judge, in case where 100 or more packets have been received within a period of 100 ms, that real-time data is being received and carry out QoS setting.

Further, it is conceivable to count the number of packets only in the case of continuous reception of packets, such UDP packets as mentioned above, expected to have a high possibility of being real-time data. That is, it is conceivable to carry out QoS setting in case where 100 or more UDP packets have been received within a period of 100 ms.

These arrangements make it possible to reduce the chance of unnecessarily reserving a bandwidth for transmission of data that does not require QoS setting.

While the receiving PLC adapter is not a target of QoS control, the transmitting PLC adapter may transmit data to the receiving PLC adapter with use of at least a portion of a remaining data transmission bandwidth other than a data transmission bandwidth allocated to another PLC adapter that is currently a target of QoS control.

<Regarding Field of a Packet for Use in Trigger Detection>

The head of an IP packet or an Ethernet packet may contain information indicative of the transmission priority of the packet. Therefore, it is conceivable to use such fields for trigger detection. Such a field corresponds to a ToS (Type of Service) field in the case of an IPv4 header, a user priority field within a VLAN tag in the case of an Ethernet header, or the like.

For example, in case where the VoD server 130 or the transmitting PLC adapter 50 transmits real-time data, the header of a packet of real-time data contains a value indicative of high priority; meanwhile, in case where the VoD server 130 or the transmitting PLC adapter 50 transmits nonreal-time data, the header of a packet of nonreal-time data contains a value indicative of low priority. In that case, each of the content-receiving PLC adapters 60, 70, and 80 can analyze such a field contained in a received packet and thereby determine whether or not the received packet is real-time data.

It is conceivable that each of the content-receiving PLC adapters 60, 70, and 80 uses this mechanism to carry out QoS setting only in the case of reception of real-time data.

In case where a received packet contains a plurality of fields indicative of transmission priorities, some sort of method is used in advance to determine which of the fields is used for trigger detection. This setting may be changed by the user, or may be implemented after it is determined in advance which of the fields is used.

For example, in PLC, the content-transmitting PLC adapter 50 adds an MAC header of PLC directly to a packet received from the Ethernet and then transmits the packet. Therefore, a packet received by the content-receiving PLC adapter 60, 70, or 80 contains both a User Priority field and a ToS field.

In a non-PLC network, the content-transmitting side may delete the header of a packet received from the Ethernet, add a MAC header to the packet, and then transmit the packet. In that case, a packet received by the content-receiving side contains only a ToS field. Therefore, it is only necessary to use only the ToS field for trigger detection.

The head of an IP packet or an Ethernet packet may contain information for identifying a flow of the packet (flow identification information), it is conceivable to use such fields for trigger detection.

Such a field corresponds to a Flow Label field in the case of an IPv6 header, a VID (VLAN Identifier) field within a VLAN tag in the case of an Ethernet header, or the like.

For example, the field is set to take on values that vary between a case where the content-transmitting PLC adapter 50 transmits real-time data and a case where the content-transmitting PLC adapter 50 transmits nonreal-time data. Moreover, some sort of method is used in advance to notify each of the content-receiving PLC adapters 60, 70, and 80 of an agreement as to which of the field values reindicates real-time data. This mechanism enables each of the content-receiving PLC adapters 60, 70, and 80 to determine whether or not a received packet is real-time data.

It is conceivable that this mechanism is used to carry out QoS setting only in the case of reception of real-time data.

That is, each of the QoS type management sections (QoS type setting control means) 61, 71, and 81 may judge, in accordance with a result of a cross-check between bridge information obtained from the corresponding bridge section 68, 78, or 88 and flow identification information, whether or not to carry out a QoS setting process.

In case where a received packet contains a plurality of fields for identifying flows, some sort of method is used in advance to determine which of the fields is used for trigger detection. This setting may be changed by the user, or may be implemented after it is determined in advance which of the fields is used.

The head of an IP packet or an Ethernet packet may contain information for specifying the quality of transmission of the packet. Therefore, it is conceivable to use such fields for trigger detection. Such a field corresponds to a ToS (Type of Service) field in the case of an IPv4 header or the like. A ToS field contains information such as a degree of delay, throughput, reliability, and monetary cost.

For example, the field is set to take on values that vary between a case where the content-transmitting PLC adapter 50 transmits real-time data and a case where the content-transmitting PLC adapter 50 transmits nonreal-time data. Moreover, some sort of method is used in advance to notify each of the content-receiving PLC adapters 60, 70, and 80 of an agreement as to which of the field values reindicates real-time data. This mechanism enables each of the content-receiving PLC adapters 60, 70, and 80 to determine whether or not a received packet is real-time data.

It is conceivable that this mechanism is used to carry out QoS setting only in the case of reception of real-time data.

<Regarding QoS Control Information Conversion Process>

When instructed by the trigger detection section 69 to start a QoS setting process, the QoS type management section 62 first carries out a QoS control information conversion process. Specifically, the QoS type management section 62 determines, in accordance with QoS type information specified by the QoS type receiving section 61, a QoS parameter to be notified to the master station, i.e., the PLC adapter 50.

Since the QoS type information specified by the PLC adapter 60 is "HD IMAGE", the QoS type management section 62 creates such a QoS parameter as to guarantee QoS suitable for transmission of an HD image.

Specifically, it is conceivable that the QoS type management section 62 derives a QoS parameter, for example, with reference to a table in which QoS type information and the respective values of QoS parameters have been stored.

Necessary QoS parameters vary from one network protocol to another. Specific QoS setting parameters are irrelevant to the essence of the present invention, and as such, they are discretionary.

In the case of PLC, examples of QoS parameters include bit rates required for data transmission, permissible transmission delays, permissible fluctuations in transmission delay, and a combination of plural values such as the average, minimum, maximum values of the sizes of packets to be sent.

A conceivable bit rate for transmission of an HD image is 16 Mbps or a value obtained by adding a margin thereto. Further, as the other parameters, optimum values obtained by experiment or the like may be stored in advance.

<Regarding QoS Setting Process>

The content-receiving PLC adapter 60 first asks the PLC adapter 50, with which the PLC adapter 60 communicates, whether or not connection is possible, and then carries out a QoS setting process with respect to the master station.

In the present embodiment, the PLC adapter 50 serves both as a transmitting station and a master station. Therefore, the process of asking whether or not connection is possible and the QoS setting process are both carried out by the PLC adapter 60 with respect to the PLC adapter 50.

The QoS type management section 62 creates a connection request packet containing a QoS parameter already determined, and then transmits the connection request packet to the PLC communication section 65*a*. The PLC communication section 65*a* transmits the connection request packet to the content-transmitting PLC adapter 50.

The PLC communication section 55*a* of the PLC adapter 50 receives the packet and transmits it to the QoS type management section 52. The QoS type management section 52 determines, from the information contained in the connection request packet, whether or not data transmission is possible. A criterion for the determination varies depending on implementation. For example, there is a case where the request is rejected due to limitations imposed on a packet-transmitting buffer in the PLC adapter 50.

The QoS type management section 52 creates a connection notification packet containing information (Result Code) indicating whether or not it is possible to accept the request for data transmission, and then transmits the connection notification packet to the PLC communication section 55a. The PLC communication section 55a transmits the connection notification packet to the PLC adapter 60.

The PLC communication section 65a of the PLC adapter 60 receives the packet and transmits it to the QoS type management section 62. The QoS type management section 62 finds, from the Result Code contained in the packet, whether or not the request for data transmission has been accepted.

At this point of time, in case where the Result Code indicates the rejection of the request, the QoS setting process is canceled and the status indication section 66 shows the user that the QoS request was not satisfied.

In case where the Result Code indicates the acceptance of the request, the QoS type management section 62 creates a QoS setting request packet containing the same QoS parameter as that contained in the connection request packet, and then transmits the QoS setting request packet to the PLC communication section 65a. The PLC communication section 65a transmits the QoS setting request packet to the master station, i.e., the PLC adapter 50. Although not detailed, a slave station in the PLC network can find the address of a master station in advance by the exchange of specific packets. In case where another PLC adapter serves as a master station, the QoS setting request packet is transmitted to that PLC adapter.

The PLC communication section 55a of the PLC adapter 50 receives the QoS setting request packet and transmits it to the QoS control section 54. The QoS control section 54 determines, in accordance with the QoS parameter contained in the QoS setting request packet, whether or not it is possible to accept the request. An increase of flows requiring QoS causes a scarcity of available PLC network bandwidths, and such a scarcity may make it impossible to satisfy QoS requests of all the flows. In such a case, QoS is guaranteed for only some of the flows by some sort of rule.

For example, such control is conceivable that requests are accepted in the order of arrival of QoS setting request packets and rejected at the point of time where bandwidths become scarce. A specific method for determination is dependent on implementation and irrelevant to the essence of the present invention, and as such, it will not be described.

In case where the QoS parameter contained in the QoS setting request packet is judged to be acceptable, the QoS control section 54 assigns an identifier, called a GLID (Global Link ID), which uniquely identifies a flow within the PLC network, and makes out a schedule for bandwidth allocation for the GLID in accordance with the QoS parameter.

A specific algorithm for scheduling is irrelevant to the essence of the present invention, and therefore is omitted. However, the QoS control section 54 of the master station 50 determines the frequency, duration, and order of bandwidth allocation so as to satisfy the QoS request notified from the slave station 60.

After that, the QoS control section 54 creates a QoS setting notification packet containing (i) information (Result Code) indicating whether or not it is possible to accept the QoS request and, in case where the Result Code takes on a value indicative of success, (ii) the GLID. Then, the QoS control section 54 transmits the QoS setting notification packet to the PLC communication section 55a. The PLC communication section 55a transmits the QoS setting notification packet to the PLC adapter 60. The PLC communication section 65a of the PLC adapter 60 receives the packet and transmits it to the QoS type management section 62.

It should be noted that it is possible to make only a QoS setting request without carrying out the process of getting connected to the content-transmitting PLC adapter 50. For example, since IEEE802.11e stipulates nothing corresponding to the process of getting connected to a content-transmitting communication apparatus, only a QoS setting process for a master station is carried out.

<Regarding Process of Controlling the Status Indication Section 66>

The QoS type management section 62 of the PLC adapter 60 finds, from the Result Code contained in the QoS setting notification packet, that the QoS setting request has been accepted. The QoS type management section 62 controls the status indication section 66 so that the status indication section 66 shows the user that the request has been accepted.

As a specific arrangement of the status indication section 66, it is conceivable to install an LED near the QoS type receiving section 61 and present a result of the QoS request to the user by turning on the LED in case where the specified QoS request has been satisfied, i.e., in case where the Result Code contained in the QoS setting notification packet takes on a value indicative of success, or by blinking the LED in case where the QoS request was not satisfied, i.e., in case where the Result Code takes on a value indicative of failure.

Since the Result Code shows here that the QoS request has been accepted, the success in QoS setting is presented to the user by turning on the LED.

In case where the QoS setting request was not accepted here, the requested QoS is not guaranteed although the user has set the switch to "HD IMAGE" in the PLC adapter 60.

In case where a request set by the switch is unsatisfied, there may occur a disarrangement in an image that has been transmitted. At this point of time, if the user is not shown that the request set by the switch is unsatisfied, the user has difficulty in identifying a reason why such a disarrangement in image occurs although QoS has been set by the switch.

However, in case where the user is shown that the request set by the switch is unsatisfied, the user can see that such a disarrangement in image occurs because QoS is not guaranteed and bandwidths are scarce. This makes it possible to take measures to arrange mediation for the entire network.

For example, it is possible to take such measures as lowering the bit rate of content to be viewed and switching the PLC adapter 60 from "HD IMAGE" to "SD IMAGE".

For example, it is possible to install an LED near each of the QoS type receiving section 61, 71, and 81 and indicate processing result information to the user by turning on the LED in case where the specified QoS request has been satisfied, or by turning off the LED in case where the QoS request was not satisfied. Conversely, it is possible to show the non-fulfillment of the request by turning on the LED, and to show the fulfillment of the request by turning off the LED.

Further, in case where the PLC adapter is already provided with some sort of display device, it is conceivable that the display device is used to display processing result information. For example, in case where the PLC adapter is provided with a liquid crystal screen, it is conceivable that the liquid crystal screen displays success or failure in QoS setting.

Further, it is possible to display some other sort of status other than success or failure in QoS setting. For example, it is conceivable to display a reason for failure in QoS setting.

For example, depending on the state of the PLC network, even when a QoS setting request packet or a QoS setting notification packet is transmitted from the PLC adapter 60 or the PLC adapter 50, the receiving station may fail in reception due to communication errors.

In such a case, such an arrangement is conceivable as to be able to determine whether the master station has rejected the request because of lack of bandwidths although the QoS setting request packet or the QoS setting notification packet has been sent and received successfully or the transmission of the QoS setting request packet or the QoS setting notification packet has ended up in failure. As an arrangement for displaying such distinctions, it is conceivable to change the way the LED blinks or the color of light emitted by the LED, or to display an error message on the liquid crystal screen.

Although the foregoing description assumes that the PLC adapter 60 receives a QoS setting notification packet, it is also possible to carry out the same operation in case where the PLC adapter 60 receives a connection notification packet.

In case where the QoS connection request or the QoS setting request is not accepted, the PLC adapter 60 may transmit, to the STB 90 connected thereto, information indicating that the QoS connection request or the QoS setting request is not accepted, and the STB 90 may display the information on a display device (e.g., a television monitor) connected thereto.

<Regarding QoS Data Transmission>

After the data transmission request process in the STB 90, the PLC adapter 50 sequentially receives the data packets from the VoD server 130 via the router 120. As mentioned above, each of the data packets contains the IP address of the STB 90 as a destination. The router 120 carries out the routing process to search the IP address for the Ethernet address, and transmits the data packet to the PLC adapter 50 via the Ethernet. The Ethernet communication section 55b of the PLC adapter 50 receives the data packet and passes it to the bridge section 58. The bridge section 58 makes a cross-check between the bridge table and the destination Ethernet address of the data packet, adds to the data packet a PLC header containing the PLC address of the PLC adapter 60 as a destination address of the data packet, and then passes the data packet to the QoS control section 54.

Incidentally, in actually transmitting the data packet, a beacon packet transmitted from the master station contains the GLID determined at the time of the QoS setting process, the time to start granting a transmission right, and the time to stop granting the transmission right, and the beacon packet allows each slave station to find which flow is granted a transmission right.

This makes it necessary for the content-transmitting PLC adapter 50 to determine which flow each data packet belongs to and find the GLID of that flow. Therefore, the QoS control section 54 analyzes the content of the packet and derives the GLID. The GLID is normally derived based on a mutual understanding of correspondence between the flow identification information and the GLID. Such a mutual understanding is reached in advance by the exchange of some sort of packet between the PLC adapter 50 and the PLC adapter 60.

A protocol for exchange of flow identification information and GLIDs is not specified in conformity to the PLC standards, and is carried out independently on a higher-level layer than PLC. On the higher-level layer, it is known which flow uses which MAC address, IP address, and port number, and it is possible to obtain, from the QoS control section 54, the value of a GLID obtained as a result of the QoS setting process. This makes it possible to find the correspondence of the GLID with the MAC address, the IP address, and the port number.

Such a rule for deriving a GLID from flow identification information is referred to as "classify rule". If the analysis of the content of a data packet shows that the packet contains a MAC address, an IP address, and a port number described as a classify rule, it can be determined that the packet is of a GLID described in the classify rule.

The present embodiment uses bridge information instead of exchanging packets and obtaining flow identification information on a higher-level layer. The bridge information is information that is required for another use as mentioned above, and it is used also as flow identification information.

The bridge information contains the Ethernet address of the STB 90 and the PLC address of the PLC adapter 60. Further, the QoS setting notification packet contains the GLID, the PLC address of the PLC adapter 50 as a flow source, and the address of the PLC adapter 60 as a flow destination.

This makes it possible for the flow-transmitting PLC adapter 50 to derive the PLC address of the PLC adapter 60 from the Ethernet address of the STB 90 and further derives the GLID from the PLC address of the PLC adapter 60. That is, in case where the Ethernet address of the STB 90 is contained as a destination, it is possible to create a Classify rule for deriving the GLID notified by the QoS setting notification packet.

The present embodiment is arranged such that the bridge information obtained from the bridge information notification packet is also notified to the QoS type management section 52, and the QoS type management section 52 creates a Classify rule by the above method on completion of the QoS setting process and sets the Classify rule in the QoS control section 54.

In case where the PLC adapter 50 receives a data packet from the router 120 and the data packet is addressed to the STB 90, the GLID of a flow to which the packet belongs is derived according to the Classify rule.

The master station 50 sets a period of transmission for each flow; therefore, no flow other than the flow given the period of transmission can be transmitted. A packet that is not contained in a flow for QoS data transmission is basically given an equal opportunity in transmission in a period of time during which no flow is granted a transmission right by the master station 50; therefore, QoS of such a packet is not guaranteed.

In accordance with the schedule already determined, the master station transmits a beacon packet containing the GLID, the time to start granting a transmission right, and the time to stop granting the transmission right. A flow that corresponds to the GLID described in the beacon packet is granted a transmission right in a period of time indicated by the time to start granting a transmission right and the time to stop granting the transmission right. Since the beacon packet is received by all the PLC adapters, each of the PLC adapters can identify a flow currently granted a transmission right.

When the PLC adapter 50, which has already derived the GLID of a data packet according to the foregoing Classify rule, receives a beacon packet whose GLID matches, the PLC adapter 50 transmits the data packet in a period of time indicated by the time to start granting a transmission right and the time to stop granting the transmission right.

In practice, although not detailed, a data packet received from the router 120 is subjected to buffering until the time to start granting a transmission right is reached in the QoS control section 54 of the PLC adapter 50.

Since the master station and the PLC adapter that transmits a data packet are identical to each other in the present embodiment, no packet for granting of a transmission right is transmitted, and the PLC adapter 50 can find a period of time during which a transmission right is granted, without receiving a beacon packet. However, there is no change in processing.

As for the destination Ethernet address of a data packet, it is necessary to make cross-checks both at the time of bridge processing and at the time of a process of cross-checking a Classify rule, and these may be processed at a time.

<Regarding QoS Cancellation Process>

Figure 10:
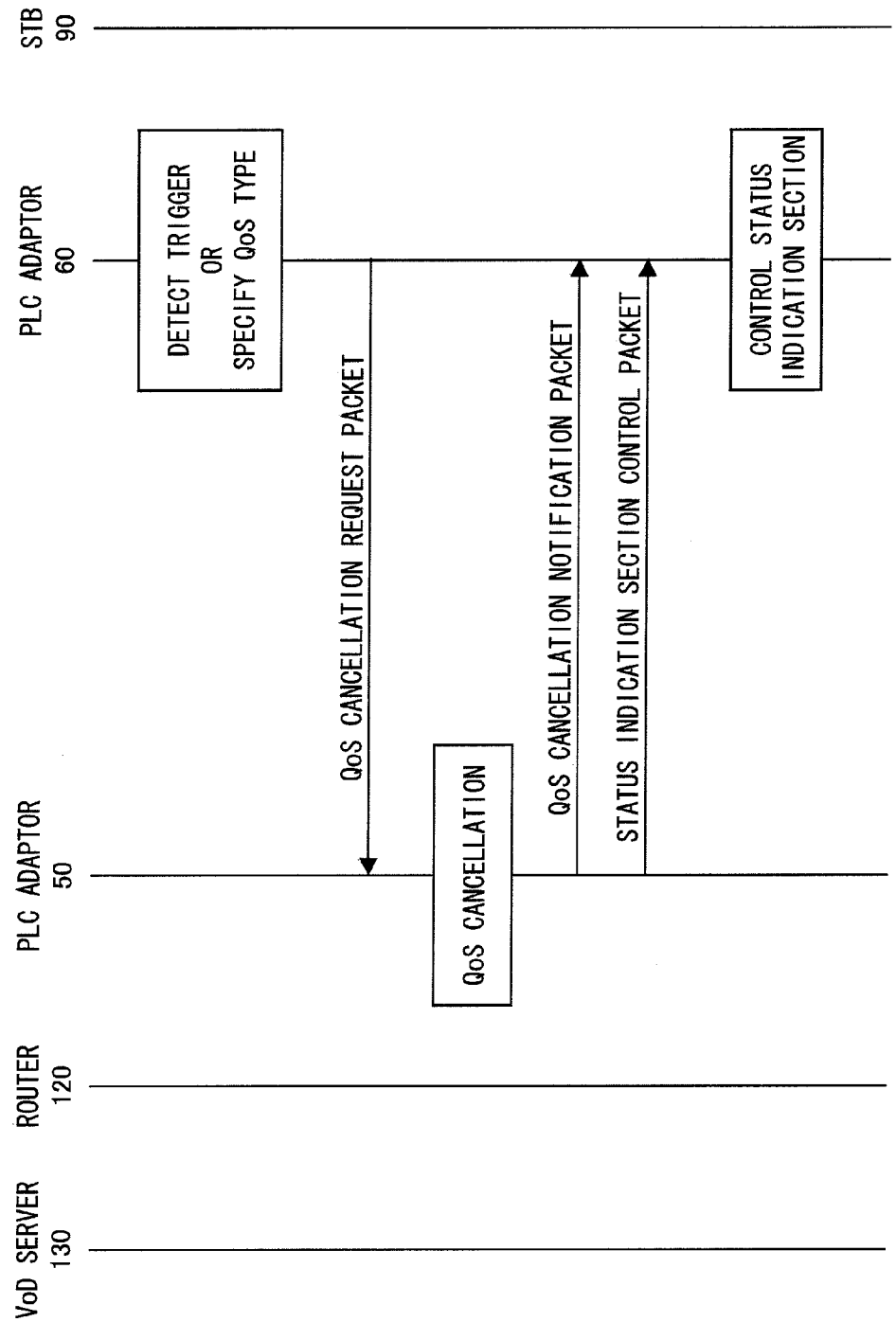
FIG. 10 is a flowchart illustrating a flow of QoS cancellation process in Embodiment 2.

A QoS cancellation process according to the present embodiment will be described with reference to FIG. 10. FIG. 10 is a flow chart showing the flow of a QoS cancellation process according to the present embodiment. A QoS cancellation process in a PLC network whose QoS is controlled by Parameterized QoS is a process of canceling the QoS setting of a receiving PLC adapter having been a target of QoS setting.

As shown in FIG. 10, in case where the trigger detection section 69 of the receiving PLC adapter 60 detects the nonnecessity of QoS setting or in case where the QoS type receiving section 61 receives an instruction to cancel the QoS setting, the QoS type management section 62 receives the information, and then transmits, via the PLC communication section 65a to the master station, i.e., the PLC adapter 50, a QoS cancellation request packet for requesting the cancellation of the QoS setting. The QoS cancellation request packet contains the address of the source, i.e., the PLC adapter 60 and the address of the destination, i.e., the PLC adapter 50.

That is, the trigger detection section 69 detects the timing (i.e., determines the timing) of a QoS cancellation process with respect to data received by the PLC adapter 60, and the QoS type management section (QoS setting control means) 62 carries out the QoS cancellation process at the timing detected by the trigger detection section 69 (i.e., the timing determined by the trigger detection section 69). Further, in case where the QoS type management section 62 obtains a QoS type indicative of the nonnecessity of QoS control, the QoS type management section 62 carries out the QoS cancellation process on data that is received by the PLC adapter 60.

Further, the QoS type management section of the transmitting or receiving PLC adapter may carry out the QoS cancellation process in accordance with timing notified from the other PLC adapter with which the transmitting or receiving PLC adapter carries out data communication. Conversely, the QoS type management section may notify the other PLC adapter via the PLC communication section of timing detected by the trigger detection section.

An example of a method by which the trigger detection section 69 detects the nonnecessity of QoS setting is to find out that the rate at which the PLC adapter 60 receives data packets becomes not more than a threshold. This will be detailed later.

Upon receiving the QoS cancellation request packet via the PLC communication section 55a, the QoS type management section 52 of the PLC adapter 50 outputs, to the QoS control section 54, a command to cancel the QoS setting for data being transmitted to the PLC adapter 60 indicated by an address contained in the QoS cancellation request packet. Furthermore, the QoS setting management section 52 transmits, via the PLC communication section 55a to the PLC adapter 60, a QoS cancellation notification packet that notifies the PLC adapter 60 of the cancellation of the QoS setting for data that is received by the PLC adapter 60.

Upon receiving the QoS cancellation notification packet, the QoS type management section 62 of the PLC adapter 60 announces the QoS cancellation to the user via the status indication section 66.

It should be noted that the QoS type management section 62 may carry out the QoS cancellation process in case where it receives, from the QoS type receiving section 61, information indicating that the QoS setting has been turned off (in the present embodiment, in case where the slide-type switch of FIG. 8 has been selected to be "OFF").

In case where data transmission is continued after the QoS setting has been turned off (i.e., after the PLC adapter is no longer a target of QoS control), the QoS type management section 62 carries out data transmission with use of a remaining transmission bandwidth other than a transmission bandwidth allocated to another PLC adapter (PLC adapter 70 or 80) that is currently a target of QoS control.

As mentioned above, in actually transmitting the data packet, a beacon packet transmitted from the master station allows each slave station to find which flow is granted a transmission right. In case where the slave station is no longer a target of QoS control, the beacon packet no longer has a bandwidth allocated to the slave station. Therefore, the transmitting station transmits data to the slave station in a period of time during which no bandwidth is allocated to another slave station.

<Regarding Processes in the PLC Adapter 70>

The following describes a procedure up to QoS transmission of SD video content to the STB 100 from the VoD server 130 via the PLC adapters 50 and 70. Among the processes in the PLC adapter 70, processes identical to those described in the PLC adapter 60 will not be described.

The PLC adapter 70 is in connection with the STB 100. A user who intends to receive SD video content via the STB 100 specifies "SD IMAGE" by the QoS type receiving section 71 of the PLC adapter 70. Specifically, such a slide-type switch as shown in FIG. 8 is set in a position indicative of "SD IMAGE". It is possible here that the status indication section 76 shows the user that a series of processes for QoS setting has been started. Specifically, an LED is blinked.

In order to obtain the Ethernet address of a device connected to the content-receiving PLC adapter 70 via the Ethernet, the content-transmitting PLC adapter 50 transmits a bridge information request packet to the PLC adapter 70.

The PLC adapter 70 replies by transmitting a bridge information notification packet containing the Ethernet address of the apparatus connected via the Ethernet communication section 75b of the PLC adapter 70. Since the PLC adapter 70 is in connection with the STB 100, the bridge information notification packet contains the Ethernet address of the STB 100.

At a given point of time after a QoS type has been set, the STB 100 determines which content data to receive. The VoD server 130 notifies the STB 100 of a list of content items stored in the VoD server 130. The STB 100 indicates the content list to the user, and the user selects a desired content item from the presented content list, for example, by operating a remote controller accompanying the STB 100.

After the content item has been selected, the STB 100 creates a data transmission request packet and transmits it to the VoD server 130. The packet contains information for identifying the content item already selected.

After receiving the data transmission request packet, the VoD server 130 starts to transmit the content item specified by the packet. The VoD server 130 converts the stored content data into packets and transmits them to the STB 100. Each of the data packets is also received by the PLC adapter 70, which stands on the path to the STB 100.

The PLC communication section 75a of the PLC adapter 70 receives the data packet and passes it to the bridge section 78. The bridge section 78 passes the data packet to the Ethernet communication section 75b so that the data packet is transferred to the Ethernet, and also notifies the trigger detection section 79 of the reception of the data packet. This notification allows the trigger detection section 79 to find that data transmission has been started, and the trigger detection section 79 recognizes the need for the QoS setting process. Accordingly, the trigger detection section 79 instructs the QoS type management section 72 to start a QoS setting process.

When instructed to start a QoS setting process, the QoS type management section 72 first carries out a QoS control information conversion process. Since the QoS type information specified by the PLC adapter 70 is "SD IMAGE", the QoS type management section 72 creates such a QoS parameter as to guarantee QoS suitable for transmission of an SD image. A conceivable bit rate for transmission of an SD image is 6 Mbps or a value obtained by adding a margin thereto. Further, as the other parameters, optimum values obtained by experiment or the like may be stored in advance.

The QoS type management section 72 creates a connection request packet containing the QoS parameter already determined in the QoS control information conversion process, and then transmits the connection request packet to the PLC adapter 50. In case where the PLC adapter 50 accepts the request for data transmission, the PLC adapter 50 creates a connection notification packet containing information indicative of the acceptance of the request, and then transmits the connection notification packet to the PLC adapter 70 in reply. This allows the QoS type management section 72 of the PLC adapter 70 to know that the request for data transmission has been accepted.

The QoS type management section 72 creates a QoS setting request packet in accordance with the same QoS parameter as that contained in the connection request packet, and then transmits the QoS setting request packet to the PLC communication section 75a. The PLC communication section 75a transmits the QoS setting request packet to the PLC adapter 50.

The PLC communication section 55a of the PLC adapter 50 receives the packet and passes it to the QoS control section 54. The QoS control section 54 determines, in accordance with the QoS parameter contained in the QoS setting request packet, whether it is possible to accept the request. Here, on the assumption that the request has been accepted, the QoS control section 54 assigns a GLID, determines the frequency, duration, and order of bandwidth allocation for the GLID, and then sets those pieces of information therein. The GLID is different from a value assigned to a flow that is received by the PLC adapter 60.

Furthermore, the QoS control section 54 creates a QoS setting notification packet containing information indicative of the acceptance of the QoS request, and then transmits the QoS setting notification packet to the PLC adapter 70. This causes the QoS type management section 72 of the PLC adapter 70 to find that the QoS request has been accepted.

The QoS type management section 72 controls the status indication section 76 so that the status indication section 76 shows the user that the request has been accepted. Specifically, the LED is turned on.

After the data transmission request process in the STB 100, the PLC adapter 50 sequentially receives the data packets from the VoD server 130 via the router 120. The Ethernet communication section 55b of the PLC adapter 50 receives each of the data packets and passes it to the bridge section 58.

The bridge section 58 makes a cross-check between the bridge table and the Ethernet address, which is contained in the data packet, of the STB 100, and then derives the PLC address of the PLC adapter 70 as a destination. The bridge section 58 adds, to the data packet, a PLC header containing the destination address, and then passes the data packet to the QoS control section 54.

In case where the data packet contains the Ethernet address of the STB 100 as a destination, the QoS type management section 52 creates a Classify rule for deriving the GLID notified by the QoS setting notification packet, and then sets the Classify rule in advance in the QoS control section 54. In case where the PLC adapter 50 receives a data packet from the router 120 and the data packet is addressed to the STB 100, the GLID of a flow to which the packet belongs is derived according to the Classify rule.

After that, QoS data transmission is carried out by transmitting the data packet in a period of time during which a flow whose GLID matches is granted a transmission right.

<Processes in the PLC Adapter 80>

The same processes are carried out in the PLC adapter 80 as those carried out in the PLC adapter 60. However, the PLC adapter 80 differs in that no QoS setting is carried out in the PLC adapter 80.

The PLC adapter 80 is in connection with the PC 110. A user who intends to receive Web content, i.e., who intends not to use the QoS function for use in reception of video content specifies "OFF" by the QoS type receiving section 81 of the PLC adapter 80. Specifically, such a slide-type switch as shown in FIG. 8 is set in a position indicative of "OFF". It is possible here that the status indication section 86 shows the user that a series of processes for QoS setting has been started. Specifically, the LED is blinked.

In order to obtain the Ethernet address of a device connected to the content-receiving PLC adapter 80 via the Ethernet, the content-transmitting PLC adapter 50 transmits a bridge information request packet to the PLC adapter 80.

The PLC adapter 80 replies by transmitting a bridge information notification packet containing the Ethernet address of the device connected via the Ethernet communication section 85b of the PLC adapter 80. Since the PLC adapter 80 is in connection with the PC 110, the bridge information notification packet contains the Ethernet address of the PC 110.

At a given point of time after a QoS type has been set, the PC 110 determines which Web content data to receive. Specifically, the user may access a specific URL by operating the PC's browser software.

After the content has been selected, the PC 110 creates a data transmission request packet and transmits it to the Web server 140. The packet contains information for identifying data to be received.

After receiving the data transmission request packet, the Web server 140 starts to transmit the content specified by the packet. The Web server 140 converts the stored content data into packets and transmits them to the PC 110. Each of the data packets is also received by the PLC adapter 80, which stands on the path to the PC 110.

The PLC communication section 85a of the PLC adapter 80 receives the data packet and passes it to the bridge section 88. The bridge section 88 passes the data packet to the Ethernet communication section 85b so that the data packet is transferred to the Ethernet, and also notifies the trigger detection section 89 of the reception of the data packet. This notification allows the trigger detection section 89 to find that data transmission has been started, and the trigger detection section 89 recognizes the need for a QoS setting process. Accordingly, the trigger detection section 89 instructs the QoS type management section 82 to start a QoS setting process.

When instructed to start a QoS setting process, the QoS type management section 82 first carries out a QoS control information conversion process. Since the QoS type information specified by the PLC adapter 80 is "OFF", it is shown that there is no need for QoS setting. Accordingly, no process is carried out as the QoS control information conversion process.

After the data transmission request process in the PC 110, the PLC adapter 50 sequentially receives the data packets from the Web server 140 via the router 120. The Ethernet communication section 55*b* of the PLC adapter 50 receives each of the data packets and passes it to the bridge section 58. The bridge section 58 makes a cross-check between the bridge table and the Ethernet address, which is contained in the data packet, of the PC 110, and then derives the PLC address of the PLC adapter 80 as a destination. The bridge section 58 adds, to the data packet, a PLC header containing the destination PLC address, and then passes the data packet to the QoS control section 54.

Since no QoS setting is carried out, the QoS setting section 54 sets no new Classify rule. Accordingly, normal data transmission is carried out by transmitting the data packet in a period of time during which none of the PLC adapters is granted a transmission right.

The setting of QoS types in the PLC adapters 60, 70, and 80 may be carried out by the same user, or may be carried out by separate users. However, it is assumed that in case where the setting of QoS types in the PLC adapters 60, 70, and 80 is carried out by separate users, the users reach an agreement in advance about the order of priority of the PLC adapters.

<Regarding Subsequent Data Transmission in Each Communication Apparatus>

Although not shown in FIG. 9, once data transmission is started, data packets are transmitted from the PLC adapter 50 to the PLC adapter 80 intermittently between other packets (e.g., the data transmission request packet, the QoS setting request packet, other date packets addressed to the PLC adapter 60 or 70).

Accordingly, after the start of transmission of data to each of the PLC adapters 60, 70, and 80, the PLC adapter 50 transmits data to the PLC adapters 60, 70, and 80 concurrently. The PLC adapter 50 makes out a schedule for bandwidth allocation for transmission of data to the PLC adapters 60, 70, and 80, and transmits packets in accordance with the schedule.

Figure 11:
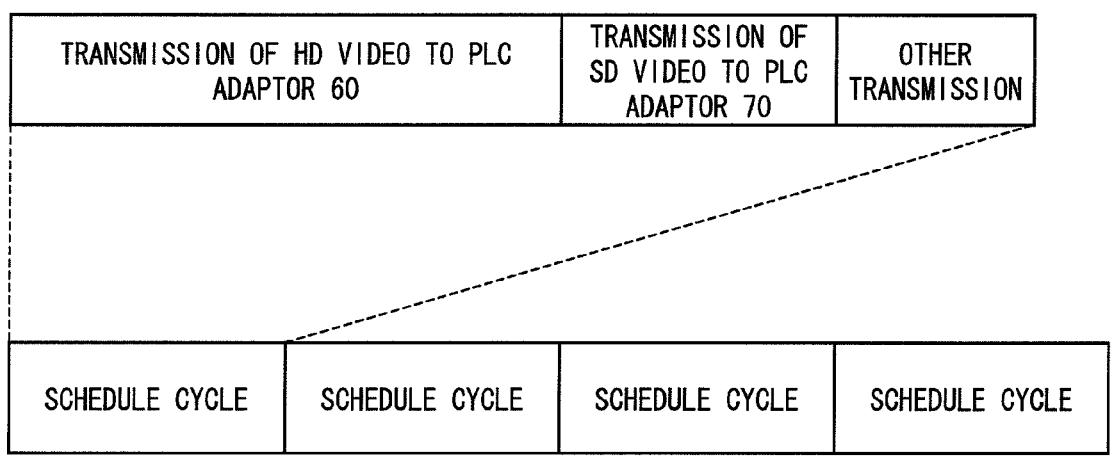
FIG. 11 is a diagram illustrating an example of a bandwidth allocation schedule in QoS of Embodiment 2.

FIG. 11 shows a specific example of the schedule. In this example, allocation is carried out by repeating a schedule cycle, which is a set of a period of time during which HD video content is transmitted to the PLC adapter 60, a period of time during which SD video content is transmitted to the PLC adapter 70, and a period of time for other transmission.

The schedule cycle and the period of transmission to be given to each PLC adapter 60, 70, or 80 are calculated and determined so that the QoS parameter required at the time of the QoS setting process can be satisfied.

Each of the PLC adapters 60 and 70 has a period of transmission provided exclusively therefor, and other PLC adapters cannot carry out transmission during the period. Therefore, a bandwidth as wide as originally scheduled can be exclusively used. That is, QoS is guaranteed.

Meanwhile, the PLC adapter 80, which carries out no QoS setting process, has no period of transmission provided therefor, and as such, the PLC adapter 80 carries out transmission in the period for "OTHER TRANSMISSION". In this period, the PLC adapters 60 and 70 as well as the PLC adapter 80 can perform communication. Therefore, QoS is not guaranteed.

Embodiment 3

Figure 13:
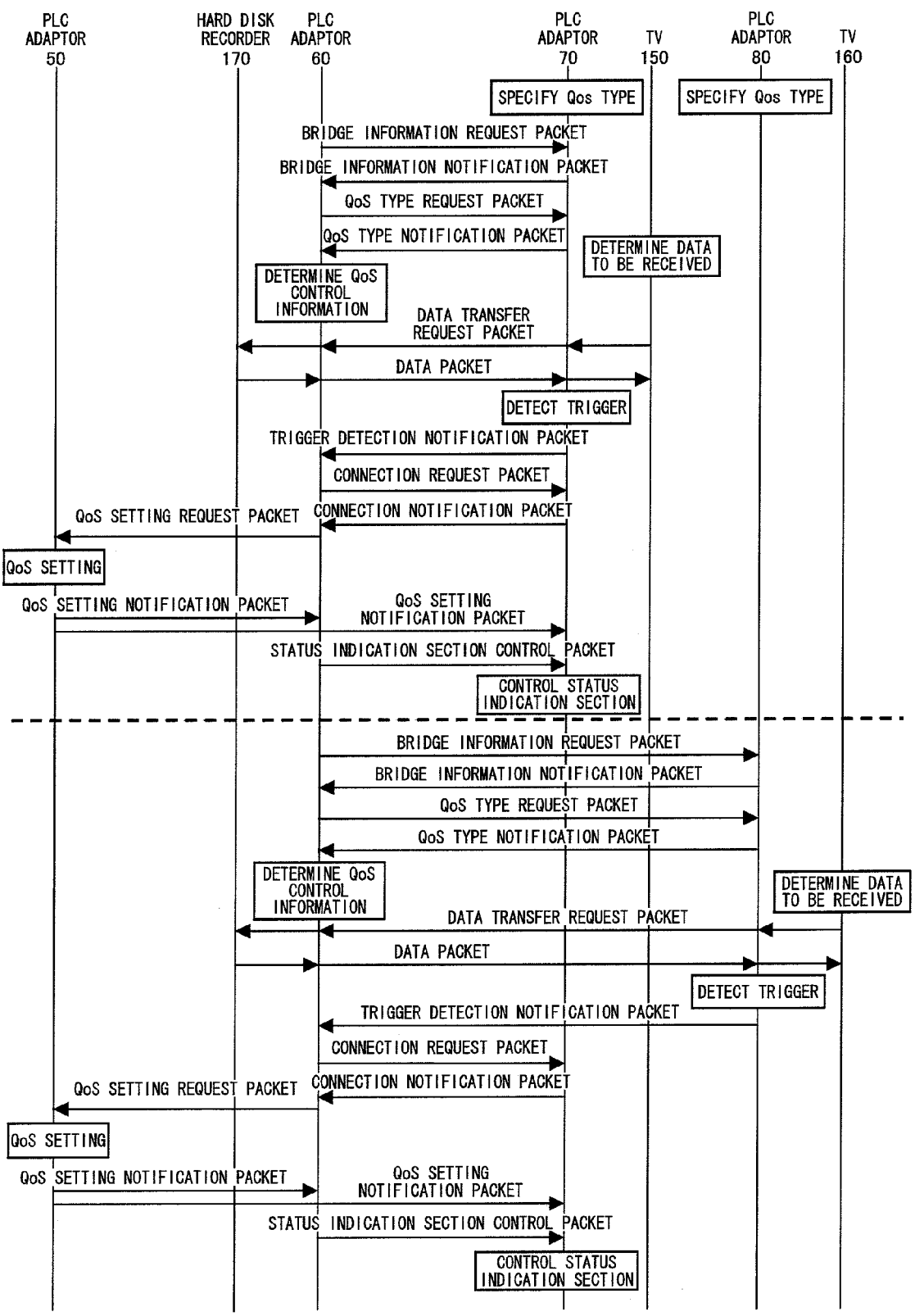
FIG. 13 is a flowchart illustrating communications among communication apparatuses in Embodiment 3.

Embodiment 3 describes a flow in which a user specifies, as QoS types, types of content items that are received by content-receiving PLC adapters respectively and the QoS of the entire network is controlled by Parameterized QoS in accordance with the specification. FIG. 13 shows an overall process flow.

<Regarding Arrangement of a Network>

Figure 12:
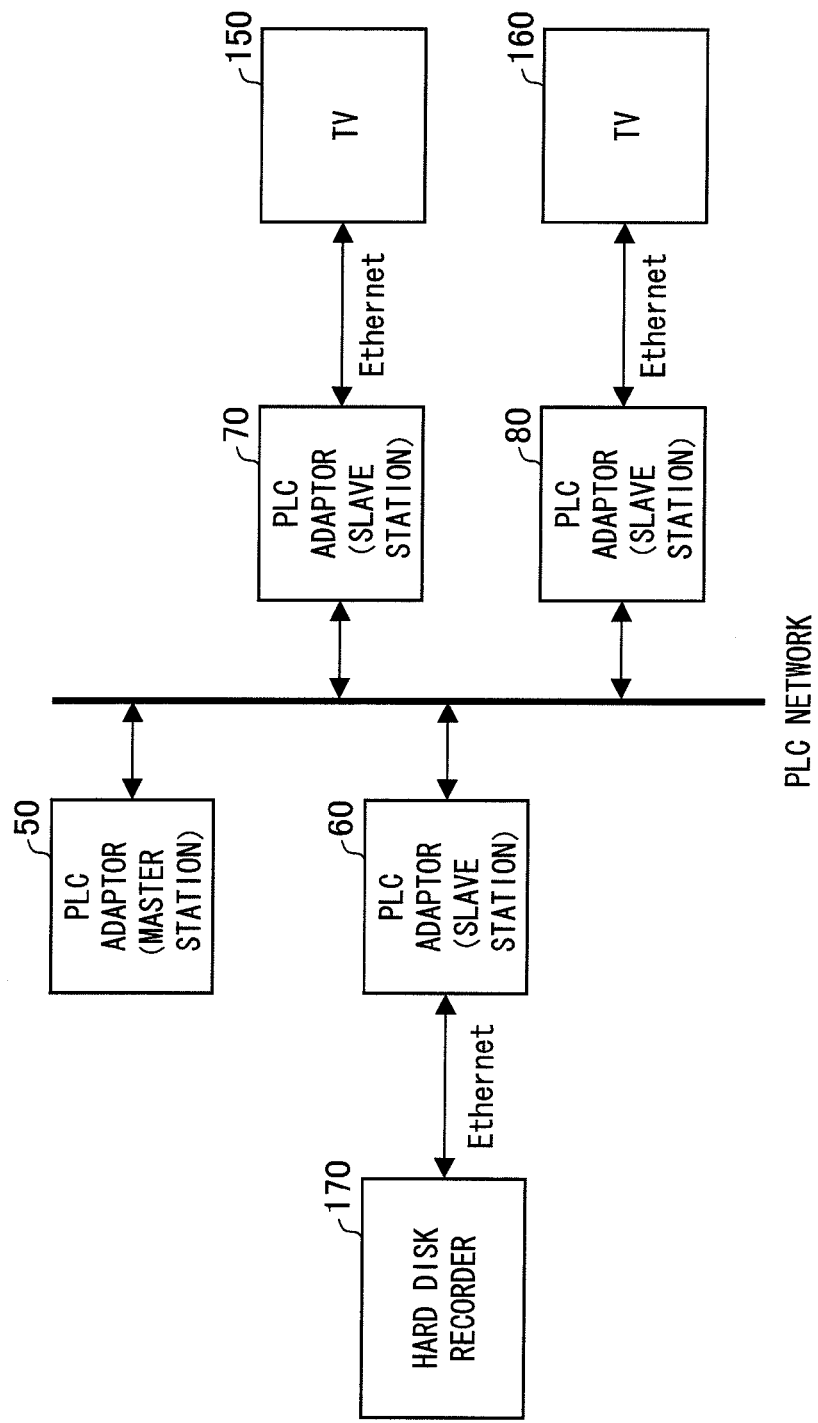
FIG. 12 is a network diagram of Embodiment 3.

FIG. 12 shows an arrangement of a network according to the present embodiment. The present embodiment differs from Embodiment 2, for example, in that a Parameterized QoS master station 50 exists separately from a content-data transmitting station 60 and content-data receiving stations 70 and 80 in the present embodiment and that a device connected to the content-transmitting PLC adapter 50 PLC is not a router 120 but a hard disk recorder 170 in the present embodiment.

The present embodiment is similar to Embodiment 2 in the basic flow of QoS control. However, whereas the content-receiving PLC adapter 60 transmits a QoS setting request packet in Embodiment 2, the content-transmitting PLC adapter 60 transmits a QoS setting request packet in the present embodiment. This is the biggest difference between Embodiment 2 and the present embodiment.

The present embodiment uses Parameterized QoS. According to Parameterized QoS, there exists one master station in a network and the station manages the entire network.

In the present embodiment, the PLC adapter 50 functions as a master station. However, the present embodiment is not limited to this. It is possible that any one of the other PLC adapters 60, 70, and 80 functions as a master station.

The hard disk recorder 170 outputs HD or SD video content data via the Ethernet in response to a request from a TV receiver 150 or 160. Conceived as the output content is content obtained by recording a radio-wave broadcast or an Internet broadcast received in advance. However, it is also conceivable that the hard disk recorder 170 is connected to the Internet and transfers streaming data received from the Internet.

In either case, the content item is outputted after being encoded into digital data such as MPEG. The output data is transmitted to the TV receiver 150 or 160 via the content-transmitting PLC adapter and the content-receiving PLC adapter. The TV receiver 150 or 160 decodes and displays the digital data. The TV receiver 150 and 160 are not intended for use in QoS data transmission, and as such, they cannot instruct the PLC adapters 80 and 70 to set QoS on the PLC network, respectively.

That is, in the present embodiment, the PLC adapters 70 and 80, which are communication apparatuses that serve as relays between the PLC network and the Ethernet, are designed to set the QoS of flows being received by the TV receivers 150 and 160, instead of the TV receivers 150 and 160, which are Ethernet terminals that cannot instruct the PLC adapters 70 and 80 to set QoS, respectively.

In the present embodiment, the TV receiver 150 receives HD video content from the hard disk recorder 170, and the TV receiver 160 receives an SD image from the hard disk recorder 170. The TV receivers 150 and 160 may be used by separate users, or may be both used by a single user.

The following describes a procedure up to QoS transmission of HD video content to the TV receiver 150 from the hard disk recorder 170.

<Regarding Arrangements of the PLC Adapters>

The PLC adapters 50, 60, 70, and 80 are arranged in the same manner as in Embodiment 2, and therefore will not be described here.

<QoS Type Receiving Process>

A user who wishes to receive HD video content via the TV receiver 15 connected to the PLC adapter 70 specifies "HD IMAGE" by the QoS type receiving section 71 of the PLC adapter 70. The QoS type receiving section 71 is arranged in the same manner as in Embodiment 2. Here, such a slide-type switch as shown in FIG. 8 is set in a position indicative of "HD IMAGE".

Further, there may be an arrangement in which the TV receiver 150 connected to the PLC adapter 70 via the Ethernet specifies a QoS type. This will be detailed later.

It should be noted here that, as in Embodiment 2, the status indication section 76 may show the user that a series of processes for QoS setting has been started.

<Bridge Information Obtaining Process>

The bridge information obtaining process is the same as that carried out in Embodiment 2.

In order to obtain the Ethernet address of the TV receiver 150 connected to the content-receiving PLC adapter 70 via the Ethernet, the content-transmitting PLC adapter 60 transmits a bridge information request packet to the PLC adapter 70.

The PLC adapter 70 replies by transmitting a bridge information notification packet containing the Ethernet address of the TV receiver 150 connected via the Ethernet communication section 75b of the PLC adapter 70. Since the PLC adapter 70 is in connection with the TV receiver 15, the bridge information notification packet contains the Ethernet address of the TV receiver 150.

<Regarding Process of Determining What Data to Receive>

The process of determining what data to receive is the same as that carried out in Embodiment 2.

At a given point of time after the QoS type has been set, the TV receiver 150 determines what data to receive. The hard disk recorder 170 notifies the TV receiver 150 of a list of content items stored in the hard disk recorder 170. The TV receiver 150 indicates the content list to the user, and the user selects a desired content item from the displayed content list, for example, by operating a remote controller accompanying the TV receiver 150.

<Regarding QoS Type Notification Process>

The QoS type notification process is a process that is not carried out in Embodiment 2.

In Embodiment 2, since it is each of the content-receiving PLC adapters 60, 70, and 80 that both receives a QoS type from a user or the like and carries out a QoS setting process, it is not necessary for each of the content-receiving PLC adapters 60, 70, and 80 to notify the PLC adapter 50 of a QoS type.

However, in the present embodiment, since it is each of the content-receiving PLC adapters 70 and 80 that receives a QoS type and it is the content-transmitting PLC adapter 60 that carries out a QoS setting process, it is necessary for each of the PLC adapters 70 and 80 to notify the PLC adapter 60 of a QoS type specified by a user or the like.

The QoS type management section 62 of the PLC adapter 60 creates a QoS type request packet addressed to the PLC adapter 70, and then transmits the QoS type request packet to the PLC communication section 65a. The PLC communication section 65a transmits the QoS type request packet to the PLC adapter 70.

Upon receiving the packet, the PLC communication section 75a of the PLC adapter 70 transmits it to the QoS type management section 72. The QoS type management section 72 obtains a QoS type received from the QoS type receiving section 71, creates a QoS type notification packet containing the QoS type, and then transmits the QoS type notification packet to the PLC communication section 75a.

That is, the QoS type management section (QoS type notification means) 72 notifies the PLC adapter 60 of a QoS type received by the QoS type receiving section 71.

As information to be contained in the QoS type notification packet, it is conceivable that a numerical value capable of uniquely identifying the setting status of the switch, i.e., the QoS type receiving section 71 is determined in advance (e.g., "0" for "OFF", "1" for "SD IMAGE", or "2" for "HD IMAGE") and contained in the packet.

The PLC communication section 75a transmits the packet to the PLC adapter 60. Upon receiving the QoS type notification packet, the PLC communication section 65a of the PLC adapter 60 transmits it to the QoS type management section 62.

Further, the QoS type notification packet may contain QoS type set information indicating what information is used as a QoS type. For example, when QoS types are classified into "OFF", "SD IMAGE", and "HD IMAGE", the QoS type set information may take on a value of "0". Alternatively, when QoS types are classified into "IMAGE", "SOUND", and "OTHER", the QoS type set information may take on a value of "1".

In case where all the communication apparatuses find correspondence between the value of the QoS type set information and its meaning in advance, e.g., in case where the QoS type notification packet contains QoS type set information of "0" and a QoS type of "1", a communication apparatus having received the QoS type notification packet can find out that the QoS type is set on "SD IMAGE" in a communication apparatus having sent the QoS type notification packet. This makes it possible that communication apparatuses using different QoS types coexist in a single network.

The timing at which the content-transmitting PLC adapter 60 transmits a QoS type request packet may be after the destination of data transmission has been determined, i.e., after the reception of a data transmission request packet.

Further, the content-transmitting PLC adapter 60 may transmit QoS type request packets to all the PLC adapters existing in the PLC network. In this case, it is conceivable, for example, that the content-transmitting PLC adapter 60 transmits QoS type request packets to all the PLC adapters at the time of detection of participation of another PLC adapter in the PLC network.

Further, it is possible that when the content-receiving PLC adapter 70 or 80 participates in the PLC network, it spontaneously transmits a QoS type notification packet to another PLC adapter. In this case, it is conceivable that QoS type notification packets are sent collectively to a plurality of PLC adapters by multicasting or broadcasting instead of being sent individually by unicasting.

<Regarding QoS Control Information Conversion Process>

The QoS control information conversion process is different from that carried out in Embodiment 2.

The QoS type management section 62 determines, in accordance with the QoS type notified from the PLC adapter 70 via the QoS type notification packet, a QoS parameter to be notified to the master station, i.e., the PLC adapter 50.

In the present embodiment, since the PLC adapter 70 notifies "HD IMAGE" as the QoS type via the QoS type notification packet, the QoS type management section 62 creates such a QoS parameter as to guarantee QoS suitable for transmission of an HD image.

As a specific method for creating a QoS parameter, it is conceivable to use a bridge table used as in Embodiment 2. The QoS parameter created here will be used later in a QoS setting process.

It should be noted that the QoS control information conversion process may be carried out in the content-receiving PLC adapter 70. In this case, the QoS type management section 72 of the PLC adapter 70 receives a QoS control information request packet from the PLC adapter 60, creates a QoS parameter in accordance with the QoS type obtained from the QoS type receiving section 71, and notifies the PLC adapter 50 of a QoS control information notification packet containing the QoS parameter. The QoS type management section 52 of the PLC adapter only needs to store therein the QoS parameter thus notified, and it is not necessary to carry out a QoS control information conversion process.

That is, the QoS type management section (QoS control information notification means) 72 may notify the PLC adapter of QoS control information.

<Regarding Data Transmission Request Process>

The data transmission request process is the same as that carried out in Embodiment 2.

The TV receiver 150 creates a data transmission request packet and transmits it to the hard disk recorder 170. The data transmission request contains information for identifying the content selected in advance.

The foregoing omits a description of a method for selecting a content item between the hard disk recorder 170 and the TV receiver 150 because such a method is irrelevant to the essence of the present invention. However, it is conceivable to use a method according to guidelines stipulated in DLNA (Digital Living Network Alliance).

<Regarding Trigger Detection Process>

The trigger detection process is the same as that carried out in Embodiment 2.

Upon receiving the data transmission request packet, the hard disk recorder 170 starts to transmit the content item specified therein. The hard disk recorder 170 converts the stored content data into packets, adds information indicative of a destination address to the packets, and then sequentially transmits the packets to the PLC adapter 60 via the Ethernet.

The Ethernet communication section 65b of the PLC adapter 60 receives the data packets and pass them to the bridge section 68. Each of these data packets is a packet for transmission of video content to be transmitted from the hard disk recorder 170 to the TV receiver 150, and as such, the data packet contains the Ethernet address of the TV receiver 150 as a destination. The bridge section 68 receives each of the data packets, makes a cross-check between the Ethernet address, contained in the received data packet, of the TV receiver 150 and the bridge table, derives the address of the PLC adapter 70 as a destination, adds to the data packet a PLC header containing the destination address, and then transmits the data packet to the QoS control section 64.

At this point of time, the data packet has not been finished with QoS setting. Therefore, the QoS control section 64 passes the data packet to the PLC communication section 65a as a normal packet, without doing anything. The PLC communication section 65a transmits the data packet to the PLC adapter 70.

<Regarding Timing of the Start of the QoS Setting Process>

The data packet received by the PLC communication section 75a of the PLC adapter 70 is transmitted to the trigger detection section 79 via the bridge section 78. This causes the trigger detection section 79 to determine that a QoS setting process is required since data transmission has been started. It is possible to use various types of method for determination as in Embodiment 2.

<Regarding Trigger Detection Notification Process>

The trigger detection notification process is a process that is not carried out in Embodiment 2.

In the present embodiment, since it is the content-transmitting PLC adapter 60 that starts a QoS setting process and it is the content-receiving PLC adapter 70 that carries out trigger detection, it is necessary for the PLC adapter 70 to notify the PLC adapter 60 of a result of the trigger detection.

In a trigger detection process, the trigger detection section 79 creates a trigger detection notification packet upon determining that a QoS setting process is required, and then transmits the trigger detection notification packet to the PLC adapter 60. The trigger detection notification packet contains the PLC address of the PLC adapter 70.

It is possible to omit transmission of a QoS type notification packet and transmits a trigger detection notification packet containing a QoS type. Since it is at the time of transmission of a QoS setting request packet that the content-transmitting PLC adapter 60 requires a QoS type, it is OK to give notification at the time of completion of a trigger detection process.

When the trigger detection notification packet created by the trigger detection section 79 is transmitted to a station with which the PLC adapter 70 carries out data communication, the QoS type management section 70 may incorporate, into the trigger detection notification packet, the flow identification information detected by the trigger detection section 79.

<Regarding QoS Setting Process>

Unlike in Embodiment 2, the content-transmitting PLC adapter 60 transmits a QoS setting request packet.

Upon receiving the trigger detection notification packet and finding that QoS setting is required, the QoS type management section 62 of the content-transmitting PLC adapter 60 first asks the PLC adapter 70, with which the PLC adapter 60 communicates, whether or not connection is possible, and then carries out a QoS setting process with respect to the master station 50. The present embodiment transmits a connection request packet to the content-receiving PLC adapter 70, and transmits a QoS setting request packet to the master station, i.e., the PLC adapter 50.

The QoS type management section 62 of the PLC adapter 60 creates a connection request packet containing the QoS parameters stored at the time of the QoS control information conversion process, and then transmits the connection request packet to the content-receiving PLC adapter 70.

The QoS type management section 72 of the PLC adapter 70 determines, from the information contained in the connection request packet, whether or not data transmission is possible. The request may not be accepted in case where data reception is impossible for such reasons as limitations imposed on a receive-buffer in the PLC adapter 70.

The QoS type management section 72 creates a connection notification packet containing information (Result Code) indicating whether or not it is possible to accept the request for data transmission, and then transmits the connection notification packet to the PLC adapter 60. The QoS type management section 62 of the PLC adapter 60 finds, from the Result Code contained in the packet, whether or not the request for data transmission has been accepted.

At this point of time, in case where the Result Code indicates rejection of the request, the QoS setting process is canceled and the status indication section 66 shows the user that the QoS request was not satisfied.

In case where the Result Code indicates acceptance of the request, the QoS type management section 62 creates a QoS setting request packet containing the same QoS parameter as that contained in the connection request packet, and then transmits the QoS setting request packet to the PLC adapter 50.

That is, the QoS type management section (QoS setting control means) 62 transmits, to the PLC adapter 50, which is a communication apparatus for carrying out QoS control on the network, a QoS setting request containing QoS control information.

The QoS control section 54 of the PLC adapter 50 determines, in accordance with the QoS parameter contained in the QoS setting request packet, whether or not it is possible to accept the request. A specific method for determination is the same as in Embodiment 2. It is assumed here that a bandwidth allocation request has been accepted.

Furthermore, the control section 54 assigns an identifier, called a GLID (Global Link ID), which uniquely identifies a flow within the PLC network, and makes out a schedule for bandwidth allocation for the GLID in accordance with the QoS parameter. A specific method is the same as in Embodiment 2. The control section 54 creates a QoS setting notification packet containing (i) information (Result Code) indicating whether or not it is possible to accept the QoS request and (ii) the GLID, and then transmits the QoS setting notification packet to both of the content-transmitting PLC adapter 60 and the content-receiving PLC adapter 70.

That is, the QoS control section (control means) 54 carries out QoS control by transmitting, to another communication apparatus, QoS control content notification for notifying the content of QoS control. The QoS type management section (QoS setting control means) 51 outputs QoS control information to the QoS control section 54, and the QoS control section 54 carries out QoS control on content data in accordance with the QoS control information.

It should be noted that it is possible to make only a QoS setting request without carrying out the process of getting connected to the content-transmitting PLC adapter 60.

It should be noted that the content-transmitting PLC adapter 60 may carry out a trigger detection process instead of the content-receiving PLC adapter 70. In that case, it is not necessary to transmit a trigger detection notification packet, and upon detecting a trigger, the PLC adapter 60 creates a QoS setting request packet in accordance with the prestored QoS parameter and transmits the QoS setting request packet to the PLC adapter 50. Also in this case, the PLC adapter 50 transmits a QoS setting notification packet to both of the PLC adapters 60 and 70.

<Regarding Case where a Single PLC Adapter Receives Data Packets from a Plurality of PLC Adapters>

The following describes a process by which a single receiving PLC adapter (receiving station) receives data packets from a plurality of transmitting PLC adapters (transmitting stations).

In this case, all the transmitting stations need to know the QoS type of the receiving PLC adapter.

In the case of an arrangement in which in case where each transmitting station transmits a QoS type request packet to the receiving station, the receiving station transmits a QoS type notification packet to the transmitting station in reply, each PLC adapter transmits QoS type request packets to all the other PLC adapters existing in the network. Upon receiving the QoS type request packets, the PLC adapters transmit QoS type information in reply. This enables the transmitting PLC adapter to find the QoS types of the receiving PLC adapters.

In the case of an arrangement in which a receiving station spontaneously transmits QoS type notification packets to transmitting stations, each PLC adapter transmits QoS type notification packets to all the other PLC adapters existing in the network. The QoS type notification packets may be transmitted periodically, or may be transmitted every time there is a change in specification of a QoS type. Further, at this time, there may be an arrangement in which the QoS type notification packets are transmitted to the transmitting stations by broadcasting. This makes it possible to notify a plurality of PLC adapters of a QoS type in a single transmission.

The transmitting PLC adapters only need to carry out the same QoS setting in accordance with the received QoS type as in case where a single transmitting station corresponds to a single receiving station.

<Regarding Process of Controlling the Status Indication Section>

In the present embodiment, it is the content-transmitting PLC adapter 60 that makes a request for QoS setting. A result of QoS setting is also notified to the receiving PLC adapter 70 by a QoS setting notification packet. However, the PLC adapter 70 cannot determine whether or not the result thus notified has been set in accordance with the QoS type specified in the PLC adapter 70.

For example, in case where the receiving PLC adapter 70 has spontaneously carried out QoS setting with respect to the PLC adapter 60 by some other sort of mechanism, the PLC adapter 70 receives a plurality of QoS setting notification packets. Therefore, the PLC adapter 70 cannot determine which of the QoS setting notification packets indicates a GLID set in accordance with the specification of a QoS type in the PLC adapter 70.

For this reason, the PLC adapter 60 controls the status indication section 76 of the PLC adapter 70 with use of a status indication section control packet.

In the flow chart of FIG. 13, the master station 50 transmits QoS setting notification packets to the content-transmitting PLC adapter 60 and the content-receiving PLC adapter 70. However, in case where the PLC adapter 50 does not accept QoS setting and the process ends up in failure, the PLC adapter 50 does not transmit a QoS setting notification packet to the PLC adapter 70.

Therefore, in preparation for such a case, the PLC adapter 60 needs to transmit a status indication section control packet to the PLC adapter 70 so that the PLC adapter 70 can present failure in QoS setting to the user.

The QoS type management section 62 of the PLC adapter 60 knows, from the QoS setting notification packet, whether or not the request for QoS setting has been accepted. The QoS type management section 62 generates control information, corresponding to the Result Code contained in the QoS setting notification packet, which serves to control the status indication section 66, generates a status indication section control packet containing the control information, and then transmits the status indication section control packet to the PLC communication section 65*a*. The PLC communication 65*a* transmits the status indication section control packet to the PLC adapter 70.

Upon receiving the status indication section control packet, the PLC communication section 75*a* of the PLC adapter 70 notifies the QoS type management section 72. The QoS type management section 72 controls the status indication section 76 so that the status indication section 76 shows the user that the request has been accepted. Specifically, the status indication section 76 is controlled in the same manner as in Embodiment 2, i.e., by defining as control information values respectively indicative of cases where the LED is turned on, where the LED is blinked, and where the LED is turned off and transmitting a status indication section control packet containing such a value.

In such a case that after the transmitting PLC adapter 60 has transmitted a status indication section control packet to cause the LED to be tuned on, the PLC adapter 60 is powered off without the LED being turned off, the LED shines steadily although no QoS data transmitting is carried out in the receiving PLC adapter 70.

In order to avoid such a situation, it is preferable that the PLC adapter 60 cause a status indication section control packet to contain information indicative of a time-out period. The time-out period refers to a limitation on a period of time during which the receiving PLC adapter 70 keeps waiting for a status indication section control packet to be received.

For example, when the time-out period is ten seconds, the QoS type management section 62 of the PLC adapter 60 transmits status indication section control packets to the PLC adapter 70 at intervals shorter than ten seconds. In case where 10 seconds has elapsed since the last status indication section control packet was received, the QoS type management section 72 of the PLC adapter 70 determines that no QoS control is being carried out on data that is received by the PLC adapter 70, and then puts the LED as the status indication section 76 in a turned-off state (i.e., a state that shows that no QoS setting is being carried out on the PLC adapter 70). Such a process makes it possible to solve the foregoing problem. In order to realize such an arrangement as described above, it is preferable that the PLC adapter 60 include a timer section for measuring the time-out period.

<Regarding Reception of Status Indication Section Control Packets in the Case of Reception of Data Packets by a Single PLC Adapter from a Plurality of PLC Adapters>

In case where the receiving PLC adapter 70 receives, from a plurality of transmitting PLC adapters, QoS transmission data based on the specification of a QoS type, the PLC adapter 70 receives a plurality of status indication section control packets. In this case, it is possible to, by managing the state of each of the transmitting PLC adapters separately, turn on the LED only in case where all the transmitting PLC adapters instruct the PLC adapter 70 to turn on the LED, blink the LED in case where even one of the transmitting PLC adapters instructs the PLC adapter 70 to blink the LED, and turn off the LED in case where all the transmitting PLC adapters instruct the PLC adapter 70 to turn off the LED.

<Regarding QoS Data Transmission>

After that, the PLC adapter 60 sequentially receives the data packets from the hard disk recorder 170 via the Ethernet. The bridge section 68 of the PLC adapter 60 relays the communication from the Ethernet to the PLC network in the same manner as in Embodiment 2.

That is, the bridge section 68 of the PLC adapter 60 makes a cross-check between the bridge table and the destination Ethernet address of each of the data packets, derives the PLC address of the PLC adapter 70 as a destination address of the packet, adds a PLC header to the data packet, and then passes the data packet to the QoS control section 64.

The present embodiment is the same as Embodiment 2 in that the present embodiment uses bridge information instead of exchanging packets and obtaining flow identification information on a higher-level layer. That is, the present embodiment makes a cross-check between the Ethernet address of the TV receiver 150 and the bridge table, derives the PLC address of the PLC adapter 70, and derives, from the PLC address of the PLC adapter 70, the GLID notified by the QoS setting notification packet.

With this, in case where the Ethernet address of the TV receiver 150 is contained as a destination, it is possible to create a Classify rule for deriving the GLID notified by the QoS setting notification packet. The Classify rule is set in advance in the QoS control section 64.

In case where the PLC adapter 60 finally receives a data packet from the hard disk recorder 170 and the data packet is addressed to the TV receiver 150, the GLID of a flow to which the packet belongs is derived according to the Classify rule.

Since the master station and the data-transmitting PLC adapter are one and the same in Embodiment 2, the content-transmitting PLC adapter 50 does not need to refer to a beacon packet. However, unlike in Embodiment 2, the master station 50 and the data-transmitting PLC adapter 60 are separate in the present embodiment. Therefore, the PLC adapter 60 transmits a data packet with reference to a beacon packet sent by the master station 50.

When the PLC adapter 60, which has already derived the GLID of a data packet according to the foregoing Classify rule, receives a beacon packet whose GLID matches, the PLC adapter 60 transmits the data packet in a period of time indicated by the time to start granting a transmission right and the time to stop granting the transmission right. In practice, the data packet is subjected to buffering until the time to start granting a transmission right is reached in the QoS control section 64 of the PLC adapter 60.

<Regarding QoS Cancellation Process>

Figure 14:
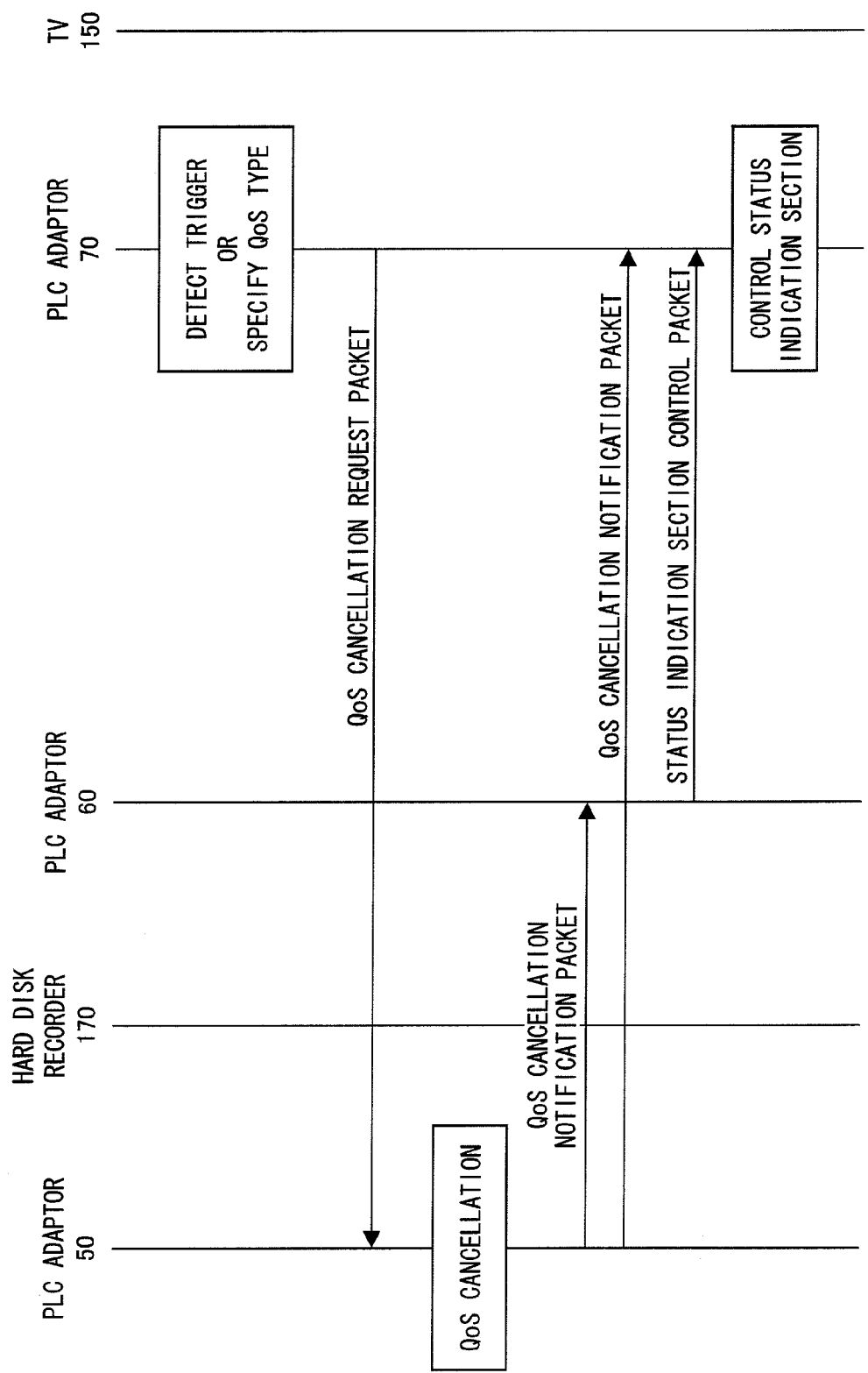
FIG. 14 is a flowchart illustrating a QoS cancellation process of Embodiment 3.

A QoS cancellation process according to the present embodiment will be described with reference to FIG. 14. FIG. 14 is a flow chart showing the flow of a QoS cancellation process according to the present embodiment.

As shown in FIG. 14, in case where the trigger detection section 79 of the receiving PLC adapter 70 detects the non-necessity of QoS setting, the QoS type management section 72 receives a result of the detection, and then transmits, via the PLC communication section 75a to the master station, i.e., the PLC adapter 50, a QoS cancellation request packet for requesting the cancellation of the QoS setting. The QoS cancellation request packet contains the address of the source, i.e., the PLC adapter 70 and the address of the destination, i.e., the PLC adapter 50.

That is, the trigger detection section 79 analyzes a history of reception of received data and thereby determines the timing of a QoS cancellation process with respect to the received data. The QoS type management section (QoS setting control means) 72 carries out a QoS cancellation process at the timing detected by the trigger detection section 79.

It is possible to carry out a QoS cancellation process in case where the QoS type inputted to the PLC adapter 70 indicates that QoS control is turned off. That is, in case where the QoS type obtained by the QoS type receiving section 71 indicates that QoS control is unnecessary, the QoS type management section 72 transmits, to the PLC adapter 50, which is a communication apparatus for carrying out QoS control on the network, a QoS cancellation request requesting the cancellation of QoS control.

An example of a method by which the trigger detection section 79 detects the nonnecessity of QoS setting is to find out that the rate at which the PLC adapter 70 receives data packets becomes not more than a threshold. This will be detailed later.

Upon receiving the QoS cancellation request packet via the PLC communication section 55a, the QoS type management section 52 of the PLC adapter 50 outputs, to the QoS control section 54, a command to cancel the QoS setting for data that is received by the PLC adapter 70 indicated by an address contained in the QoS cancellation request packet. Furthermore, the QoS setting management section 52 transmits, via the PLC communication section 55*a* to the PLC adapter 70 and the data-transmitting PLC adapter 60, a QoS cancellation notification packet that notifies the cancellation of the QoS setting for data that is received by the PLC adapter 70.

The QoS type management section 62 of the transmitting PLC adapter 60 finds, from the QoS setting notification packet, whether or not the request for QoS setting has been accepted. As in case where the QoS type management section 62 generates a status indication section control packet containing control information, corresponding to the Result Code contained in the QoS setting notification information, which serves to control the status indication section 66, the QoS type management section 62 generates a status indication section control packet containing control information, corresponding to the Result Code contained in the QoS cancellation notification packet, which serves to control the status indication section 66. Then, the QoS type management section 62 causes the status indication section control packet to contain information indicative of a time-out period, and transmits such status indication section control packets the PLC adapter 70 at intervals shorter than the time-out period.

Further, it is possible that when the receiving PLC adapter 70 has received the QoS cancellation notification packet, the QoS type management section 72 of the PLC adapter 70 announces the QoS cancellation to the user via the status indication section 76.

It should be noted that it is possible that the PLC adapter 70 transmits a trigger detection notification packet to the PLC adapter 60 and the PLC adapter 60 transmits a QoS cancellation request packet to the PLC adapter 50. Further, in case where the QoS control information conversion process is carried out in the content-receiving PLC adapter 70, the QoS type management section (QoS control information request means) 62 carries out a QoS cancellation process as follows: In case where QoS control information obtained from the PLC adapter 70 indicates the nonnecessity of QoS control with respect to data that is received by the PLC adapter 70, the QoS type management section 62 carries out a QoS cancellation process on the data. Further, in case where a QoS type received by the QoS type receiving section 71 indicates the nonnecessity of QoS control with respect to data that is received by the PLC adapter 70, the QoS type management section (QoS control information request means) 72 notifies the PLC adapter 60 of QoS control information containing the information.

Further, it is possible to carry out a QoS cancellation process in the master station, i.e., the PLC adapter 50. That is, the PLC adapter 50 has the QoS control section (control means) 54 for carrying out QoS control, and the QoS type management section 52 notifies the QoS control section 54 of the stoppage of QoS control with respect to data that is transmitted to the receiving PLC adapter. Upon receiving the notification, the QoS control section 54 stops QoS control with respect to the data.

<Regarding Processes in the PLC Adapter 80>

The same processes are carried out in the PLC adapter 80 as those carried out in the PLC adapter 70.

However, the only difference in process between the PLC adapters 70 and 80 is that "SD IMAGE" is specified in the QoS type receiving section 81 and such a QoS parameter is created in the QoS control information conversion process as to guarantee QoS suitable for transmission of an SD image, and therefore will not be detailed.

The setting of QoS types in the PLC adapters 70 and 80 may be carried out by the same user, or may be carried out by separate users. However, it is assumed that in case where the setting of QoS types in the PLC adapters 70 and 80 is carried out by separate users, the users reach an agreement in advance about what QoS setting to carry out in their respective PLC adapters.

<Supplementary Explanation Common to the Embodiments>

The following provides supplementary explanations common to the embodiments.

<Regarding Timing of QoS Cancellation>

In order to effectively utilize the transmission bandwidth of a network, it is desirable to open the bandwidth by carrying out a QoS cancellation process after completion of data transmission that requires QoS. With this QoS cancellation process, while QoS data transmission is not being carried out, a bandwidth allocated thereto is not in use and can be therefore used for another flow. This causes the entire network to improve in efficiency in the use of bandwidths.

The timing of a QoS cancellation process is determined by the reverse of the method for determination at the time of the QoS setting process. That is, it is conceivable to carry out a QoS cancellation process at a point of time where the PLC adapters 60, 70, and 80 stop receiving data.

For example, it is conceivable to carry out a QoS cancellation process at a point of time where a fixed period of time has elapsed since the PLC adapters 60, 70, and 80 stopped receiving data. However, in order not to carry out a QoS cancellation process by mistake in determining the elapse of the fixed period of time, it is necessary to consider widening the intervals of transmission of packets even in process of content data transmission, depending on schedules for bandwidth allocation in the PLC network.

Therefore, it is desirable to make a determination with use of a comparatively long period of time, e.g., a period of time of approximately one minute.

Further, as with the time of QoS setting, it is conceivable to carry out a QoS cancellation process in case where a packet highly likely to be real-time data, e.g., a UDP packet or the like, has not been received for a fixed period of time.

<Regarding Case where there is a Change in QoS Type During Data Transmission>

In case where there is a change in QoS type while QoS data transmission is in execution after completion of a QoS setting process, it is only necessary to repeat the same process as at the first time of QoS setting.

In this case, for a flow already subjected QoS setting, a master station subjected to a QoS setting process does not obtain a new bandwidth by the QoS setting process but transmits information meaning a change in bandwidth already obtained. Therefore, the master station changes, in accordance with a newly-requested QoS parameter, a bandwidth that has originally been reserved.

In the case of a request for a wider bandwidth after the change than before the change, i.e., in the case of a request for bandwidth spreading, the bandwidth may not be spread, because the bandwidth has already been allocated to another flow.

In such a case, the status indication section 56, 66, 76, and 86 show the user that the QoS request has not been satisfied, the user can consider restoring the QoS type.

Further, there is a possibility that when the original bandwidth is opened in such a case, the originally reserved bandwidth is obtained for transmission of another flow. In that case, the obtained bandwidth is not restored even if the user restores the QoS type. In order to avoid such a situation, it is desirable that the originally reserved bandwidth should not be opened even if there is a request for a change in bandwidth.

Further, on the assumption that the user operates the switch by mistake, it is conceivable to carry out a QoS setting process after a fixed period of time has elapsed since a flick of the switch. It is conceivable that in case where the user changes the switch by mistake, the user immediately returns the switch to its former state.

Depending on the mounting of a master station, the performance of a QoS setting process may cause a temporary opening of a bandwidth, or may cause stagnation in data transmission due a delay in internal processing. In such a case, there occurs a disarrangement in image or sound. Therefore, it is desirable not to carry out a QoS setting process wastefully.

If set to carry out a QoS setting process after a fixed period of time has elapsed since a flick of the switch and set not to carry out a QoS setting process when the switch is flicked and then moved back to its former setting, no QoS setting process is carried out when the user flicks the switch by mistake and moves the switch back to its former state immediately thereafter. This makes it possible to avoid stagnation in data transmission.

That is, only in case where a predetermined period of time has elapsed since the last time a QoS type was received and where a QoS type different from a QoS type specified the last time a QoS type was received is specified may the QoS type receiving section receive the QoS type.

In a period of time between a change in setting of the switch and the start of QoS setting, the status indication sections 56, 66, 76, and 86 may be put in states different from states in which the status indication sections 56, 66, 76, and 86 are put during normal QoS data transmission. Specifically, it is conceivable to change the color of light that an LED emits. With this, in case where the user flicks the switch unintentionally, the LED emits light whose color is different from the color of light that the LED normally emits. This makes it easy to recognize that there has been a change in setting of the switch. The user, who has recognized that there has been an unintentional change in setting of the switch, is highly likely to carry out an operation of moving the switch back to its former state. This makes it possible to avoid the foregoing problem.

As in a period of time during which a series of processes for QoS setting is carried out, it is possible to use the color of light of an LED emits, a number, or a progress bar to show how soon the process begins.

The aforementioned arrangement in which to carry out a QoS setting process after a fixed period of time has elapsed since a flick of the switch may be applied to a case where a bandwidth has been changed, a case where a bandwidth has been opened, or Embodiment 1 (i.e., a case where prioritized control is carried out). In case where the arrangement is applied to Embodiment 1, such an effect is obtained that the occurrence of unnecessary traffic is inhibited.

The term "fixed period of time since a flick of the switch" refers to a period of time required for the user to notice a mistake and move the switch back to its former state, e.g., 2 to 5 seconds. The fixed period of time is not particularly limited, and only needs to be appropriately set.

Further, it is preferable that a flick of the switch be announced to the user. For example, when the QoS type receiving section 61 receives a QoS type, the QoS type management section 62 may notify the user of the reception of the QoS type or of the received QoS type via the status indication section 66. Alternatively, the QoS type management section 62 may transmit, via the Ethernet communication section 65b to the STB 90, reception information indicating that the QoS type receiving section 61 has received a QoS type or the received QoS type, and the STB 90 may display the reception information or the QoS type on a display device connected thereto.

That is, the QoS type management section 62 announces the reception of the QoS type to the user via an announcing device (announcing means) communicably connected to the PLC adapter 60. Examples of the announcing device include a display device (not shown) or loudspeaker (not shown) of the PLC adapter 60 and a television monitor connected to the STB 90.

Such announcement of a QoS type may be made every time the QoS type receiving section 61 receives a QoS type, or may be made only in case where the QoS type (second QoS type) received by the QoS type receiving section 61 is different from the QoS type (first QoS type) previously received.

As described above, when the QoS type receiving section 61 receives a QoS type, the QoS type management section 62 announces the reception of the QoS type to the user via the announcing device communicably connected to the PLC adapter 60.

<Regarding Modified Examples of Ethernet Devices that are Connected to the PLC Adapters>

Ethernet devices that are connected to PLC adapters serving as slave stations may be telephones, picture recorders, image-reproducing devices, and devices for receiving pay services (e.g., STBs). Further, it is possible that: the names of these Ethernet devices are displayed as switch options for selecting one of a number of QoS types, and in case where one of those QoS types is selected, priority and a QoS parameter suitable for data that is received by the corresponding Ethernet device are used in a QoS setting process. Provision of such a display makes it possible to easily set a QoS type favorable to an Ethernet device that a user uses.

<Regarding Case where there are a Plurality of Content-Transmitting PLC Adapters>

Embodiments 2 and 3 have described cases where the PLC adapter 50 exists as one and only content-transmitting PLC adapter. However, the present invention can also be applied in case where there exist a plurality of content-transmitting PLC adapters. The PLC adapter 50, which serves as a master station, manages bandwidths for the entire PLC network, and also manages bandwidths for flows that are not transmitted from the PLC adapter 50. In case where the master station allocates a bandwidth to a PLC adapter other than itself, the master station transmits beacon packets to all the slave stations. Each of the beacon packets contains a GLID. This makes it possible to find a flow to which a bandwidth is currently allocated. Therefore, even in case where a plurality of PLC adapters are transmitting content, it is not necessary to carry out a special process.

<Regarding Case where a Content-Receiving PLC Adapter Receives a Plurality of Flows>

Embodiments 2 and 3 assume that each of the content-receiving PLC adapters 60, 70, and 80 has an Ethernet side to which only one device is connected and via which only one flow is transmitted.

However, each of the PLC adapters 60, 70, and 80 receives a plurality of flows in case where a single device connected to the Ethernet side receives a plurality of flows simultaneously or in case where a plurality of devices connected to the Ethernet side receive different flows.

In Embodiments 2 and 3, a flow is identified by a Classify rule created from bridge information. In case where a content-receiving PLC adapter is in connection with a plurality of devices via the Ethernet, the Ethernet addresses of all those devices are contained in the bridge information.

Therefore, according to the final Classify rule, packets addressed to the Ethernet addresses of all the devices connected to the content-receiving PLC adapter are sorted into an identical GLID. That is, a single flow is assigned to all the devices connected to the content-receiving PLC adapter. Therefore, a single QoS type receiving section is enough.

Unlike in Embodiment 2 or 3, in the case of an exchange of flow identification information on a higher-level layer, it is possible to identify flows from information such as IP addresses and port numbers. Therefore, even in case where a single PLC adapter is receiving a plurality of flows, analysis of the packets makes it possible to sort out the flows. That is, it is possible to sort out flows for each device connected to a PLC adapter and perform QoS setting on each of the flows. In case where a flow unfinished with QoS setting is discovered in the flows thus sorted out, the corresponding trigger detection section 69, 79, or 89 makes such a determination as to start QoS setting for that flow. This makes it possible to carry out QoS setting on all flows being received.

In this case, it is conceivable that each PLC adapter is provided with a single QoS type receiving section 61, 71, or 81 and a QoS parameter corresponding to a QoS type specified thereby are applied to all flows.

It is also conceivable that a plurality of QoS type receiving sections 61, 71, or 81 are provided and different QoS parameters are used to carry out QoS setting. In such a case, it is necessary to select targets of application of QoS types specified by the QoS type receiving sections 61, 71, and 81.

For example, in case where a single PLC adapter is provided with three QoS type receiving sections 61, 71, and 81 and four flows are being received, it is necessary to select three of the four flows. In such a case, it is conceivable to select target flows in the order of start of reception from first to last. It is also conceivable to arrange the PLC adapter such that a user can select target flows and to target only selected flows. It is also conceivable to target only flows specified by a device connected to an Ethernet side of the PLC adapter. It is also conceivable to target only flows having predetermined flow identification information.

Further, it is conceivable to provide each of the PLC adapters 60, 70, and 80 with a plurality of Ethernet connection terminals so that a user can distinguish between a QoS communication terminal and a normal communication terminal, and to carry out QoS setting only on a flow for a device connected to the QoS communication terminal.

However, a state in which a plurality of devices are connected to the QoS communication terminal via an Ethernet hub is the same as a state in which a plurality of devices are connected to the QoS communication terminal. Therefore, it is conceivable to let users know through a manual or the like that not more than one device can be connected to the QoS communication terminal.

<Regarding Case where there Exists a PLC Adapter to which the Present Invention has not been Applied>

If a PLC adapter to which the present invention has not been applied exists within the network and the PLC adapter transmits and receives content data, no QoS setting request packets are transmitted for flows that are transmitted and received by such a PLC adapter, and no QoS setting is carried out in the master station, i.e., the PLC adapter 50, either.

Therefore, data packets transmitted from the content-transmitting PLC adapter to a PLC adapter to which the present invention has not been applied are out of accordance with a Classify rule and are not assigned GLIDs. As such, the data packets are transmitted as normal data.

As previously noted, each of the packets may contain information, such as a ToS (Type of Service) field in the case of an IPv4 header or a user priority field within a VLAN tag in the case of an Ethernet header, which indicates the transmission priority of the packet. In that case, it is conceivable that for a PLC adapter to which the present invention has not been applied or a PLC adapter in which "OFF" is specified as a QoS type, the content-transmitting PLC adapter carries out priority control in accordance with these pieces of information indicative of priorities.

However, these packets containing transmission priorities can be transmitted only in a remaining bandwidth other than a bandwidth reserved by a QoS setting process. Therefore, the number of packets that can be transmitted varies depending on the width of a bandwidth reserved by a QoS setting process. The term "transmission priorities" here means relative transmission priorities within a remaining bandwidth other than a bandwidth in which QoS is guaranteed.

<Regarding Another Technique of Parameterized QoS>

Embodiments 2 and 3 have described, as a method for Parameterized QoS, a technique in which a master station grants a transmission right (such a technique being called "HCCA method" according to IEEE802.11e, which is a standard for wireless LAN). However, another method may be used.

For example, IEEE802.11c stipulates a method called EDCA with Admission Control. According to this method, each slave station wishing for QoS data transmission transmits QoS parameters to a master station. The master station accepts the request if the master station judges that the required QoS can be guaranteed, or rejects the request if the master station judges that the required QoS cannot be guaranteed.

In case where the request has been accepted, the slave station having made the request for QoS is notified of a period of time during which transmission is permitted (Medium Time). Each slave station is equally granted a transmission right. However, every time the slave station transmits a packet, the amount of time spent on the transmitting is subtracted from Medium Time, and the slave station becomes incapable of transmission at a point of time where Medium Time becomes 0. As a result, the more Medium time a slave station is given, the wider bandwidth the slave station is assigned.

Also in case where this method is used, there is no difference in QoS setting request packet to be transmitted to the master station. Therefore, the present invention can be directly applied.

<Regarding Case of Prioritized QoS>

Embodiments 2 and 3 have described a method for realizing QoS by Parameterized QoS. However, QoS may be realized with use of Prioritized QoS.

Specifically, it is conceivable to change the transmission priorities of packets in accordance with QoS types specified by the QoS type receiving sections 61, 71, and 81.

For example, a QoS setting request packet is used to notify the content-transmitting PLC adapter 50 of QoS types set in the content-receiving PLC adapters 60, 70, and 80 and flow identification information, and the PLC adapter converts, into the transmission priorities of the packets, QoS type information notified by the QoS setting request packet. The conversion may be based on a conversion table created and saved in advance.

Upon receiving data packets from the router 120, the content-transmitting PLC adapter 50 makes a cross-check between flow identification information obtained by analyzing each of the data packets and flow identification information notified from the content-receiving PLC adapters 60, 70, and 80. In case where there is correspondence in flow identification information, the data packet are transmitted in accordance with the transmission priorities notified from the content-receiving PLC adapters 60, 70, and 80.

Such a method makes it possible to change the transmission priorities of packets in accordance with QoS types received by the QoS type receiving sections 61, 71, and 81.

<Regarding Another Example Arrangement of a QoS Type Receiving Section>

Embodiments 2 and 3 have described each of the QoS type receiving sections 61, 71, and 81 as a three-staged slide-type switch. However, the QoS type receiving sections 61, 71, and 81 may be arranged differently.

The number of switchable stages may be any number. However, an excessive increase in the number of selectable stages undesirably makes it difficult for a user to understand.

It is desirable that the selective state of the switch be able to be checked with a user's eyes, so that the user can easily understand the setting status. However, this is not a must. For example, it is possible to provide only one push switch that changes QoS type information cyclically every time the switch is pushed. For example, it is conceivable that every time the push switch is pushed, QoS type information is changed in the order from "HD IMAGE" to "SD IMAGE", from "SD IMAGE" to "OFF", from "OFF" to "HD IMAGE", and so on.

In case where the QoS of a reserved transmission bandwidth is not sufficient for the bit rate of content to be transmitted, a content-receiving PLC adapter suffers from a disarrangement in image as a result. In such a case, the user only needs to repeatedly attempt a change in priority setting by operating the switch and complete the operation of the switch at a point of time where the playback state of the content is improved most.

Further, it is possible to provide a display device separately from the switch and display the state of the switch on the display device. For example, it is conceivable to display the state of the switch on a liquid crystal screen. The display device may also be used for displaying another state in the PLC adapter. For example, it is conceivable that every time the push switch is pushed, the display device is changed from displaying one QoS type to displaying another.

<Regarding Other Examples of QoS Types>

QoS types can be classified into categories other than those mentioned above. For example, QoS types may be classified according to the type of data to be received, e.g., into "IMAGE", "SOUND", and "OTHER".

Once the type of data is determined for example as an image or a sound, it is possible to some extent to predict a QoS parameter. Accordingly, it is only necessary to store parameters such as the frequency, duration, and order of bandwidth allocation as a table or the like in each of the content-receiving PLC adapters 60, 70, and 80 and specify the parameters by a QoS setting request packet. As specific values, optimum values may be calculated in advance by experiment or the like.

Further, QoS types may be classified according to the type of device that is connected to an Ethernet side of the PLC adapter 60, 70, or 80, e.g., into "TV", "TELEPHONE", and "OTHER". This classification is identical in internal processing to the classification of QoS types into "IMAGE", "SOUND", and "OTHER". However, from the viewpoint of a user who configures the settings, the method for specifying what device is connected is easier to understand.

Further, QoS types may be classified according to the display-screen size of a device (e.g., a TV) that is connected to an Ethernet side of the PLC adapter 60, 70, or 80, e.g., into "20 INCHES", "37 INCHES", and "45 INCHES". The larger a device is in display-screen size, the more likely the device is to transmit an image at a high bit rate. Therefore, it is conceivable to reserve a wider bandwidth for the device.

Further, QoS types may be classified according to the display resolution of a device (e.g., a TV) that is connected to an Ethernet side of the PLC adapter 60, 70, or 80, e.g., into "1920×1080 (full HDTV)", "1366×768 (HDTV)" and "640×480 (non HDTV)". The higher a device is in display resolution, the more likely the device is to transmit an image at a high bit rate. Therefore, it is conceivable to reserve a wider bandwidth for the device.

Further, QoS types may be classified according to the bit rate of content to be received via the PLC adapter 60, 70, or 80, e.g., into "6 Mbps", "12 Mbps", and "24 Mbps". The most important value of the QoS parameters is a bit rate. As for the other parameters, the quality of transmission is not affected most of the time even if there are discrepancies between the parameters and the characteristics of data to be actually transmitted. Therefore, a certain level of QoS can be guaranteed even by a method for changing from one bit rate to another by a switch with the other values fixed.

Further, QoS types may be classified according to whether content to be received via the PLC adapter 60, 70, or 80 is paid or free, e.g., into "PAY CONTENT" and "FREE CONTENT".

Content to be enjoyed as VoD service is classified into pay content and free content. Examples of pay content include the latest movies; examples of free content include news programs and programs containing commercials.

In such a case, it is conceivable that a user specifies, by a switch provided in the PLC adapter 60, 70, or 80, whether content to be received from now is pay or free. In case where the user specifies "PAY CONTENT", QoS is guaranteed so that the content is transmitted with high quality. In case where the user specifies "FREE CONTENT", the content is normally transmitted without guaranteeing QoS.

In such a case that usage fees vary depending on the bit rates of content, QoS may be specified according to the price of content with use of the classification of QoS types into "EXPENSIVE CONTENT", "INEXPENSIVE CONTENT", and "FREE CONTENT", instead of the simple classification of QoS types into "PAID CONTENT" and "FREE CONTENT".

Further, it is possible that the user flicks the switch in a two-staged manner with use of the classification of QoS types into "QoS is required" and "QoS is not required" so as to specify information indicating whether or not the corresponding PLC adapter requires QoS.

It is conceivable that QoS is guaranteed in case where "QoS is required" is specified and QoS is not guaranteed in case where "QoS is not required" is specified.

In setting "QoS is required" and "QoS is not required", the user may judge, from the above conditions (i.e., the type of data to be received and the type of device that is connected) in a comprehensive manner, whether or not QoS is required for receiving data by a device that is connected to the PLC adapter.

It is possible to use a combination of the above classifications of QoS types. For example, it is conceivable to designate a combination of "IMAGE" and "24 Mpbs" or a combination of "SOUND" and "6 Mbps".

In this case, it is possible to provide a plurality of switches so that a plurality of QoS types can be specified (to provide two three-staged switches), or to provide a single switch capable of designating more complex QoS types (to provide one nine-staged switch).

Further, it is possible to use a combination of a switch for specifying whether or not QoS is required and a switch for designating QoS types.

For example, it is conceivable to combine a switch for switching between "QoS is required" and "QoS is not required" and a switch for switching between "SD IMAGE" and "HD IMAGE". In this case, it is supposed that the user basically operates only the switch for switching between "QoS is required" and "QoS is not required". It is conceivable to change QoS type settings only in the case of need for detailed settings.

To a light user who wishes for simple use even at the cost of the capability of changing the setting of "SD IMAGE" or "HD IMAGE", a simple operation for specifying only whether or not QoS is required can be provided. To a heavy user who wishes for more detailed settings, a detailed method of operation can be provided.

Further, for example, when a switch for specifying whether or not QoS is required is installed on the front surface of a PLC adapter and a switch for designating a QoS type is installed on the rear surface, such a situation can be avoided where a light user unintentionally changes QoS type settings to devastate an problem-free operating environment.

Further, QoS types may be classified according to the extent to which content to be received via the PLC adapter 60, 70, or 80 is allowed to be delayed, e.g., into "PERMISSIBLE DELAY: SMALL", "PERMISSIBLE DELAY: MEDIUM", and "PERMISSIBLE DELAY: LARGE". It is conceivable that content with a smaller permissible delay is subjected to QoS setting with use of such a QoS parameter that a transmission right is granted more frequently.

Further, QoS types may be classified according to how much error is tolerated by content to be received via the PLC adapter 60, 70, or 80, e.g., into "PERMISSIBLE ERROR: SMALL", "PERMISSIBLE ERROR: MEDIUM", and "PERMISSIBLE ERROR: LARGE". It is conceivable that content with a lower permissible error rate is subjected to QoS setting by designating such a QoS parameter that the error rate is lowered with more chances of retransmission.

Further, QoS types may be classified according to how much jitter is tolerated by content to be received via the PLC adapter 60, 70, or 80, e.g., into "PERMISSIBLE JITTER: SMALL", "PERMISSIBLE JITTER: MEDIUM", and "PERMISSIBLE JITTER: LARGE". Jitter is a fluctuation in transmission delay. It is conceivable that content with low permissible jitter is subjected to QoS setting by specifying such a QoS parameter that chances of retransmission are given at as even time intervals as possible.

<Another Method for Specifying a QoS Type>

Each of the aforementioned classifications of QoS types may be specified directly by a user, or may be specified by a device connected to an Ethernet side of the PLC adapter 60, 70, or 80.

Currently, most of the devices that are connected to the Ethernet side are not mounted in preparation for QoS data transmission. However, it is conceivable in the future that these devices will be highly functionalized to be able to determine a QoS type according to the type of data to be received by the devices. In that case, it is conceivable that a QoS type is specified by these devices' giving some sort of instruction to the PLC adapters 60, 70, and 80, instead of a user's designating a QoS type by a switch.

For example, it is conceivable that a device connected to the PLC adapter 60, 70, or 80 gives instructions with use of communication by Ethernet. On the assumption of such a case, each of the PLC adapter 60, 70, and 80 may be mounted so as to be able to receive both the specification of a QoS type by a switch and the specification of a QoS type by a device connected to the Ethernet side.

Further, each of the PLC adapter 60, 70, and 80 may be arranged so as to receive either of the specification of a QoS type by a device connected to the Ethernet side and the specification of a QoS type by a switch. In this case, a user may determine which of the settings is enabled, or a receiving method to be enabled may be predetermined.

There may be an arrangement in which a device connected to the Ethernet side carries out such control as to be able to invalidate a QoS type specified by a user.

<Regarding Arrangement in which a Plurality of Devices are Connected to the a PLC Adapter Via a Hub>

Figure 15:
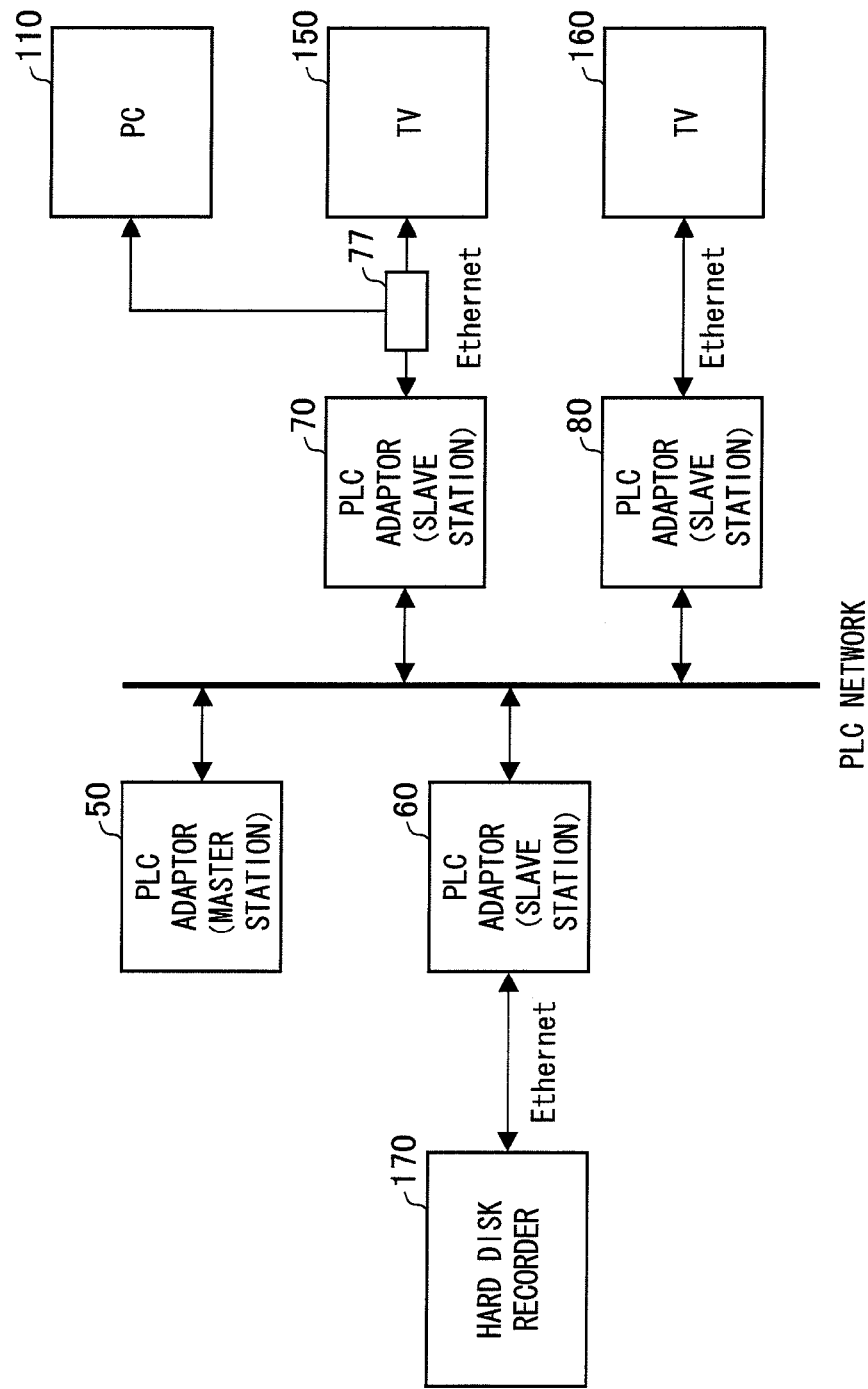
FIG. 15 is a network diagram illustrating an arrangement in which a plurality of apparatuses are connected to PLC adaptors via hubs.

A plurality of Ethernet devices (e.g., STBs and PCs) may be connected to the content-receiving PLC adapter 70 or 80 via an Ethernet hub. The following describes the content of processing in such a topology. The following describes a case where the PLC adapter 70 is in connection with the TV receiver 150 and the PC 110 via a hub 77 as shown in FIG. 15. Such a topology may be applied to Embodiment 2.

In order to obtain the respective Ethernet addresses of the TV receiver 150 and the PC 110 each connected to the content-receiving PLC adapter 70, the content-transmitting PLC adapter 60 transmits a bridge information request packet to the PLC adapter 70.

The bridge section 78 of the PLC adapter 70 creates a bridge information notification packet containing the Ethernet addresses of all the devices connected thereto (i.e., the respective addresses of the TV receiver 150 and the PC 110), and then transmits the bridge information notification packet to the PLC adapter 60 via the PLC communication section 65*a*.

The bridge section 68 of the PLC adapter 60 associates the address of the PLC adapter 70 with the respective addresses of the TV receiver 150 and the PC 110, and then saves the associated addresses on a bridge table stored in a storage section (not shown) available to the bridge section 68.

In the case of reception of data packets, the trigger detection section 79 of the PLC adapter 70 carries out a trigger detection process, for each of the addresses of the Ethernet devices connected to the PLC adapter 70, of saving the number of data packets or the frequency of reception of data packets on a storage section (not shown) available to the trigger detection section 79.

Upon finding out that the number of data packets or the frequency of reception of data packets has reached not less than a threshold, the trigger detection section 79 instructs the QoS type management section 72 to start a QoS setting process. The QoS type management section 72 generates a connection request packet and transmits it to the PLC adapter 60 via the PLC communication section 75*a*.

The QoS type management section 62 of the PLC adapter 60 creates a QoS setting request packet containing the same QoS parameter as that contained in the connection request packet, and then transmits the QoS setting request packet to the PLC adapter 50.

Upon receiving the QoS setting request packet, the QoS control section 54 of the PLC adapter 50 assigns a GLID to the flow and makes out a schedule for bandwidth allocation for the GLID in accordance with the QoS parameter. The QoS control section 54 generates a QoS setting notification packet containing (i) information (Result Code) indicating whether or not it is possible to accept the QoS request and (ii) the GLID, and then transmits the QoS setting notification packet to both of the PLC adapter 60 (transmitting station) and the PLC adapter 70 (receiving station). The QoS setting notification packet also contains the address of the PLC adapter 70.

Upon receiving the QoS setting notification packet, the bridge section 68 of the PLC adapter 60 searches the bridge table for the address, which is contained in the QoS setting notification packet, of the PLC adapter 70, and then obtains the addresses of all the Ethernet devices connected to the PLC adapter 70. The bridge section 68 outputs the obtained addresses to the QoS type management section 62.

The QoS type management section 62 creates a Classify rule (correspondence table) by associating these addresses with the GLID contained in the QoS setting notification packet, and then outputs the created Classify rule to the QoS control section 64.

When the PLC adapter 60 receives a data packet from the hard disk recorder 170 and the QoS control section 64 then finds out by the Classify rule that a plurality of Ethernet addresses have been registered for the PLC adapter 70, the QoS control section 64 determines whether or not all the registered addresses match the destination address of the received data packet. If so, the QoS control section 64 determines that the GLID registered in the Classify rule is the GLID of the data packet.

In accordance with the schedule for bandwidth allocation, the PLC adapter 50 transmits, to each of the PLC adapters 60, 70, and 80, a beacon packet containing the GLID, the time to start grating a transmission right, and the time to stop granting the transmission right.

Having derived the GLID of the data packet according to the foregoing Classify rule, the QoS control section 64 of the PLC adapter 60 receives the beacon packet, and then transmits the data packet to the PLC adapter 70 via the communication section 65a in a period of time indicated by the time to start granting a transmission right and the time to stop granting the transmission right, each of the times corresponding to the GLID.

<Regarding Case where a Transmitting PLC Adapter Carries Out Trigger Detection>

It is possible that a transmitting PLC adapter carries out trigger detection. That is, the PLC adapter 50 carries out trigger detection in Embodiment 2, and the PLC adapter 60 carries out trigger detection in Embodiment 3.

At the time of reception of packets from the Ethernet side (i.e., the router 120 or the hard disk recorder 170), the bridge section of the transmitting PLC adapter specifies the address of a destination PLC adapter with reference to a bridge table regardless of the existence of trigger detection. In so doing, the trigger detection section enables trigger detection by saving the number of packets or the frequency of reception of packets on a storage section for each destination PLC adapter. There is no change in trigger detection method from a receiving PLC adapter.

<Regarding Modified Examples of the Status Indication Sections>

The status indication sections 56, 66, 76, and 86, each of which indicates the status of QoS, may be used also as indication sections for presenting other information. This arrangement makes it possible to reduce the number of LEDs that are mounted as status indication sections. Examples of the other information include the status of power, the status of a link between communication terminals, the speed of communication between communication terminals, information indicating whether the corresponding PLC adapter is a master station or a slave station.

Further, each of the status indication sections 56, 66, 76, and 86 may present the user with a QoS setting status derived from results of a QoS setting process and a QoS cancellation process. For example, the corresponding QoS type management section may control the status indication section so that an LED serving as the status indication section is turned on upon the setting of QoS and turned off upon the cancellation of QoS. In case where the status of a QoS setting process is notified from a station with which to carry out data communication, the QoS type management section controls the status indication section in accordance with the status of a QoS setting process in the station with which to carry out data communication and from which the status has been notified. In other words, the status indication section makes a presentation based on the status of a QoS setting process in the station with which to carry out data communication and from which the status has been notified. Conversely, the QoS type management section of a PLC adapter that notifies the status of a QoS setting process to a station with which to carry out data communication notifies, via the corresponding PLC communication section to a station with which to carry out data communication, a QoS setting status derived from results of a QoS setting process and a QoS cancellation process.

<Regarding Modified Examples of QoS Types>

QoS types may be classified according to the resolution of the TV 150. For example, QoS types may be classified according to the number of scanning lines (1080, 750, 525), may be classified into interlaced and progressive formats, or may be classified according to a combination of the classifications. An increase in the number of scanning lines causes an increase in the level of QoS. The level of preferred QoS is higher in the progressive format than in the interlaced format.

<Regarding how to Present the Time of Completion of QoS Setting>

In case of changing colors of emitted light of an LED stepwise to show the user how long will it take to complete QoS setting, it is possible to change colors stepwise in the order from red to yellow and from yellow to green, or to gradually narrow intervals at which the LED blinks.

Further, the time it will take to complete QoS setting may be displayed on a television monitor connected to the STB. In this case, it is possible to display the remaining time, or to display a progress bar or the like.

In order to realize such an arrangement, it is only necessary that the Ethernet communication section 75b of the PLC adapter 70 output, to the STB 100, time information indicative of the time it will take to complete QoS setting and the STB 100 superimpose the time information onto an image and transmit the image to a television connected thereto.

<Regarding Example Arrangement of a QoS Type Receiving Section>

In case where a QoS type receiving section is a push switch, it is possible to provide a multicolor LED near the QoS type receiving section and indicate a QoS type setting status by a color of emitted light. For example, in Embodiment 1, it is possible to indicate "HIGH PRIORITY", "MEDIUM PRIORITY", and "LOW PRIORITY" by green, orange, and red respectively. Further, in Embodiments 2 and 3, it is possible to indicate "HD IMAGE", "SD IMAGE", and "OFF" by green, orange, and red respectively. Further, the push switch may emit light.

QoS types to be inputted may be changed by changing the length of time during which the push switch continues to be pushed. For example, a greater length of time during which the push switch continues to be pushed means a higher priority or a wider bandwidth. For example, there may be an arrangement in which a duration of pressing of not more than 1 second, a duration of pressing of not less than 5 seconds to less than 10 seconds, and a duration of pressing of not less than 10 second mean low priority, medium priority, and high priority respectively.

Further, a push switch serving as a QoS type receiving section may be used as a switch for inputting other operating instructions. For example, it is possible that an instruction requesting a "pairing operation" is inputted in case where the duration of pressing of the push switch is less than 1 second and an instruction for designating a QoS type is inputted in case where the duration of pressing of the push switch is not less than 1 second. The term "pairing operation" means the default settings in which PLC adapters are recognized as a single network.

Further, it is possible to display a QoS type setting status with the same arrangement as in case where the time it will take to complete QoS setting is displayed on a television monitor connected to the STB.

<Regarding Modified Example Concerning a Trigger Detection Process>

A trigger detection section may be arranged such that a user can change conditions for trigger detection, e.g., so that a user can change the number of packets to be received, the frequency of reception, a threshold bit rate, the frequency of packet analyses, or a protocol for trigger detection. The conditions may be changed in either of the following manners: (1) After a computer is connected to a PLC adapter so that the settings can be directly changed with use of dedicated utility software or after the function of an HTTP server is built in the PLC adapter so that the settings of the PLC adapter can be changed via a setting screen (described in HTML or the like) provided by the HTTP server, the conditions are changed by accessing the setting screen via a Web browser from a PLC adapter connected to the PLC adapter; and (2) The PLC adapter is provided with an input section for changing the conditions.

<Regarding QoS Switch>

A device connected to an Ethernet side (i.e., an Ethernet device connected to a PLC adapter, e.g., STBs and PCs in Embodiment 2 and TVs in Embodiment 3) may be provided with a QoS switch so that the Ethernet device transmits its setting status to the PLC adapter and then carries out the subsequent QoS setting process.

<Regarding Specification of a QoS Type at the Time of Transmission in Each Embodiment>

Embodiments 1 to 3 have described a method for designating a QoS type for a communication apparatus (PLC adapter) to receive data. However, it is possible to make it possible to specify a QoS type for a communication apparatus (PLC adapter) to transmit data.

In case where a single communication apparatus (PLC adapter) both transmits and receives data, there may be provided a QoS type receiving section for transmission and a QoS type receiving section for reception, or there may be provided a single QoS type receiving section arranged so as to be able to receive both a QoS type for transmission and a QoS type for reception.

Further, in case where QoS types have been specified for both the transmitting and receiving sides, such QoS setting may be carried out as to designate the average of the QoS types as a QoS type. It is also conceivable to refer to one of the QoS types for the transmitting and receiving sides while ignoring the setting of the other QoS type.

If such a policy is not well known to users, there will be operational problems. Therefore, such a policy may be written in a manual.

Embodiments 2 and 3 may be arranged such that no QoS type receiving sections 51, 61, 71, and 81 are provided and QoS setting is carried out with use of predetermined QoS types and predetermined QoS parameters. In this case, each of the PLC adapters 50, 60, 70, and 80 automatically carries out QoS setting without a user's inputting information. Therefore, it becomes possible to carry out data transmission with QoS guaranteed for a flow that is received by an Ethernet terminal, such as the STB 90, the STB 100, the PC 110, the TV receiver 150, or the TV receiver 160, which cannot give instructions for QoS setting.

Further, a QoS switch serving as a QoS type receiving section may be arranged so as to be able to select one of the setting for guaranteeing a transmission bandwidth (Parameterized QoS), the setting for carrying out priority control (Prioritized QoS), and the setting in which no QoS setting is carried out. That is, the QoS type receiving section may selectively receive, as a QoS type, the priority of data reception of the corresponding PLC adapter with respect to a PLC adapter other than a PLC adapter under the same QoS control and information indicative of the bit rate (transmission bandwidth) of data to be sent to the corresponding PLC adapter. A process that is carried out in case where such an arrangement has been realized will be described below with reference to a case (corresponding to Embodiment 2) where a receiving PLC adapter transmits a QoS setting request packet and a QoS cancellation packet. It is obvious that the same applies to a case (corresponding to Embodiment 3) where a transmitting PLC adapter transmits a QoS setting request packet and a QoS cancellation packet. Therefore, such a case will not be described.

<Change from Bandwidth Assurance to Priority Control>

In case where a QoS switch has been changed from bandwidth assurance to priority control, a QoS type management section of the receiving PLC adapter transmits, to a transmitting PLC adapter, a QoS setting request packet that requests a change to priority control. However, since there is a possibility of failure in changing to priority control, the QoS type management section does not immediately transmits, to the PLC adapter serving as a master station, a QoS cancellation request packet that requests the cancellation of a transmission bandwidth reserved up to then. A QoS setting notification packet received as a response to the QoS setting request packet shows whether or not a change to priority control has been made successfully.

In the case of success in changing to priority control, the QoS type management section of the receiving PLC adapter transmits the QoS cancellation request packet to the PLC adapter serving as a master station. This leads to the cancellation of the reserved bandwidth.

Further, the QoS type management section of the receiving PLC adapter announces the success in QoS setting to the user via a status indication section.

On the other hand, in the case of failure in changing to priority control, the QoS type management section of the receiving PLC adapter does not transmit a QoS cancellation request packet to the PLC adapter serving as a master station (i.e., does not cancel the data transmission bandwidth) and continues to receive data with the bandwidth guaranteed. In this case, the QoS type management section of the receiving PLC adapter announces the failure in QoS setting to the user via the status indication section. Further, it is possible to announce to the user that although the QoS type is set on priority control, the data is being transmitted with the bandwidth guaranteed.

<Regarding Change from Priority Control to Bandwidth Assurance>

In case where the QoS switch has been changed from priority control to bandwidth assurance, the QoS type management section of the receiving PLC adapter transmits, to the PLC adapter serving as a master station, a QoS setting request packet that requests a change to bandwidth assurance.

A QoS setting notification packet received as a response to the QoS setting request packet shows whether or not a change to bandwidth assurance has been made successfully.

In the case of success in changing to bandwidth assurance, the QoS type management section of the receiving PLC adapter transmits the QoS cancellation request packet to the transmitting PLC adapter. With this, the priority to be given to data packets is changed back to the default.

Further, the QoS type management section of the receiving PLC adapter announces the success in QoS setting to the user via a status indication section.

On the other hand, in the case of failure in changing to priority control, the QoS type management section of the receiving PLC adapter does not transmit a QoS cancellation request packet to the transmitting PLC adapter (i.e., does not set off the priority) and continues to receive data with the priority controlled. In this case, the QoS type management section of the receiving PLC adapter announces the failure in QoS setting to the user via the status indication section. Further, it is possible to announce to the user that although the QoS type is set on bandwidth assurance, the data is being transmitted with the priority controlled.

Embodiment 4

The present embodiment describes a topology in which a receiving PLC adapter 300 is provided with a plurality of output ports to which Ethernet devices are connected and a plurality of Ethernet devices are connected to the PLC adapter 300. Those processes which have been described above in Embodiments 1 to 3 will not be described at all or will only be described briefly. Further, the present embodiment mainly describes an example of a case where QoS control is carried out by Parameterized QoS (bandwidth assurance). However, as will be mentioned later, Prioritized QoS (priority control) may be applied to the present embodiment.

<Regarding Arrangement of a Communication Network 400>

Figure 16:
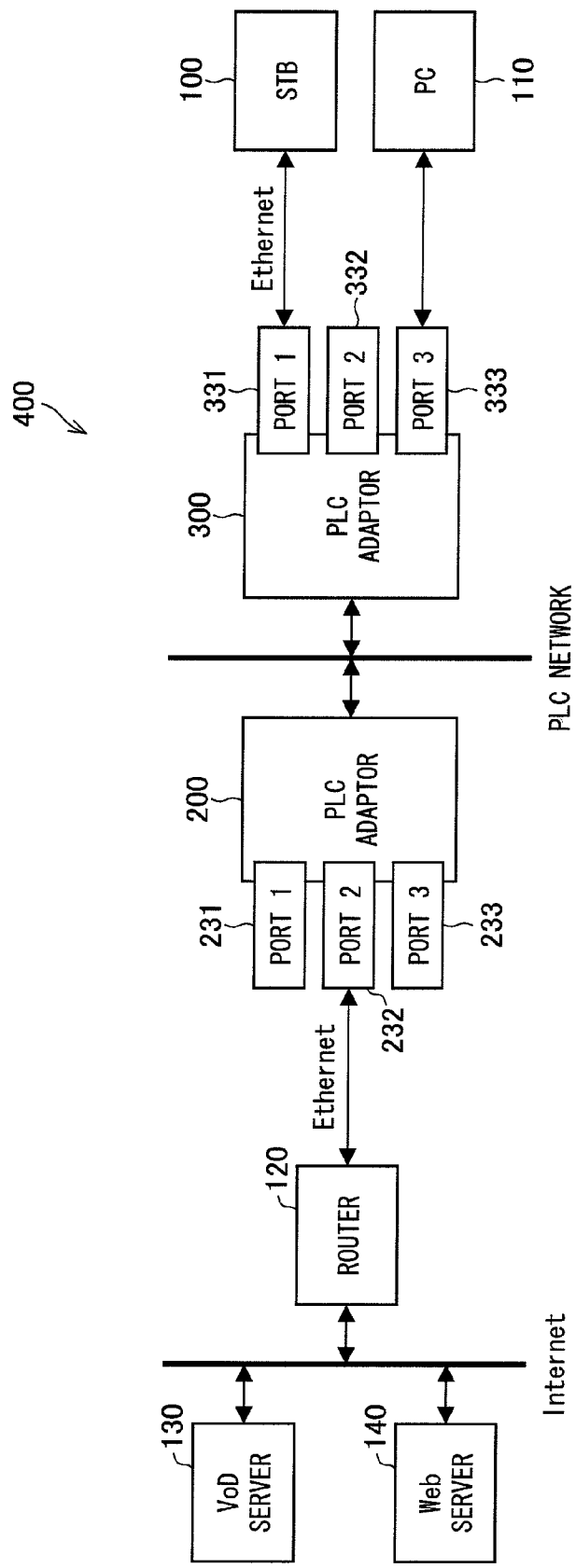
FIG. 16 is a diagram illustrating an arrangement of a communication network of Embodiment 4.

FIG. 16 shows an arrangement of a communication network 400 according to the present embodiment. As shown in FIG. 16, the communication network 400 has a topology similar to that of the communication network of Embodiment 2 shown in FIG. 6. However, unlike in Embodiment 2, the PLC network has a PLC adapter 200 connected thereto instead of the PLC adapter 50. As with the PLC adapter 50 of Embodiment 2, the PLC adapter 200 is a data-transmitting communication apparatus that functions as a master station. Although not shown because of irrelevance to the essence of the present invention, the STB 100 is in connection with a TV connected thereto.

The PLC adapter 300 is in connection with the PLC network to serve as a receiving communication apparatus for receiving data from the PLC adapter 200. A PLC adapter other than the PLC adapter 300 may be connected to the PLC network to serve as a receiving communication apparatus; however, such a PLC adapter is not shown.

The PLC adapter 300 includes three input-output ports (namely a first port 331, a second port 332, and a third port 333). Connected to the first port 331 is the STB 100, and connected to the third port 333 is the PC 110.

That is, the PLC adapter 300 is a communication apparatus that receives data packets from the PLC network and transmits them to an Ethernet device connected thereto, and includes a plurality of input-output ports (output ports) via which the data are outputted to the Ethernet device.

The PLC adapter 200 also includes three input-output ports (namely a first port 231, a second port 232, and a third port 233). Connected to the second port 232 is the router 120. However, the PLC adapter 200 does not necessarily need to be provided with three input-output ports, and the PLC adapter 200 only needs to include at least one input-output port.

<Regarding Arrangement of the PLC Adapter 300>

Figure 17:
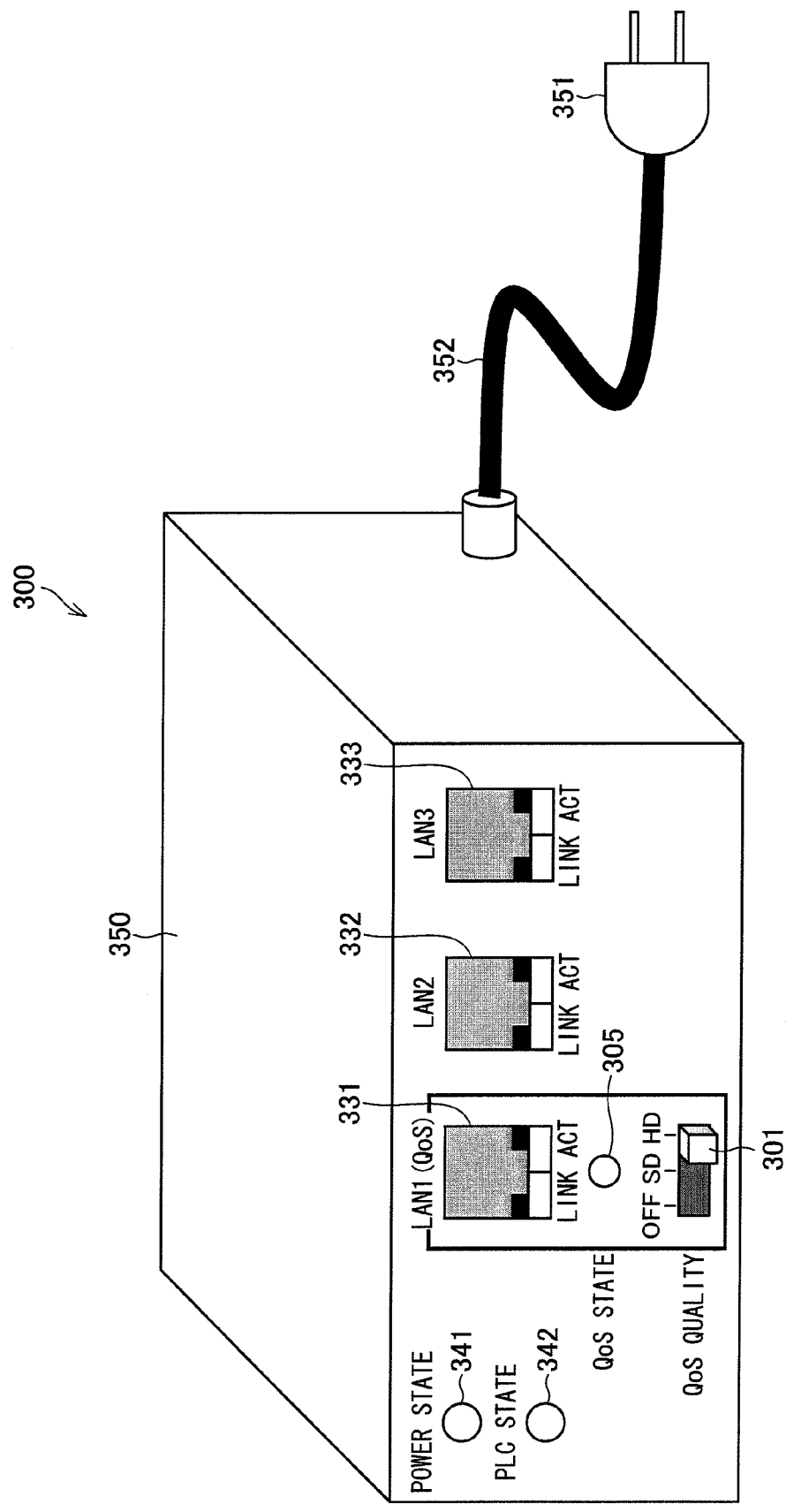
FIG. 17 is an oblique perspective view illustrating appearance of a PLC adaptor of Embodiment 4.

FIG. 17 is a perspective view of the appearance of the PLC adapter 300. As shown in FIG. 17, the PLC adapter 300 includes a housing 350, an electric plug 351, and a power cord 352. The PLC adapter 300 can be connected to the PLC network by inserting the electric plug 351 into an outlet.

Further, the PLC adapter 300 includes a power status indication section 341 that shows the power status of the PLC adapter 300, a PLC status indication section 342 that shows the status of connection to the PLC network, a QoS status indication section 305 that shows the status of QoS control, and a QoS type specifying section (QoS type specifying means) 301 serving as a slide-type switch for a user to input a QoS type.

As with the status indication sections 55, 66, 76, and 86, the QoS status indication section 305 is constituted by an LED. The QoS status indication section 305 is identical in lighting operation to the status indication sections 55, 66, 76, and 86. For example, the QoS status indication section 305 glows green when QoS control is satisfied, glows yellow when QoS control is not satisfied, and glows red when QoS control is off.

The QoS type specifying section 301 is identical to the QoS type receiving sections 51, 61, 71, and 81 of FIG. 8. That is, the QoS type specifying section 301 serves for the user to designate QoS type information indicative of a type of QoS control. Further, the QoS types, namely "HD (High Definition) IMAGE" and "SD (Standard Definition) IMAGE", which are inputted by operating the QoS type specifying section 301, are identical to those mentioned above.

Provided near the QoS type specifying section 301 shown in FIG. 17 are indicators "HD", "SD", and "OFF" that serve as QoS type indication means for presenting QoS types to the user. A QoS type specified by the user may be presented by changing the way the LED glows or the color of light that the LED emits.

Among the three outputs ports of the PLC adapter 300, only the first port 331 serves as a target of QoS control (QoS control target input-output port). No QoS control is carried out on data that is sent to an Ethernet devices, if any, connected to the second or third port 332 or 333. That is, it is determined in advance which of the plurality of input-output ports of the PLC adapter 300 serves as a QoS control target input-output port (QoS target output port).

It should be noted that the number of QoS control target input-output ports is not limited to 1. There may be provided a plurality of QoS control target input-output ports. Similarly, the number of input-output ports of the PLC adapter 300 is not limited to 3, either, and may be 2, 4, or more.

Figure 18:
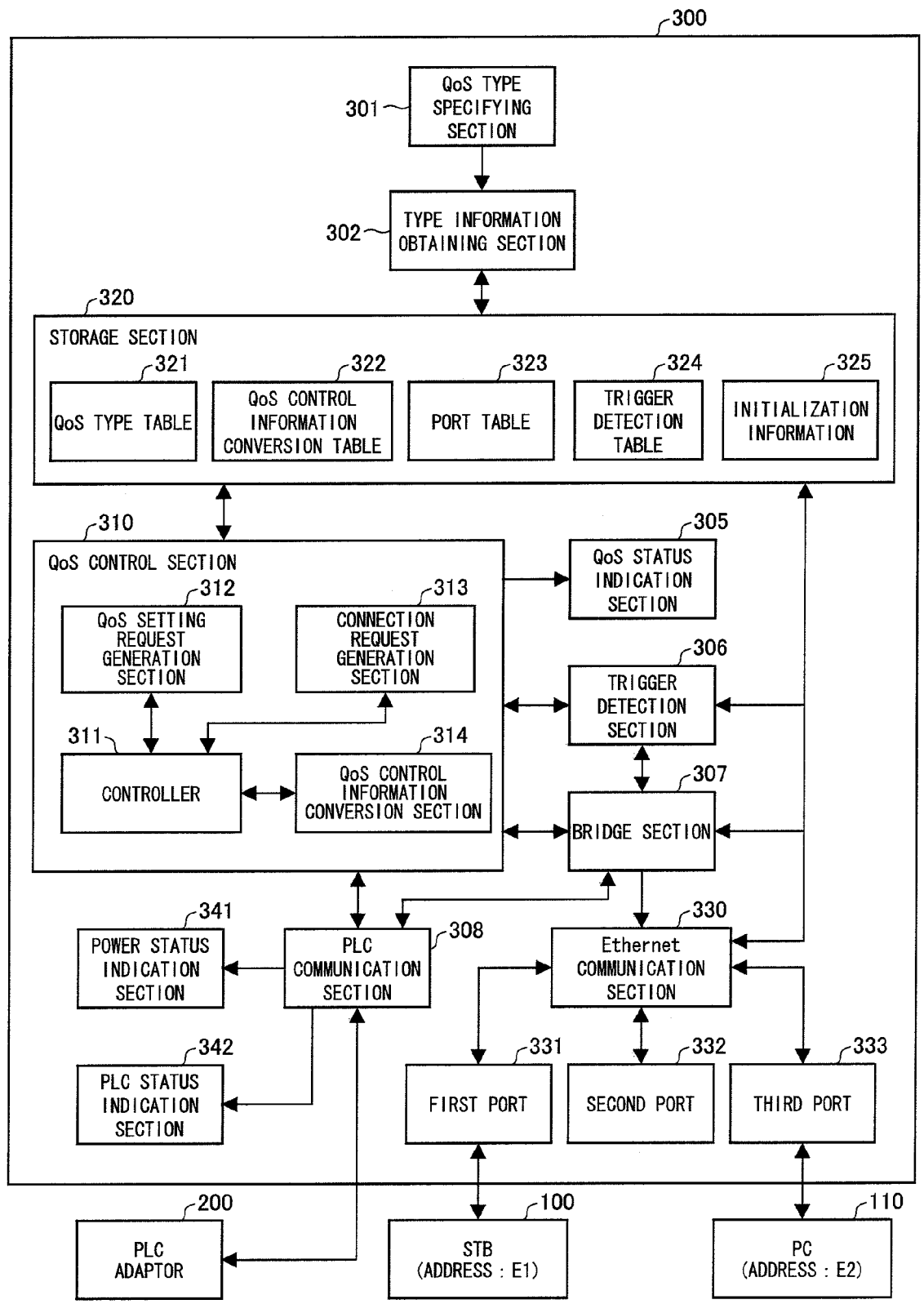
FIG. 18 is a functional block diagram illustrating an arrangement of a receiving-side PLC adaptor of Embodiment 4.

FIG. 18 is a functional block diagram showing an arrangement of the PLC adapter 300. As shown in FIG. 18, the PLC adapter 300 includes a type information obtaining section 302, a storage section (QoS type storage means) 320, a QoS control section 310, a trigger detection section 306, a bridge section 307, a PLC communication section (transmitting means) 308, and an Ethernet communication section 330 in addition to the aforementioned components.

The storage section 320 has a QoS type table 321, a QoS control information conversion table 322, a port table 323, and a trigger detection table 324 stored therein. The storage section 320 also has initialization information 325 stored therein. The initialization information 325 indicates which of the input-output ports serves as a QoS control target input-output port.

The type information obtaining section 302 obtains a QoS type inputted by the user via the QoS type specifying section 301 and records the QoS type on the QoS type table 321, on which to record a QoS type. The type information obtaining section 302 stores the QoS type table 321, on which the QoS type has been recorded, in the storage section 320. That is, in the storage section 320, QoS type information indicative of a type of QoS control is stored.

FIG. 19 shows an example of the QoS type table 321. As shown in FIG. 19, the QoS type table 321 is a table that shows correspondence between an input-output port and a QoS type of QoS control targeted at data that is outputted from the input-output port. In the present embodiment, since only the first port 133 is an input-output port serving as a target of QoS control, a QoS type ("HD" in the example shown in FIG. 19) of QoS control targeted at data that is outputted from the first port 331 is recorded on the QoS type table 321.

The QoS control section 310 includes a controller 311, a QoS setting request generation section (QoS setting request generating means) 312 for generating a QoS setting request packet, a connection request packet generation section 313 for generating a connection request packet, and a QoS control information conversion section 314.

The QoS control information conversion section 314 converts, into a QoS parameter (QoS control information) that is used when the PLC adapter 200 carries out QoS control, a QoS type shown on the QoS type table 321. The QoS control information conversion section 314 carries out such conversion with reference to the QoS control information conversion table 322.

FIG. 20 shows an example of the QoS control information conversion table 322. As shown in FIG. 20, the QoS control information conversion table 322 is a table that shows correspondence between QoS types and QoS parameters. In the example shown in FIG. 20, the QoS types "SD" and "HD" are associated with bandwidths to be reserved for QoS control (required bandwidths), respectively. It should be noted that QoS parameters other than the required bandwidths may be put on the QoS control information conversion table 322. Conceivable examples of QoS parameters include permissible transmission delays, permissible fluctuations in transmission delay, and plural values such as the average, minimum, maximum values of the sizes of packets to be transmitted.

The controller 311 controls each functional block of the QoS control section 310.

The trigger detection section 306 uses the trigger detection table 324 to determine the need for QoS control corresponding to data that is outputted from the first port 331. Processing in the trigger detection section 306 will be detailed later.

The PLC communication section 308 is identical to the aforementioned PLC communication sections 55a, 65a, 75a, and 85a. The PLC communication section 308 transmits, to the PLC adapter 200, which carries out QoS control, a QoS setting request packet generated by the QoS setting request generation section 312 and other packets.

The Ethernet communication section 330 transmits and receives packets to and from an Ethernet device connected to the PLC adapter 300 via the Ethernet. The Ethernet communication section 330 generates the port table 323, which shows correspondence between the source address of a packet received from the Ethernet (i.e., the address (Ethernet address) of an Ethernet device that transmitted the packet) and an input-output port that received the packet, and stores the generated port table 323 in the storage section 320. The Ethernet address can be obtained through detection of a source address given to some sort of packet (of any form) transmitted from the Ethernet device to the PLC adapter 300.

FIG. 21 shows an example of the port table 323. As shown in FIG. 21, the port table 323 is a table that shows correspondence between the Ethernet address (identification information) of an Ethernet address and an input-output port to which the Ethernet device has been connected. In FIG. 21, the first port 331 is associated with the Ethernet address (E1) of the STB 100, and the third port 333 is associated with the Ethernet address (E2) of the PC 110.

As with the bridge sections 68, 78, and 88, the bridge section 307 carries out bridging of a packet between the PLC communication section 308 and the Ethernet communication section 330, and notifies the trigger detection section 306 of the destination address of a packet received by the PLC communication section 308. The bridge section 307 carries out such bridging with reference to the port table 323. Further, the bridge section 307 generates a bridge information notification packet and transmits it to the PLC adapter 200 via the PLC communication section 308.

<Regarding Processing in the Trigger Detection Section 306>

The trigger detection section 306 generates the trigger detection table 324 with use of the initialization information 325, a QoS parameter outputted from the QoS control information conversion section 314, and the port table 323 generated by the Ethernet communication section 330. FIG. 22 shows an example of the trigger detection table 324. As shown in FIG. 22, the trigger detection table 324 is a table that shows correspondence among the Ethernet address of an Ethernet device connected to a QoS control target input-output port, a QoS parameter for QoS control of data packets that are transmitted to the Ethernet device, and information on a history of the data packets received. FIG. 22 shows the total packet size of received packets as the reception history. However, as another reception history, the number of packets may be recorded on the trigger detection table 324. The type of information that is stored as a reception history varies depending on algorithms for trigger detection.

When the PLC communication section 308 receives a data packet, the bridge section 307 notifies the trigger detection section 306 of the data packet.

Upon receiving the data packet from the bridge section 307, the trigger detection section 306 extracts a destination address from the data packet, and then cross-checks the destination address and the trigger detection table 324 in order to check whether or not the trigger detection table 324 has an entry having an address field that matches the extracted address. If there exists an entry that matches, the trigger detection section 306 further extracts information (e.g., packet size and the number of packets) necessary as a reception history, and then records the information in a reception history field of the trigger detection table 324.

Then, upon the satisfaction of specific conditions (e.g., a situation in which the total data size has a specific or greater value or a situation in which a predetermined number of packets have been received), the trigger detection section 306 outputs trigger detection information to the QoS control section 310 to that effect.

In the present embodiment, the trigger detection table 324 contains an entry for the STB 100, which is an Ethernet device connected to the first port 331, which is a QoS control target input-output port. The entry has E1 in its address field. Upon receiving a data packet whose destination address is E1, the trigger detection section 306 further extracts packet size from the data packet, and then adds the extracted packet size to the history information field of the entry for the STB 100 on the trigger detection table 324. Then, when the reception history field comes to have a specific or greater value, the trigger detection section 306 outputs the trigger detection information to the QoS control section 310. Further, the trigger detection section 306 checks the total packet size at predetermined measurement intervals. Further, the trigger detection section 306 brings the total packet size back to zero upon completion of such a check. With this, the bit rate of reception is computed by calculating (Total Packet Size/Measurement Interval) at the time of checking of the packet size. When this bit rate of reception exceeds a certain threshold, the trigger detection section 306 outputs the trigger detection information to the QoS control section 310.

At the time of data transmission, control packets are transmitted in addition to content data packets. For example, to the STB 100, character data such as program data and HTML is transmitted in addition to image data. At a point where only a packet of program information is being transmitted, the user has not viewed any image yet. Therefore, at this point of time, in order that another terminal can use a bandwidth, it is desirable that no bandwidth be reserved. Simply measuring the total packet size results in the acquisition of a bandwidth as time elapses with program information being merely transmitted. Packets such as program information are lower in bit rate than image data (i.e., small packets are merely transmitted at low frequencies). Therefore, when a trigger is detected based on the bit rate, no bandwidth is reserved until the transmission of image data. It is also possible to detect a trigger when the bit rate has been in excess of a specific value for a given period of time. This makes it possible to avoid detecting a trigger by mistake when the bit rate becomes temporarily higher due to file downloading or the like and then becomes lower shortly thereafter.

It is possible that all the ports are equal in threshold for trigger detection. Alternatively, it is possible that thresholds for trigger detection vary depending on QoS types. For example, a bandwidth of 16 Mbps is required in case where HD is specified as a QoS type, and a bandwidth of 6 Mbps is required in case where SD is specified as a QoS type. Therefore, it is conceivable to set a threshold of 8 Mbps for HD and a threshold of 3 Mbps for SD in proportion to the required bandwidths. Further, it is possible to allow the user to change these thresholds. In that case, it is possible to change a threshold for each port or change common thresholds for all the ports.

Upon receiving the trigger detection information, the QoS control section 310 generates a connection request packet and transmits it to the PLC adapter 200.

<Regarding Arrangement of the PLC Adapter 200>

Figure 23:
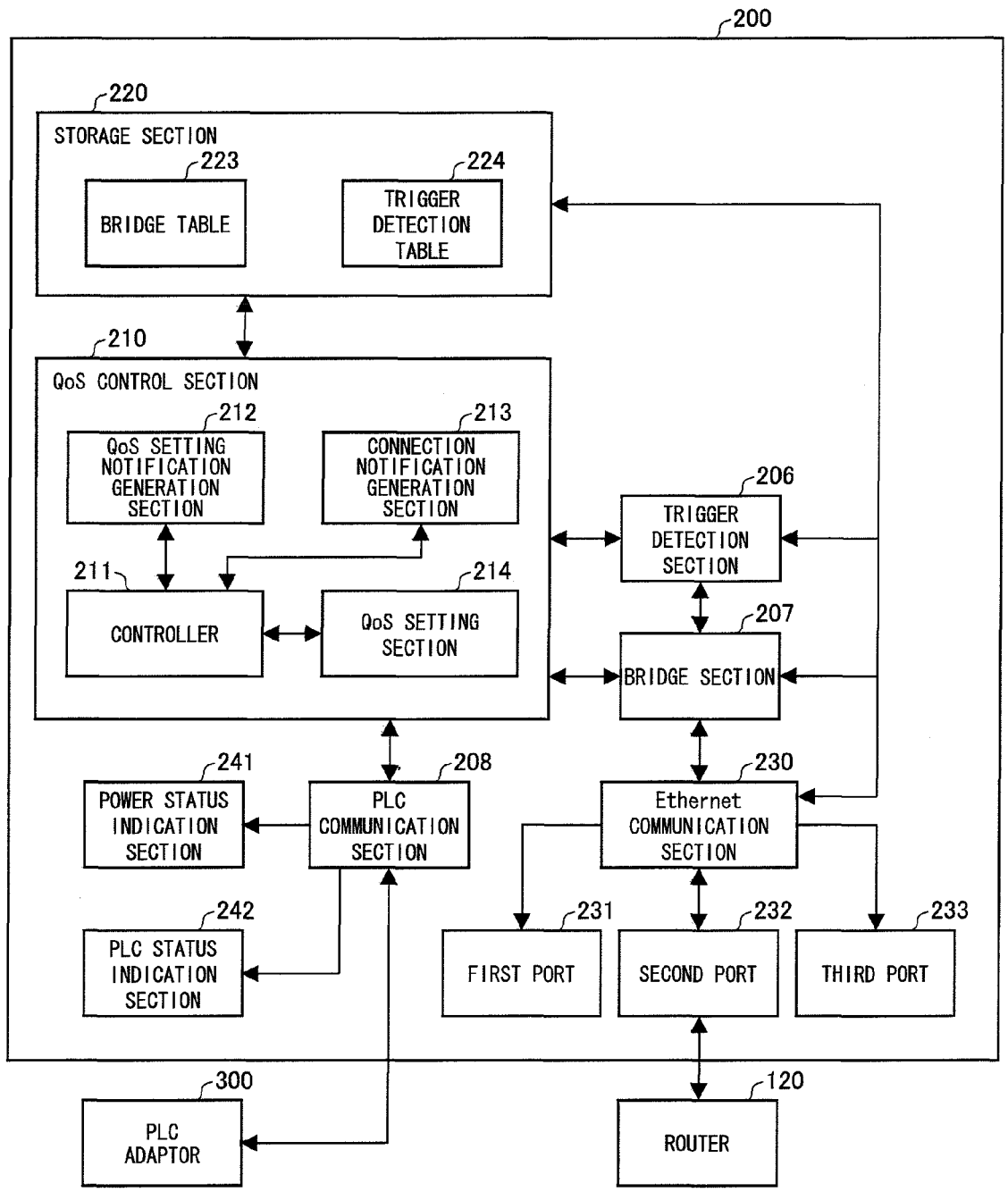
FIG. 23 is a functional block diagram illustrating an arrangement of a transmitting-side PLC adaptor of Embodiment 4.

FIG. 23 is a functional block diagram showing an arrangement of the PLC adapter 200. As shown in FIG. 23, the PLC adapter 200 includes a storage section 220, a QoS control section 210, a trigger detection section 206, a bridge section 207, a PLC communication section 208, an Ethernet communication section 230, a power status indication section 241, and a PLC status indication section 242. The PLC adapter 200 may be identical in structure to the PLC adapter 300. However, for ease of understanding of the functions of the transmitting and receiving PLC adapters, the functions of the transmitting and receiving PLC adapters will be described separately.

The storage section 220 has a bridge table 223 stored therein.

The QoS control section 210 includes a QoS setting notification generation section 212 for generating a QoS setting notification packet, a connection notification generation section 213 for generating a connection notification packet, a QoS setting section (control device) 214, and a controller 211 for controlling each function block of the control section 210.

The QoS setting section 214 determines a schedule for bandwidth allocation in the PLC network and transmits packets via the PLC communication section 208 in accordance with the schedule. That is, the QoS setting section 214 carries out QoS control on packets that are transmitted to the receiving PLC adapter. Further, the QoS setting section 214 derives a GLID from flow identification information and notifies each PLC adapter of a schedule of bandwidth allocation. Such a process is identical to the counterpart processes of the aforementioned embodiments. In the present embodiment, the transmitting station includes the functions of a master station and notification of the schedules is carried out internally. Therefore, such a process will not be described.

The trigger detection section 206 is basically identical to the trigger detection section 306, and a trigger table 224 is also identical to the trigger detection 324. It should be noted that the trigger detection section 206 is needed in case where the transmitting PLC adapter carries out trigger detection but is not needed in case where the receiving PLC adapter 300 carries out trigger detection.

The bridge section 207 is substantially identical to the bridge section 58 of Embodiment 2, and generates the bridge table 223, which shows correspondence between the PLC address of the PLC adapter 300 and the Ethernet addresses of the STB 100 and the PC 110 both connected to the PLC adapter 300, the Ethernet addresses being contained in the bridge information notification packet transmitted from the PLC adapter 300. The bridge table 223 may be a publicly-known one and is not particularly limited in format.

The Ethernet communication section 230 transmits and receives packets to and from the router 120.

The PLC communication section 208, the power status indication section 241, and the PLC status indication section 242 are identical to the PLC communication section 308, the power status indication section 341, and the PLC status indication section 342, respectively.

<Regarding Flow of Processing in the Communication Network 400>

Figure 24:
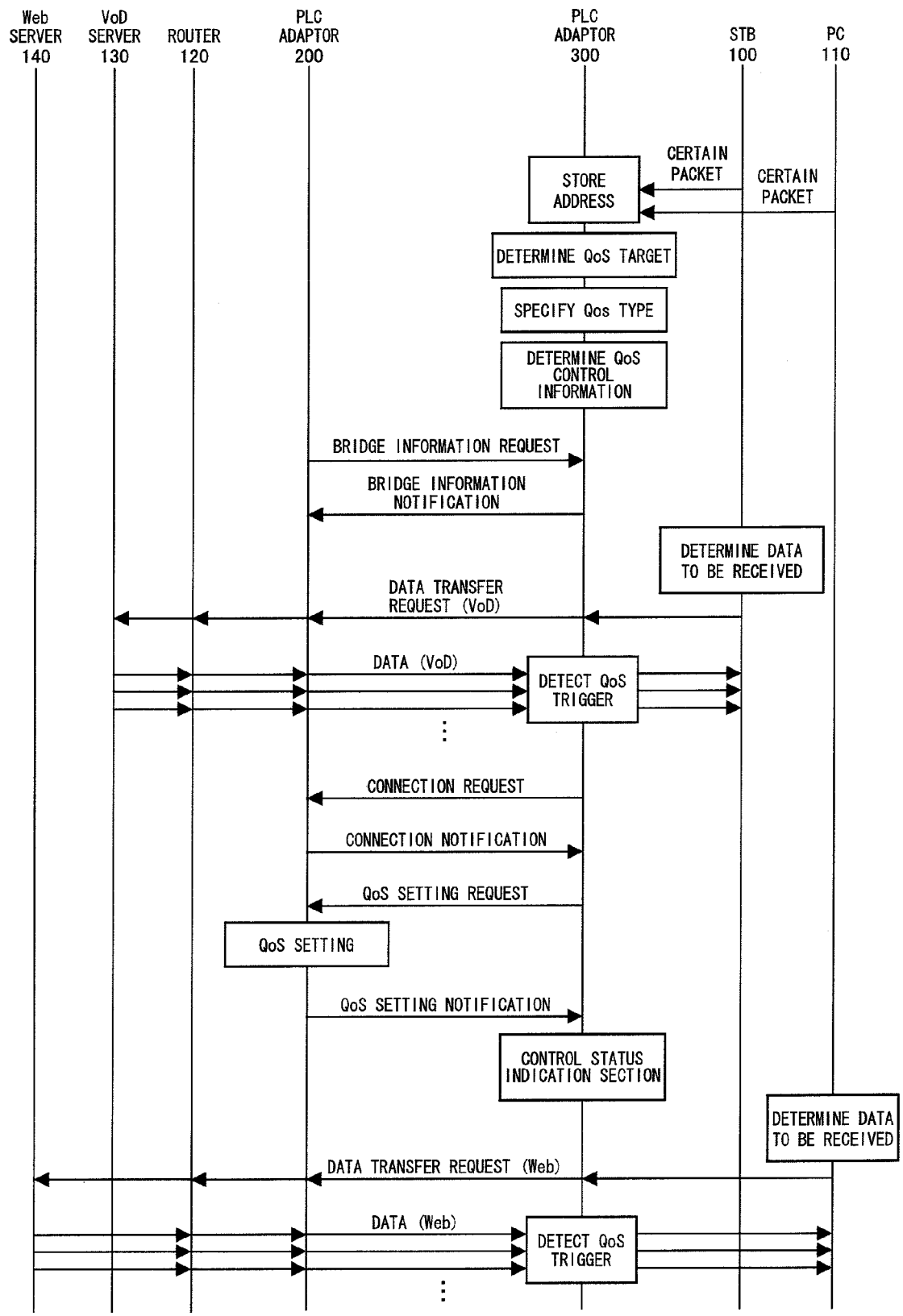
FIG. 24 is a flowchart illustrating communications among communication apparatuses in Embodiment 4.

The following describes the flow of processing in each communication apparatus with reference to FIG. 24. FIG. 24 is a flow chart showing communication between one communication apparatus and another in Embodiment 4.

<How to Obtain the Address of an Ethernet Device>

The bridge section 307 of the PLC adapter 300 obtains in advance the Ethernet addresses of the STB 100 and the PC 110 both connected to the PLC adapter 300. When the PLC adapter 300 receives a given packet from the STB 100 or the PC 110, the Ethernet communication section 330 generates a port table 323 that shows correspondence between the Ethernet address of an Ethernet device (STB 100 or PC 110) that sent the packet and an input-output port that received the packet, and then stores the generated port table 323 in the storage section 320 (see "ADDRESS STORAGE" in FIG. 24).

<QoS Type Receiving Process>

In case where a user wishes to receive HD video content via the STB 100, the user specifies "HD IMAGE" as QoS type information by operating the QoS type receiving section 301 of the PLC adapter 300 to which the STB 100 has been connected.

The type information obtaining section 302 obtains, from the QoS type specifying section 310, the QoS type information inputted by the user. Upon obtaining the QoS type information, the type information obtaining section 302 records the QoS type information on the QoS type table 321. The type information obtaining section 302 stores the QoS type table 321, on which the QoS type information has been recorded, in the storage section 320 ("QoS TYPE SPECIFICATION" in FIG. 24).

<QoS Control Information Conversion Process>

When the QoS type table 321 has been stored, the QoS control information conversion section 314 refers to the QoS control information conversion table 322 and determines a QoS parameter corresponding to the QoS type recorded on the QoS type table 321 ("DETERMINATION OF QoS CONTROL INFORMATION" in FIG. 24). The QoS control information conversion section 314 outputs the determined QoS parameter to the trigger detection section 306.

<Generation of a Trigger Detection Table 324>

The trigger detection section 306 generates a trigger detection table 324 with use of the initialization information 325, a QoS parameter outputted from the QoS control information conversion section 314, and an Ethernet address shown on the port table 323 generated by the Ethernet communication section 330.

Since the initialization information 325 shows that the first port 331 is a QoS control target input-output port, it is found that the STB 100, which has been connected to the first port 331, receives a data packet to be subjected to QoS control.

<Bridge Information Obtaining Process>

The content-transmitting PLC adapter 200 obtains bridge information (i.e., information on the Ethernet addresses of the STB 100 and the PC 110) from the PLC adapter 300 in advance in preparation for transferring, to the PLC adapter 300, a data packet received from the router 120.

For that purpose, the PLC adapter 200 transmits a bridge information request packet to the PLC adapter 200. Specifically, the bridge section 207 of the PLC adapter 200 creates a bridge information request packet and transmits it to the PLC adapter 300 via the PLC communication section 208 ("BRIDGE INFORMATION REQUEST" in FIG. 24). The bridge information request packet is identical in structure to its counterparts described in the aforementioned embodiments.

Upon receiving the bridge information request packet, the PLC communication section 308 of the PLC adapter 300 notifies the bridge section 307 of the reception. The bridge section 307 creates a bridge information notification packet containing the Ethernet addresses of the Ethernet devices connected to the PLC adapter 300 via the Ethernet communication section 330, i.e., of the STB 100 and the PC 110.

The bridge section 307 transmits the created bridge information notification packet to the PLC adapter 200 via the PLC communication section 308 (which is indicated by "BRIDGE INFORMATION NOTIFICATION" in FIG. 24).

Upon receiving the bridge information notification packet, the PLC communication section 208 of the PLC adapter 200 notifies the bridge section 207. The bridge section 207 associates the PLC address of the PLC adapter 300 with the Ethernet addresses, which are contained in the bridge information notification packet, of the STB 100 and the PC 110, and then records the associated addresses on the bridge table 223. The bridge section 207 stores the created bridge table 223 in the storage section 220.

It should be noted that the bridge information obtaining process may be carried out at any point of time before the PLC adapter 200 starts to transmit data packets.

<Process of Determining What Data to Receive and Data Transmission Request Process>

At a given point of time after a QoS type has been set, the STB 100 determines which content data to receive ("DETERMINATION OF DATA TO BE RECEIVED" in FIG. 24).

Such a process of determining what content data to receive is identical to the counterpart processes of the aforementioned embodiments.

Upon determining what content data to receive, the STB 100 generates a transmission request packet containing content identification information for identifying the content data and transmits the transmission request packet to the PLC adapter 300 via the Ethernet. Then, the PLC adapter 300 receives the packet and transmits it to the PLC adapter 200 via the PLC network. Then, the PLC adapter 200 receives the packet and transmits it to the router 120 via the Ethernet. Then, the router 120 receives the packet and transmits it to the VoD server 130 via the Internet ("DATA TRANSMISSION REQUEST (VoD)" in FIG. 24).

<Data Transmission Request>

After receiving the data transmission request packet, the VoD server 130 starts to transmit the content specified by the packet. The VoD server converts the stored content into packets and transmits them sequentially to the router 120 via the Internet together with destination information. The router 120 receives the data packets and transmits them sequentially to the PLC adapter 200 via the Ethernet.

Each of these data packets is a packet of video content that is transmitted from the VoD server 130 to the STB 100, and therefore contains the IP address of the STB 100 as a destination.

The router 120 carries out a routing process to search the IP address for an Ethernet address. As a result of the routing process, the data packet contains the Ethernet address of the STB 100 as a destination address at a point of time where the data packet has been transferred to the PLC adapter 200 from the router 120.

The Ethernet communication section 230 of the PLC adapter 200 receives the data packet and passes it to the bridge section 207. Since the bridge table 223, which has been generated in advance, contains the PLC address of the PLC adapter 300 and the Ethernet addresses of the STB 100 and the PC 110, a cross-check between the bridge table 233 and the destination address of the data packet shows that the destination of the data packet on the PLC network is the PLC adapter 300.

Accordingly, the bridge section 207 gives the data packet a PLC header containing the PLC address of the PLC adapter 300 as the destination of the data packet, and then transmits the data packet via the PLC communication section 208 to the PLC adapter 300 (which is indicated by "DATA (VoD)" in FIG. 24).

<Trigger Detection Process>

The PLC communication section 308 of the PLC adapter 300 receives the data packet and passes it to the bridge section 307. The bridge section 307 passes the data packet to the Ethernet communication section 330 so that the data packet is transferred to the STB 100, and also passes the data packet to the trigger detection section 306.

By analyzing this data packet, the trigger detection section 306 carries out the aforementioned trigger detection process ("QoS TRIGGER DETECTION" in FIG. 24) with use of the trigger detection table 324. Upon the satisfaction of the aforementioned specific conditions, the trigger detection section 306 outputs trigger detection information to the QoS control section 310 to that effect.

<Connection Request Process and Connection Notification Process>

Upon receiving the trigger detection information, the QoS control section 310 generates a connection request packet containing information (Ethernet address) for identifying the Ethernet device to be subjected to QoS control and the QoS parameter determined earlier, and then transmits the connection request packet to the content-transmitting PLC adapter 200 via the PLC communication section 308 ("CONNECTION REQUEST" in FIG. 24).

The PLC communication section 208 of the PLC adapter 200 receives the connection request packet and transmits it to the QoS control section 210. The connection notification generation section 213 of the QoS control section 210 determines, from the information contained in the connection request packet, whether or not data transmission is possible.

The connection notification generation section 213 generates a connection notification packet containing information (Result Code) indicating whether or not it is possible to accept the request for data transmission, and then transmits the connection notification packet to the PLC adapter 300 via the PLC communication section 208 ("CONNECTION NOTIFICATION" in FIG. 24).

<QoS Setting Request Process>

The PLC communication section 308 of the PLC adapter 300 receives the connection notification packet and transmits it to the QoS control section 310. The controller 311 of the QoS control section 310 determines, from the Result Code contained in the connection notification packet, whether or not the request for data transmission has been accepted.

At this point of time, in case where the Result Code indicates the rejection of the request, the controller 311 cancels the QoS setting process, and then controls the QoS status indication section 305 so that the QoS status indication section 305 shows the user that the QoS request was not satisfied.

In case where the Result Code indicates the acceptance of the request, the controller 311 orders the QoS setting request generation section 312 to generate a QoS setting request packet. The QoS setting request generation section 312 generates a QoS setting request packet containing the same Ethernet device-identification information (i.e., the Ethernet address shown on the trigger detection table 324) and QoS parameter (i.e., the QoS parameter shown on the trigger detection table 324) as those contained in the connection request packet, and then transmits the QoS setting request packet to the master station, i.e., the PLC adapter 200 via the PLC communication section 308 ("QoS SETTING REQUEST" in FIG. 24).

That is, the QoS setting request generation section 312 generates a QoS setting request packet containing, as information for defining the content of QoS control required by the PLC adapter 300, the QoS type information specified by the QoS type specifying section 301.

<QoS Setting Process and QoS Setting Notification Process>

The PLC communication section 208 of the PLC adapter 200 receives the QoS setting request packet and transmits it to the QoS control section 210. The QoS setting notification generation section 212 of the QoS control section 210 determines, in accordance with the QoS parameter contained in the QoS setting request packet, whether or not it is possible to accept the request.

In case where the QoS parameter contained in the QoS setting request packet is determined to be acceptable, the QoS setting notification generation section 212 outputs information to the QoS setting section 214 via the controller 211 to that effect.

The QoS setting section 214 assigns, to a flow addressed to the Ethernet address, which is contained in the QoS setting request packet, of the STB 100a, a GLID (Global Link ID) for uniquely identifying the flow within the PLC network, and then makes out a schedule for bandwidth allocation for the GLID in accordance with the QoS parameter indicated by the QoS setting request packet ("QoS SETTING" in FIG. 24). Then, the QoS setting section 214 controls the PLC communication section 208 so that QoS control corresponding to the QoS type requested by the PLC adapter 300 is carried out on the flow, which has been given the GLID, of data packets that are sent to the STB 100.

After that, the QoS setting notification generation section 212 generates a QoS setting notification packet containing (i) information (Result Code) indicating whether or not it is possible to accept the QoS request and, in case where the Result Code is a value indicative of success, (ii) the GLID, and then transmits the QoS setting notification packet to the PLC adapter 300 via the PLC communication section 208 ("QoS SETTING NOTIFICATION" in FIG. 24).

<Process of Controlling the Status Indication Section>

The PLC communication section 308 of the PLC adapter 300 receives the QoS setting notification packet and transmits it to the QoS control section 310. The controller 311 of the QoS control section 310 determines, from the Result Code contained in the QoS setting notification packet, whether or not the request for QoS setting has been accepted. The controller 311 controls the QoS status indication section 305 so that the QoS status indication section 305 shows the user whether or not the request has been accepted ("CONTROL OF STATUS INDICATION SECTION" in FIG. 24). The method for controlling the QoS status indication section 305 may be identical to the counterpart control methods of the aforementioned embodiments.

<Regarding Transmission Control of Data Packets that are Transmitted to the PC 110>

Data packets that are transmitted to the PC 100 connected to the third port 333, which is not a QoS control target input-output port, are not subjected to QoS control. That is, no bandwidth is allocated to data packets that are transmitted to the PC 110, and the PLC adapter 200, which serves as a transmitting station, transmits such data packets to the PLC 110 via the PLC adapter 300 in a period of time other than a period of time during which there is a bandwidth allocated to data transmission to the STB 100 or a period of time where there is a bandwidth allocated to another slave station.

<Regarding Case where a Transmitting Station Carries Out Trigger Detection>

Figure 25:
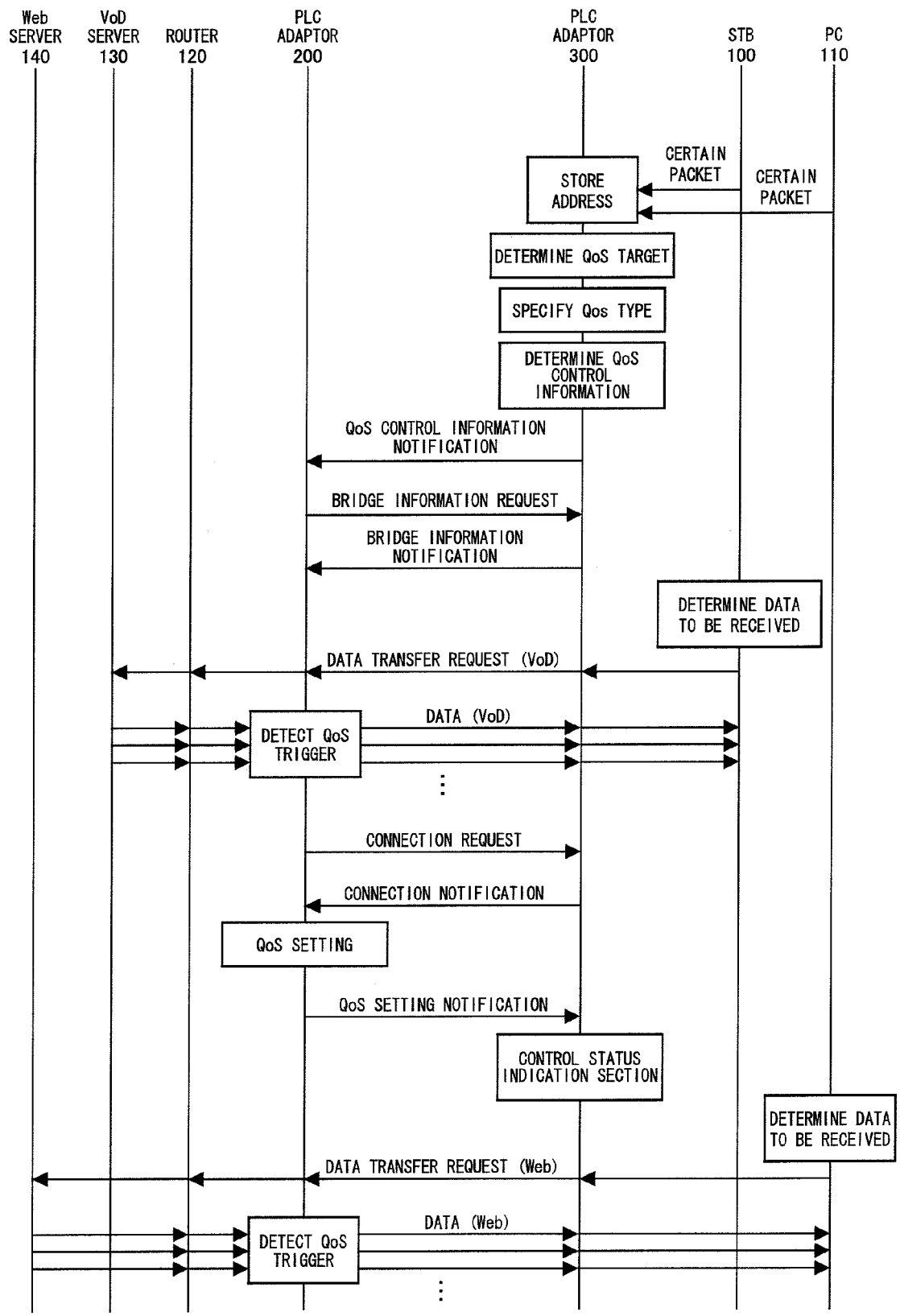
FIG. 25 is a flowchart illustrating a flow of steps carried out in a trigger detection process carried out in the transmitting-side PLC adaptor.

The PLC adapter 200, which serves as a transmitting station, may carry out the trigger detection process as mentioned above. FIG. 25 is a flow chart showing the flow of a process that is carried out in such a case. The following explains points different from those in the flow of processing shown in FIG. 24.

After determining a QoS parameter as described above, the QoS control information conversion section 314 generates a QoS control information notification packet containing the QoS parameter and the Ethernet address of the Ethernet device connected to the QoS control target input-output port, i.e., of the STB 100, and then transmits the QoS control information notification packet to the PLC adapter 200 via the PLC communication section 308 ("QoS CONTROL INFORMATION NOTIFICATION" in FIG. 25).

In the present embodiment, the first port 331 is the only QoS control target input-output port. However, in case where there are a plurality of QoS control target input-output ports, the QoS control information notification packet contains the Ethernet addresses of all Ethernet devices respectively connected to the QoS control target input-output ports.

Further, in case where the transmitting station carries out such a trigger detection process, the connection request generation section 313 and the connection notification generation section 213 reverse their aforementioned functions.

When the PLC adapter 200 receives the QoS control information notification packet, the trigger detection section 206 associates, with each other, the Ethernet address and the QoS parameter both contained in the QoS control information notification packet and records them on the trigger detection table 224. The trigger detection table 224 may be identical to the trigger detection table 324.

After that, an exchange of a bridge information request packet and a bridge information notification packet is made, and then data transmission is started.

When the PLC adapter 200 receives a data packet, the bridge section 207 outputs the received data packet to the trigger detection section 206.

By analyzing this data packet, the trigger detection section 206 carries out a trigger detection process in the same manner as the trigger detection section 306. Upon the satisfaction of the aforementioned specific conditions, the trigger detection section 206 outputs trigger detection information to the QoS control section 210 to that effect.

Upon receiving the trigger detection information, the QoS control section 210 generates a connection request packet containing the QoS parameter determined earlier, and then transmits the connection request packet to the content-receiving PLC adapter 300 via the PLC communication section 208 ("CONNECTION REQUEST" in FIG. 25).

The PLC communication section 308 of the PLC adapter 300 receives the packet and transmits it to the QoS control section 310. The connection request generation section 313 of the QoS control section 310 determines, from the information contained in the connection request packet, whether or not data reception is possible.

The connection request generation section 313 generates a connection notification packet containing information (Result Code) indicating whether or not data reception is possible, and then transmits the connection notification packet to the PLC adapter 200 via the PLC communication section 308 ("CONNECTION NOTIFICATION" in FIG. 25).

After that, in case where the Result Code contained in the connection notification packet indicates that data reception is possible, the QoS setting section 214 of the PLC adapter 200 assigns a GLID to a flow that is transmitted to the STB 100, and then makes out a schedule for bandwidth allocation for the GLID in accordance with the QoS parameter shown by the trigger detection table 224 ("QoS SETTING" in FIG. 25).

Further, the QoS setting notification generation section 212 generates a QoS setting notification packet containing the GLID, and then transmits the QoS setting notification packet to the PLC adapter 300 via the PLC communication section 208 ("QoS SETTING NOTIFICATION" in FIG. 25).

<Regarding Case where Priority Control is Carried Out>

In case where Prioritized QoS is applied to the present embodiment, i.e., in case where priority control is carried out on data packets that are transmitted from the PLC adapter 200 to the PLC adapter 300, information indicative of priority is received as a QoS type via the QoS type specifying section 301, and the priority is recorded on the QoS type table 321.

FIG. 26 shows another example of the QoS type table 321. In case where priority control is carried out, the QoS type table 321 associates, with each other, an input-output port and the priority of QoS control targeted at data that is outputted from the input-output port. FIG. 26, shows an example where "HIGH PRIORITY" has been selected as the priority.

The QoS control information conversion section 314 converts, into a PLID (Priority Link ID), the priority information shown by the QoS type table 321. Correspondence between QoS types and PLIDs is shown by the QoS control information conversion table 322.

FIG. 27 shows another example of the QoS control information conversion table 322. In FIG. 27, the three levels of priority "NORMAL", "PRIORITY", "HIGH PRIORITY" are associated with the PLIDs "1", "2", and "3", respectively.

FIG. 28 shows another example of the trigger detection table 324. In the case of the modified example shown in FIG. 28, the trigger detection table 324 generated by the trigger detection section 306 is a table that shows correspondence among the address of an Ethernet device connected to a QoS control target input-output port, the priority of packets that are transmitted to the Ethernet device, and information on a history of the data packets received.

Figure 29:
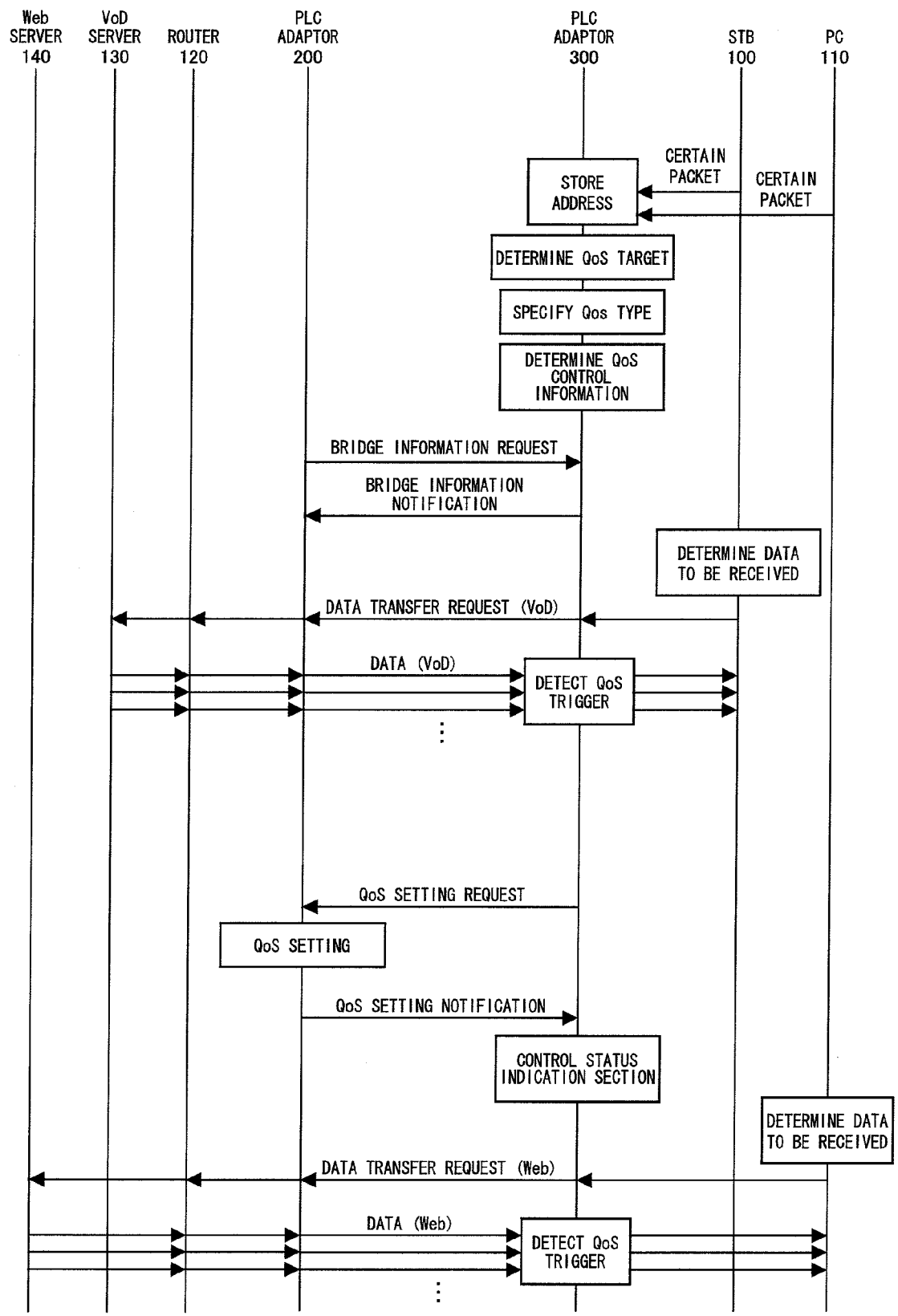
FIG. 29 is a flowchart illustrating a flow of steps in carrying out priority control in Embodiment 4.

The flow of a process that is carried out in the case of the present modified example will be described with reference to FIG. 29. FIG. 29 is a flow chart showing the flow of a process of carrying out priority control in the present embodiment. The flow of FIG. 29 differs from the flow of FIG. 24 in that neither a connection request packet nor a connection notification packet is transmitted in the flow of FIG. 29, and in that in the flow of FIG. 29 the QoS setting request generation section 312 generates a QoS setting request packet containing information (PLID) indicative of priority as QoS control information. In the case of use of bandwidth assurance, a receiving station transmits a connection request packet to a transmitting station and transmits a QoS setting request packet to a master station. In FIG. 24, since the PLC adapter functions as a master station as well as a transmitting station, the receiving station transmits both of the packets to the PLC adapter 200. In the case of use of priority control, a master station is not involved in QoS control, and a receiving station only requests QoS setting from a transmitting station and therefore does not need to transmit a connection request packet. The flow of FIG. 29 is identical to the flow of FIG. 24 except for the process, and therefore will not be described.

Also in the case of performance of priority control, it is possible to carry out a trigger detection process with the receiving PLC adapter 300 or the transmitting PLC adapter 200. The flow of a trigger detection process that is carried out with the transmitting PLC adapter 200 is identical to that of FIG. 25 except that neither a connection request packet nor a connection notification packet is transmitted.

<Regarding Case where a Plurality of Ethernet Devices have been Connected to a Single Port>

According to the above description, the number of Ethernet devices connected to the QoS control target input-output port is only 1. However, it is possible to connect a plurality of Ethernet devices to the QoS control target input-output port via a hub. In this case, the port table contains a plurality of Ethernet addresses recorded with respect to a single port. Accordingly, the trigger detection table contains a plurality of entries created therein. However, since each port has a QoS type set therefor, QoS parameters (priorities) respectively corresponding to the addresses of Ethernet devices connected to an identical port take on an identical value. Since each entry of the trigger detection table is independently subjected to a trigger detection process, and therefore is also independently subjected to a connection request and a QoS setting request. That is, in the case of bandwidth assurance transmission, each device has a bandwidth reserved therefor. Furthermore, since each device is independently subjected to a trigger detection process, such control is possible, depending on the setting of a threshold for trigger detection, as to provide bandwidth assurance transmission (priority control transmission) only for that one of the connected devices which is receiving data at a high rate and to provide no bandwidth assurance transmission for that one of the connected devices which is receiving data at a low rate.

For example, the reception rate of a device, such as a PC, that is receiving only Web content data is lower than the reception rate of a device, such as an STB, that is receiving video content data. Therefore, by setting a threshold for trigger detection so that the threshold takes on a value that is larger than the reception rate at which the PC receives data packets and smaller than the reception rate of the STB, it becomes possible to carry out control as to transmit the data packets to the PC with best effort instead of bandwidth assurance transmission (priority control transmission) while providing bandwidth assurance transmission (priority control transmission) for the STB.

Further, it is possible to create an entry for each port instead of creating entries individually for the trigger detection table. In this case, an entry into the trigger detection table contains a plurality of Ethernet addresses, a piece of QoS control information, and a piece of history information. In a trigger detection process, all the Ethernet addresses recorded in the entry are checked against the destination address of a received packet, and the history information is recorded in case where the destination address matches any one of the recorded Ethernet addresses.

For example, in case where the total size of received packets is used as history information, the sizes of all the packets addressed to the Ethernet addresses are totalized. This means recording the sizes of all the packets outputted from a port. Moreover, in a QoS setting process, the QoS setting request generation section generates a QoS setting request packet containing all the recorded Ethernet addresses. With this, in the case of bandwidth assurance transmission, an allocated bandwidth is shared by Ethernet devices connected to the same port.

Such an arrangement as described above that a plurality of Ethernet devices are connected to a single input-output port may be applied to Embodiments 5, 6, and 8, which will be described later, as well as the present embodiment.

<Effect of the Present Embodiment>

As described above, even in the case where the PLC adapter 300 is in connection with a plurality of devices, a bandwidth (or priority) specified by a user for the PLC adapter 300 is reserved on the PLC network for data packets that are transmitted to a device connected to a QoS control target input-output port. This makes it possible to efficiently carry out QoS control even in the case where a receiving PLC adapter is in connection with a plurality of devices.

Embodiment 5

The present embodiment describes a PLC adapter 500 that makes it possible to select any one of three input-output ports of a receiving PLC adapter as a QoS control target input-output port. Members identical to those described in Embodiment 4 will be given the same reference numerals, and will not be described. Those processes which have been described above in Embodiments 1 to 4 will not be described at all or will only be described briefly. Further, the present embodiment mainly describes an example of a case where QoS control is carried out by Parameterized QoS (bandwidth assurance). However, as will be mentioned later, Prioritized QoS (priority control) may be applied to the present embodiment.

Figure 30:
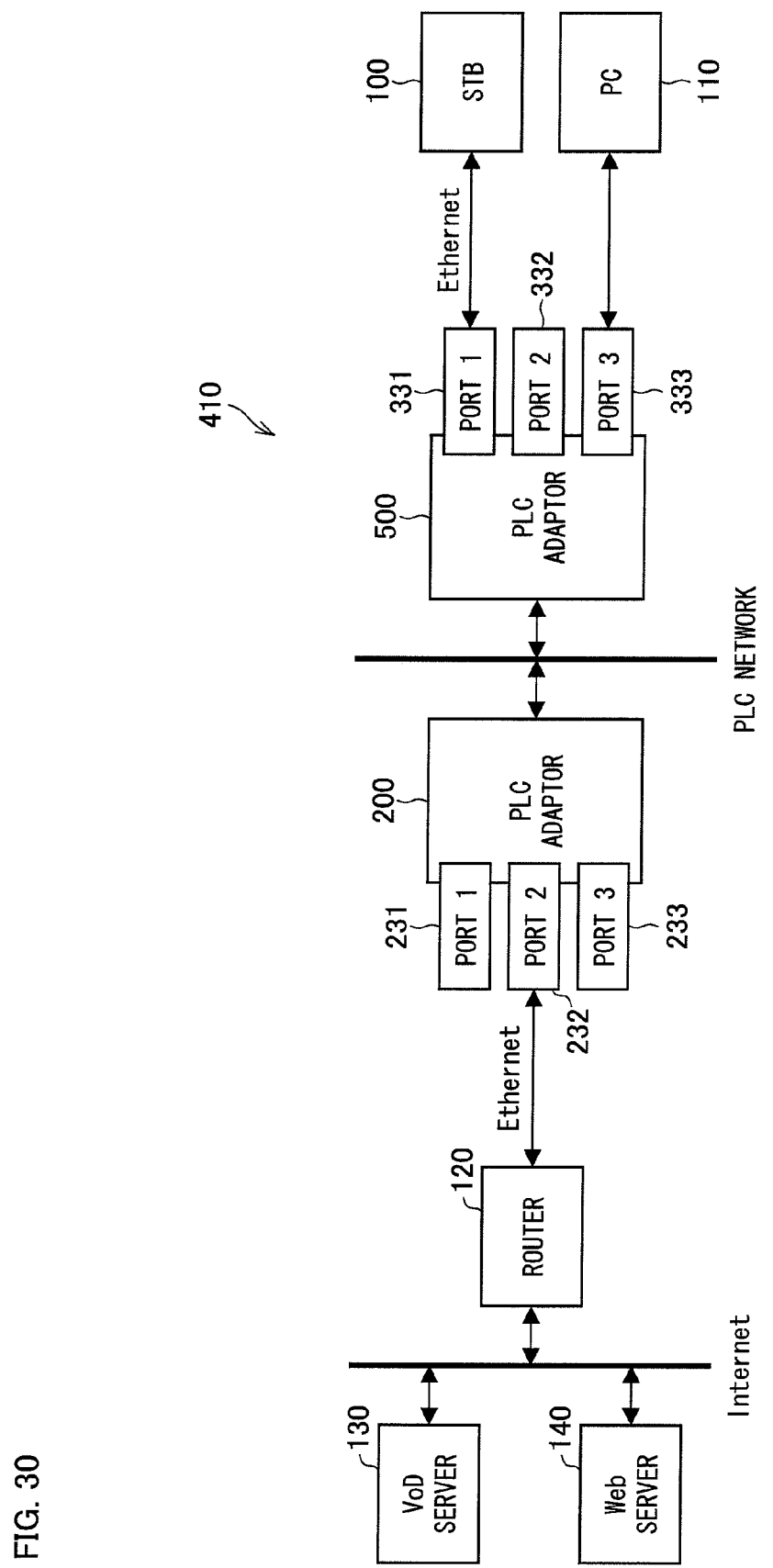
FIG. 30 is a diagram illustrating an arrangement of a communication network in Embodiment 5.

FIG. 30 shows an arrangement of a communication network 410 according to the present embodiment. As shown in FIG. 30, the communication network 410 differs from the communication network 400 in that the communication network 410 includes the PLC adapter 500 as a receiving PLC adapter.

<Regarding Arrangement of the PLC Adapter 500>

Figure 31:
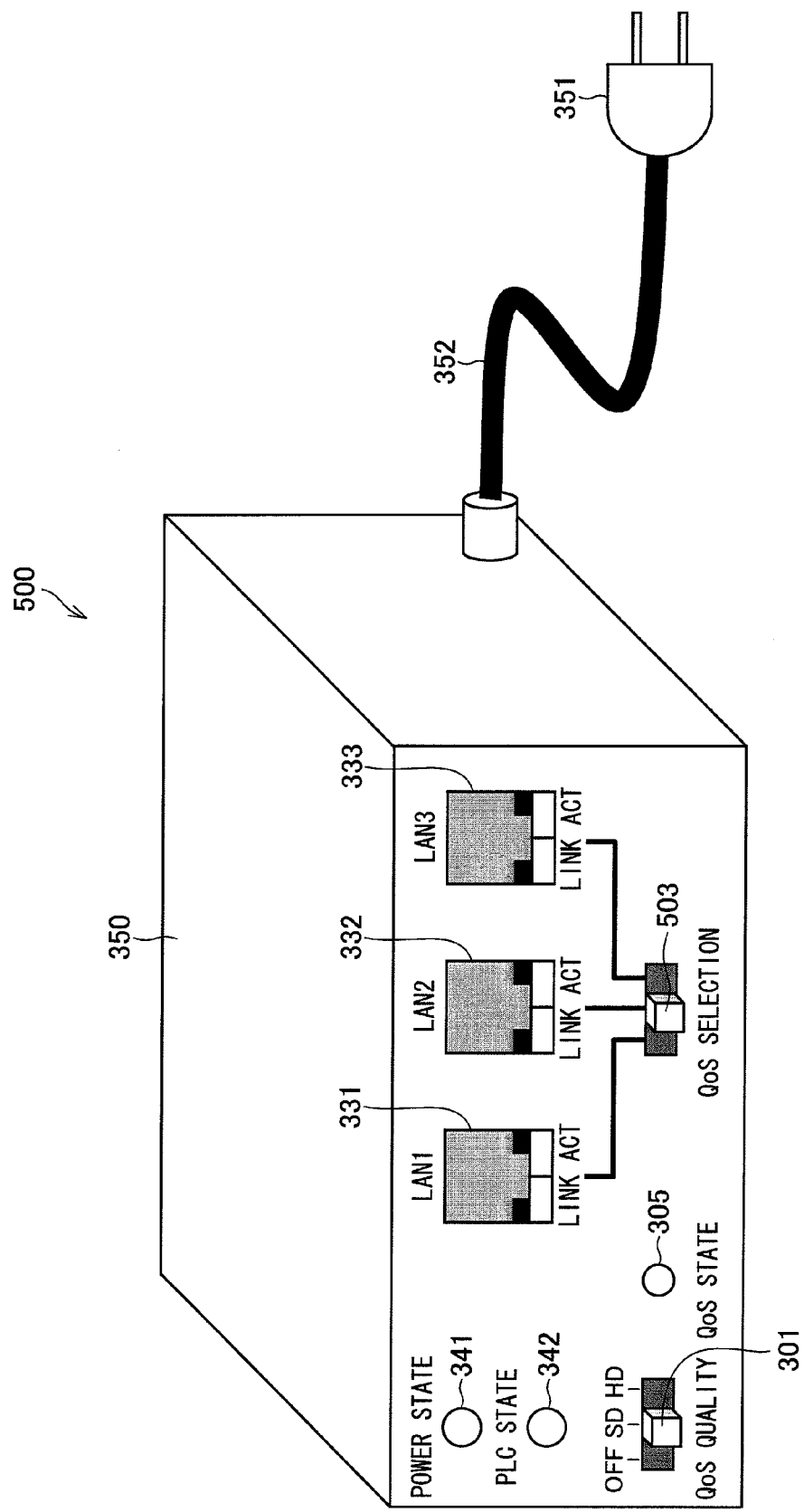
FIG. 31 is an oblique perspective view illustrating appearance of a PLC adaptor of Embodiment 5.

FIG. 31 is a perspective view of the appearance of the PLC adapter 500. As shown in FIG. 31, the PLC adapter 500 includes a QoS target specifying section (QoS target selection means) 503 for selecting any one out of three input-output ports (namely a first port 331, a second port 332, and a third port 333) as a QoS control target input-output port. The QoS target specifying section 503 is a slide-type switch, for example, but may be any type of switch that makes it possible to select one of the three input-output ports. That is, the QoS target specifying section 503 serves for a user to select any one of the plurality of input-output ports of the PLC adapter 500 as a QoS control target input-output port.

The PLC adapter 500 is provided with a QoS type specifying section 301, too. However, this QoS type specifying section 301 serves to specify the type of QoS control that corresponds to data packets that are outputted from an input-output port selected with use of the QoS target specifying section 503.

Figure 32:
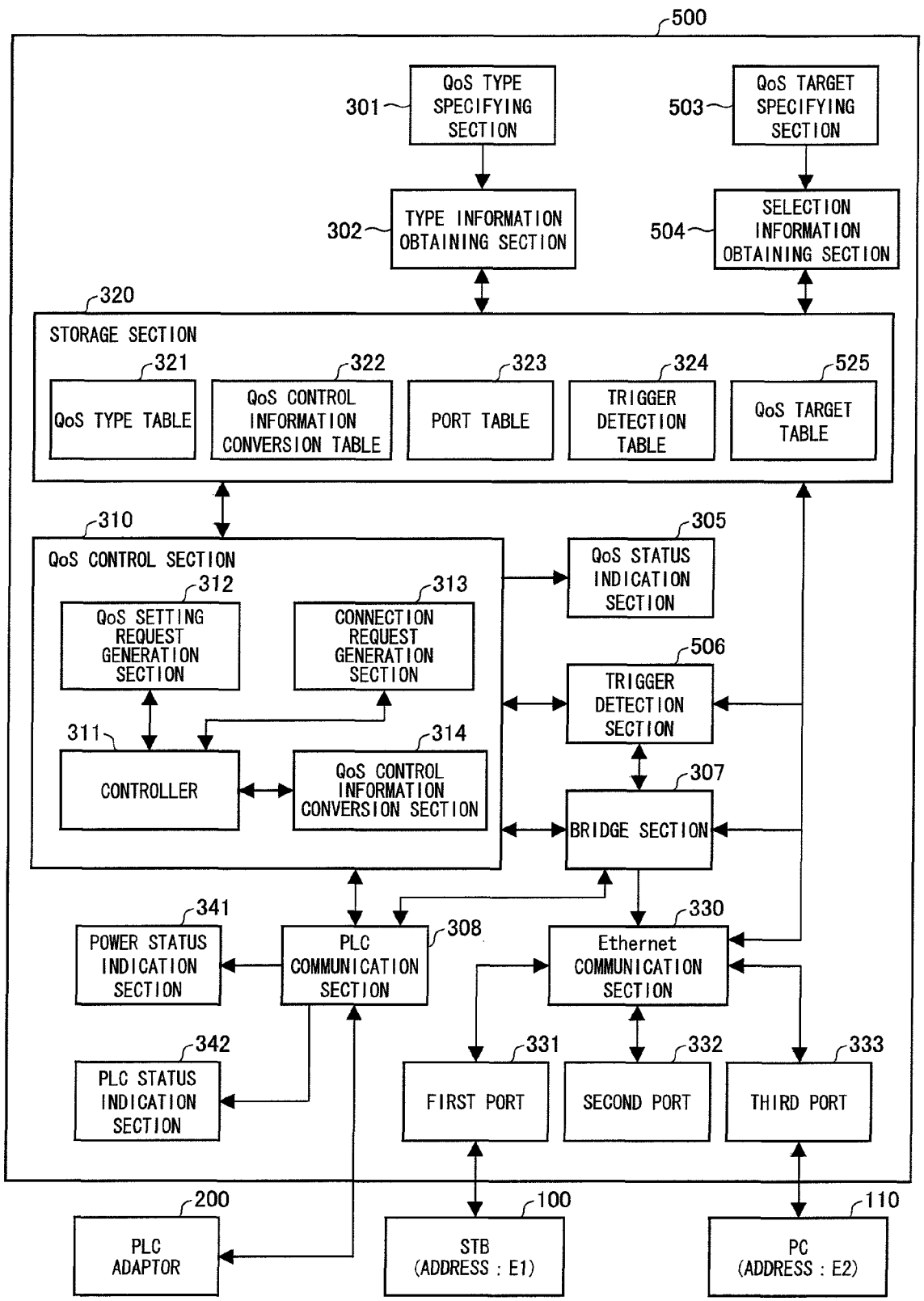
FIG. 32 is a functional block diagram illustrating an arrangement of a receiving-side PLC adaptor of Embodiment 5.

FIG. 32 is a functional block diagram showing an arrangement of the PLC adapter 500. As shown in FIG. 32, the PLC adapter 500 differs from the PLC adapter 300 in that the PLC adapter 500 includes the aforementioned QoS target specifying section 503, a selection information obtaining section 504, and a trigger detection section 506.

The selection information obtaining section 504 obtains selection information indicative of an input-output port (QoS control target input-output port) selected by the user via the QoS target specifying section 503 and records the selection information on a QoS target table 525 on which to record selection information. The selection information obtaining section 504 stores the QoS target table 525, on which the QoS type has been recorded, in the storage section 320.

FIG. 33 shows an example of the QoS target table 525. As shown in FIG. 33, the QoS target table 525 is a table that shows which of the three input-output ports has been specified as a QoS control target input-output port. FIG. 33 shows an example of a case where the first port 331 has been specified as a QoS control target input-output port. The QoS target table is not particularly limited in format and only needs to show which input-output port has been specified as a QoS control target input-output port. It is not necessary to tabulate selection information.

The trigger detection section 506 generates a trigger detection table 324 with use of (1) information, shown on the QoS target table 525, which specifies a QoS control target input-output port, (2) a QoS parameter outputted from the QoS control information conversion section 314, and (3) an Ethernet address shown on a port table 323 generated by the Ethernet communication section 330. The trigger detection section 506 uses the trigger detection table 324 to determine the necessity of QoS control corresponding to data that is outputted from the QoS control target input-output port. The trigger detection section 506 carries out the same trigger detection process as the trigger detection section 306.

<Regarding Flow of Processing in the Communication Network 410>

Figure 34:
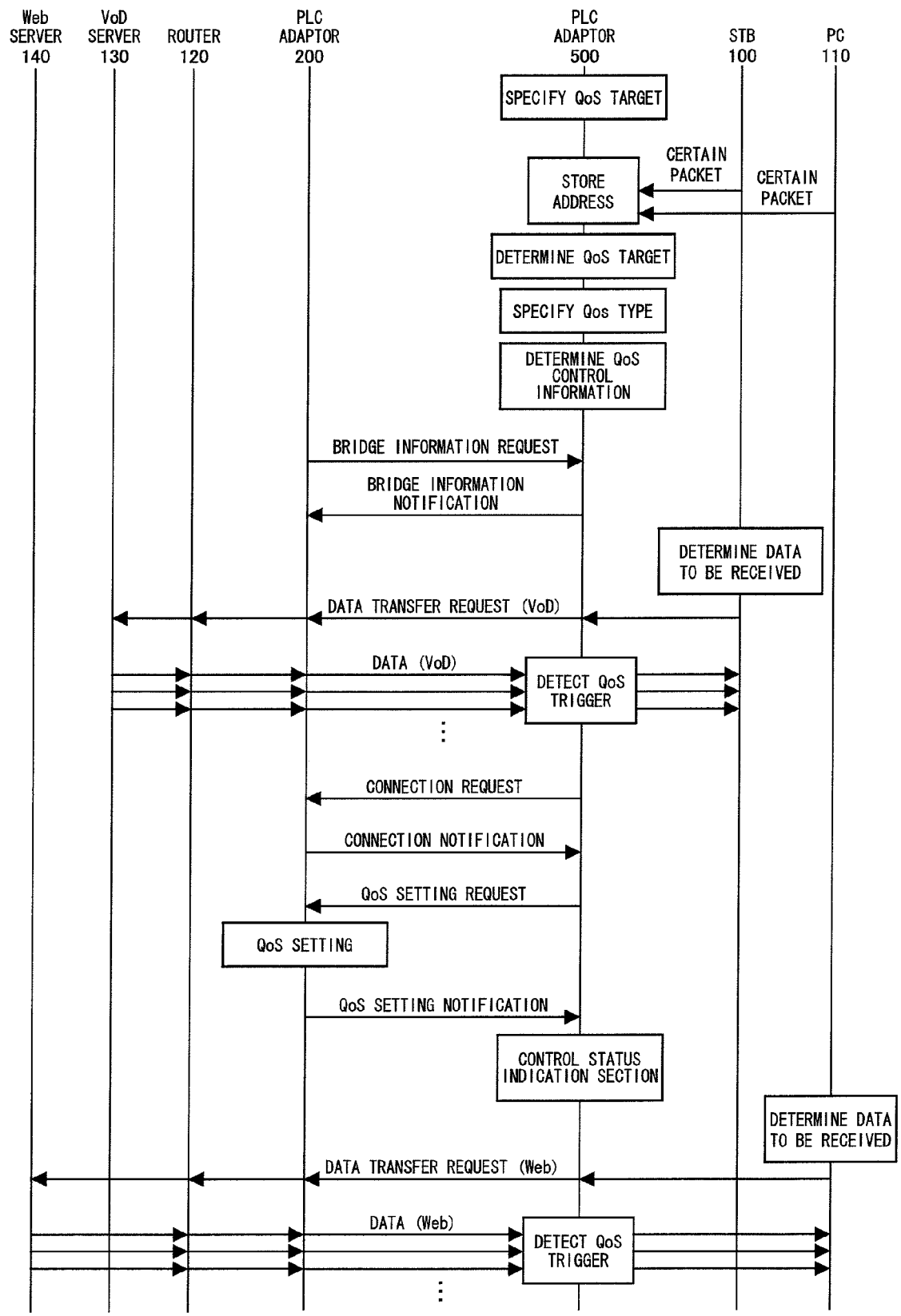
FIG. 34 is a flowchart illustrating communications among communication apparatuses in Embodiment 5.

The following describes the flow of processing in each communication apparatus with reference to FIG. 34. FIG. 34 is a flow chart showing communication between one communication apparatus and another in Embodiment 5. Processes identical to those described in Embodiment 4 will not be described.

When the user selects a QoS control target input-output port by operating the QoS target specifying section 503, selection information specifying the input-output port thus selected is outputted to the selection information obtaining section 504.

The selection information obtaining section 504 obtains the selection information, records it on the QoS target table 525, and then stores the QoS target table 525, on which the selection information has been recorded, in the storage section 320 ("QoS TARGET SETTING" in FIG. 34).

After that, the bridge section 307 obtains the address of an Ethernet device connected to the PLC adapter 500, and the type information obtaining section 302 obtains a QoS type via the QoS type specifying section 301. It should be noted that the selection information, the address of the Ethernet device, and the QoS type may be obtained in any order.

When the QoS type table 321 has been stored, the QoS control information conversion section 314 refers to the QoS control information conversion table 322 and determines a QoS parameter corresponding to the QoS type recorded on the QoS type table 321. The QoS control information conversion section 314 outputs the determined QoS parameter to the trigger detection section 506.

After that, the trigger detection section 506 generates a trigger detection table 324 with use of (1) information, shown on the QoS target table 525, which specifies a QoS control target input-output port, (2) a QoS parameter outputted from the QoS control information conversion section 314, and (3) an Ethernet address shown on port table 323 generated by the Ethernet communication section 330. The timing at which the trigger detection section 506 generates the trigger detection table 324 is not particularly limited, and the trigger detection section 506 only needs to generate the trigger detection table 324 at a point of time where the trigger detection section 506 becomes able to generate the trigger detection table 324.

The flow of subsequent processes is the same as the flow of processes shown in FIG. 24, and therefore will not be described.

<Regarding Modified Example of the QoS Target Specifying Section 503>

Figure 35:
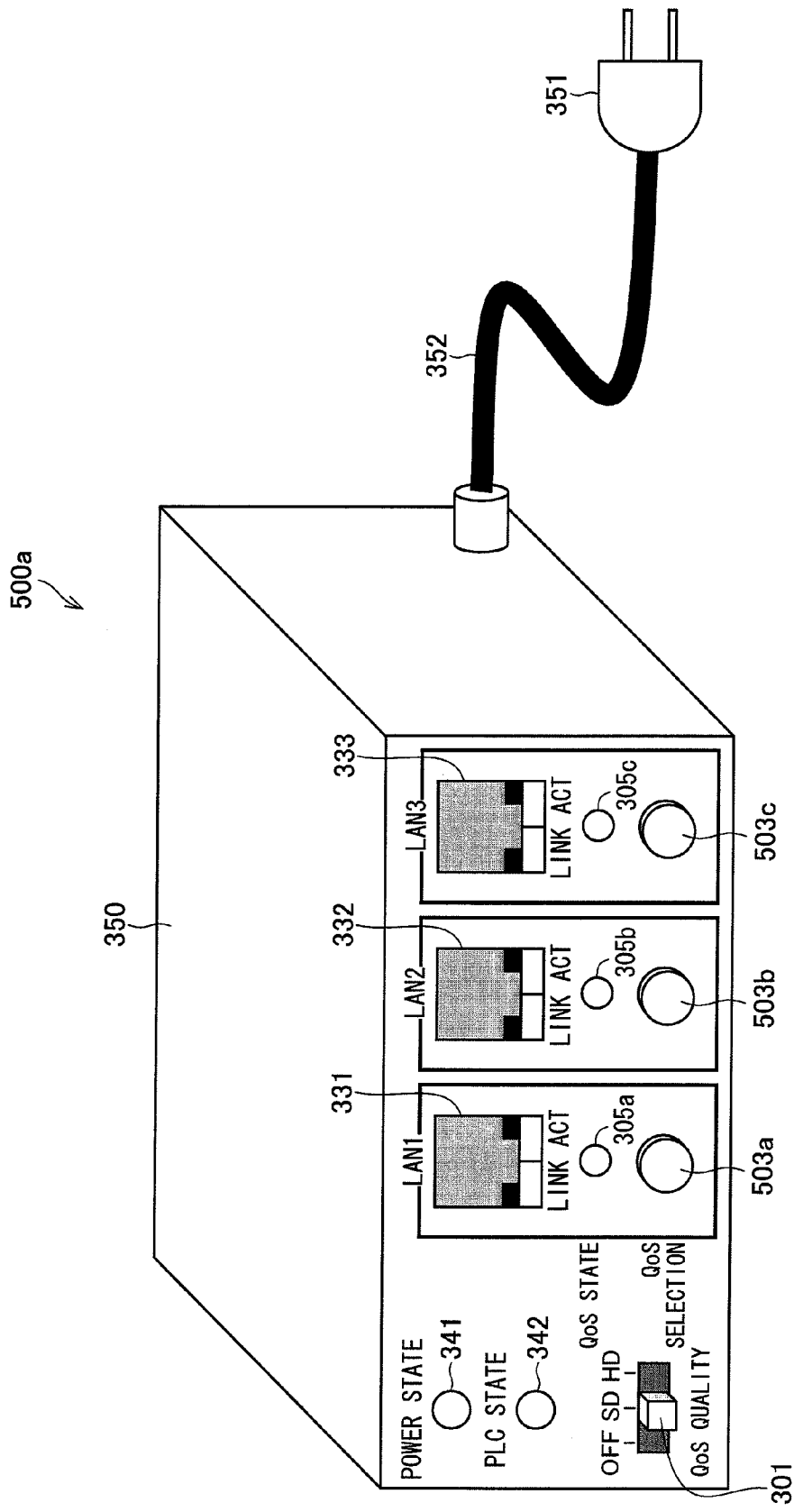
FIG. 35 is an oblique perspective view illustrating another appearance of the PLC adaptor in Embodiment 5.

The QoS target specifying section 503 may be arranged not as a slide-type switch but as push buttons, provided near their respective input-output ports, which make it possible to decide, for each input-output port, whether the input-output port is specified as a QoS control target input-output port. FIG. 35 shows the appearance of a PLC adapter 500*a* thus arranged.

As shown in FIG. 35, push buttons 503*a*, 503*b*, and 503*c* are provided near the first port 331, the second port 332, and the third port 333, respectively. Each of the push buttons is arranged such that every time it is pushed, the corresponding port switches between being set and reset as a QoS control target input-output port.

Also in case where a plurality of QoS control target input-output ports have been specified, a QoS type specified by operating the QoS type specifying section 301 is applied to all the QoS control target input-output ports.

Further, the input-output ports are provided with LEDs serving as QoS status indication sections 305*a* to 305*c*, respectively. The PLC adapter 500 controls these LEDs to show, for each input-output port, whether or not the input-output port has succeeded in QoS setting. Such an indication method is significant, for example, in case where although a bandwidth was reserved for the first port 331, no bandwidth was reserved for the second port 332.

Further, it is possible to determine, for each input-output port, whether or not the input-output port has been specified as a QoS control target input-output port. For example, it is possible that: in case where the input-output port has not been specified as a QoS control target input-output port, its corresponding LED is turned off; and in case where the input-output port has been specified as a QoS control target input-output port, its corresponding LED is turned on. In case where the LED is turned on, it is possible to simultaneously show success or failure in QoS setting by the frequency of emission of light by the LED and/or the color of light that the LED emits. For example, an LED corresponding to an input-output port is turned off in case where the input-output port has not been specified as a QoS control target input-output port, blinked in the case of failure in QoS setting, and made to shine steadily in the case of success in QoS setting.

That is, the QoS status indication sections 305*a* to 305*c* may function as QoS target indication means for a user to discriminate (distinguish) between a QoS control target output port and the other output ports.

Further, it is possible to provide only one LED as a QoS status indication section 305 and determine the status of QoS control by the color of the LED. For example, the LED may glow green in the case of success in QoS setting for all flows to be subjected to QoS control, glow yellow in the case of failure in QoS setting for one or more of the flows, and glow red in the case of failure in QoS setting for all the flows or in case where none of the ports has been specified as a QoS control target input-output ports. Such LED control is carried out by the control section 310.

It is possible to realize a QoS status indication section, for example, by providing a liquid crystal screen, instead of providing an LED.

<Regarding Effect of the Present Embodiment>

As described above, since the PLC adapter 500 includes the QoS target specifying section(s) 503 (or 503*a* to 503*c*), it is possible to specify any one of the plurality of input-output ports as a QoS control target input-output port. This makes it possible to easily specify a specific Ethernet device as a target of QoS control with Ethernet devices connected to a plurality of input-output ports and without exchanging one input-output port for another.

Embodiment 6

The present embodiment describes a PLC adapter 600 including QoS type specifying sections respectively corresponding to a plurality of QoS control target input-output ports. Members identical to those described in Embodiments 4 and 5 will be given the same reference numerals, and will not be described. Those processes which have been described above in Embodiments 1 to 5 will not be described at all or will only be described briefly. Further, the present embodiment mainly describes an example of a case where QoS control is carried out by Parameterized QoS (bandwidth assurance). However, as will be mentioned later, Prioritized QoS (priority control) may be applied to the present embodiment.

Figure 36:
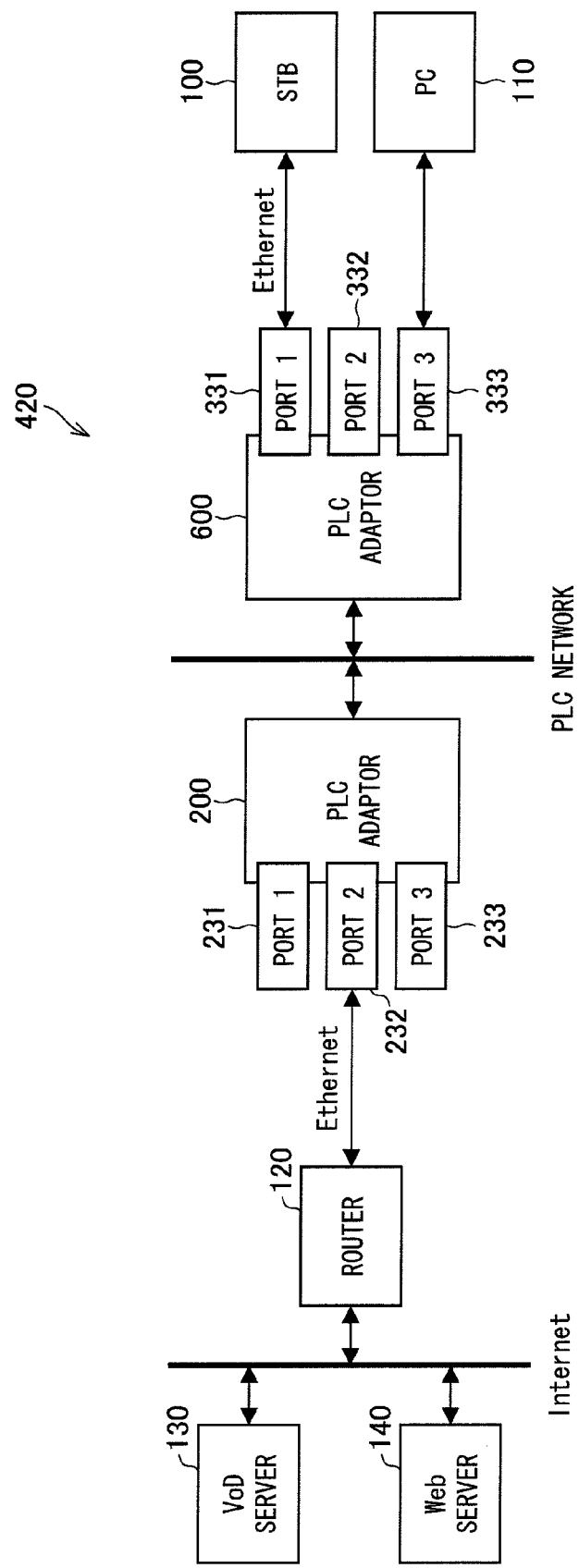
FIG. 36 is a diagram illustrating an arrangement of a communication network of Embodiment 6.

FIG. 36 shows an arrangement of a communication network 420 according to the present embodiment. As shown in FIG. 36, the communication network 420 differs from the communication network 400 in that the communication network 420 includes the PLC adapter 600 as a receiving PLC adapter.

Figure 37:
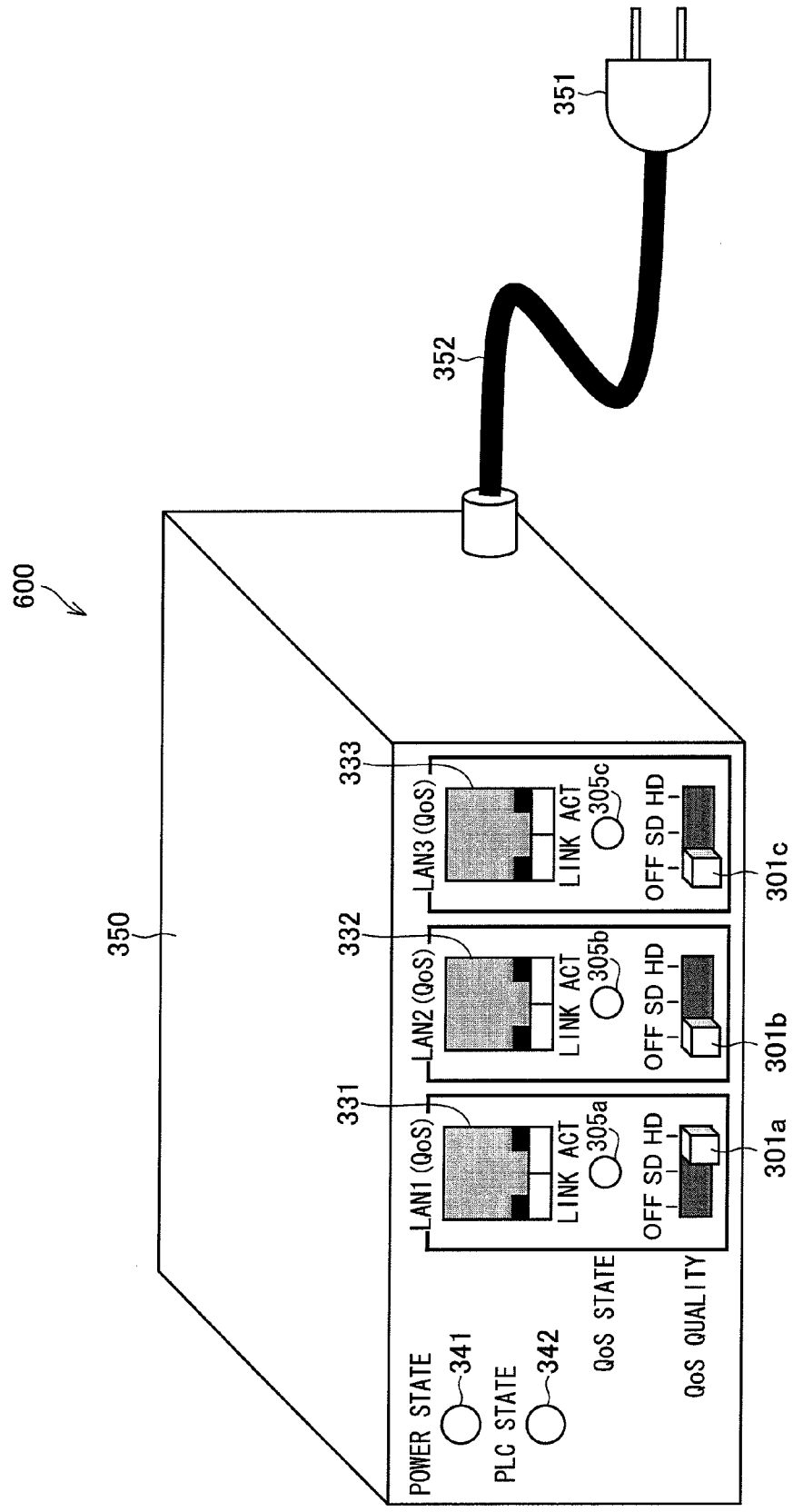
FIG. 37 is an oblique perspective view illustrating appearance of a PLC adaptor of Embodiment 6.

FIG. 37 is a perspective view of the appearance of the PLC adapter 600. As shown in FIG. 37, the PLC adapter 600 is provided with slide-type switches serving as a QoS type specifying sections 301*a*, a QoS type specifying section 301*b*, and a QoS type specifying section 301*c* for the first port 331, the second port 332, and the third port 333, respectively. Further, the input-output ports are provided with LEDs serving as QoS status indication section 305a to 305c. As mentioned above, it is possible to provide only one LED as a QoS status indication section 305 and determine the status of QoS control by the color of the LED.

Figure 38:
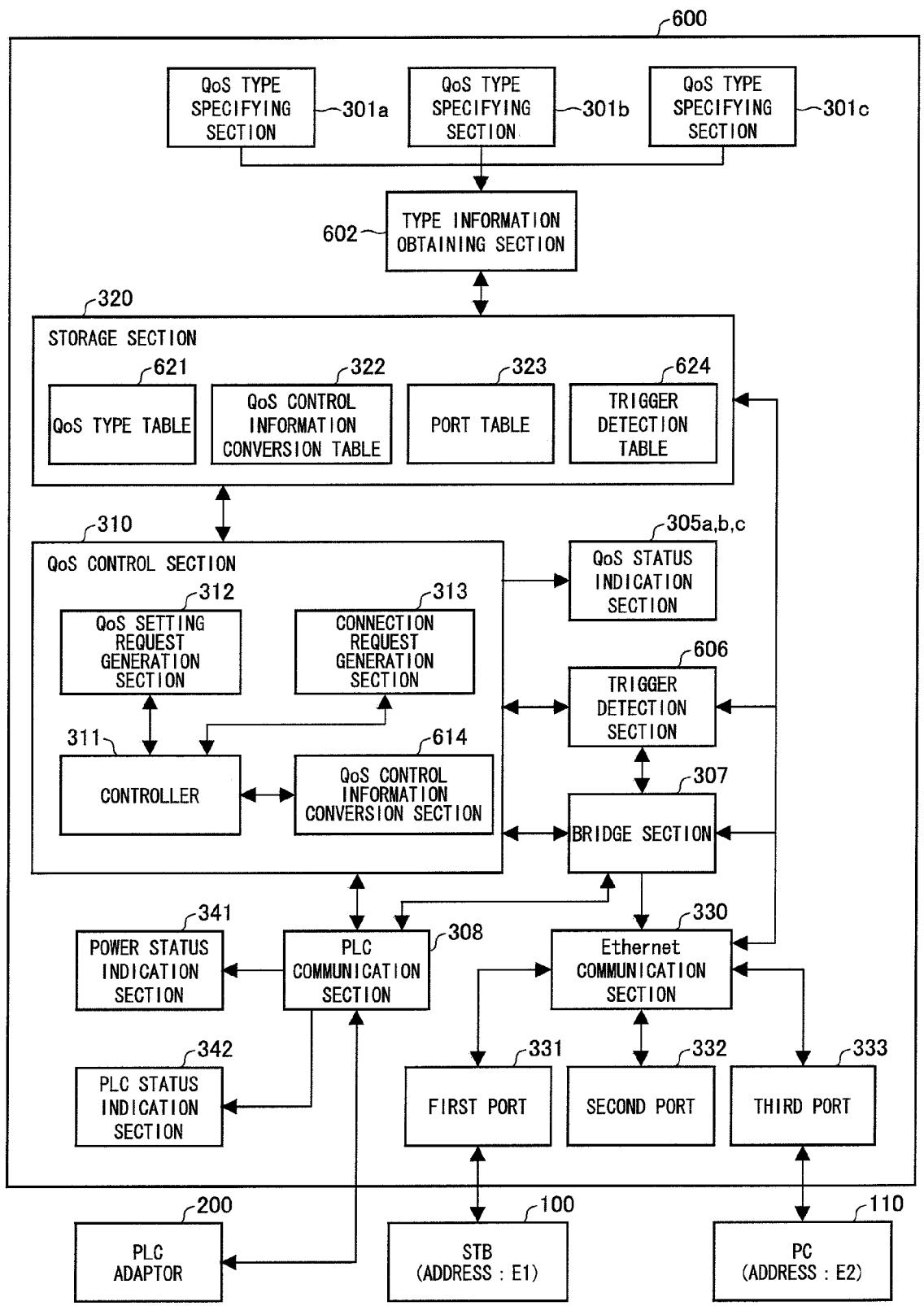
FIG. 38 is a functional block diagram illustrating an arrangement of a receiving-side PLC adaptor of Embodiment 6.

FIG. 38 is a functional block diagram showing an arrangement of the PLC adapter 600. As shown in FIG. 38, the PLC adapter 600 includes a type information obtaining section 602, a QoS control information conversion section 614, and a trigger detection section 606.

The type information obtaining section 602 obtains QoS types inputted by a user via the QoS type specifying sections 301a to 301c and records the QoS types on a QoS type table 621. The type information obtaining section 602 stores the QoS type table 612, on which the QoS types have been recorded, in the storage section 320.

FIG. 39 shows an example of the QoS type table 621. As shown in FIG. 39, the QoS type table 621 is a table that shows correspondence between each input-output port (first port 331, second port 332, third port 333) and the type of QoS control corresponding to data packets that are outputted from the input-output port. In the example shown in FIG. 39, the first port 331 has "HD" (HD image) specified as a QoS type therefor, and the second port 332 and the third port 333 are in a state ("OFF") where no QoS control has been specified.

The QoS control information conversion section 614 refers to the QoS control information conversion table 322 and thereby converts, into a QoS parameter that is used when the PLC adapter carries out QoS control, a QoS type shown on the QoS type table 621. The QoS control information conversion section 614 carries out such conversion on all QoS types shown on the QoS type table 621 (i.e., QoS types respectively corresponding to the input-output ports). The QoS control information conversion section 614 outputs, to the trigger detection section 606, a QoS parameter obtained as a result of conversion and an input-output port to which the QoS parameter is applied, with the QoS parameter and the input-output port associated with each other.

The trigger detection section 606 generates a trigger detection table 624 with use of a combination of the QoS parameter and the input-output port each outputted from the QoS control information conversion section 614 and an Ethernet address shown on the port table 323 generated by the Ethernet communication section 330.

FIG. 40 shows an example of the trigger detection table 624. As shown in FIG. 40, the trigger detection table 624 is a table that shows correspondence among the address of an Ethernet device connected to a QoS control target input-output port, a QoS parameter corresponding to data packets that are transmitted to the Ethernet device, and information on a history of the data packets received. FIG. 40 shows an example of a case where the QoS type for the first port 331 is "HD" and QoS control for the second port 332 and the third port 333 has been set to "OFF".

For example, in case where the QoS type for the third port 333 is "SD", such an entry is added to the trigger detection table 624 that the Ethernet address (E2) of the PC 110 connected to the third port 333, a QoS parameter (6 Mbps) for data packets that are transmitted to the Ethernet device, and information on a history of the data packets received have been associated with one another.

The trigger detection section 606 uses the trigger detection table 624 to determine the necessity of QoS control corresponding to data that is outputted from the QoS control target input-output port. The trigger detection section 606 carries out basically the same trigger detection process as the trigger detection section 306. However, the trigger detection section 606 carries out a trigger detection process for each QoS control target input-output port or, more accurately, for each Ethernet device connected to a QoS control target input-output port.

<Regarding Flow of Processing in the Communication Network 420>

The flow of processing in the communication network 420 is identical to the flow of FIG. 24, except that the trigger detection section 606 carries out a trigger detection process for each QoS control target input-output port as mentioned above. That is, upon the start of reception of data packets, the trigger detection section 606 determines, for each QoS control target input-output port, whether or not the aforementioned specific conditions have been satisfied. In case where the specific conditions have been satisfied, the trigger detection section 606 outputs, to the QoS control section 310, trigger detection information containing information specifying a QoS control target input-output port where the specific conditions have been satisfied.

Upon receiving the trigger detection information, the connection request generation section 313 generates a connection request packet regarding data packets that are outputted from the QoS control target input-output port indicated by the trigger detection information, and then transmits the connection request packet to the PLC adapter 200 via the PLC communication section 308. Further, the QoS setting request generation section 312 generates a QoS setting request packet regarding the data packets that are outputted from the QoS control target input-output port indicated by the trigger detection information, and then transmits the QoS setting request packet to the PLC adapter 200 via the PLC communication section 308.

<Regarding Effect of the Present Embodiment>

As described above, since the PLC adapter 600 includes QoS type specifying sections respectively corresponding to a plurality of QoS control target input-output ports, it is possible to set QoS control for each QoS control target input-output port even in case where there are a plurality of QoS control target input-output ports. This enables a user to set QoS control more in detail.

<Cases where a Plurality of Devices are Connected to a QoS Control Target Input-Output Port Via a Hub>

A plurality of devices, e.g., the STB 100 and the PC 110 may be connected to a single QoS control target input-output port via a hub. In this case, since the reception rate at which the PC 110 receives data packets is low when priority control is carried out only on data packets that are transmitted to the STB 100. Therefore, by setting a threshold for trigger detection so that the threshold takes on a value that is larger than the reception rate at which the PC 110 receives data packets and smaller than the reception rate at which the STB 100 receives data packets, it becomes possible to carry out control as to "carry out priority control only on data packets to the STB 100 without carrying out priority control on data packets to the PC 110". Further, in case where priority control is carried out on both data packets that are transmitted to the STB 100 and data packets that are transmitted to the PC 110, there is no compression of bandwidths when no data packet is being transmitted. Therefore, the receiving PLC adapter only needs to carry out a priority-control requesting process at a point of time where a QoS type has been selected.

Embodiment 7

The present embodiment describes a PLC adapter 700 that recognizes, as a QoS control target, an Ethernet device connected to the receiving PLC adapter during a QoS control target selection mode. Members identical to those described in Embodiment 4 will be given the same reference numerals, and will not be described. Those processes which have been described above in Embodiments 1 to 6 will not be described at all or will only be described briefly. Further, the present embodiment mainly describes an example of a case where QoS control is carried out by Parameterized QoS (bandwidth assurance). However, as will be mentioned later, Prioritized QoS (priority control) may be applied to the present embodiment.

Figure 41:
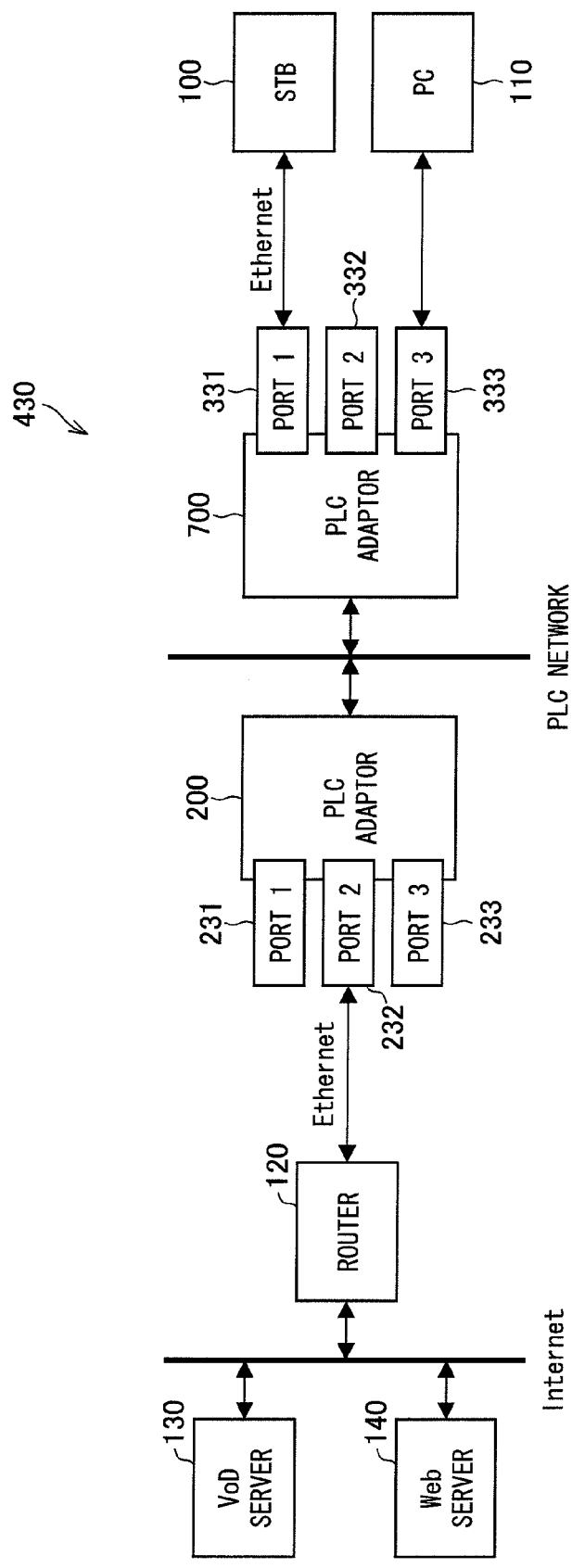
FIG. 41 is a diagram illustrating an arrangement of a communication network of Embodiment 7.

FIG. 41 shows an arrangement of a communication network 430 according to the present embodiment. As shown in FIG. 41, the communication network 430 differs from the communication network 400 in that the communication network 430 includes the PLC adapter 700 as a receiving PLC adapter.

Figure 42:
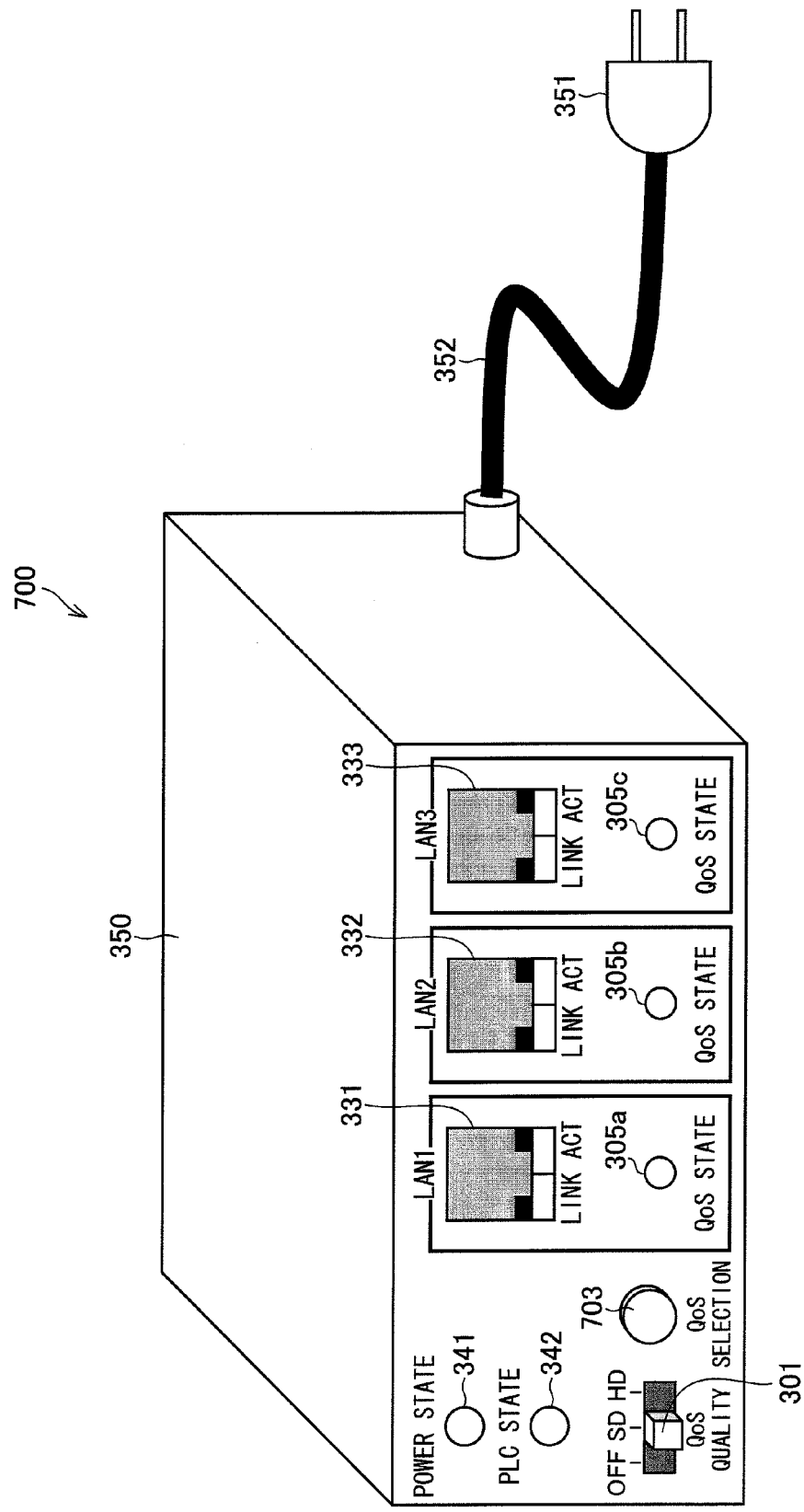
FIG. 42 is an oblique perspective view illustrating appearance of a PLC adaptor of Embodiment 7.

FIG. 42 is a perspective view of the appearance of the PLC adapter 700. As shown in FIG. 42, the PLC adapter 700 includes a push button serving as a mode switching section (period information specifying means) 703. The mode switching section 703 is a switch for switching between a normal mode and a QoS selection mode. The QoS selection mode is a mode in which to recognize an Ethernet device to be subjected to QoS control, and an Ethernet device connected to the PLC adapter 700 during the QoS selection mode is recognized as a target of QoS control. In other words, the mode switching section 703 serves for a user to specify a period of time during which the after-mentioned Ethernet communication section 703 obtains the address of the Ethernet device.

The mode switching section 703 may be a switch other than a push button, e.g., a slide-type switch as long as it serves for a user to specify a period of time during which an Ethernet device to be subjected to QoS control is recognized.

The PLC adapter 700 is provided with a QoS type specifying section 301 that serves to specify the type of QoS control common to data packets that are transmitted to one or more Ethernet devices recognized as targets of QoS control.

Figure 43:
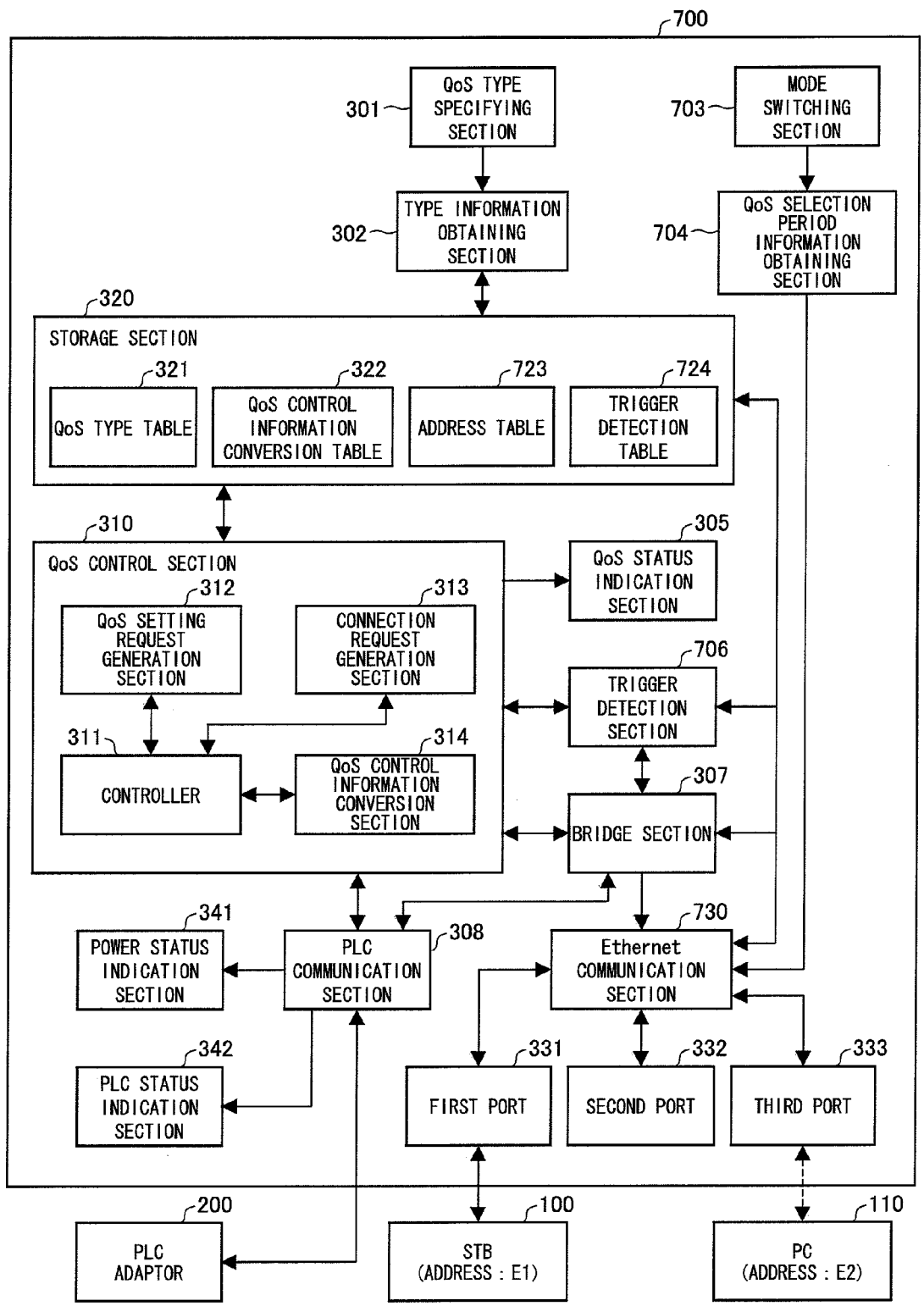
FIG. 43 is a functional block diagram illustrating an arrangement of the receiving-side PLC adaptor of Embodiment 7.

FIG. 43 is a functional block diagram showing an arrangement of the PLC adapter 700. As shown in FIG. 43, the PLC adapter 700 includes the aforementioned mode switching section 703, a QoS selection period information obtaining section 704, a trigger detection section 706, and an Ethernet communication section (identification information obtaining means) 730.

The QoS selection period information obtaining section 704 obtains QoS selection period information inputted by the user's operating the mode switching section 703, and then outputs the QoS selection period information to the Ethernet communication section 730. The QoS selection period information is information indicative of a period of time during which an Ethernet device to be subjected to QoS control is recognized. In a period of time indicated by the QoS selection period information, the Ethernet communication section 730 obtains an Ethernet address (identification information) for identifying an Ethernet device connected to the PLC adapter 700.

The QoS selection period information obtaining section 704 may output, as the QoS selection period information to the Ethernet communication section 730, information indicating whether the QoS selection mode or the normal mode has been specified and, only in case where the QoS selection mode has been specified, output information to the Ethernet communication section 730 to that effect.

Further, it is possible that the duration of the QoS selection mode is determined in advance (e.g., one minute) and the QoS selection period information obtaining section 704 outputs, as the QoS selection period information to the Ethernet communication section 730, information indicating that the QoS selection mode has been selected. In this arrangement, the switch from the QoS selection mode to the normal mode is made at a point of time where a predetermined period of time has elapsed since the QoS selection mode was selected.

Further, while the user is pushing the push button serving as the mode switching section 703, the QoS selection period information obtaining section 704 may output, as the QoS selection period information to the Ethernet communication section 730, information indicating that the QoS selection mode has been selected.

Further, the duration of the QoS selection mode may be determined in advance. For example, it is possible that the QoS selection mode continues for a certain period of time (e.g. 30 seconds) after the PLC 700 is powered on. Such information indicating the duration of the QoS selection mode only needs to be stored in the storage section 320. That is, the storage section (period information storing means) 320 stores therein period information indicative of a period of time during which the Ethernet communication section 730 obtains an Ethernet address. Then, the Ethernet communication section 730 obtains an Ethernet address in a period of time indicated by the period information stored in the storage section 320.

The following description assumes that: upon selection of the QoS selection mode, the QoS selection period information obtaining section 704 outputs QoS selection start information to the Ethernet communication section 730 to that effect; and upon cancellation of the QoS selection mode (i.e., upon switch to the normal mode), the QoS selection period information obtaining section 704 outputs QoS selection stop information to the Ethernet communication section 730.

It is preferable that the QoS selection mode be distinguished from the normal mode, for example, by causing an LED serving as the QoS status indication section 305 or the PLC status indication section 342 to glow a specific color. That is, it is possible to cause the QoS status indication section 305 or the PLC status indication section 342 to function as period information indication means for showing that the QoS selection mode is being used.

Further, as mentioned above, the LEDs serving as the QoS status indication sections 305 may be integrated into one.

In a period of time between a point of time where the Ethernet communication section 730 receives QoS selection start information and at a point of time where the Ethernet communication section 730 receives QoS selection stop information, the Ethernet communication section 730 obtains the Ethernet address of an Ethernet device connected to the PLC adapter 700 and records the obtained address on an address table 723. That is, the Ethernet communication section 730 obtains the Ethernet address in the period of time specified via the mode switching section 703.

FIG. 44 shows an example of the address table 723. As shown in FIG. 44, the address table 723 is a table containing the addresses of Ethernet devices and QoS target specifying information for specifying which of the addresses is the address of an Ethernet device connected to an input-output port during the QoS selection mode. FIG. 44 shows an example of a case where the STB 100, whose Ethernet address is "E1", is connected to the PLC adapter 700 during the QoS selection mode and the PC 110, whose Ethernet address is "E2", is connected to the PLC adapter 700 during the normal mode.

Further, in FIG. 44, the Ethernet address of the Ethernet device that had been connected during the QoS selection mode is given information "REQUIRED" indicating that QoS control is required and the Ethernet address of the Ethernet device that had not been connected during the QoS selection mode is given information "NOT REQUIRED" indicating that QoS control is not required. These pieces of information serve as the QoS target specifying information. The QoS target specifying information only needs to specify an Ethernet device that had been connected to the PLC adapter 700 during the QoS selection mode.

The trigger detection section 706 generates a trigger detection table 724 with use of a QoS parameter outputted from the QoS control information conversion section 314 and the Ethernet address, shown on the address table 723 generated by the Ethernet communication section 730, of an Ethernet device to be subjected to QoS control. The trigger detection section 706 uses the trigger detection table 724 to determine the need for QoS control corresponding to data that is transmitted to the Ethernet device to be subjected to QoS control. The trigger detection section 706 carries out the same trigger detection process as the trigger detection section 606.

<Regarding Flow of Processing in the Communication Network 430>

Figure 45:
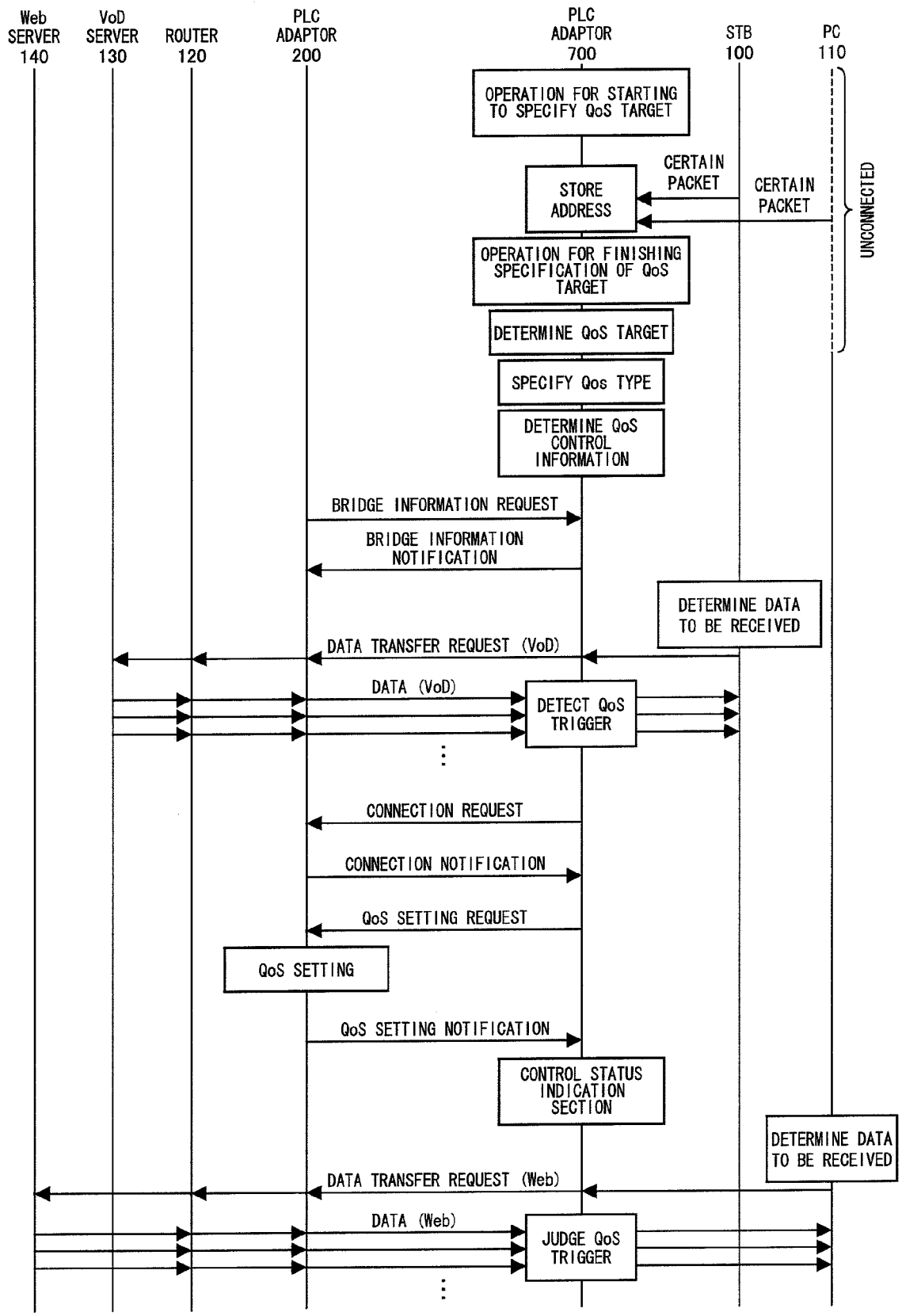
FIG. 45 is a flowchart illustrating communications among communication apparatuses in Embodiment 7.

The following describes the flow of processing in each communication apparatus with reference to FIG. 45. FIG. 45 is a flow chart showing communication between one communication apparatus and another in Embodiment 7. Processes identical to those described in Embodiment 4 will not be described.

First, when the user selects the QoS selection mode through operation of the mode switching section 703 with the STB 100 connected to the first port 331 ("QoS TARGET SPECIFICATION START OPERATION" in FIG. 45), the information (QoS selection period information) is outputted to the QoS selection period information obtaining section 704.

Upon receiving the information, the QoS selection period information obtaining section 704 outputs the QoS selection start information to the Ethernet communication section 730.

Upon receiving the QoS selection start information, the Ethernet communication section 730 obtains the Ethernet address of an Ethernet device connected to the PLC adapter 700 at that point of time. This Ethernet address can be obtained through detection of a source address given to some sort of packet transmitted from the Ethernet device to the PLC adapter 700. Since an Ethernet device spontaneously transmits some sort of packet, for example, in order to discover an address, it is possible to obtain the Ethernet address of each device. However, in order to obtain an address more surely, the PLC adapter may transmit, to the Ethernet device, some sort of packet that requires a response. For example, it is conceivable to transmit an ARP packet.

In the present embodiment, only the STB 100 is connected during the QoS selection mode and the Ethernet communication section 730 records the source address (E1) of a packet received from the STB 100 during the QoS selection mode. In so doing, the source address (E1) is recorded on the address table 723 as the address of an Ethernet device to be subjected to QoS control. That is, the Ethernet communication section 730 records the necessity of QoS as "REQUIRED" for the Ethernet address (E1) of the STB 100 ("ADDRESS STORAGE" in FIG. 45).

After that, when the user cancels the QoS selection mode through operation of the mode switching section 703 ("QoS TARGET SPECIFICATION ENDING OPERATION" in FIG. 45), the information is outputted to the QoS selection period information obtaining section 704. The QoS selection period information obtaining section 704 outputs the QoS selection stop information to the Ethernet communication section 730.

Upon receiving the QoS selection stop information, the Ethernet communication section 730 ends the recognition of an Ethernet device to be subjected to QoS control. That is, even if the Ethernet communication section 730, which has received the QoS selection stop information, receives some sort of packet from an Ethernet device connected to the PLC adapter 700, the Ethernet communication section 730 does not add the Ethernet device as a target of QoS control.

Therefore, in case where the PC 110 is connected to the third port 333 after the user has canceled the QoS selection mode, the Ethernet communication section 730 adds the Ethernet address (E2) of the PC 110 to the address table 723 but records "NECESSITY OF QoS" as "NOT REQUIRED".

After that, the type information obtaining section 302 obtains a QoS type via the QoS type specifying section 301. Further, the trigger detection section 706 generates a trigger detection table 724 with use of a QoS parameter outputted from the QoS control information conversion section 314 and the Ethernet address, which is shown on the address table 723 generated by the Ethernet communication section 730, of an Ethernet device to be subjected to QoS control. In case where there exist a plurality of Ethernet devices to be subjected to QoS control, QoS parameters for data packets that are transmitted to those Ethernet devices take on the same value.

The flow of subsequent processes is the same as the flow of processes shown in FIG. 24, except that the trigger detection section 706 carries out a trigger detection process for each Ethernet device (QoS control target) as mentioned above.

That is, upon the start of reception of data packets, the trigger detection section 706 determines, for each Ethernet device, whether or not the aforementioned specific conditions have been satisfied. In case where the specific conditions have been satisfied, the trigger detection section 706 outputs, to the QoS control section 310, trigger detection information containing information containing the Ethernet address of an Ethernet device where the specific conditions have been satisfied.

Upon receiving the trigger detection information, the connection request generation section 313 generates a connection request packet regarding data packets that are transmitted to the Ethernet device whose Ethernet address is contained in the trigger detection information, and then transmits the connection request packet to the PLC adapter 200 via the PLC communication section 308. Further, the QoS setting request generation section 312 generates a QoS setting request packet regarding the data packets that are transmitted to the Ethernet device whose Ethernet address is contained in the trigger detection information, and then transmits the QoS setting request packet to the PLC adapter 200 via the PLC communication section 308.

That is, the QoS setting request generation section 312 generates a QoS setting request packet for QoS control over the PLC network for data packets that are transmitted to an Ethernet device indicated by an Ethernet address obtained by the Ethernet communication section 730.

It should be noted that the address of an Ethernet device and a QoS type may be obtained in any order.

<Regarding Case where a Plurality of Devices have been Connected to a Single Input-Output Port Via a Hub>

A plurality of Ethernet devices may be connected to a single input-output port via a hub. In this case, the Ethernet communication section 730 provides the address table 723 with entries corresponding in number to Ethernet addresses discovered, and the trigger detection section 706 only carries out a trigger detection process for each of the entries. There is basically no change in processing.

<Regarding Effect of the Present Embodiment>

As described above, the PLC adapter 700 sets QoS control for each Ethernet device having been connected to the PLC adapter 700 during the QoS selection mode. Therefore, it is possible to set QoS control individually for each Ethernet device. In particular, in case where a plurality of Ethernet devices have been connected to a single input-output port via a hub, it is possible to set QoS individually for each Ethernet device.

Embodiment 8

The present embodiment describes a PLC adapter 800 having a plurality of QoS control target input-output ports for each of which the setting content of QoS control has been predetermined. Members identical to those described in Embodiment 4 will be given the same reference numerals, and will not be described. Those processes which have been described above in Embodiments 1 to 7 will not be described at all or will only be described briefly.

<Regarding Arrangement of the PLC Adapter 800>

Figure 46:
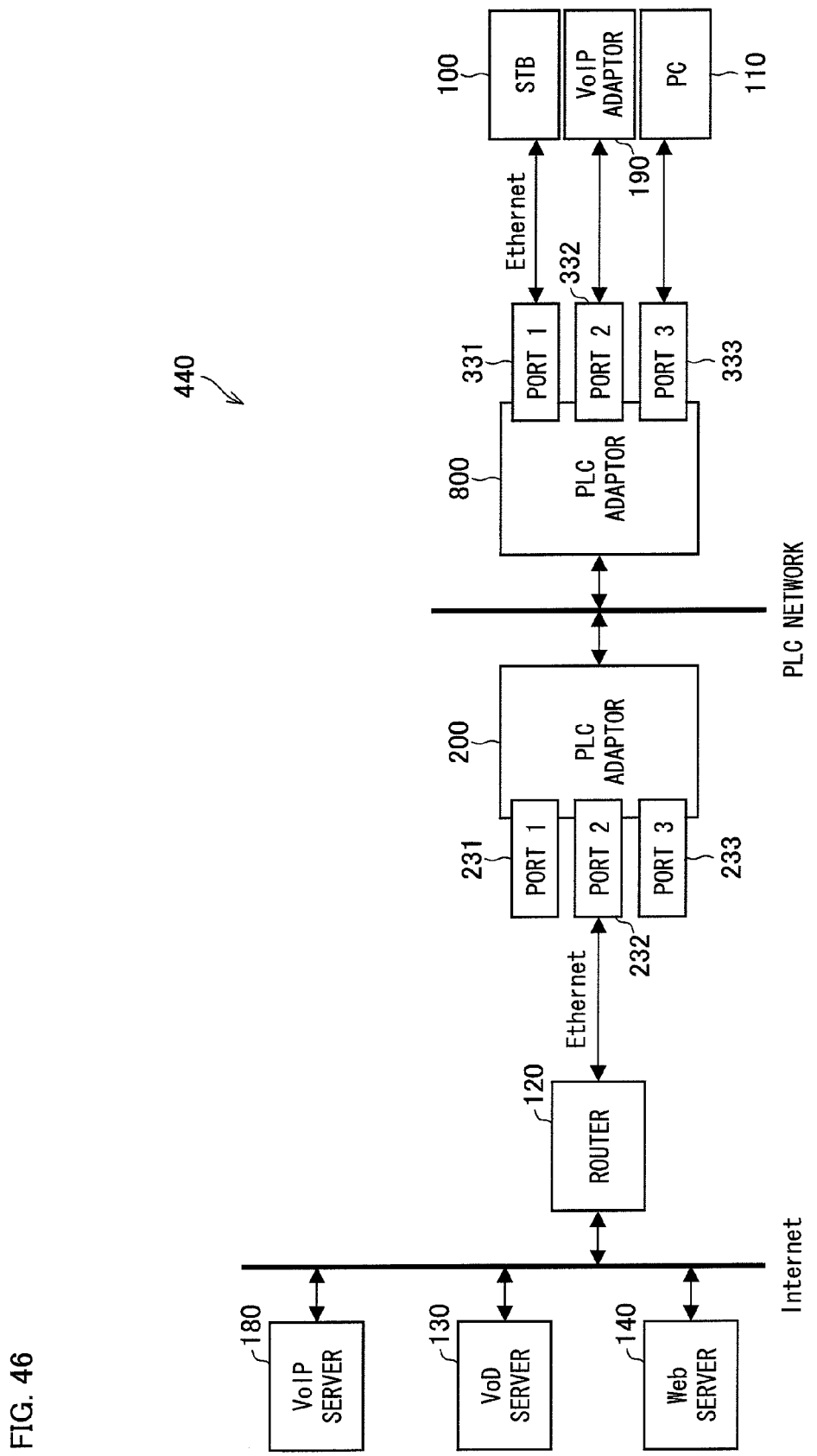
FIG. 46 is a diagram illustrating an arrangement of a communication network of Embodiment 8.

FIG. 46 shows an arrangement of a communication network 440 according to the present embodiment. As shown in FIG. 46, the communication network 440 differs from the communication network 400 in that the communication network 440 includes the PLC adapter 800 as a receiving PLC adapter. Further, the router 120 has a VoIP server 180 connected thereto via the Internet, and the PLC adapter 800 a VoIP adapter 190 connected thereto. The VoIP adapter 190 has a telephone connected thereto. However, the telephone is irrelevant to the essence of the present invention, and therefore will not be shown. Further, although it is supposed that two VoIP adapters exchange data with each other via the VoIP server, FIG. 46 shows only one of the two VoIP adapters.

Figure 47:
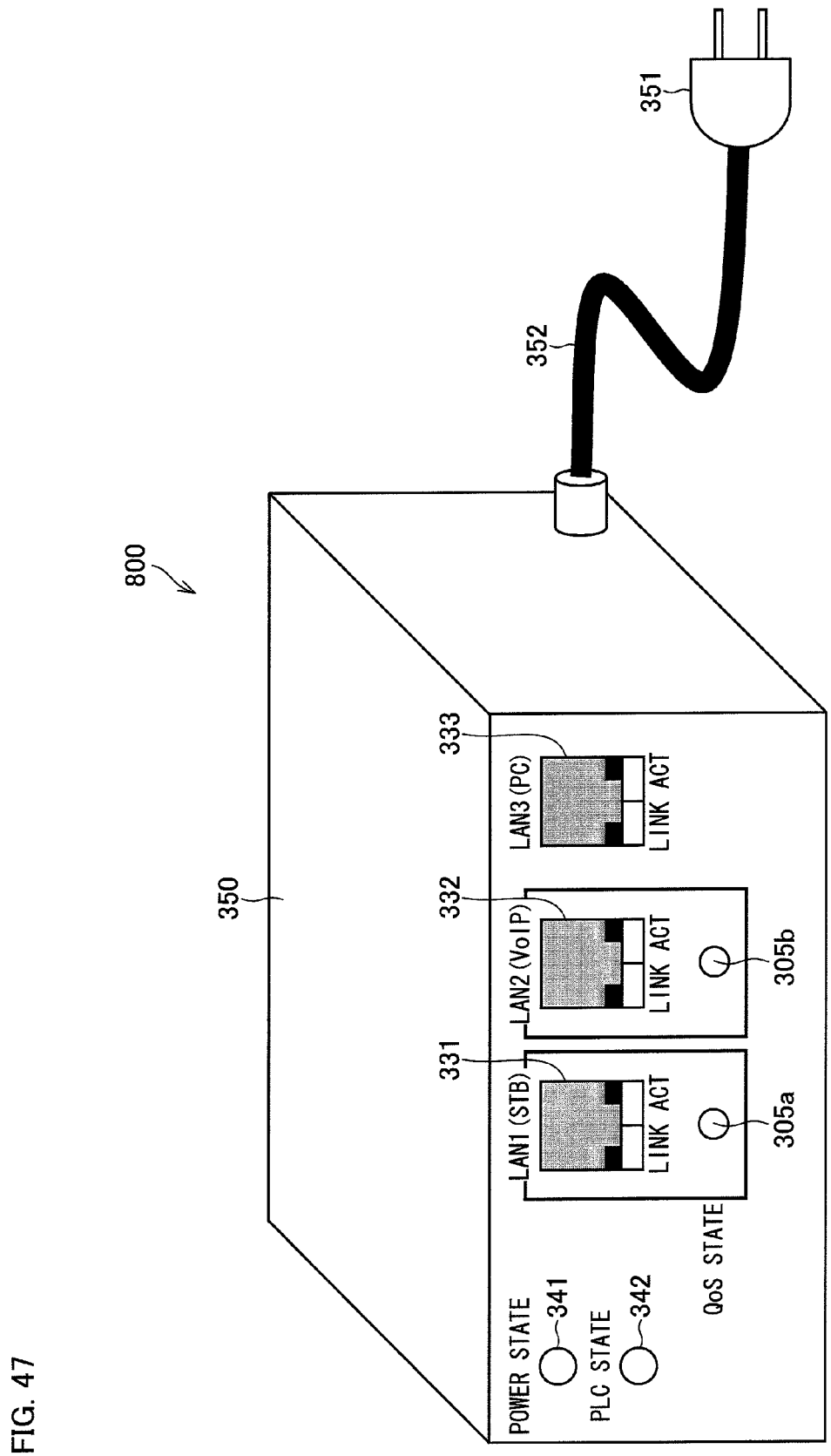
FIG. 47 is an oblique perspective view illustrating appearance of a PLC adaptor of Embodiment 8.

FIG. 47 is a perspective view of the appearance of the PLC adapter 800. As shown in FIG. 47, the PLC adapter 800 includes a first port 331 and a second port 332 each serving as a QoS control target input-output port and a third port 333 for use in normal data transmission. The first port 331 is an input-output port for an STB, and the second port 332 is an input-output port for a VoIP. Further, the third port 333 is an input-output port for a device, such as a PC, that carries out normal transmission.

That is, each of the three ports of the PLC adapter 800 is a port for which the existence of QoS control corresponding to data packets that are outputted therefrom and the type (setting content) of QoS control have been predetermined. Moreover, the setting content of QoS control is defined for each input-output port so that QoS control corresponding to data packets that are outputted from the input-output port becomes suitable for an Ethernet device supposed to be connected to the input-output port.

The setting content of QoS control is stored in the storage section 320. That is, the storage section 320 stores therein QoS type information indicative of the type of QoS control. Then, the QoS setting request generation section 312 generates a QoS setting request packet containing, as information for defining the content of QoS control required by the PLC adapter 800, the QoS type information stored in the storage section 320.

Specifically, an STB to be connected to the first port 331 is supposed to receive HD images by streaming, and it is stipulated that data packets that are outputted from the first port 331 are guaranteed a bandwidth of 16 Mbps in a PLC interval. Further, a VoIP adapter to be connected to the second port 332 is supposed to exchange audio data in the order of 200 kbps with a VoIP server by streaming, and it is stipulated that data packets that are inputted to and outputted from the second port 332 are subjected to priority control with high priority in a PLC interval. Such stipulations are provided because transmission of telephone audio data does not require a wide bandwidth but requires keeping a delay in data to minimum.

Further, a device to be connected to the third port 333 is supposed to be a PC or the like that receives comparatively low-rate data such as Web content from a Web server, and it is stipulated that data packets that are outputted from the third port 333 are normally transmitted in a PLC interval. Other than the PC, such a device as a game machine or TV that functions as a Web browser may be connected.

It should be noted that the PLC adapter 800 may include a plurality of input-output ports of the same kind.

Further, the QoS status indication sections 305a and 305b display success or failure in QoS setting as mentioned above.

Figure 48:
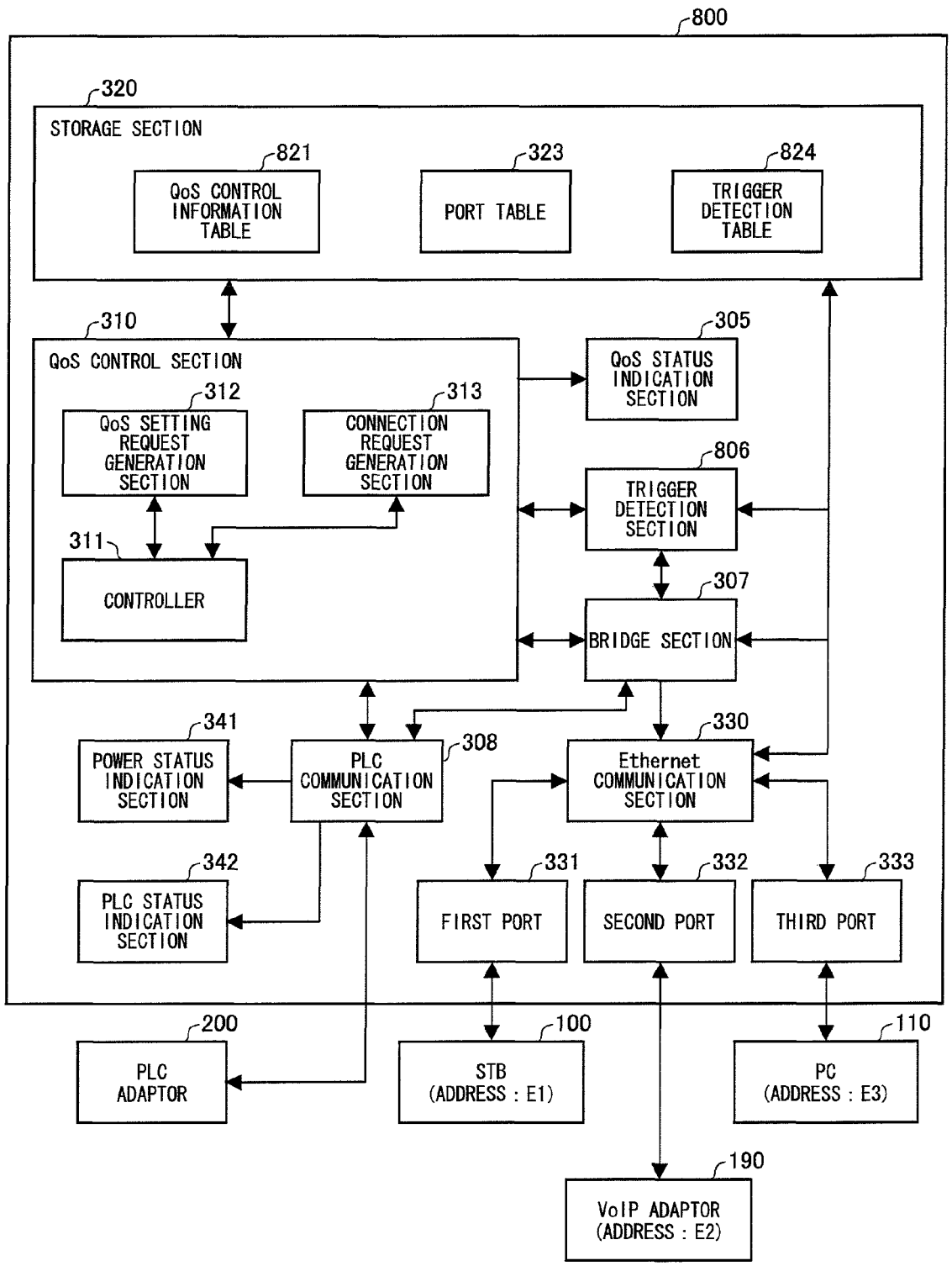
FIG. 48 is a functional block diagram illustrating an arrangement of a receiving-side PLC adaptor of Embodiment 8.

FIG. 48 is a functional block diagram showing an arrangement of the PLC adapter 800. As shown in FIG. 48, the PLC adapter 800 includes a trigger detection section 806 with a QoS control information table 821 stored in the storage section 320. Further, the QoS control section 310 has no QoS control information conversion section 314.

FIG. 49 shows an example of the QoS control information table 821. The QoS control information table 821 is a table that associates, with the three ports, the existence of QoS control corresponding to data packets that are outputted therefrom and the types of QoS control.

In the example shown in FIG. 49, a method of QoS control (whether bandwidth assurance or priority control), priority, and a bandwidth to be reserved for QoS control are stipulated for each input-output port as QoS control information. QoS control information to be stipulated on the QoS control information table 821 is not limited to that shown in FIG. 49.

The trigger detection section 806 generates a trigger detection table 824 with use of QoS control information shown on the QoS control information table 821 for each input-output port and an Ethernet address shown on the port table 323 generated by the Ethernet communication section 330.

FIG. 50 shows an example of the trigger detection table 824. As shown in FIG. 50, the trigger detection table 824 is a table that shows correspondence between QoS control information shown on the QoS control information table 821 for each input-output port and the Ethernet address of an Ethernet device. The STB 100, whose Ethernet address is "E1", is in connection with the first port 331, and the VoIP adapter 190, whose Ethernet address is "E2", is in connection with the second port 332. Therefore, "E1" is associated with the QoS control information regarding the first port 331, and "E2" is associated with the QoS control information regarding the second port 332. Further, since the third port 333 is not a target of QoS control, the trigger detection table 824 does not contain the address ("E3") of the PC 110 connected to the third port 333.

The trigger detection section 806 uses the trigger detection table 824 to determine the need for QoS control corresponding to data that is outputted from a QoS control target input-output port. The trigger detection section 806 carries out the same trigger detection process as the trigger detection section 606.

<Regarding Flow of Processing in the Communication Network 440>

Figure 51:
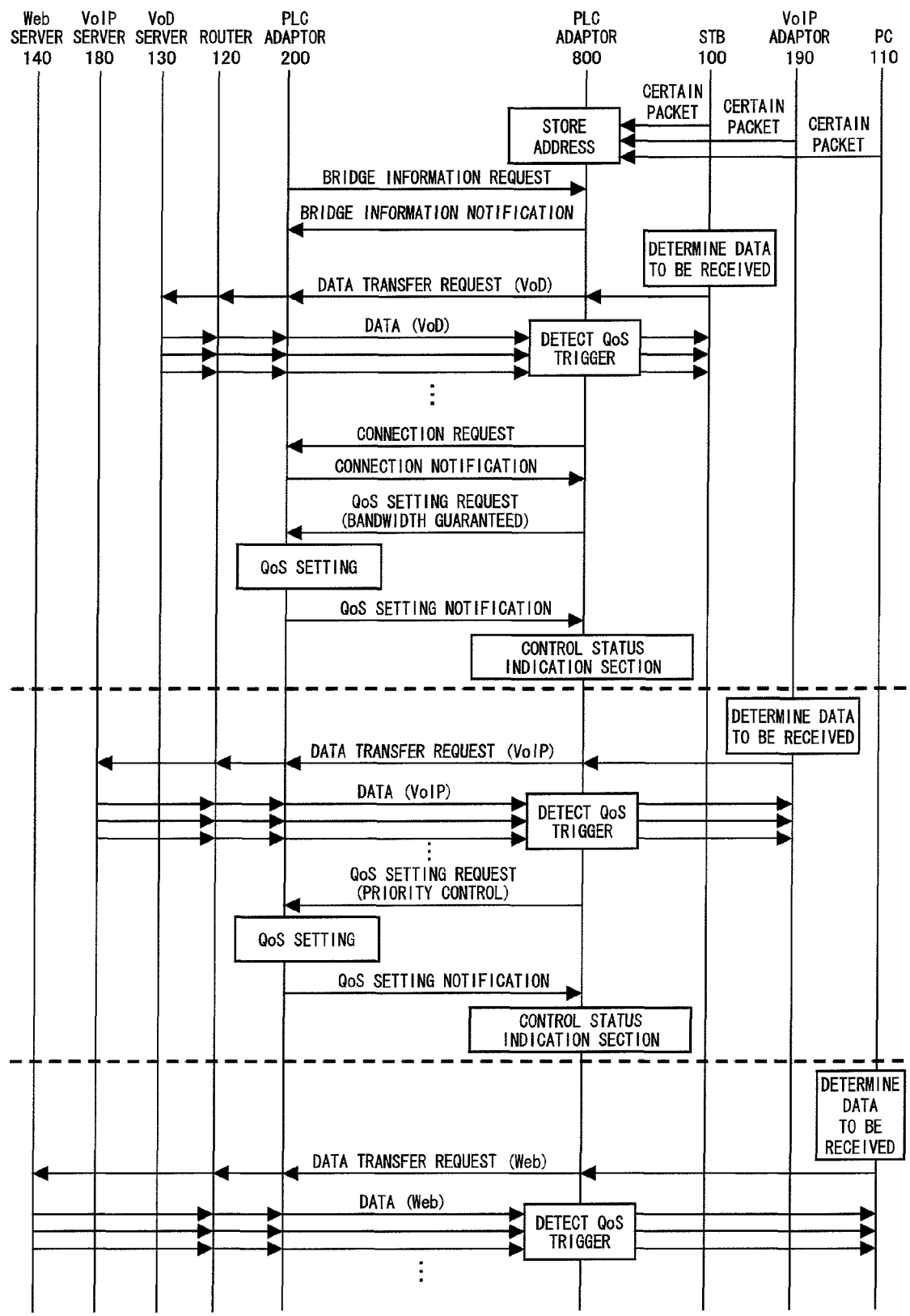
FIG. 51 is a flowchart illustrating communications among communication apparatuses in Embodiment 8.

The following describes the flow of processing in each communication apparatus with reference to FIG. 51. FIG. 51 is a flow chart showing communication between one communication apparatus and another in Embodiment 8. Processes identical to those described in Embodiment 4 will not be described.

The Ethernet communication section 330 detects a source address given to some sort of packet transmitted from an Ethernet device to the PLC adapter 800 and thereby obtains the Ethernet address of the Ethernet device. Then, the Ethernet communication section 330 records the obtained Ethernet address on the port table 323 ("ADDRESS STORAGE" in FIG. 51).

After that, the trigger detection section 806 generates a trigger detection table 824 with use of QoS control information shown on the QoS control information table 821 for each input-output port and an Ethernet address shown on the port table 323 generated by the Ethernet communication section 330.

The flow of subsequent processes is the same as the flow of processes shown in FIG. 24, except that the trigger detection section 806 carries out a trigger detection process for each Ethernet device as mentioned above.

That is, upon the start of reception of data packets, the trigger detection section 806 determines, for each QoS control target input-output port, whether or not the aforementioned specific conditions have been satisfied. In case where the specific conditions have been satisfied, the trigger detection section 806 outputs, to the QoS control section 310, trigger detection information containing information specifying a QoS control target input-output port where the specific conditions have been satisfied.

Upon receiving the trigger detection information, the connection request generation section 313 refers to the QoS control information table 821. In case where bandwidth assurance is required, the connection request generation section 313 generates a connection request packet regarding data packets that are outputted from a QoS control target input-output port indicated by the trigger detection information, and then transmits the connection request packet to the PLC adapter 200 via the PLC communication section 308. In case where priority control is required, no connection request packet is generated. Further, the QoS setting request generation section 312 generates a QoS setting request packet regarding the data packets that are outputted from the QoS control target input-output port indicated by the trigger detection information, and then transmits the QoS setting request packet to the PLC adapter 200 via the PLC communication section 308. In so doing, the QoS setting request generation section 312 refers to the QoS control information table 821. In case where bandwidth assurance is required, the QoS setting request generation section 312 causes the QoS setting request packet to contain a QoS parameter for QoS control required. In case where priority control is required, the QoS setting request generation section 312 causes the QoS setting request packet to contain priority.

Further, in either case, the QoS setting request generation section 312 causes the QoS setting request packet to contain the Ethernet address of an Ethernet device to be subjected to QoS control, as mentioned above. Further, because the VoIP adapter 190 transmits a packet in a direction opposite to the VoIP server 180, the QoS setting request generation section 312 internally instructs the PLC communication section 308 for priority control transmission of the packet.

Further, because a data packet that is transmitted to an Ethernet device that is not a target of QoS control does not require QoS control, such a data packet is normally transmitted.

In FIG. 51, the data that are transmitted from the VoIP server to the VoIP adapter are telephone voice data and therefore are transmitted and received bi-directionally. However, for simplicity of illustration, FIG. 51 is drawn as if the data were transmitted unidirectionally. Further, in FIG. 51, "DETERMINATION OF DATA TO BE RECEIVED" regarding the VoIP adapter means the act of making or receiving a phone call.

<Regarding Effect of the Present Embodiment>

As described above, the PLC adapter 800 sets QoS control suitable for an Ethernet device supposed to be connected. This makes it unnecessary for the user to set QoS control suitable for the Ethernet device. Further, it is possible to set QoS control suitable for each of a plurality of Ethernet devices connected to a receiving PLC adapter.

<Supplementary Items Common to the Embodiments>

The present invention is not limited to the description of the embodiments above, but may be altered by a skilled person within the scope of the claims. An embodiment based on a proper combination of technical means disclosed in different embodiments is encompassed in the technical scope of the present invention.

For example, various modified examples described in Embodiments 1 to 3 may be applied to Embodiments 4 to 8. Specifically, for example, in Embodiments 4 to 8, the PLC adapter 200 may be separated as in Embodiment 3 into a PLC adapter serving as a mater station and a PLC adapter serving as a transmitting station. Further, a QoS cancellation process may be carried out in Embodiments 4 to 8. The content of processing in the case of such a combination is obvious to a person skilled in the art from the aforementioned description, and therefore will not be described.

Finally, the blocks of the communication apparatuses 10, 20, 30, and 40 and the PLC adapters 50, 60, 70, 80, 200, 300, 500, 600, 700, and 800 or, in particular, the QoS type management sections 12, 22, 32, 42, 52, 62, 72, and 82 and the control sections 14, 24, 34, 44, 54, 64, 74, 84, 210, and 310 may be constituted by way of hardware logic, or may be realized by way of software as executed by a CPU in the following manner.

The communication apparatuses 10, 20, 30, and 40 and the PLC adapters 50, 60, 70, 80, 200, 300, 500, 600, 700, and 800 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The object of the present invention can also be achieved by mounting to the communication apparatuses 10, 20, 30, and 40 and the PLC adapters 50, 60, 70, 80, 200, 300, 500, 600, 700, and 800 a computer-readable storage medium containing control program code (executable program, intermediate code program, or source program) for the terminal communication apparatuses 10, 20, 30, and 40 and the PLC adapters 50, 60, 70, 80, 200, 300, 500, 600, 700, and 800, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The communication apparatuses 10, 20, 30, and 40 and the PLC adapters 50, 60, 70, 80, 200, 300, 500, 600, 700, and 800 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a carrier wave or data signal transmission in which the program code is embodied electronically.

<Regarding Another Expression of the Present Invention>

The present invention can be expressed as follows.

That is, the communication apparatus of the present invention serves as a receiving communication apparatus which receives data from a transmitting communication apparatus for transmitting the data and comprises: a QoS type receiving section for receiving a QoS type information indicative of a priority of data received from the transmitting communication apparatus, with respect to other receiving communication apparatus for receiving data from the transmitting communication apparatus; and a PLC communication section for transmitting, to the transmitting communication apparatus, a QoS setting request packet for transmitting, to the transmitting communication apparatus, a QoS setting request packet including the QoS type information received by the QoS type receiving section and an address of the receiving communication apparatus.

Further, the communication apparatus of the present invention, which serves as a transmitting communication apparatus for transmitting data to a receiving communication apparatus, comprises: a PLC receiving section for receiving a QoS setting request which is transmitted from the receiving communication apparatus and which includes (i) QoS type information indicative of a priority of data reception with respect to other receiving communication apparatus when the receiving communication apparatus receives data from the transmitting communication apparatus and (ii) an address of the receiving communication apparatus for transmitting the QoS setting request; a QoS control means for giving a transmission priority, corresponding to the priority indicated by the QoS type information included in the QoS setting request received by the receiving means, to data transmitted to the receiving communication apparatus indicated by the address included in the QoS setting request; and a PLC communication section for transmitting the data, to which the QoS control means has given the transmission priority, to the receiving communication apparatus indicated by the address included in the QoS setting request, in accordance with the transmission priority.

Further, the communication apparatus of the present invention comprises: a QoS type receiving section for receiving QoS type information indicative of a size of a transfer bandwidth of data transmitted from a transmitting communication apparatus to the communication apparatus; a QoS type management section for generating a QoS notification packet including information indicative of the size of the transfer bandwidth which size is indicated by the QoS type information having been received by the QoS type receiving means; and a PLC communication section for transmitting the QoS notification packet, having been generated by the QoS type management section, to the transmitting communication apparatus.

Further, the communication apparatus of the present invention, included in a communication network which has (a) at least one transmitting communication apparatus for transmitting data, (b) at least one receiving communication apparatus for receiving the data from the transmitting communication apparatus, and (c) a control device (master station) having a control means for carrying out QoS control with respect to the data transmitted from the transmitting communication apparatus to the receiving communication apparatus in accordance with QoS setting request, said communication apparatus serving as the transmitting communication apparatus, said communication apparatus comprising: a PLC communication section for receiving a trigger detection notification which notifies start of the QoS control carried out with respect to data received by the receiving communication apparatus; and a QoS type management section for transmitting, to the control device, a QoS setting request for start of the QoS control with respect to the data received by the receiving communication apparatus, when the PLC communication section receives the trigger detection notification.

Further, the communication apparatus of the present invention, included in a communication network which has (a) at least one transmitting communication apparatus for transmitting data and (b) at least one receiving communication apparatus for receiving the data from the transmitting communication apparatus, said communication apparatus serving as the receiving communication apparatus, said communication apparatus comprising: a QoS control section for carrying out QoS control; and a PLC communication section for receiving a trigger detection notification which notifies start of the QoS control carried out with respect to data received by the receiving communication apparatus, the QoS control section starts the QoS control (priority control) when the PLC communication section receives the trigger detection notification.

Further, a PLC adaptor of the receiving side may have a function as a master station. In this case, the communication apparatus of the present invention, included in a communication network which has (a) at least one transmitting communication apparatus for transmitting data and (b) at least one receiving communication apparatus for receiving the data from the transmitting communication apparatus, said communication apparatus serving as the receiving communication apparatus (master station), said communication apparatus comprising a QoS control section for carrying out QoS control, wherein the QoS control section starts the QoS control in response to the data received from the transmitting communication apparatus (in case where a condition of the trigger detection is satisfied).

Further, the communication apparatus of the present invention is a PLC adaptor (communication apparatus) which relays data transfer between Ethernet (first network) and a PLC network (second network), wherein a receiving communication apparatus connected through the Ethernet (via the Ethernet) to the PLC adaptor comprises a QoS type management section (QoS setting control section) for setting QoS of the PLC network regarding a flow received from the transmitting communication apparatus connected through the Ethernet (via the Ethernet) to the PLC adaptor.

As described above, it is preferable to arrange the communication apparatus so that, as the QoS setting process, the QoS setting control means carries out a process for transmitting the QoS setting request including the QoS control information to the communication apparatus for transmitting the data.

According to the foregoing arrangement, it is possible to request the communication apparatus which transmits data for the QoS control indicated by the QoS control information. This arrangement is applicable to the case where the communication apparatus for transmitting data carries out priority control transfer for example, i.e., the case where Prioritized QoS is adopted.

Further, it is preferable to arrange the communication apparatus so as to further comprise a control means for carrying out the QoS control, wherein the QoS setting control means outputs the QoS control information to the control means as the QoS setting process, and the control means carries out the QoS control with respect to the data in accordance with the QoS control information.

According to the foregoing arrangement, the QoS setting control means outputs the QoS control information to the control means, and the control means carries out the QoS control with respect to the data in accordance with the QoS control information.

Therefore, it is possible to carry out the QoS control in a communication apparatus for transmitting data. This arrangement is applicable to the case where the communication apparatus for transmitting data carries out priority control transfer for example, i.e., the case where Prioritized QoS is adopted.

Further, it is preferable to arrange the communication apparatus so that: as the QoS setting process, the QoS setting control means transmits a QoS setting request including the QoS control information to a communication apparatus for carrying out QoS control of a network.

According to the foregoing arrangement, the QoS setting control means transmits a QoS setting request including the QoS control information to a communication apparatus for carrying out QoS control of a network.

Therefore, it is possible to require a communication apparatus which carries out the QoS control of a network to carry out the QoS control. This arrangement is applicable to the case where the communication apparatus for carrying out the QoS control of the network manages bandwidth-guaranteed transfer for example, i.e., the case where Parameterized QoS is adopted.

Further, it is preferable to arrange the communication apparatus so as to further comprise a control means for carrying out the QoS control by transmitting a QoS control detail notification, which notifies content of the QoS control, to another communication apparatus, wherein the QoS setting control means outputs the QoS control information to the control means as the QoS setting process, and the control means carries out the QoS control with respect to the data in accordance with the QoS control information outputted by the QoS setting control means.

According to the foregoing arrangement, the control means carries out the QoS control by transmitting a QoS control content notification, which notifies content of the QoS control, to another communication apparatus. The QoS setting control means outputs the QoS control information to the control means, and the control means carries out the QoS control with respect to the data in accordance with the QoS control information outputted by the QoS setting control means.

Therefore, it is possible to carry out the QoS control in a communication apparatus for transmitting data. This arrangement is applicable to the case where the communication apparatus for transmitting data manages bandwidth-guaranteed transfer for example, i.e., the case where Parameterized QoS is adopted.

Further, it is preferable to arrange the communication apparatus so that: as the QoS cancellation process, the QoS setting control means transmits, to the communication apparatus for transmitting the data, a QoS cancellation request for cancellation of the QoS control.

According to the foregoing arrangement, it is possible to require the communication apparatus which transmits data to cancel the QoS control. This arrangement is applicable to the case where the communication apparatus for transmitting data carries out priority control transfer for example, i.e., the case where Prioritized QoS is adopted.

Further, it is preferable to arrange the communication apparatus so as to further comprise a control means for carrying out the QoS control, wherein as the QoS cancellation process, the QoS setting control means notifies the control means that the QoS control with respect to the data is to be stopped, and the control means stops the QoS control with respect to the data in response to the notification from the QoS setting control means.

According to the foregoing arrangement, the QoS setting control means notifies the control means that the QoS control with respect to the data is to be stopped, and the control means stops the QoS control with respect to the data in response to the notification from the QoS setting control means.

Therefore, it is possible to cancel the QoS control in a communication apparatus for transmitting data. This arrangement is applicable to the case where the communication apparatus for transmitting data carries out priority control transfer for example, i.e., the case where Prioritized QoS is adopted.

Further, it is preferable to arrange the communication apparatus so that: as the QoS cancellation process, the QoS setting control means transmits a QoS cancellation request for requesting cancellation of the QoS control to a communication apparatus for carrying out the QoS control of a network.

According to the foregoing arrangement, it is possible to require the communication apparatus, which carries out the QoS control of the network, to cancel the QoS control. This arrangement is applicable to the case where the communication apparatus for carrying out the QoS control of the network manages bandwidth-guaranteed transfer for example, i.e., the case where Parameterized QoS is adopted.

Further, it is preferable to arrange the communication apparatus so as to further comprise a control means for carrying out the QoS control, wherein as the QoS cancellation process, the QoS setting control means notifies the control means that the QoS control with respect to the data is to be stopped, and the control means stops the QoS control with respect to the data in response to the notification from the QoS setting control means.

According to the foregoing arrangement, the QoS setting control means notifies the control means that the QoS control with respect to the data is to be stopped, and the control means stops the QoS control with respect to the data in response to the notification from the QoS setting control means.

Therefore, it is possible to stop the QoS control in the communication apparatus for transmitting data. This arrangement is applicable to the case where the communication apparatus for transmitting data manages bandwidth-guaranteed transfer for example, i.e., the case where Parameterized QoS is adopted.

Further, it is preferable to arrange the communication apparatus so as to further comprise a trigger detection means for detecting a timing, at which the QoS setting process is carried out, by analyzing a transmission history or a reception history regarding the data, wherein the QoS setting control means carries out the QoS setting process at the timing detected by the trigger detection means.

According to the foregoing arrangement, the trigger detection means detects a timing, at which the QoS setting process is carried out, by analyzing a transmission history or a reception history regarding the data, and the QoS setting control means carries out the QoS setting process at the timing detected by the trigger detection means.

Thus, the QoS is set after the communication in which the QoS control should be carried out is actually started. As a result, it is possible to prevent the QoS control from being unnecessarily carried out before the communication in which the QoS control should be carried out is started.

Further, it is preferable to arrange the communication apparatus so as to further comprise a trigger detection means for detecting a timing, at which the QoS cancellation process with respect to the data is carried out, by analyzing a transmission history or a reception history regarding the data, wherein the QoS setting control means carries out the QoS cancellation process at the timing detected by the trigger detection means.

According to the foregoing arrangement, the trigger detection means detects a timing, at which the QoS cancellation process with respect to the data is carried out, by analyzing a transmission history or a reception history regarding the data, and the QoS setting control means carries out the QoS cancellation process at the timing detected by the trigger detection means.

Therefore, it is possible to prevent the QoS control from being unnecessarily continued though the actual QoS transfer is finished.

Further, it is preferable to arrange the communication apparatus so that: the QoS setting control means carries out the QoS setting process at the timing for the QoS setting process which timing has been notified by a counterpart station in data communication.

According to the foregoing arrangement, the timing for the QoS setting process is notified by the counterpart station in data communication.

Therefore, the QoS is set at a timing at which the QoS control should be actually carried out. As a result, it is possible to prevent the QoS control from being unnecessarily carried out before the communication in which the QoS control should be carried out is started.

Further, it is preferable to arranged the communication apparatus so that: the QoS setting control means carries out the QoS cancellation process at the timing for the QoS cancellation process which timing has been notified by a counterpart station in data communication.

According to the foregoing arrangement, the timing for the QoS cancellation process is notified by the counterpart station in data communication.

Therefore, it is possible to prevent the QoS control from being unnecessarily continued though it is not necessary to carry out the QoS control.

Further, it is preferable to arrange the communication apparatus so as to further comprise: a trigger detection means for detecting a timing, at which a QoS setting process is carried out with respect to the data, by analyzing a transmission history or a reception history regarding the data; and a trigger detection notification means for notifying the timing, having been detected by the trigger detection means, to a counterpart station in a data communication.

According to the foregoing arrangement, the trigger detection means detects a timing, at which a QoS setting process is carried out with respect to the data, by analyzing a transmission history or a reception history regarding the data, and the trigger detection notification means notifies the timing, having been detected by the trigger detection means, to a counterpart station in data communication.

Therefore, the QoS is set at a timing at which the QoS control should be actually carried out. As a result, it is possible to prevent the QoS control from being unnecessarily carried out before the communication in which the QoS control should be carried out is started.

Further, it is preferable to arrange the communication apparatus so as to further comprise: a trigger detection means for detecting a timing, at which a QoS cancellation process with respect to the data is carried out, by analyzing a transmission history or a reception history regarding the data; and a trigger detection notification means for notifying the timing, having been detected by the trigger detection means, to a counterpart station in data communication.

According to the foregoing arrangement, the trigger detection means detects a timing, at which a QoS cancellation process is carried out with respect to the data, by analyzing a transmission history or a reception history regarding the data, and the trigger detection notification means notifies the timing, having been detected by the trigger detection means, to a counterpart station in data communication.

Therefore, it is possible to prevent the QoS control from being unnecessarily continued though it is not necessary to carry out the QoS control.

Further, it is preferable to arrange the communication apparatus so that: the trigger detection means detects, from the data having been received, flow identification information for identifying a flow which includes the data having been received, and the trigger detection notification means notifies not only the timing having been detected but also the flow identification information having been detected by the trigger detection means to the counterpart station in data communication.

According to the foregoing arrangement, the trigger detection notification means notifies not only the flow identification information indicative of a flow (flow in the network) including the received data but also the timing for carrying out the QoS setting process or the QoS cancellation process with respect to the data, to the counterpart station in data communication.

Therefore, the counterpart station in data communication can exactly identify the data with respect to which the QoS setting process or the QoS cancellation process is to be carried out.

Further, it is preferable to arrange the communication apparatus so that: the QoS type receiving means receives a QoS type only in case where a predetermined time passes after previous reception of a QoS type and there is specified that QoS type which is different from the QoS type received in the previous reception.

According to the foregoing arrangement, in case where the user unintentionally specifies a QoS type which is not desired due to his/her erroneous operation and immediately cancels the operation, the QoS type for the QoS setting (or QoS cancellation) is not received.

Therefore, it is possible to prevent the QoS setting (including QoS cancellation) from being changed by the user's erroneous operation. As a result, it is possible to prevent reproduced video or reproduced sound from being disarranged by unintentional change of the QoS setting.

Further, in addition to the foregoing arrangement, the communication apparatus according to the present invention further comprises a status indication means for indicating, to a user, a QoS setting status derived from results of the QoS setting process and the QoS cancellation process.

In the foregoing arrangement, the status indication means indicates, to the user, a status such as (i) whether the QoS setting specified by the user has been started or not, (ii) whether the QoS setting process is being carried out or not, (iii) whether the QoS setting process has been successfully carried out or not, (iv) whether the QoS cancellation process has been carried out or not, (v) and the like.

According to the foregoing arrangement, a QoS setting status (status of the QoS control) resulting from the QoS setting process and the QoS cancellation process is indicated to the user. This makes it possible to exhibit such effect that the user can exactly find the QoS setting status concerning his or her operation for specifying the QoS type and the QoS setting status concerning his or her operation for directing the QoS cancellation process.

In addition to the foregoing arrangement, the communication apparatus according to the present invention further comprises a status indication means for indicating, to a user, a QoS setting status derived from results of the QoS setting process and the QoS cancellation process, wherein the status indication means carries out the indication in accordance with statuses of a QoS setting process and a QoS cancellation process in a counterpart station in data communication which statuses have been notified by the counterpart station.

In the foregoing arrangement, a status such as (i) whether the QoS setting has been carried out or not in the counterpart station in data communication, (ii) whether the QoS setting process is being carried out or not, (iii) whether the QoS setting process has been successfully carried out or not, (iv) whether the QoS cancellation process has been carried out or not, (v) and the like, is notified from the counterpart station in data communication. The status indication means indicates, to the user, results of the QoS setting process and the QoS cancellation process which have been notified.

According to the foregoing arrangement, the results of the QoS setting process and the QoS cancellation process which have been carried out in the counterpart station in data communication are indicated to the user. This makes it possible to exhibit such effect that the user can exactly find the statuses of the QoS setting process and the QoS cancellation process.

In addition to the foregoing arrangement, the communication apparatus according to the present invention is arranged so that the QoS setting control means notifies, to a counterpart station in a data communication, a QoS setting status derived from results of the QoS setting process and the QoS cancellation process.

In the foregoing arrangement, a status such as (i) whether the QoS setting has been started or not, (ii) whether the QoS setting process is being carried out or not, (iii) whether the QoS setting process has been successfully carried out or not, (iv) whether the QoS cancellation process has been carried out or not, (v) and the like, is notified to the counterpart station in data communication.

According to the foregoing arrangement, the statuses of the QoS setting process and the QoS cancellation process are notified to the counterpart station in data communication. This makes it possible to exhibit such effect that the counterpart station in the data communication can exactly find the statuses of the QoS setting process and the QoS cancellation process.

In addition to the foregoing arrangement, the communication apparatus according to the present invention is arranged so that the QoS type receiving means indicates a QoS type convertible into QoS control information and receives a QoS type, having been specified by a user, as an input.

According to the foregoing arrangement, the QoS type receiving means allows the user to specify and input the QoS type by indicating, as an option, the QoS type obtained by conversion from the QoS control information so that the user can easily understand the QoS type. That is, the user has only to carry out a switching operation, for example, with respect to a switch provided on the communication apparatus as the QoS type receiving means, thereby exhibiting such effect that the user can specify the QoS type required by data which is to be transferred.

In addition to the foregoing arrangement, the communication apparatus according to the present invention is arranged so that the QoS type receiving means receives a QoS type, having been specified by a device which is connected to the communication apparatus to receive the data, as an input.

According to the foregoing arrangement, the QoS type receiving means receives a QoS type, having been specified by a device which is connected to the communication apparatus to receive the data, thereby exhibiting such effect that, even if the user does not specify the QoS type, the QoS type required by data transferred by the communication apparatus is automatically set in response to the specifying operation of the device which is connected to the communication apparatus to receive the data.

In addition to the foregoing arrangement, the communication apparatus according to the present invention is arranged so that the QoS type receiving means indicates to a user, as the QoS type, information indicative of whether or not to carry out the QoS control in data reception carried out by the communication apparatus.

In addition to the foregoing arrangement, the communication apparatus according to the present invention is arranged so that the QoS type receiving means indicates to a user, as the QoS type, a priority of data reception carried out by the communication apparatus with respect to other station under the same QoS control.

In addition to the foregoing arrangement, the communication apparatus according to the present invention is arranged so that the QoS type receiving means indicates to a user, as the QoS type, information indicating that a flow received or relayed by the communication apparatus is any one of a flow including both a moving image and sound, a flow including only sound, and other flow.

In addition to the foregoing arrangement, the communication apparatus according to the present invention is arranged so that the QoS type receiving means indicates to a user, as the QoS type, information indicating that an apparatus connected to the communication apparatus is any one of a reproducing apparatus for a flow including both a moving image and sound, a reproducing apparatus for a flow including only sound, and a reproducing apparatus for other flow.

In addition to the foregoing arrangement, the communication apparatus according to the present invention is arranged so that the QoS type receiving means indicates to a user, as the QoS type, a bit rate of a flow received or relayed by the communication apparatus.

In addition to the foregoing arrangement, the communication apparatus according to the present invention is arranged so that the QoS type receiving means indicates to a user, as the QoS type, a type into which a flow received or relayed by the communication apparatus is categorized in accordance with a permissible range of transfer delay.

In addition to the foregoing arrangement, the communication apparatus according to the present invention the QoS type receiving means indicates to a user, as the QoS type, a type into which a flow received or relayed by the communication apparatus is categorized in accordance with a permissible range of an error rate.

In addition to the foregoing arrangement, the communication apparatus according to the present invention is arranged so that the QoS type receiving means indicates to a user, as the QoS type, a type into which a flow received or relayed by the communication apparatus is categorized in accordance with a permissible range of jitter.

In addition to the foregoing arrangement, the communication apparatus according to the present invention is arranged so that the QoS type receiving means indicates to a user, as the QoS type, a type into which a flow received or relayed by the communication apparatus is categorized in accordance with a permissible range of transfer delay of a flow received by an apparatus connected to the communication apparatus.

In addition to the foregoing arrangement, the communication apparatus according to the present invention is arranged so that the QoS type receiving means indicates to a user, as the QoS type, a type into which a flow received or relayed by the communication apparatus is categorized in accordance with a permissible range of an error rate of a flow received by an apparatus connected to the communication apparatus.

In addition to the foregoing arrangement, the communication apparatus according to the present invention is arranged so that the QoS type receiving means indicates to a user, as the QoS type, a type into which a flow received or relayed by the communication apparatus is categorized in accordance with a permissible range of jitter of a flow received by an apparatus connected to the communication apparatus.

According to the foregoing arrangement, the user makes a selection from easily understandable QoS types in specifying transfer quality in the network, so that a QoS type can be appropriately set. This makes it possible to exhibit such effect that the QoS control can appropriately function.

Further, the user carries out such a simple operation that a certain QoS type is selected from QoS types having been prepared in advance. This makes it possible to exhibit such effect that trouble taken for the user to carry out the setting can be reduced.

Further, it is preferable that: the QoS type receiving means selectively receives, as the QoS type, a priority of data reception carried out by the communication apparatus and information indicative of a bit rate of data received or relayed by the communication apparatus with respect to other station under the same QoS control.

According to the foregoing arrangement, it is possible to receive the command for selectively switching between the QoS control based on the priority and the QoS control for guaranteeing the bit rate. Further, by transmitting the command to the control device which carries out the QoS control, it is possible to selectively switch between the QoS control based on the priority and the QoS control for guaranteeing the bit rate.

Further, it is preferable to arrange the communication apparatus so that: while the communication apparatus is not subjected to the QoS control, data is transmitted by using at least part of a data transfer bandwidth other than a data transfer bandwidth allocated to other communication apparatus subjected to the QoS control.

According to the foregoing arrangement, not the priority-control transfer and the bandwidth-guaranteed transfer but the normal transfer (best effort transfer) can be carried out with respect to data transmitted to a communication apparatus which is not to be subjected to the QoS control.

Further, it is preferable to arrange the communication apparatus so that: when the QoS type receiving means receives the QoS type, the QoS control information conversion means notifies, via a notification means communicably connected to the communication apparatus, a user that the QoS type has been received.

According to the foregoing arrangement, in case where the QoS type receiving means receives a QoS type, this can be notified to the user via the notification means.

Thus, in case where the QoS type receiving means receives a QoS type, the user can find this. Particularly, in case where the QoS type receiving means receives a QoS type against the user's intension, the user can find this.

Incidentally, the communication apparatus may be realized by hardware or may be realized by causing a computer to execute a program. Specifically, a program according to the present invention is a control program which causes a computer to operate at least as the QoS control information conversion means, the QoS setting control means, the QoS type request means, the QoS type notification means, the QoS control information request means, the QoS control information notification means, the bridge information obtaining means, the flow identification information obtaining means, the trigger detection means, and the trigger detection notification means. On a recording medium according to the present invention, the communication apparatus control program is recorded.

When the communication apparatus control program is executed by a computer, the computer operates as the communication apparatus. Thus, as in the communication apparatus, appropriate QoS is set merely by specifying a QoS type, so that QoS control is carried out. That is, it is not necessary to input complicate information such as a MAC address or the like. This makes it possible to exhibit such effect that QoS can be set in a simpler manner.

Further, it is preferable to arrange the communication apparatus so as to further comprise a QoS type storage means for storing QoS type information indicative of a type of the QoS control, wherein the QoS setting request generation means incorporates, into the QoS setting request, the QoS type information stored in the QoS type storage means, as information for defining content of the QoS control requested by the communication apparatus.

According to the foregoing arrangement, the QoS type storage means stores QoS type information indicative of a type of the QoS control, and the QoS setting request generation means incorporates, into the QoS setting request, the QoS type information stored in the QS type storage means, as information for defining content of the QoS control requested by the communication apparatus.

Therefore, regarding data outputted from the QoS target port, the QoS control in the network can be carried out in accordance with control content corresponding to the QoS type information stored in the QoS type information storage means.

If the QoS type information is stored in the QoS type storage means in advance (for example, at the time of production of the communication apparatus), it is possible to save the trouble taken to input the QoS type information every time the user uses the communication apparatus. This improves the usability for the user.

Further, it is preferable to arrange the communication apparatus so as to further comprise a QoS type specifying means by which a user specifies the QoS type information indicative of a type of the QoS control, wherein the QoS setting request generation means incorporates, into the QoS setting request, the QoS type information specified by the QoS type specifying means, as information for defining content of the QoS control requested by the communication apparatus.

According to the foregoing arrangement, the QoS setting request generation means incorporates, into the QoS setting request, the QoS type information specified by the user via the QoS type specifying means, as information for defining content of the QoS control requested by the communication apparatus.

Therefore, regarding data outputted from the QoS target port, the QoS control in the network can be carried out in accordance with control content corresponding to the QoS type specified by the user.

Further, the QoS type specifying means is provided on the communication apparatus to which the device used by the user is connected, so that the user can easily set transfer quality in the network.

Further, it is preferable to arrange the communication apparatus so as to further comprise a QoS type indication means for indicating the QoS type information.

According to the foregoing arrangement, the QoS type indication means allows the QoS type information, stored in the QoS type storage means or specified by the user, to be indicated.

Examples of the QoS type indication means include: a printed material on which the QoS type is printed (e.g., a seal); an LED (light-emitting diode); a liquid crystal display panel; and the like.

Further, it is preferable to arrange the communication apparatus so that an output port out of the plurality of output ports is determined as the QoS target output port in advance.

The foregoing arrangement makes it possible to simplify the entire arrangement of the communication apparatus.

Further, it is preferable to arrange the communication apparatus so as to further comprise a QoS target selection means by which a user selects an output port out of the plurality of output ports as the QoS target output port.

According to the foregoing arrangement, the user can select, via the QoS target selection means, an output port from the plurality of output ports as a QoS target output port.

Thus, the user can change the device, which is to be subjected to the QoS control, without changing an output port which allows for connection to the device (without switching a cable).

Further, it is preferable to arrange the communication apparatus so as to further comprise a QoS target indication means by which a user discriminates the QoS target output port from other output ports.

According to the foregoing arrangement, it is possible to indicate a QoS target output port out of the plurality of output ports. This makes it possible to improve the usability for the user.

Examples of the QoS target indication means include: a printed material indicative of the QoS target output port (e.g., a seal); an LED (light-emitting diode); a liquid crystal display panel; and the like.

Further, it is preferable to arrange the communication apparatus so as to further comprise a period information storage means for storing period information indicative of a period in which the identification information obtaining means obtains the identification information, wherein the identification information obtaining means obtains the identification information in the period indicated by the period information stored in the period information storage means.

According to the foregoing arrangement, the period information storage means stores period information indicative of a period in which the identification information obtaining means obtains the identification information, and the identification information obtaining means obtains the identification information in the period indicated by the period information stored in the period information storage means.

Therefore, it is possible to limit the period in which the identification information obtaining means obtains the identification information. Thus, even if identification information is irregularly supplied to the identification information obtaining means, in a period in which identification information required to be obtained by the identification information obtaining means is supplied, the identification information obtaining means can obtain this identification information.

Further, it is preferable to arrange the communication apparatus so as to further comprise a period information specifying means by which a user specifies a period in which the identification information obtaining means obtains the identification information, wherein the identification information obtaining means obtains the identification information in the period specified with the period information specifying means.

According to the foregoing arrangement, the identification information obtaining means obtains the identification information in a period specified by the user via the period information specifying means. In other words, the period information specifying means receives the period information which is specified by the user and which is indicative of a period in which the identification information obtaining means obtains identification information, and the identification information obtaining means obtains the identification information in a period indicated by the period information received by the period information specifying means.

Therefore, the user can specify the period in which the identification information obtaining means obtains the identification information, so that the user can carry out the operation for supplying identification information to the identification information obtaining means in a period specified by the user.

Further, it is preferable to arrange the communication apparatus so as to further comprise a period indication means for indicating that the communication apparatus is currently in a period for obtaining the identification information.

According to the foregoing arrangement, the period information indication means indicates that the communication apparatus is currently in a period for obtaining the identification information.

Therefore, it is possible to notify the user of whether the identification information obtaining means can obtain identification information or not.

Further, it is preferable to arrange the communication apparatus so as to further comprise a transmission means for transmitting the QoS setting request generated by the QoS setting request generation means to a control device for carrying out the QoS control.

According to the foregoing arrangement, the transmission means transmits the QoS setting request generated by the QoS setting request generation means to a control device for carrying out the QoS control.

Therefore, even if the communication apparatus does not include the control device for carrying out the QoS control, it is possible to transmit the QoS setting request to the control device.

Further, it is preferable to arrange the communication apparatus so that the network is a communication network including an electric power line.

The electric power line is used in the communication network, so that it is not necessary to wire any special LAN cable. This allows for construction of a network merely by connecting a power source cable of a device to a plug. As a result, a terminal can be more freely moved.

Further, the technical scope of the present invention includes also: (i) a control program, causing the communication apparatus to operate, said control program causing a computer to function as the respective means; and (ii) a computer-readable recording medium, in which the control program is recorded.

Further, the communication apparatus according to the present invention further comprises a trigger detection means for detecting a timing at which the QoS setting process is carried out and a timing at which the QoS cancellation process for generating the QoS cancellation request is carried out, by analyzing a transmission history or a reception history regarding one or more packets, wherein the QoS setting control means carries out the QoS setting process at the detected timing at which the QoS setting process is started and carries out the QoS cancellation process at the detected timing detected at which the QoS cancellation process is started.

In the foregoing arrangement, on the basis of a packet transmission history or a packet reception history indicating that a packet communication for data transfer has been started, the trigger detection means determines start of the QoS setting process for carrying out the QoS control. Further, on the basis of a packet transmission history or a packet reception history indicating that a packet communication for data transfer has stopped, the trigger detection means determines start of a process for canceling the transfer bandwidth having been secured for QoS transfer.

Note that, the generated QoS cancellation request is transmitted to a transmitting end of packet transfer in case of Prioritized QoS and is transmitted to a master station in case of Parameterized QoS.

According to the foregoing arrangement, the QoS is set after the communication in which a QoS transfer bandwidth should be secured is actually started. As a result, it is possible to prevent a bandwidth of the network from being unnecessarily secured before the communication in which a QoS transfer bandwidth should be secured is started. Further, it is possible to prevent the QoS transfer bandwidth from being unnecessarily kept secured though the actual QoS transfer is finished.

In addition to the foregoing arrangement, the communication apparatus according to the present invention is arranged so that the QoS setting control means starts the QoS setting process at the timing for the QoS setting process which timing has been notified by a counterpart station in packet communication and the QoS setting control means starts the QoS cancellation process at the timing for the QoS setting process for generating the QoS cancellation request which timing has been notified by the counterpart station in packet communication.

In the foregoing arrangement, when the QoS setting control means receives a packet indicative of a timing at which the QoS setting process is started from the counterpart station in packet communication, the QoS setting control means starts the QoS setting process. When the QoS setting control means receives a packet indicative of a timing at which the QoS cancellation process is started from the counterpart station in packet communication, the QoS setting control means starts the QoS cancellation process.

According to the foregoing arrangement, the QoS is set at a timing notified by the counterpart station in packet communication. This makes it possible to prevent a bandwidth of the network from being unnecessarily secured before notification of the timing at which the QoS setting process is started. Further, it is possible to prevent a QoS transfer bandwidth from being unnecessarily kept secured also after notification of the timing at which the QoS cancellation process is started.

In addition to the foregoing arrangement, the communication apparatus according to the present invention further comprises: a trigger detection means for detecting a timing, at which a QoS setting process for generating a QoS setting request is started and a QoS cancellation process for generating a QoS cancellation request is started, by analyzing a packet transmission history or a packet reception history regarding one or more packets; and a trigger detection notification means for notifying the timing, having been detected by the trigger detection means, to a counterpart station in packet communication.

In the foregoing arrangement, on the basis of the packet transmission history or the packet reception history indicating that the packet communication of data transfer has been started, the trigger detection means determines that the QoS setting process is to be started so as to carry out the QoS control and notifies the counterpart station in packet communication that the QoS setting process should be started. Further, on the basis of the packet transmission history or the packet reception history indicating that the packet communication of data transfer has been stopped, the trigger detection means determines that a process for canceling the transfer bandwidth having been secured for QoS transfer should be started and notifies the counterpart station in packet communication that the counterpart station should start the QoS cancellation process.

According to the foregoing arrangement, the QoS is set after the communication in which a QoS transfer bandwidth should be secured is actually started. As a result, it is possible to prevent a bandwidth of the network from being unnecessarily secured before the communication in which a QoS transfer bandwidth should be secured is started. Further, it is possible to prevent the QoS transfer bandwidth from being unnecessarily kept secured though the actual QoS transfer is finished.

In addition to the foregoing arrangement, the communication apparatus according to the present invention is arranged so that the QoS setting control means newly carries out a QoS setting process only in case where a predetermined time passes after previous execution of the QoS setting process and there is specified QoS control information different from the QoS control information used in the previous execution.

In the foregoing arrangement, in case where the user unintentionally specifies a QoS type which is not desired due to his/her erroneous operation and immediately cancels the operation for example, a state of the QoS setting process which has been previously executed is not changed.

According to the foregoing arrangement, it is possible to prevent the QoS setting from being changed by the user's erroneous operation. As a result, it is possible to prevent reproduced video or reproduced sound from being disarranged by unintentional change of the QoS setting.

In addition to the foregoing arrangement, the communication apparatus according to the present invention comprises a storage means for storing (i) a first QoS type previously notified to a communication apparatus transmitting to that communication apparatus and (ii) a time at which the notification has been carried out, wherein the QoS type notification means notifies this communication apparatus of a second QoS type only in case where a predetermined time passes after the time at which the notification has been carried out and where the second QoS type newly received by the QoS type receiving means is different from the first QoS type.

In the foregoing arrangement, in case where the user unintentionally specifies a QoS type which is not desired due to his/her erroneous operation and immediately cancels the operation for example, the second QoS type is not transmitted to a communication apparatus transmitting a packet to that communication apparatus.

According to the foregoing arrangement, it is possible to prevent the QoS setting from being changed by the user's erroneous operation. As a result, it is possible to prevent reproduced video or reproduced sound from being disarranged by unintentional change of the QoS setting.

In addition to the foregoing arrangement, the communication apparatus according to the present invention comprises a storage means for storing (i) first QoS control information previously notified to a communication apparatus which transmits a packet to that communication apparatus and (ii) a notification time thereof, wherein the QoS control information notification means notifies the communication apparatus of second QoS control information, which is obtained by causing the QoS control information conversion means to convert the second QoS type newly received by the QoS type receiving means, only in case where a predetermined time passes after the notification time and the first QoS control information is different from the second QoS control information.

In the foregoing arrangement, in case where the user unintentionally specifies a QoS type which is not desired due to his/her erroneous operation and immediately cancels the operation for example, the second QoS control information is not transmitted to the communication apparatus transmitting a packet to that communication apparatus.

According to the foregoing arrangement, it is possible to prevent the QoS setting from being changed by the user's erroneous operation. As a result, it is possible to prevent reproduced video or reproduced sound from being disarranged by unintentional change of the QoS setting.

In addition to the foregoing arrangement, the communication apparatus according to the present invention further comprises a status indication means for indicating a QoS setting status to a user.

In the foregoing arrangement, the status indication means indicates, to the user, statuses such as (i) whether the QoS setting specified by the user has been started or not, (ii) whether the QoS setting process is being carried out or not, (iii) whether the process has been carried out successfully or not, (iv) and the like.

According to the foregoing arrangement, the status of the QoS setting process is indicated to the user. This makes it possible to exhibit such effect that the user can exactly find the status of the QoS setting process with respect to the operation the user carried out in specifying the QoS type.

In addition to the foregoing arrangement, the communication apparatus according to the present invention further comprises a status indication means for indicating a status of the QoS setting process to a user, wherein the QoS type receiving means passes, to the status indication means, the status of the QoS setting process in the counterpart station in data communication which status has been notified from the counterpart station.

In the foregoing arrangement, the counterpart station in data communication notifies statuses such as (i) whether the QoS setting specified by the user has been started or not, (ii) whether the QoS setting process is being carried out or not, (iii) whether the process has been carried out successfully or not, (iv) and the like. The status indication means indicates to the user the statuses of the QoS setting process which have been notified.

According to the foregoing arrangement, the statuses of the QoS setting process carried out in the counterpart station in data communication are indicated to the user. This makes it possible to exhibit such effect that the user can exactly find the statuses of the QoS setting process.

In addition to the foregoing arrangement, the communication apparatus according to the present invention is arranged so that the QoS setting control means notifies a status of the QoS setting process to the counterpart station in data communication.

In the foregoing arrangement, statuses such as (i) whether the QoS setting specified by the user has been started or not, (ii) whether the QoS setting process is being carried out or not, (iii) whether the process has been carried out successfully or not, (iv) and the like, are notified to the counterpart station in data communication.

According to the foregoing arrangement, the status of the QoS setting process is notified to the counterpart station in data communication. This makes it possible to exhibit such effect that the counterpart station in data communication can exactly find the status of the QoS setting process.

A communication apparatus according to the present invention, which receives a packet from a first network and outputs the packet to a second network, comprises: a QoS type receiving means for receiving a QoS control type for the packet; a QoS target port selection means for selecting an output port, which should carry out a QoS setting process, out of output ports for the second network; a QoS control information conversion means for converting the QoS type received by the QoS type receiving means into QoS control information for the packet; and a QoS setting control means for carrying out a QoS setting process in which a QoS setting request is generated in accordance with the QoS control information regarding a packet which is to be outputted to the output port having been selected by the QoS target port selection means.

A communication apparatus according to the present invention, which receives a packet from a first network and outputs the packet to a second network, comprises: a QoS type receiving means for receiving a QoS control type for the packet; a switching means for switching between a normal communication mode and a QoS target selection mode; a QoS target apparatus selection means for selecting, as a QoS target, a communication apparatus in the second network which communication apparatus is in connection with that communication apparatus in the QoS target selection mode; a QoS control information conversion means for converting the QoS type received by the QoS type receiving means into QoS control information for the packet; and a QoS setting means for carrying out a QoS setting process in which a QoS setting request is generated in accordance with the QoS control information regarding a packet which is to be outputted to the communication apparatus having been selected by the QoS target apparatus selection means.

INDUSTRIAL APPLICABILITY

A communication apparatus according to the present invention enables users to simply set the quality of transmission over networks and enables effective functioning of QoS control, and can therefore be applied in general to network devices that require users to set QoS.

The invention claimed is:

1. A communication apparatus, which transmits data, comprising:
   a QoS control information request means for obtaining QoS control information of the data from another communication apparatus for receiving the data; and
   a QoS setting control means for carrying out a QoS setting process with respect to the data in accordance with the QoS control information obtained by the QoS control information request means,
   said communication apparatus, further comprising a trigger detection means for detecting a timing, at which the QoS setting process is carried out, by analyzing a transmission history or a reception history regarding the data, wherein the QoS setting control means carries out the QoS setting process at the timing detected by the trigger detection means.

2. A communication apparatus as in claim 1 comprising:

a QoS type request means for obtaining a QoS type indicative of a type of QoS control of the data from a communication apparatus for receiving the data; and a QoS setting control means for carrying out a QoS cancellation process with respect to the data in case where the QoS type obtained by the QoS type request means indicates that the QoS control is not required.

3. The communication apparatus as set forth in claim 2, further comprising a trigger detection means for detecting a timing, at which the QoS cancellation process with respect to the data is carried out, by analyzing a transmission history or a reception history regarding the data, wherein the QoS setting control means carries out the QoS cancellation process at the timing detected by the trigger detection means.

4. The communication apparatus as set forth in claim 2, wherein the QoS setting control means carries out the QoS cancellation process at the timing for the QoS cancellation process which timing has been notified by a counterpart station in data communication.

5. A communication apparatus as in claim 1 comprising:

a QoS control information request means for obtaining QoS control information of the data from a communication apparatus for receiving the data; and a QoS setting control means for carrying out a QoS cancellation process with respect to the data in case where the QoS control information obtained by the QoS control information request means indicates that the QoS control with respect to the data is not required.

6. The communication apparatus as set forth in claim 5, further comprising a trigger detection means for detecting a timing, at which the QoS cancellation process with respect to the data is carried out, by analyzing a transmission history or a reception history regarding the data, wherein the QoS setting control means carries out the QoS cancellation process at the timing detected by the trigger detection means.

7. The communication apparatus as set forth in claim 5, wherein the QoS setting control means carries out the QoS cancellation process at the timing for the QoS cancellation process which timing has been notified by a counterpart station in data communication.

8. A communication apparatus, which receives data, comprising:

a QoS type receiving means for receiving a QoS type indicative of a type of QoS control of the data;

a QoS control information conversion means for converting the QoS type received by the QoS type receiving means into QoS control information of the data; and a QoS control information notification means for notifying the QoS control information, obtained by the conversion carried out by the QoS control information conversion means, to a communication apparatus for transmitting the data, said communication apparatus further comprising:

a trigger detection means for detecting a timing, at which a QoS setting process is carried out with respect to the data, by analyzing a transmission history or a reception history regarding the data; and a trigger detection notification means for notifying the timing, having been detected by the trigger detection means, to a counterpart station in a data communication.

9. A communication apparatus as in claim 8 comprising:

a QoS type receiving means for receiving a QoS type indicative of a type of QoS control of the data; and a QoS setting control means for carrying out a QoS cancellation process with respect to the data received by the communication apparatus in case where the QoS type received by the QoS type receiving means indicates that the QoS control is not required.

10. The communication apparatus as set forth in claim 9, further comprising a trigger detection means for detecting a timing, at which the QoS cancellation process with respect to the data is carried out, by analyzing a transmission history or a reception history regarding the data, wherein the QoS setting control means carries out the QoS cancellation process at the timing detected by the trigger detection means.

11. The communication apparatus as set forth in claim 9, wherein the QoS setting control means carries out the QoS cancellation process at the timing for the QoS cancellation process which timing has been notified by a counterpart station in data communication.

12. A communication apparatus as in claim 8 comprising:

a QoS type receiving means for receiving a QoS type indicative of a type of QoS control of the data; and a QoS control information notification means for notifying, to a communication apparatus for transmitting the data, QoS information indicating that the QoS control with respect to the data is not required, in case where the QoS type received by the QoS type receiving means indicates that the QoS control with respect to the data is not required.

13. The communication apparatus as set forth in claim 12, further comprising:

a trigger detection means for detecting a timing, at which a QoS cancellation process with respect to the data is carried out, by analyzing a transmission history or a reception history regarding the data; and a trigger detection notification means for notifying the timing, having been detected by the trigger detection means, to a counterpart station in data communication.

14. A communication apparatus, which transmits data to a receiving communication apparatus, comprising:

a QoS setting control means for carrying out a QoS setting process with respect to the data;

a bridge information obtaining means for obtaining, from the receiving communication apparatus, bridge information including an address of an apparatus to which the data is relayed; and a flow identification information obtaining means for obtaining, from the data, flow identification information for identifying a flow including the data having been received, wherein the QoS setting control means determines whether or not to carry out the QoS setting process in accordance with a result obtained by making a cross-check between the bridge information obtained by the bridge information obtaining means and the flow identification information obtained by the flow identification information obtaining means.

15. A communication apparatus, which relays data transfer between a first network and a second network, wherein said communication apparatus comprises a QoS setting control means for setting QoS of the second network regarding a flow received, by an apparatus connected to the communication apparatus via the first network, from an apparatus connected to the communication apparatus via the second network.

16. A communication apparatus, which serves as a receiving communication apparatus for receiving data transmitted from a transmitting communication apparatus, comprising:
a QoS type receiving means for receiving a QoS type information indicative of a priority of data reception in the communication apparatus with respect to other receiving communication apparatus in receiving data from the transmitting communication apparatus; and
a communication means for transmitting, to the transmitting communication apparatus, a QoS setting request including the QoS type information received by the QoS type receiving means and an address of the communication apparatus, and for transmitting, to the transmitting communication apparatus, a request for transfer of the data.

17. A communication apparatus, which serves as a transmitting communication apparatus for transmitting data to a receiving communication apparatus, comprising:
a receiving means for receiving a QoS setting request which is transmitted from the receiving communication apparatus and which includes (i) QoS type information indicative of a priority of data reception in the communication apparatus with respect to other receiving communication apparatus when the receiving communication apparatus receives data from the transmitting communication apparatus and (ii) an address of the receiving communication apparatus for transmitting the QoS setting request;
a QoS control means for giving a transmission priority, corresponding to the priority indicated by the QoS type information included in the QoS setting request received by the receiving means, to data transmitted to the receiving communication apparatus indicated by the address included in the QoS setting request; and
a data transmitting means for transmitting the data, to which the QoS control means has given the transmission priority, to the receiving communication apparatus indicated by the address included in the QoS setting request, in accordance with the transmission priority.

18. A communication apparatus, comprising:
a QoS type receiving means for receiving QoS type information indicative of a size of a transfer bandwidth of data transmitted from a transmitting communication apparatus to the communication apparatus;
a QoS type management section for generating a QoS notification including information indicative of the size of the transfer bandwidth which size is indicated by the QoS type information having been received by the QoS type receiving means; and
a communication means for transmitting the QoS notification, having been generated by the QoS type management means, to the transmitting communication apparatus, and for transmitting, to the transmitting communication apparatus, a request for transfer of the data.

19. A communication apparatus, included in a communication network which has (a) at least one transmitting communication apparatus for transmitting data, (b) at least one receiving communication apparatus for receiving the data from the transmitting communication apparatus, and (c) a control device equipped with a control means for carrying out QoS control with respect to the data transmitted from the transmitting communication apparatus to the receiving communication apparatus in response to a QoS setting request, said communication apparatus serving as the transmitting communication apparatus,
said communication apparatus comprising:
a receiving means for receiving a trigger detection notification which notifies start of the QoS control carried out with respect to data received by the receiving communication apparatus; and
a QoS type management means for transmitting, to the control device, a QoS setting request for start of the QoS control with respect to the data received by the receiving communication apparatus when the receiving means receives the trigger detection notification.

20. A communication apparatus, included in a communication network which has (a) at least one transmitting communication apparatus for transmitting data and (b) at least one receiving communication apparatus for receiving the data from the transmitting communication apparatus, said communication apparatus serving as the transmitting communication apparatus,
said communication apparatus comprising:
a control means for carrying out QoS control; and
a receiving means for receiving a trigger detection notification which notifies start of the QoS control carried out with respect to data received by the receiving communication apparatus, wherein
the control means starts the QoS control when the receiving means receives the trigger detection notification.

21. A communication apparatus, included in a communication network which has (a) at least one transmitting communication apparatus for transmitting data and (b) at least one receiving communication apparatus for receiving the data from the transmitting communication apparatus, said communication apparatus serving as the receiving communication apparatus,
said communication apparatus comprising a control means for carrying out QoS control, wherein
the control means starts the QoS control in response to reception of the data from the transmitting communication apparatus.

22. A communication apparatus, which receives data from a network and transmits the data having been received to an apparatus communicably connected to the communication apparatus, said communication apparatus comprising:
an identification information obtaining means for obtaining identification information for identifying the apparatus; and
a QoS setting request generation means for generating a QoS setting request for QoS control, in the network, with respect to data transmitted to the apparatus indicated by the identification information obtained by the identification information obtaining means.

23. The communication apparatus as set forth in claim 22, further comprising a period information storage means for storing period information indicative of a period in which the identification information obtaining means obtains the identification information, wherein
the identification information obtaining means obtains the identification information in the period indicated by the period information stored in the period information storage means.

24. The communication apparatus as set forth in claim 22, further comprising a period information specifying means by which a user specifies a period in which the identification information obtaining means obtains the identification information, wherein the identification information obtaining means obtains the identification information in the period specified with the period information specifying means.

25. The communication apparatus as set forth in claim 22, further comprising a period indication means for indicating that the communication apparatus is currently in a period for obtaining the identification information.

26. The communication apparatus as set forth in claim 22, further comprising a QoS type storage means for storing QoS type information indicative of a type of the QoS control, wherein the QoS setting request generation means incorporates, into the QoS setting request, the QoS type information stored in the QoS type storage means, as information for defining content of the QoS control requested by the communication apparatus.

27. The communication apparatus as set forth in claim 22, further comprising a QoS type specifying means by which a user specifies the QoS type information indicative of a type of the QoS control, wherein the QoS setting request generation means incorporates, into the QoS setting request, the QoS type information specified by the QoS type specifying means, as information for defining content of the QoS control requested by the communication apparatus.

28. The communication apparatus as set forth in claim 22, further comprising a QoS type indication means for indicating the QoS type information.

29. The communication apparatus as set forth in claim 22, further comprising a transmission means for transmitting the QoS setting request generated by the QoS setting request generation means to a control device for carrying out the QoS control.

30. A communication apparatus, which receives data from a network and outputs the data having been received to an apparatus communicably connected to the communication apparatus, said communication apparatus comprising:

a plurality of output ports for outputting data to the apparatus; and a QoS setting request generation means for generating a QoS setting request for QoS control in the network regarding data outputted from a QoS target output port which is any one of the plurality of output ports.

31. The communication apparatus as set forth in claim 30, further comprising a QoS type storage means for storing QoS type information indicative of a type of the QoS control, wherein the QoS setting request generation means incorporates, into the QoS setting request, the QoS type information stored in the QoS type storage means, as information for defining content of the QoS control requested by the communication apparatus.

32. The communication apparatus as set forth in claim 31, further comprising a QoS type indication means for indicating the QoS type information.

33. The communication apparatus as set forth in claim 30, further comprising a QoS type specifying means by which a user specifies the QoS type information indicative of a type of the QoS control, wherein the QoS setting request generation means incorporates, into the QoS setting request, the QoS type information specified by the QoS type specifying means, as information for defining content of the QoS control requested by the communication apparatus.

34. The communication apparatus as set forth in claim 33, further comprising a QoS type indication means for indicating the QoS type information.

35. The communication apparatus as set forth in claim 30, further comprising a QoS type indication means for indicating the QoS type information.

36. The communication apparatus as set forth in claim 30, wherein an output port out of the plurality of output ports is determined as the QoS target output port in advance.

37. The communication apparatus as set forth in claim 30, further comprising a QoS target selection means by which a user selects an output port out of the plurality of output ports as the QoS target output port.

38. The communication apparatus as set forth in claim 30, further comprising a QoS target indication means by which a user discriminates the QoS target output port from other output ports.

39. The communication apparatus as set forth in claim 30, further comprising a transmission means for transmitting the QoS setting request generated by the QoS setting request generation means to a control device for carrying out the QoS control.

* * * * *